United States Patent [19]
Baron et al.

[11] Patent Number: 5,517,579
[45] Date of Patent: May 14, 1996

[54] HANDWRITTING INPUT APPARATUS FOR HANDWRITTING RECOGNITION USING MORE THAN ONE SENSING TECHNIQUE

[75] Inventors: Ehud Baron, Haifa; Alexander Prishvin, Jerusalem; Zeev Bar-Itzhak; Victor Korsensky, both of Haifa, all of Israel

[73] Assignee: Baron R & D Ltd., Haifa, Israel

[21] Appl. No.: 227,275

[22] Filed: Apr. 13, 1994

[30] Foreign Application Priority Data

Feb. 4, 1994 [IL] Israel ......................................... 108566

[51] Int. Cl.⁶ ........................................................ G06K 9/62
[52] U.S. Cl. .............................. 382/187; 382/313; 178/18
[58] Field of Search .................................... 382/3, 13, 24, 382/25, 29, 30, 59, 120, 122, 123, 187, 188, 202, 203, 207, 209, 313, 314; 364/705.03, 709.11; 178/18

[56] References Cited

U.S. PATENT DOCUMENTS

| | | | |
|---|---|---|---|
| 3,731,273 | 5/1973 | Hunt | 340/16 |
| 4,122,435 | 10/1978 | Greenaway | 340/146.3 SY |
| 4,128,829 | 12/1978 | Herbst et al. | 340/146.3 SY |
| 4,142,175 | 2/1979 | Herbst et al. | 340/146.3 SY |
| 4,240,065 | 12/1980 | Howbrook | 340/146.3 SY |
| 4,263,592 | 4/1981 | Takahashi et al. | 340/707 |
| 4,317,005 | 2/1982 | DeBruyne | 178/19 |
| 4,345,239 | 8/1982 | Elliott | 340/146.3 SY |
| 4,357,672 | 11/1982 | Howells et al. | 364/561 |
| 4,495,644 | 1/1985 | Parks et al. | 382/3 |
| 4,513,437 | 4/1985 | Chainer et al. | 382/3 |
| 4,578,674 | 3/1986 | Baker et al. | 340/710 |
| 4,654,648 | 3/1987 | Herrington et al. | 340/710 |
| 4,665,282 | 5/1987 | Sato et al. | 178/18 |
| 4,695,741 | 9/1987 | Takeda | 307/643 |
| 4,695,831 | 9/1987 | Shinn | 340/707 |
| 4,703,511 | 10/1987 | Conoval | 382/13 |
| 4,719,578 | 1/1988 | Okitomo et al. | 364/474 |
| 4,751,741 | 6/1988 | Mochinaga et al. | 382/13 |
| 4,758,691 | 7/1988 | DeBruyne | 178/19 |
| 4,814,552 | 3/1989 | Stefik et al. | 178/18 |
| 4,845,684 | 7/1989 | Garwin et al. | 367/137 |
| 4,862,152 | 8/1989 | Milner | 340/712 |

(List continued on next page.)

FOREIGN PATENT DOCUMENTS

| | | | |
|---|---|---|---|
| 63-73386 | 4/1988 | Japan | 382/13 |
| 2270740 | 3/1994 | United Kingdom | G06K 11/18 |

OTHER PUBLICATIONS

EerNisse et al., "Piezoelectric Sensor Pen for Dynamic Signature Verification", Conf.: 1977 Intn. Electron. Dev. Mtg., Washington, DC (5–7 Dec. 1977) pp. 473–476.

Morrissey, "Electronic Calculator Based on Character Recognition of Input from Stylus Acceleration Dynamics," IBM Technical Disclosure Bulletin, vol. 19, No. 7, Dec. 1976 pp. 2816–2817.

C. C. Tappert et al, "The State of the Art in On–Line Handwriting Recognition", IEEE Trans. on Pattern Analysis and Machine Intelligence, vol. 12, No. 8, 1990, pp. 787–808.

Brenner and DeBruyne, "A Sonic Pen: A Digital Stylus System", IEEE Trans. on Computers, vol. C–19, No. 6, Jun. 1970, pp. 546–548.

DeBruyne, "Compact Large–Area Graphic Digitizer For PC", IEEE Computer Graphics and Application, Dec. 1986, pp. 49–53.

IBM Technical Disclosure Bulletin, vol. 12, No. 3, Aug. 1969, p. 390, "Acoustical Data Input Panel" by Gunn et al.

IBM Technical Disclosure Bulletin, vol. 27, No. 11, Apr. 1985, "US Curser Position Detection".

*Primary Examiner*—Leo Boudreau
*Assistant Examiner*—Andrew W. Johns
*Attorney, Agent, or Firm*—Ladas & Parry

[57] ABSTRACT

Handwriting recognition apparatus including handwriting input apparatus employing at least two different sensing techniques to sense handwriting and symbol identification apparatus receiving an output of the handwriting input apparatus for providing an output indication of symbols represented by the handwriting.

54 Claims, 26 Drawing Sheets

U.S. PATENT DOCUMENTS

| | | | |
|---|---|---|---|
| 4,991,148 | 2/1991 | Gilchrist | 367/124 |
| 5,022,086 | 6/1991 | Crane et al. | 382/2 |
| 5,051,736 | 9/1991 | Bennett | 340/707 |
| 5,054,088 | 10/1991 | Gunderson et al. | 382/3 |
| 5,077,802 | 12/1991 | Plamondon | 382/3 |
| 5,111,512 | 5/1992 | Fan et al. | 382/3 |
| 5,142,506 | 8/1992 | Edwards | 367/127 |
| 5,159,321 | 10/1992 | Masaki et al. | 340/706 |
| 5,214,615 | 5/1993 | Bauer | 367/128 |
| 5,215,397 | 6/1993 | Taguchi et al. | 401/194 |
| 5,226,091 | 7/1993 | Howell et al. | 382/3 |
| 5,227,614 | 7/1993 | Danielson et al. | 235/380 |
| 5,239,139 | 8/1993 | Zuta | 178/18 |
| 5,247,137 | 9/1993 | Ebberson | 178/18 |
| 5,280,457 | 1/1994 | Figueroa et al. | 367/127 |
| 5,294,792 | 3/1994 | Lewis et al. | 250/221 |
| 5,308,936 | 5/1994 | Biggs et al. | 178/18 |
| 5,315,667 | 5/1994 | Fujisaki et al. | 382/13 |
| 5,319,721 | 6/1994 | Chefalas et al. | 382/13 |
| 5,333,209 | 7/1994 | Sinden et al. | 382/13 |
| 5,337,149 | 8/1994 | Kozan et al. | 356/376 |
| 5,343,537 | 8/1994 | Beileganda et al. | 382/13 |
| 5,361,310 | 11/1994 | Ishigaki | 382/13 |
| 5,365,598 | 11/1994 | Sklarew | 382/13 |
| 5,434,371 | 7/1995 | Brooks | 178/18 |

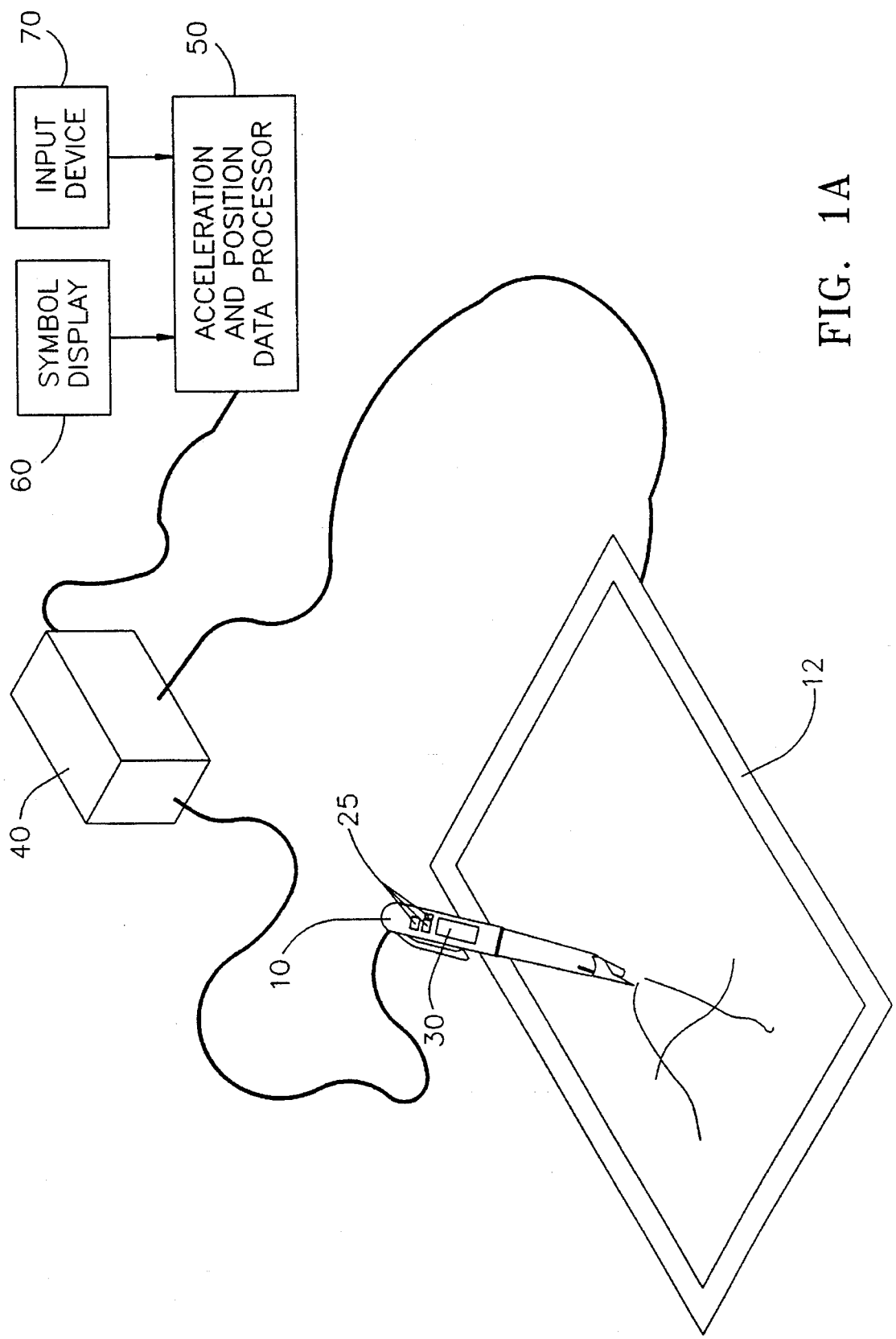

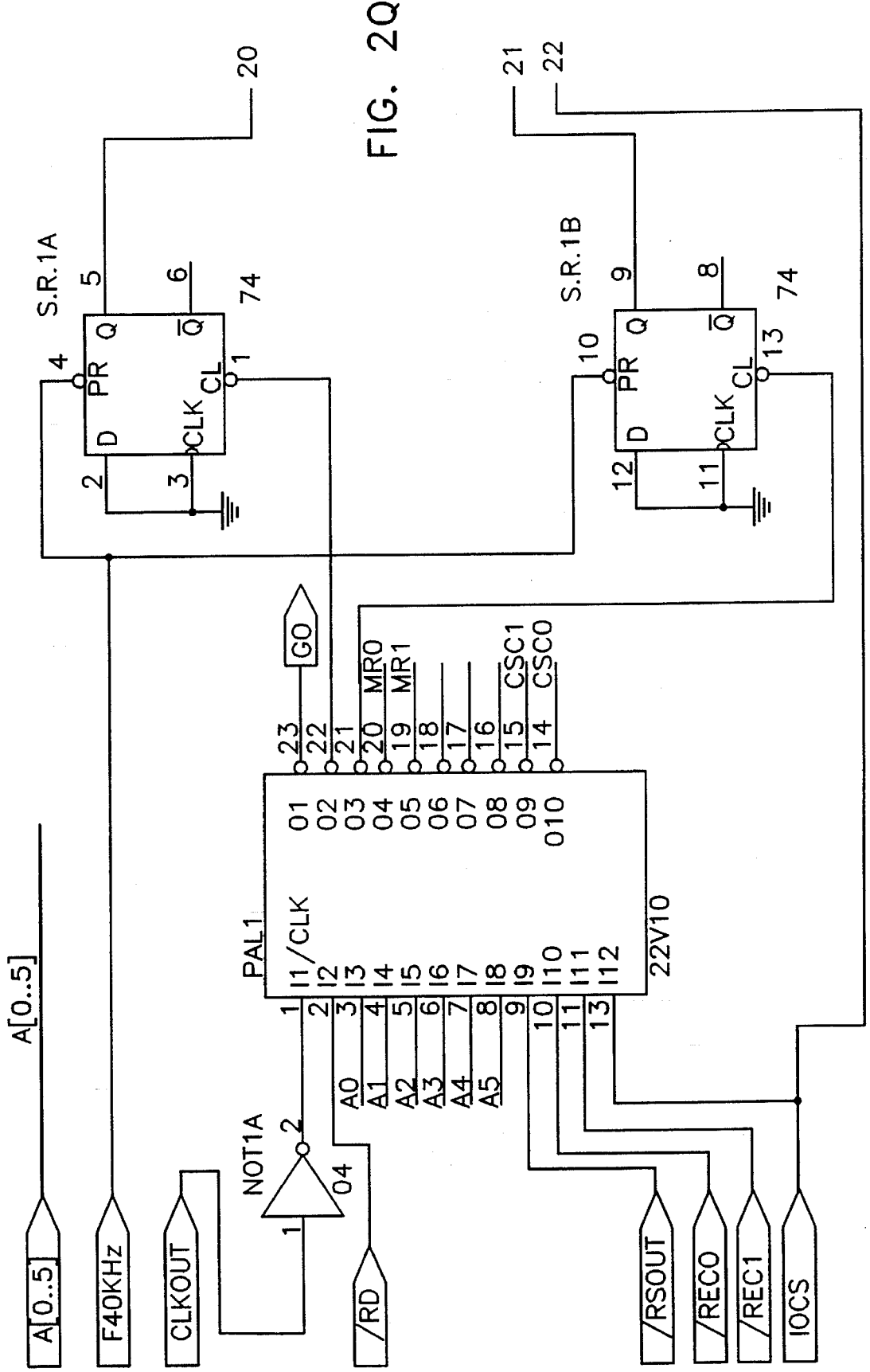

HANDWRITTING INPUT APPARATUS FOR HANDWRITTING RECOGNITION USING MORE THAN ONE SENSING TECHNIQUE

FIELD OF THE INVENTION

The present invention relates to computer input devices generally and more particularly to handwriting recognition computer input devices.

BACKGROUND OF THE INVENTION

There exists a significant amount of activity in the field of on-line handwriting recognition. The prior art current to 1990 is reviewed in "The State of the Art in On-Line Handwriting Recognition" by Charles C. Tappert et al, IEEE Transactions on Pattern Analysis and Machine Intelligence, Vol. 12, No. 8, August, 1990.

Generally speaking, on-line handwriting analysis is currently employed for two distinct applications: identity verification and input of handwritten letters and numbers into a computer. These two applications have sharply contrasting operational requirements and goals. Handwriting analysis for identity verification senses features of handwriting which are distinct for each individual and thus can be used to unambiguously identify a given individual. In contrast, handwriting analysis for alphanumeric input to a computer seeks to minimize the effect of the very features which are important for identity verification and to concentrate on universal handwriting characteristics which can be associated with given symbols independently of the individual writer.

Currently existing and proposed systems providing handwriting analysis for alphanumeric input to a computer are generally geared towards recognition of how a symbol looks rather than how it is created. Accordingly, such systems employ digitizers or graphic tablets.

Signature verification systems, on the other hand, attempt to identify biometric characteristics of the writer and employ indications such as pressure and acceleration during writing.

U.S. Pat. No. 4,345,239 employs pen acceleration for use in a signature verification system. U.S. Pat. No. 5,054,088 employs both acceleration and pressure data characteristics of handwriting for identity verification. As indicated by the above patents, pen acceleration is employed for signature verification because it is a personal feature, characteristic of each individual. Accordingly, pen acceleration has not been employed for alpha-numeric input.

U.S. Pat. No. 4,751,741 describes pen-type character recognition apparatus which employs pen pressure data exclusively.

U.S. Pat. No. 4,695,741 describes a light-pen equipped with an accelerometer for detecting tapping of the pen on a computer screen. As indicated by the above patent, pen acceleration is not used more generally to determine contact between a pen and a surface.

U.S. Pat. No. 4,845,684 describes a hand-held ultrasonic apparatus for detecting contact between a pen and a writing surface. The above patent does not disclose use of acceleration data.

U.S. Pat. No. 4,122,435 describes an apparatus using accelerometers which, when employed to write on a special surface, produces signals which can be used for handwriting analysis.

Position digitization through ultrasonic position digitization is well-known in the prior art, as for example in U.S. Pat. Nos. 3,731,273; 4,317,005; 4,357,672; 4,578,674; 4,654,648; 4,758,691; 4,814,552; 4,862,152; 4,991,148; 5,142,506; 5,214,615; 5,239,139; and 5,280,457. Other publications describing ultrasonic position digitization include "A sonic pen: a digital stylus system" by Brenner and DeBruyne, IEEE Transactions on Computers, Vol. C-19, No. 6, June 1970, pp. 546–548; "Compact Large-Area Graphic Digitizer for PC" by DeBruyne, IEEE Computer Graphics and Applications, December 1986, pp. 49–53; IBM Technical Disclosure Bulletin, Vol. 12, No. 3., August 1969, p. 390; and "US Cursor Position Detection", IBM Technical Disclosure Bulletin, Vol. 27, No. 11, April 1985.

In practice digitized positions derived from ultrasonic measurement are not determined precisely enough to allow even minimally operative handwriting recognition, so that handwriting recognition from ultrasonic position detection is not known in the prior art.

SUMMARY OF THE INVENTION

The present invention seeks to provided an improved computer input device.

There is thus provided in accordance with a preferred embodiment of the present invention handwriting recognition apparatus including handwriting input apparatus employing at least two different sensing techniques to sense handwriting, and symbol identification apparatus receiving an output of the handwriting input apparatus for providing an output indication of symbols represented by the handwriting.

Further in accordance with a preferred embodiment of the present invention the handwriting input apparatus includes a position digitizer and at least one accelerometer located in a hand held writing implement.

Still further in accordance with a preferred embodiment of the present invention the handwriting input apparatus includes ultrasonic position determination apparatus and at least one accelerometer located in a hand held writing implement.

Additionally in accordance with a preferred embodiment of the present invention the handwriting input apparatus is operative to write on a computer screen.

There is also provided in accordance with another preferred embodiment of the present invention apparatus for detecting pen-surface contact including at least one accelerometer measuring at least one component of acceleration of a user's hand manipulating a pen, and a pen-surface contact detector receiving input from the accelerometer.

Further in accordance with a preferred embodiment of the present invention the at least one accelerometer includes a plurality of mutually orthogonally disposed accelerometers.

Still further in accordance with a preferred embodiment of the present invention the symbol identification apparatus includes combined position and acceleration processing apparatus which combines the inputs from the digitizer and the at least one accelerometer in identifying symbols.

Additionally in accordance with a preferred embodiment of the present invention the symbol identification apparatus includes a first identification channel for employing input from the digitizer to provide a first output representing identification of symbols, a second identification channel for employing input from the at least on accelerometer to provide a second output representing identification of symbols, and symbol selection apparatus for selecting between the first and the second outputs based on predetermined criteria.

Further in accordance with a preferred embodiment of the present invention the detector includes an acceleration noise analyzer operative to extract noise out of the acceleration data.

Still further in accordance with a preferred embodiment of the present invention the at least one accelerometer is retrofittable onto the pen.

There is also provided in accordance with another preferred embodiment of the present invention a handwriting recognition method including receiving information regarding the acceleration of a writing implement, and identifying symbols written by the writing implement at least partly on the basis of a comparison between the acceleration of the writing implement and stored acceleration sequences characterizing each of a plurality of symbols.

There is also provided in accordance with another preferred embodiment of the present invention handwriting recognition apparatus including a characteristic acceleration sequence memory operative to store acceleration sequences characterizing each of a plurality of symbols, a writing implement monitor operative to receive information regarding acceleration of a writing implement, and a symbol identifier operative to provide an output indication of symbols written by the writing implement at least partly on the basis of a comparison between the acceleration of the writing implement and the stored acceleration sequences.

Further in accordance with a preferred embodiment of the present invention the writing implement monitor is also operative to receive information regarding the position of the writing implement.

There is also provided in accordance with another preferred embodiment of the present invention a handwriting recognition method including employing at least two different sensing techniques to sense handwriting, and receiving an output of the sensing techniques for providing an output indication of symbols represented by the handwriting.

Further in accordance with a preferred embodiment of the present invention the sensing techniques include position digitizing, and employing at least one accelerometer located in a hand held writing implement to sense acceleration.

There is also provided in accordance with another preferred embodiment of the present invention a method for detecting pen-surface contact including employing at least one accelerometer measuring at least one component of acceleration of a user's hand manipulating a pen, and receiving input from the accelerometer and providing an output indication of pen-surface contact.

Further in accordance with a preferred embodiment of the present invention the method also includes identifying symbols by combining digitized position inputs and sensed acceleration information.

Further in accordance with a preferred embodiment of the present invention the receiving step includes employing digitized position inputs to provide a first output representing identification of symbols, employing acceleration information to provide a second output representing identification of symbols, and selecting between the first and second outputs.

There is also provided in accordance with another preferred embodiment of the present invention handwriting recognition apparatus including handwriting input apparatus including at least first and second different handwriting sensors producing first and second handwriting outputs, and an associator for combining the first and second handwriting outputs to provide an enhanced performance handwriting output, and symbol identification apparatus receiving the enhanced performance handwriting output for providing an output indication of symbols represented by the handwriting.

Further in accordance with a preferred embodiment of the present invention and the first handwriting sensor includes at least one accelerometer.

Still further in accordance with a preferred embodiment of the present invention the second handwriting sensor includes a pad.

Additionally in accordance with a preferred embodiment of the present invention and wherein the second handwriting sensor includes ultrasonic position determination apparatus.

Further in accordance with a preferred embodiment of the present invention the second handwriting sensor is operative to sense handwriting on a computer screen.

Still further in accordance with a preferred embodiment of the present invention the handwriting recognition apparatus includes a writing implement.

Additionally in accordance with a preferred embodiment of the present invention at least one of the first and second handwriting sensors includes apparatus operative to sense the location of the writing implement.

Further in accordance with a preferred embodiment of the present invention the associator is operative to correlate first and second handwriting outputs in a two dimensional domain.

Still further in accordance with a preferred embodiment of the present invention the associator is operative to correlate first and second handwriting outputs in a time domain.

There is also provided in accordance with another preferred embodiment of the present invention a handwriting recognition method including employing at least first and second different handwriting sensors to produce first and second handwriting outputs, combining the first and second handwriting outputs to provide an enhanced performance handwriting output, and employing the enhanced performance handwriting output for providing an output indication of symbols represented by the handwriting.

Further in accordance with a preferred embodiment of the present invention the first handwriting sensor senses acceleration.

Still further in accordance with a preferred embodiment of the present invention at least one of the first and second handwriting sensors is operative to sense the location of a writing implement.

Additionally in accordance with a preferred embodiment of the present invention the step of combining includes correlating the first and second handwriting outputs in a two dimensional domain.

Further in accordance with a preferred embodiment of the present invention the step of combining includes correlating the first and second handwriting outputs in a time domain.

There is also provided in accordance with a preferred embodiment of the present invention hand imaging recognition apparatus including hand imaging input apparatus employing at least two different sensing techniques to sense hand imaging, and shape identification apparatus receiving an output of the hand imaging input apparatus for providing all output indication of shapes represented by the hand imaging.

Further in accordance with a preferred embodiment of the present invention the hand imaging input apparatus includes a position digitizer and at least one accelerometer located in a hand held writing implement.

Still further in accordance with a preferred embodiment of the present invention the hand imaging includes at least one of drawing and handwriting.

Additionally in accordance with a preferred embodiment of the present invention the input apparatus includes ultrasonic position determination apparatus and at least one accelerometer located in a hand held writing implement.

Further in accordance with a preferred embodiment of the present invention the shape identification apparatus includes combined position and acceleration processing apparatus which combines the inputs from the digitizer and the at least one accelerometer in identifying shapes.

Still further in accordance with a preferred embodiment of the present invention the shape identification apparatus includes a first identification channel for employing input from the digitizer to provide a first output representing identification of shapes, a second identification channel for employing input from the at least on accelerometer to provide a second output representing identification of shapes, and shape selection apparatus for selecting between the first and the second outputs based on predetermined criteria.

Further in accordance with a preferred embodiment of the present invention the at least one accelerometer is retrofittable onto a pen.

There is also provided in accordance with another preferred embodiment of the present invention a hand imaging recognition method including receiving information regarding the acceleration of a writing implement, and identifying shapes written by the writing implement at least partly on the basis of a comparison between the acceleration of the writing implement and stored acceleration sequences characterizing each of a plurality of shapes.

Further in accordance with a preferred embodiment of the present invention the hand imaging recognition method also includes receiving information regarding the position of a writing implement.

Still further in accordance with a preferred embodiment of the present invention the hand imaging recognition method also includes storing acceleration sequences characterizing each of a first plurality of shapes as generated by each of a second plurality of users.

There is also provided in accordance with another preferred embodiment of the present invention hand imaging recognition apparatus including a characteristic acceleration sequence memory operative to store acceleration sequences characterizing each of a plurality of shapes, a writing implement monitor operative to receive information regarding acceleration of a writing implement, and a shape identifier operative to provide an output indication of shapes written by the writing implement at least partly on the basis of a comparison between the acceleration of the writing implement and the stored acceleration sequences.

Further in accordance with a preferred embodiment of the present invention the writing implement monitor is also operative to receive information regarding the position of the writing implement.

There is also provided in accordance with another preferred embodiment of the present invention a hand imaging recognition method including employing at least two different sensing techniques to sense hand imaging, and receiving an output of the sensing techniques for providing an output indication of shapes represented by the hand imaging.

Further in accordance with a preferred embodiment of the present invention the sensing techniques include position digitizing, and employing at least one accelerometer located in a hand held writing implement to sense acceleration.

Still further in accordance with a preferred embodiment of the present invention the hand imaging recognition method also includes identifying shapes by combining digitized position inputs and sensed acceleration information.

Additionally in accordance with a preferred embodiment of the present invention the receiving step includes employing digitized position inputs to provide a first output representing identification of shapes, employing acceleration information to provide a second output representing identification of shapes, and selecting between the first and second outputs.

Further in accordance with a preferred embodiment of the present invention the receiving includes extracting noise out of the acceleration data.

There is also provided in accordance with another preferred embodiment of the present invention hand imaging recognition apparatus including hand imaging input apparatus including at least first and second different hand imaging sensors producing first and second hand imaging outputs, and an associator for combining the first and second hand imaging outputs to provide an enhanced performance hand imaging output, and shape identification apparatus receiving the enhanced performance hand imaging output for providing an output indication of shapes represented by the hand imaging.

Further in accordance with a preferred embodiment of the present invention the first hand imaging sensor includes at least one accelerometer.

Still further in accordance with a preferred embodiment of the present invention the second hand imaging sensor includes a pad.

Additionally in accordance with a preferred embodiment of the present invention the second handwriting sensor includes an ultrasonic position determination apparatus.

Further in accordance with a preferred embodiment of the present invention the hand imaging recognition apparatus includes a writing implement.

Further in accordance with a preferred embodiment of the present invention 50 at least one of the first and second handwriting sensors includes apparatus operative to sense the location of the writing implement.

Still further in accordance with a preferred embodiment of the present invention the associator is operative to correlate first and second hand imaging outputs in a two dimensional domain.

Further in accordance with a preferred embodiment of the present invention the associator is operative to correlate first and second hand imaging outputs in a time domain.

There is also provided in accordance with another preferred embodiment of the present invention hand imaging recognition method including employing at least first and second different hand imaging sensors to produce first and second hand imaging outputs, combining the first and second hand imaging outputs to provide an enhanced performance hand imaging output, and employing the enhanced performance hand imaging output for providing an output indication of shapes represented by the hand imaging.

Further in accordance with a preferred embodiment of the present invention the first hand imaging sensor senses acceleration.

Still further in accordance with a preferred embodiment of the present invention at least one of the first and second handwriting sensors is operative to sense the location of a writing implement.

Additionally in accordance with a preferred embodiment of the present invention the step of combining includes correlating the first and second hand imaging outputs in a two dimensional domain.

Further in accordance with a preferred embodiment of the present invention the step of combining includes correlating the first and second hand imaging outputs in a time domain.

BRIEF DESCRIPTION OF THE DRAWINGS AND APPENDICES

The present invention will be understood and appreciated from the following detailed description, taken in conjunction with the drawings in which:

FIG. 1A is a simplified semi-pictorial semi-block diagram illustration of handwriting recognition apparatus constructed and operative in accordance with a preferred embodiment of the present invention;

Figure 1B:
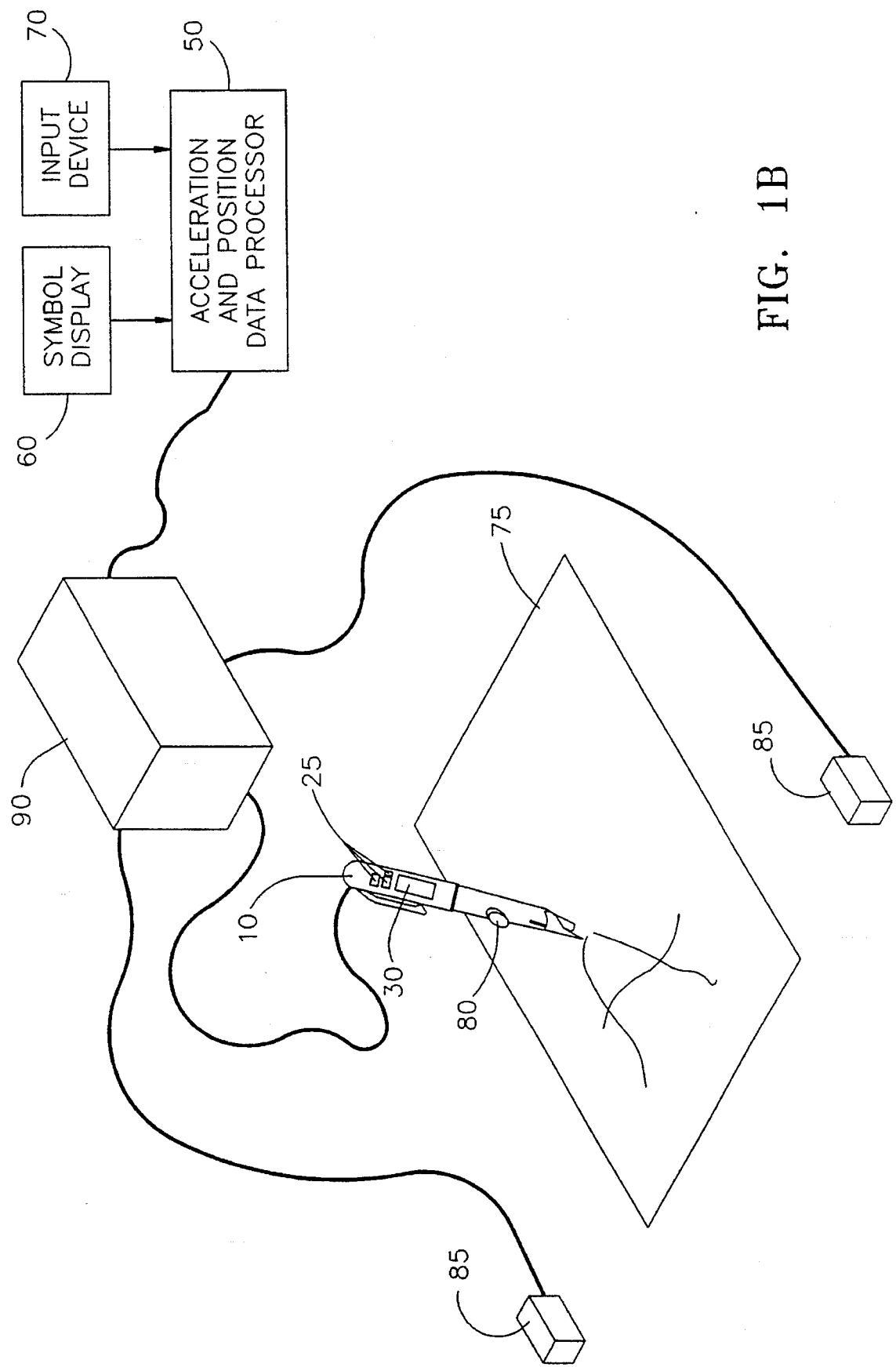
FIG. 1B is a simplified semi-pictorial semi-block diagram illustration of handwriting recognition apparatus constructed and operative in accordance with an alternative preferred embodiment of the present invention.
Figure 2A:
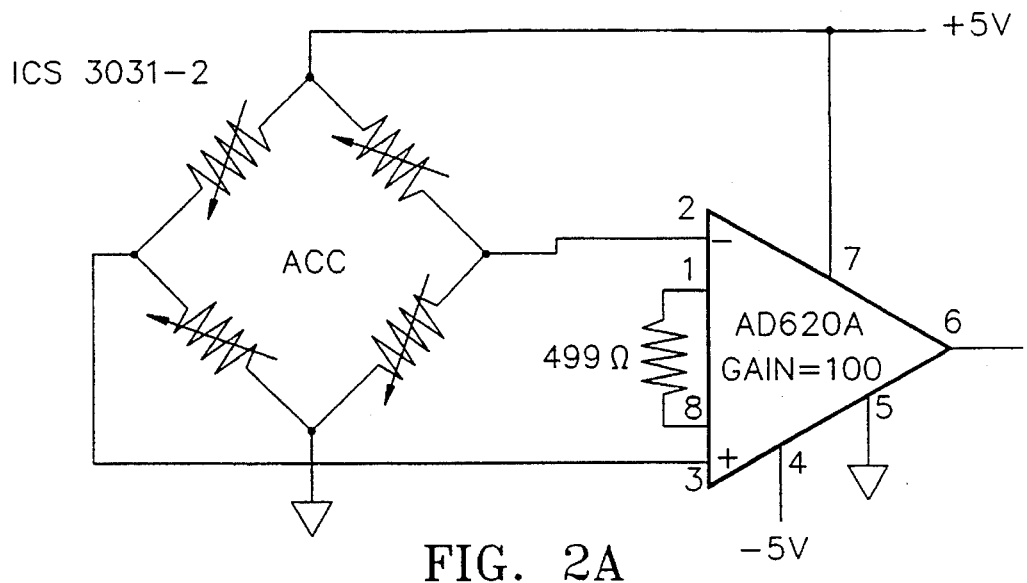
FIGS. 2A through 2R are schematic drawings of preferred structures of portions of the apparatus of FIGS. 1A and 1B.
Figure 2B:
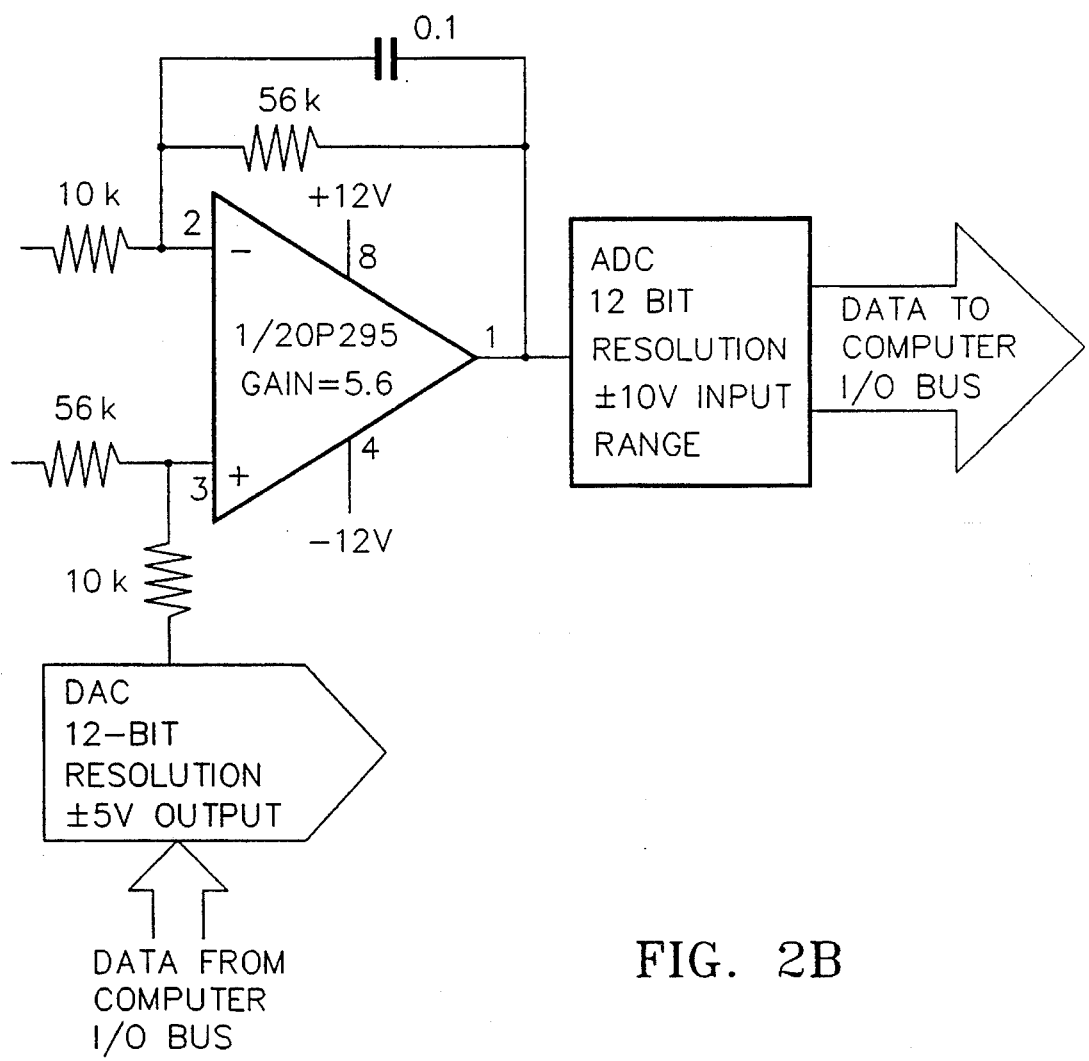
Figure 2C:
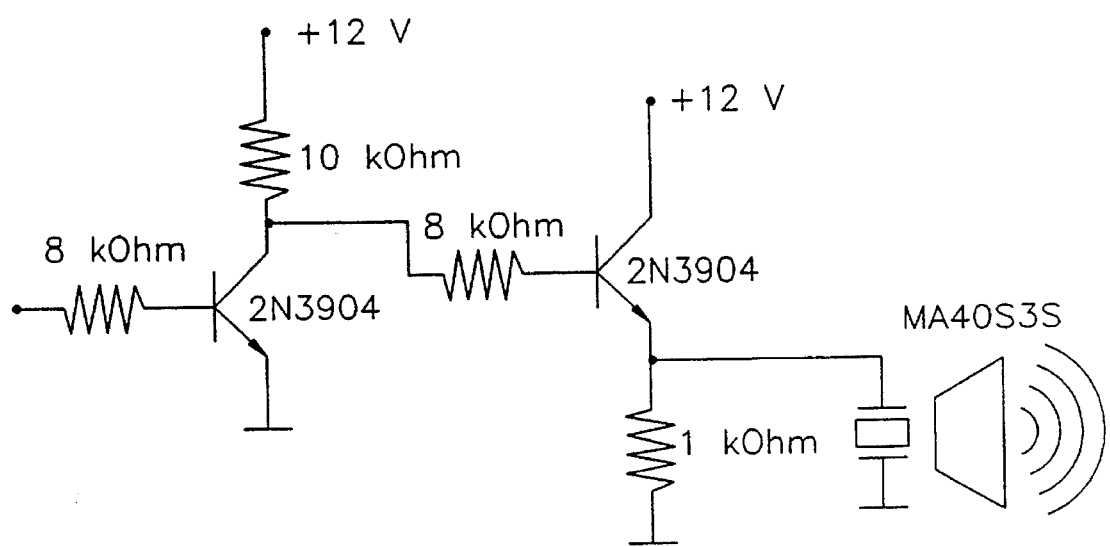
Figure 2D:
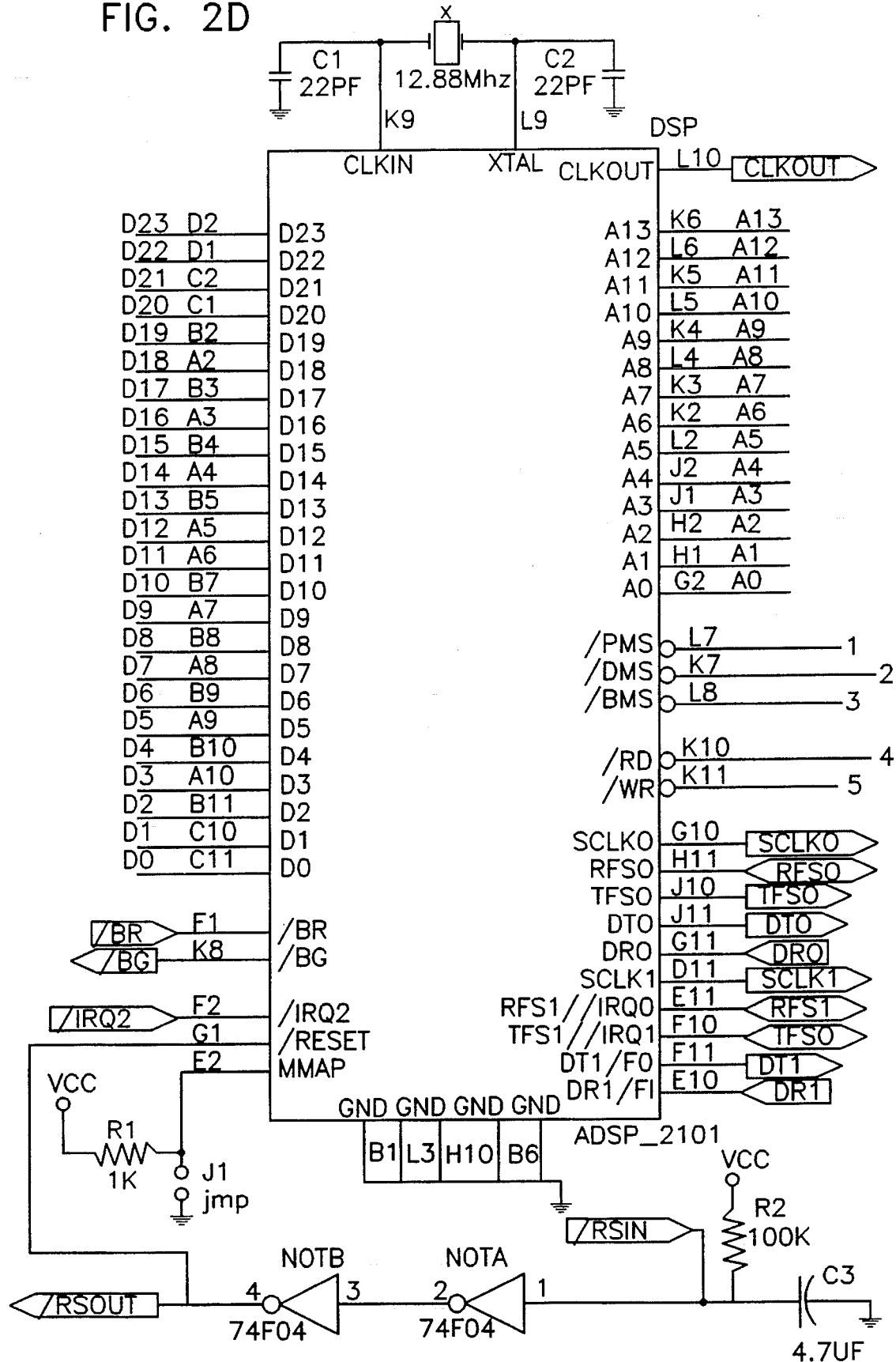
Figure 2E:
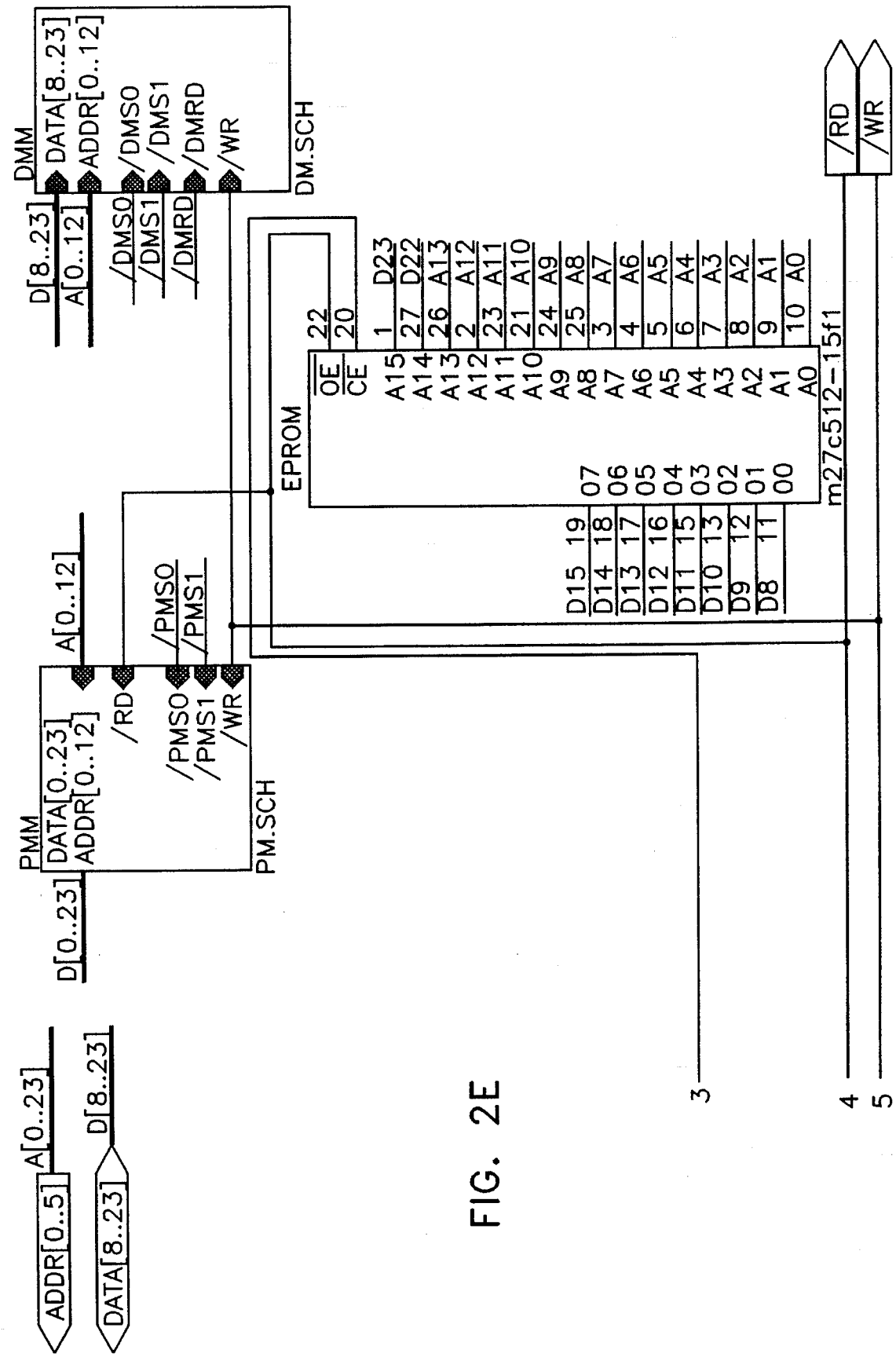
Figure 2F:
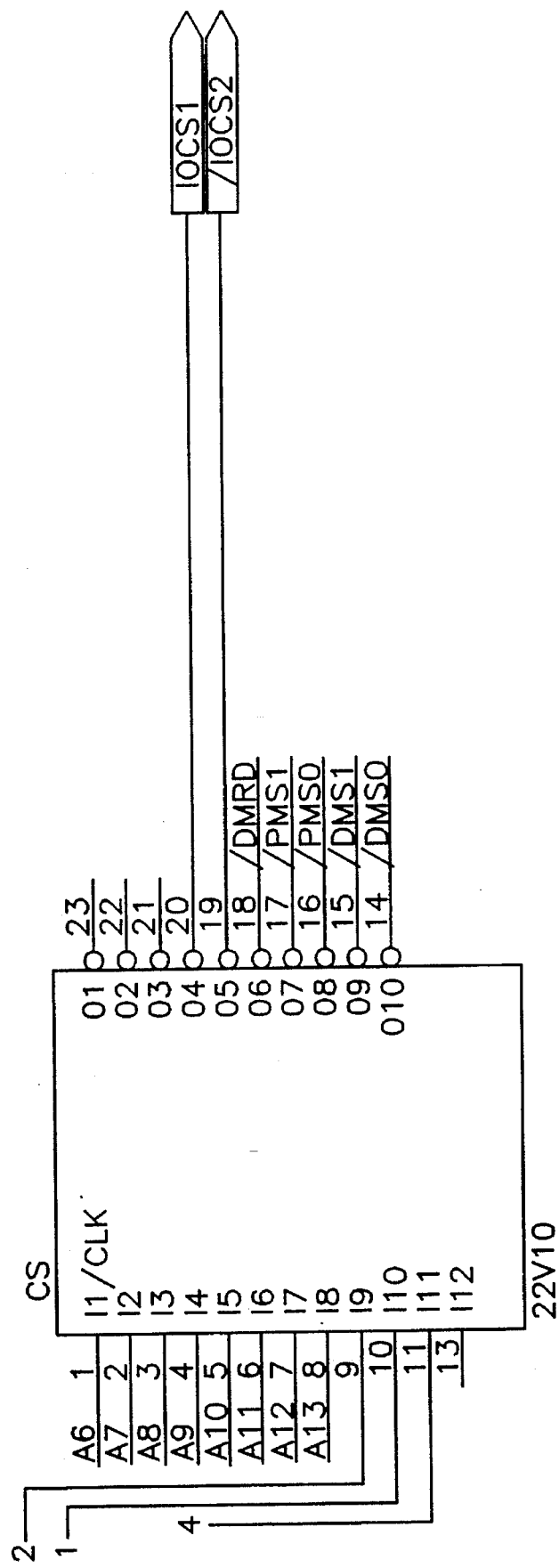
Figure 2G:
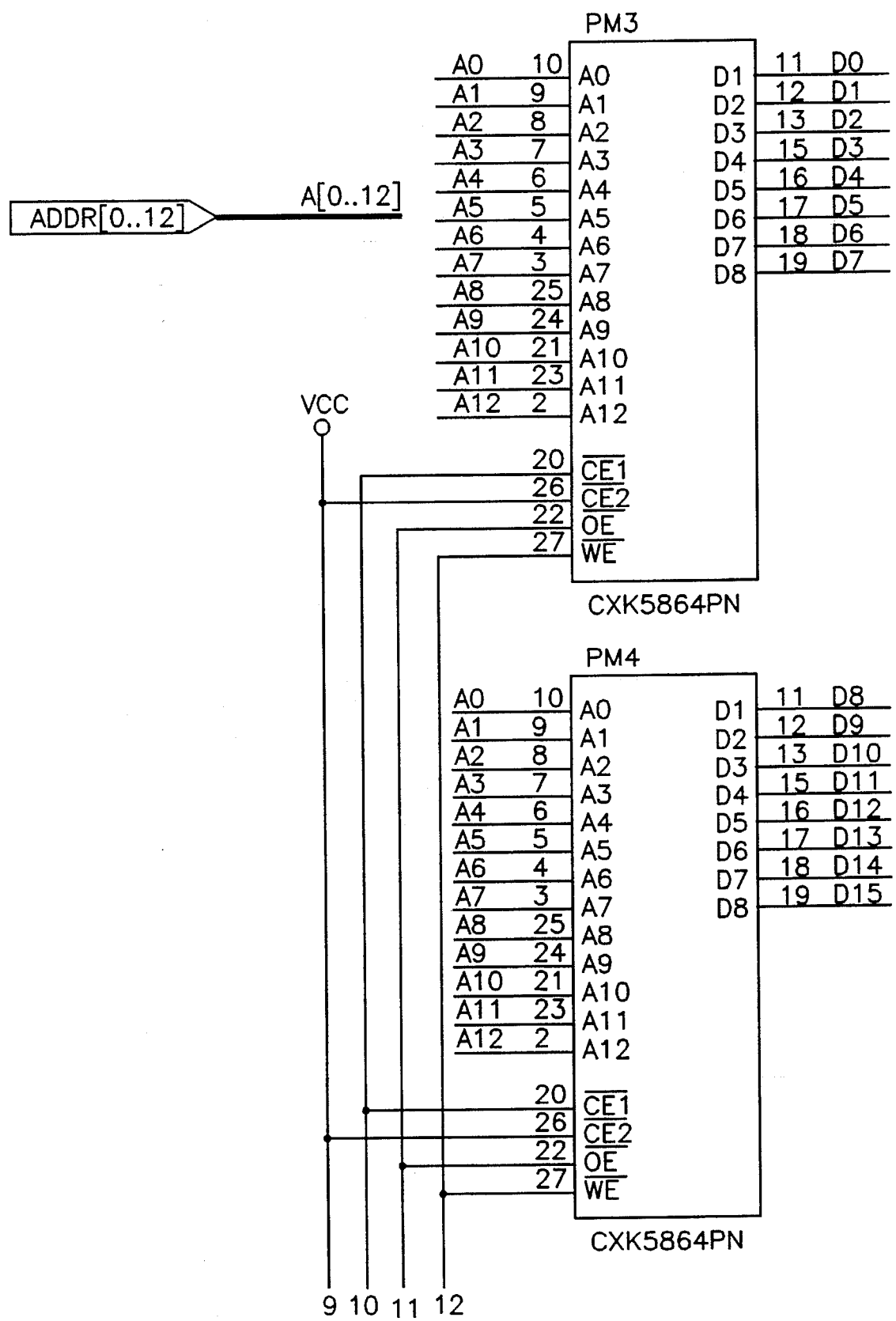
Figure 2H:
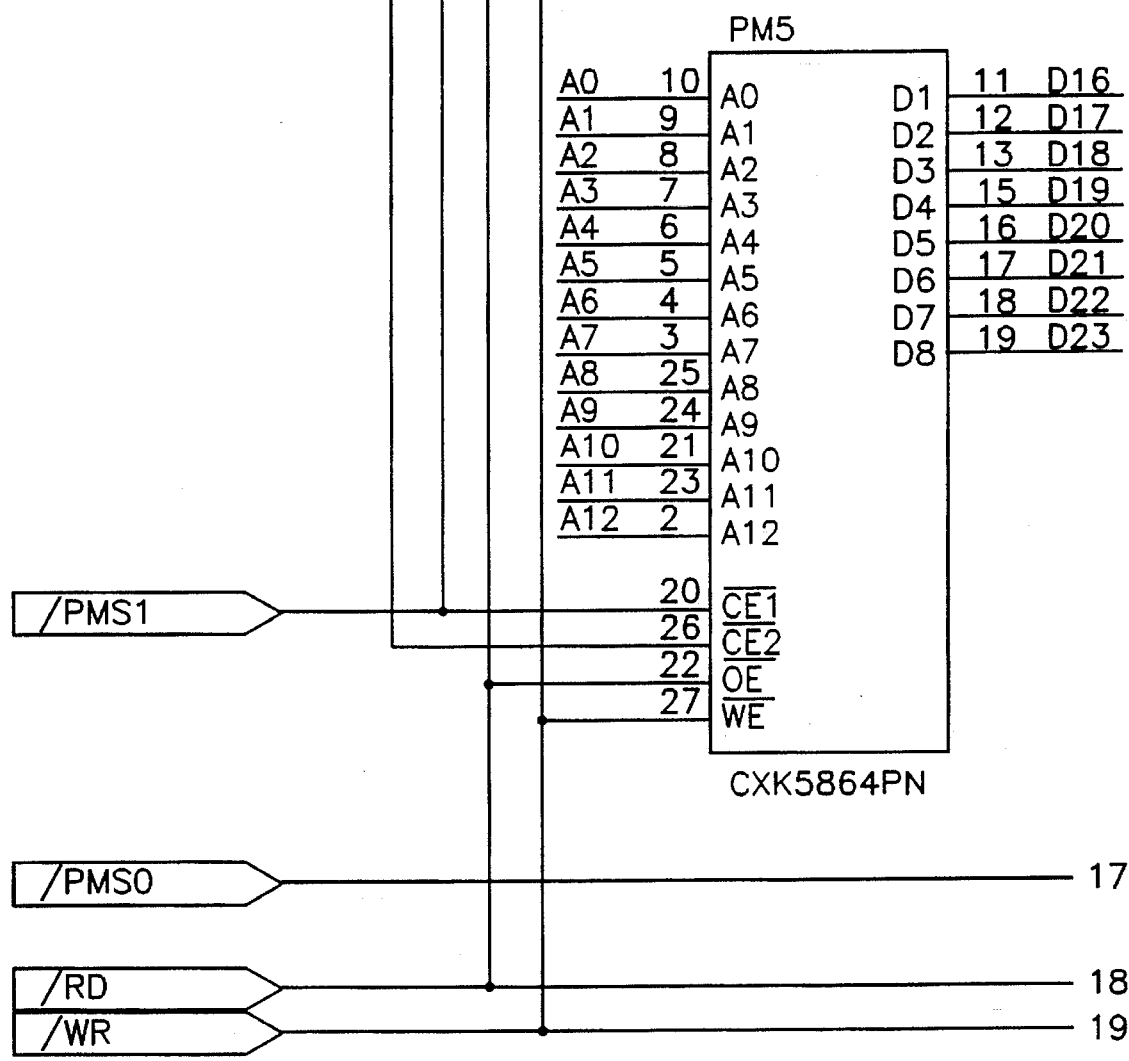
Figure 2I:
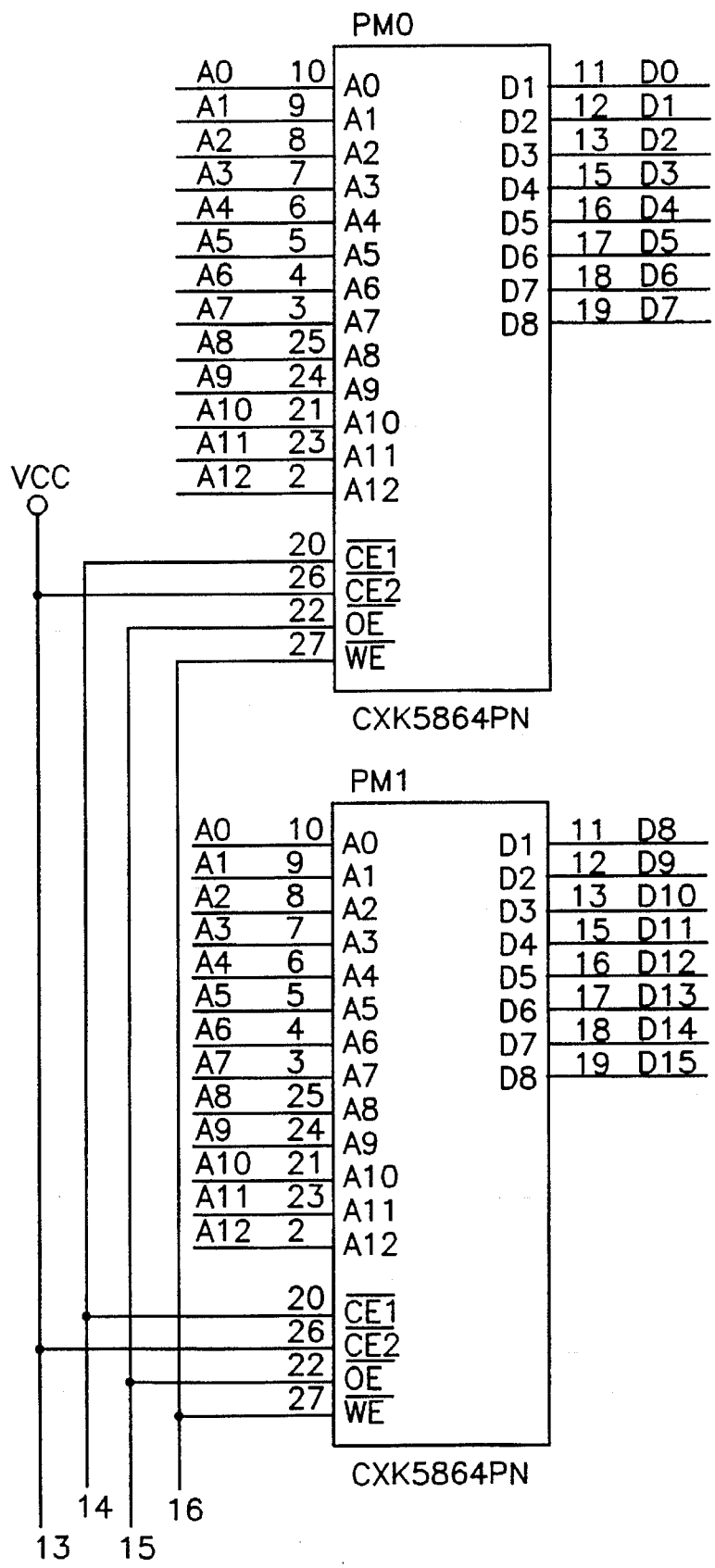
Figure 2J:
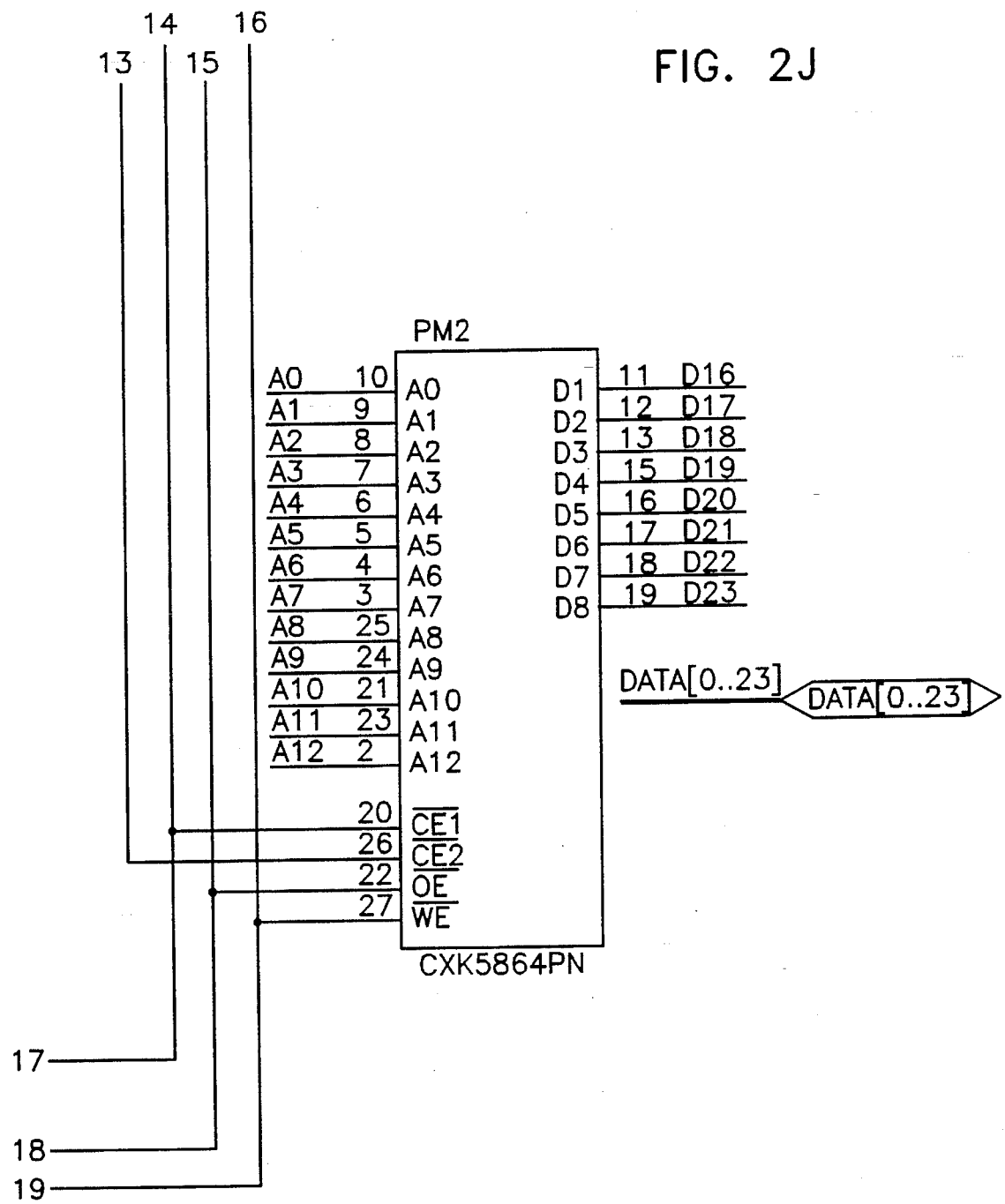
Figure 2K:
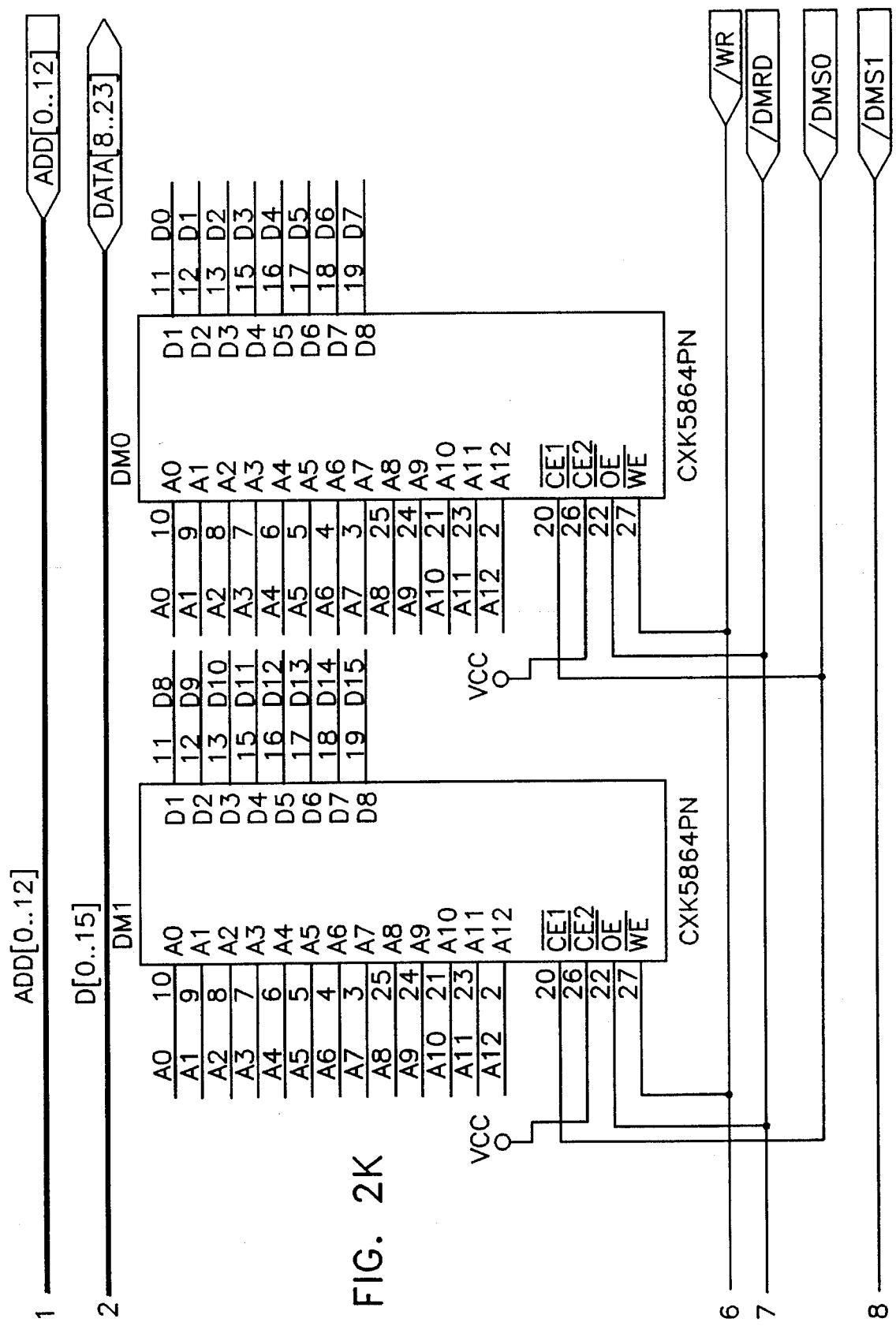
Figure 2L:
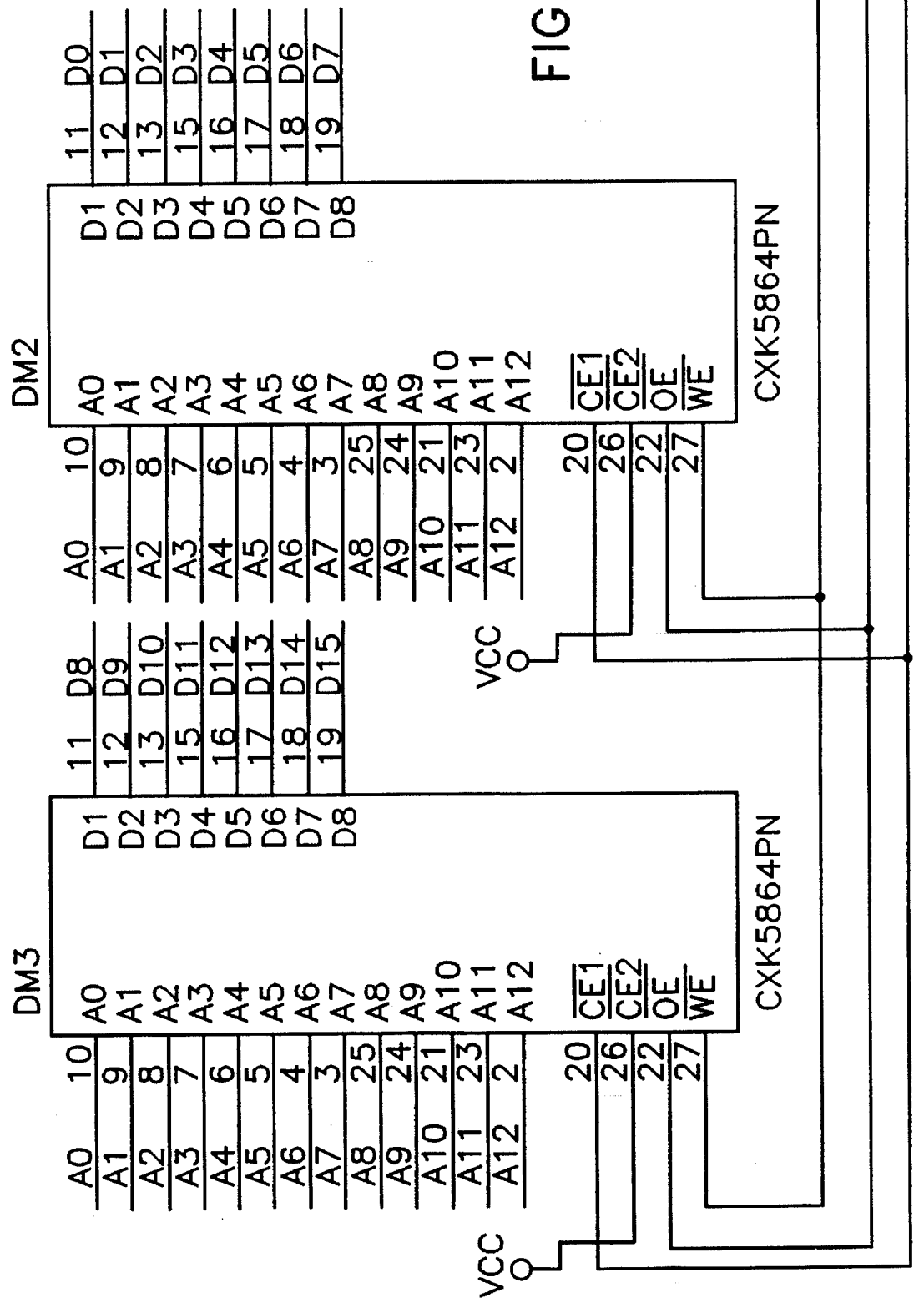
Figure 2M:
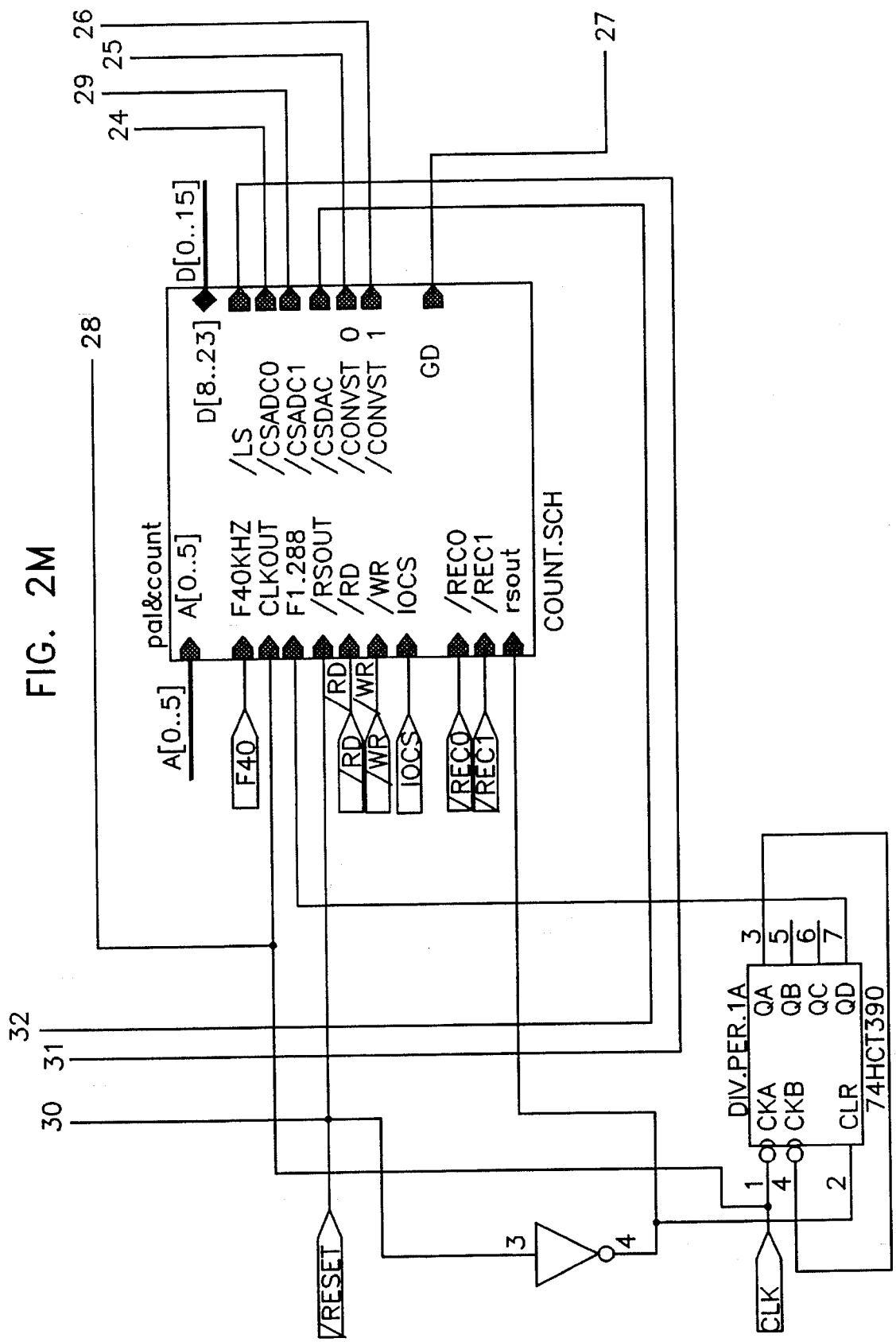
Figure 2N:
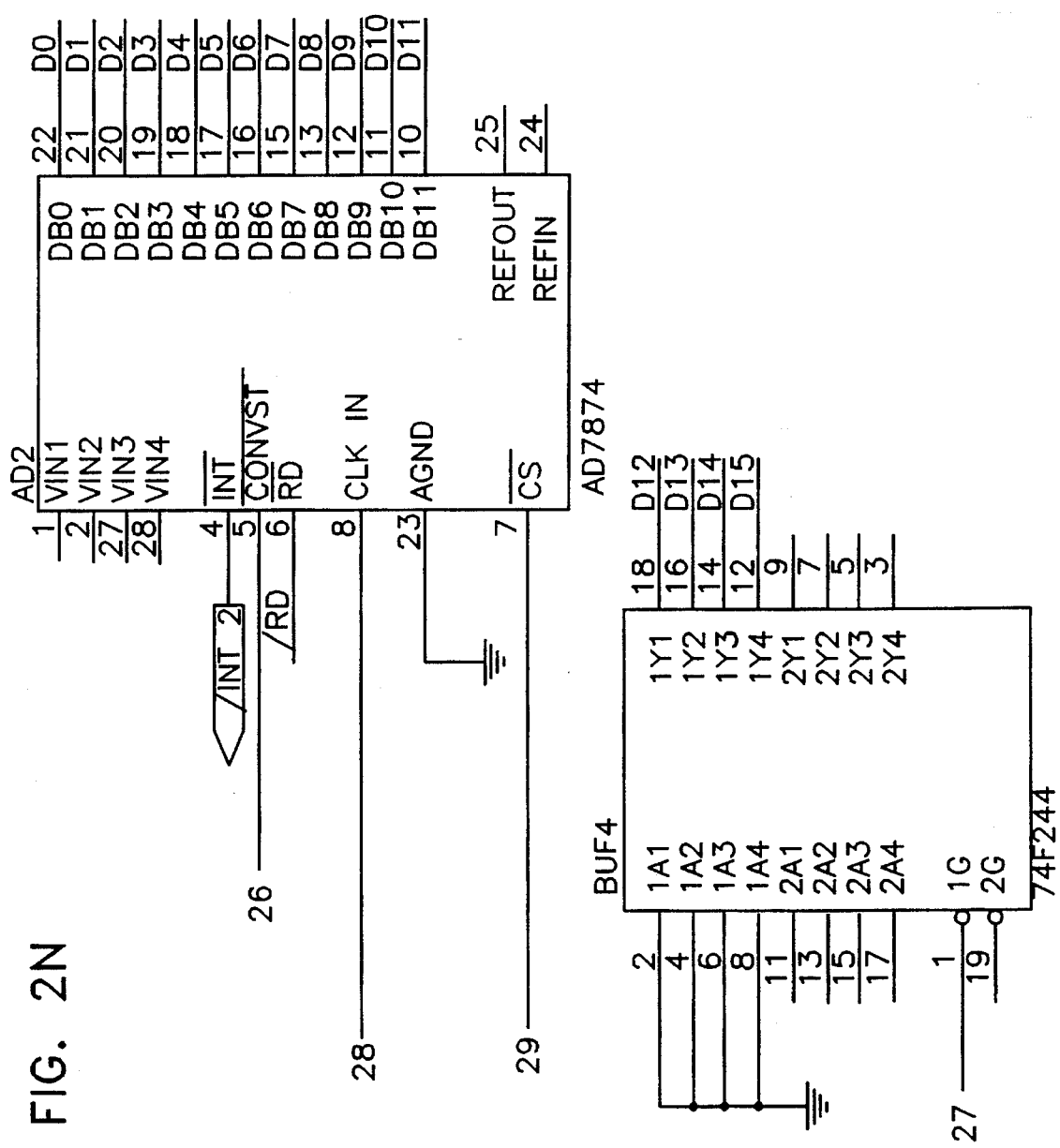
Figure 20:
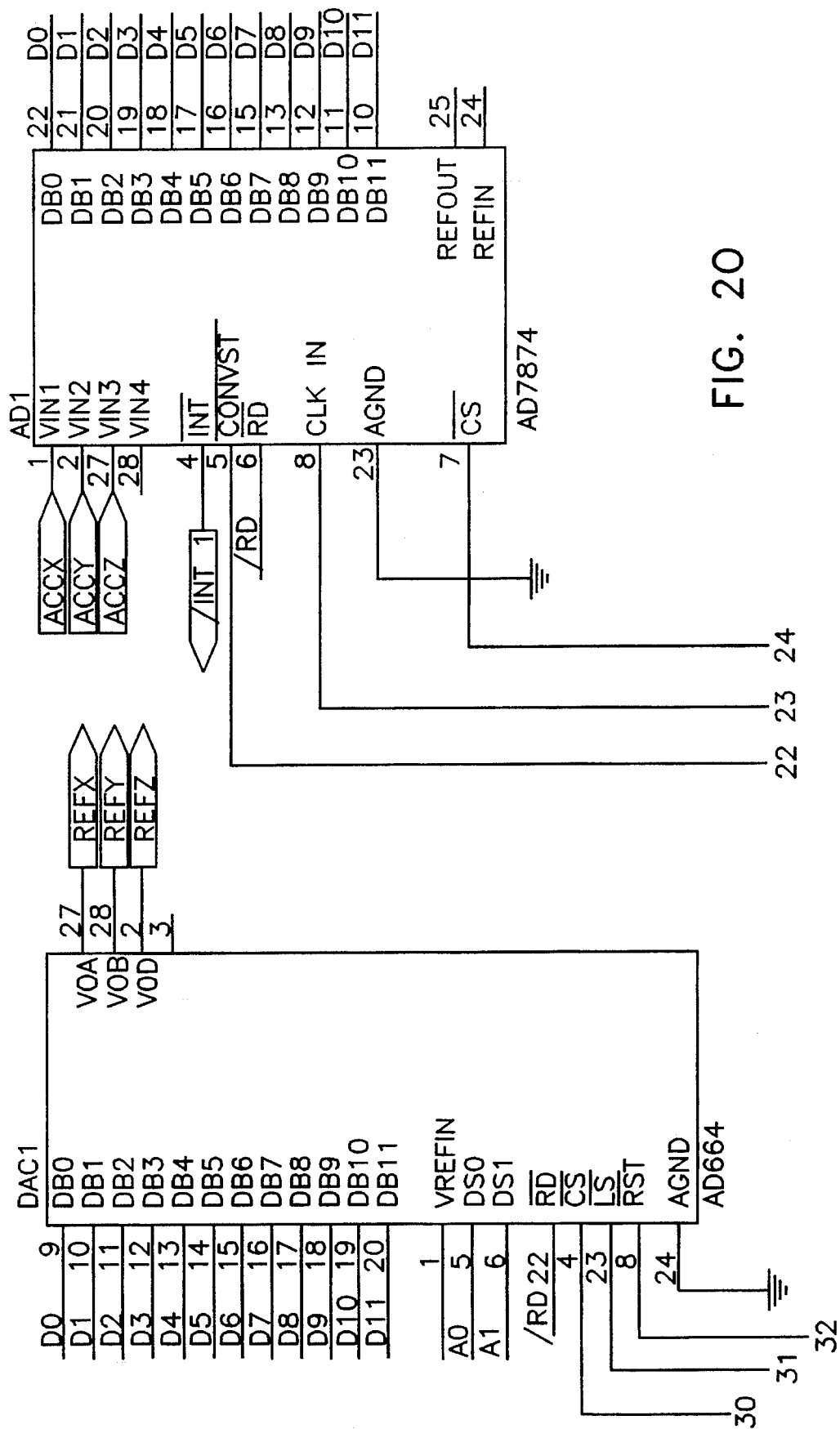
Figure 2P:
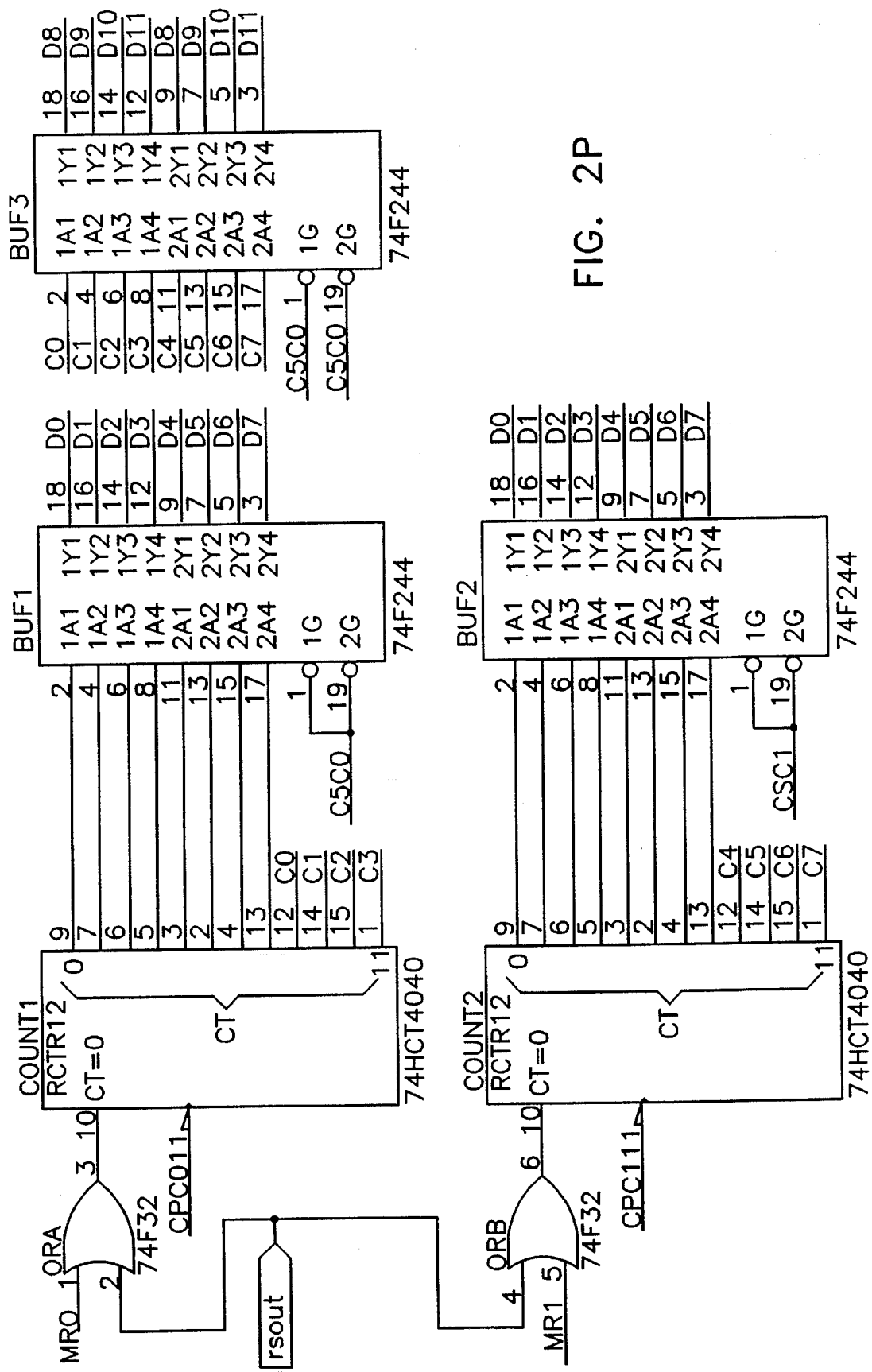
Figure 2R:
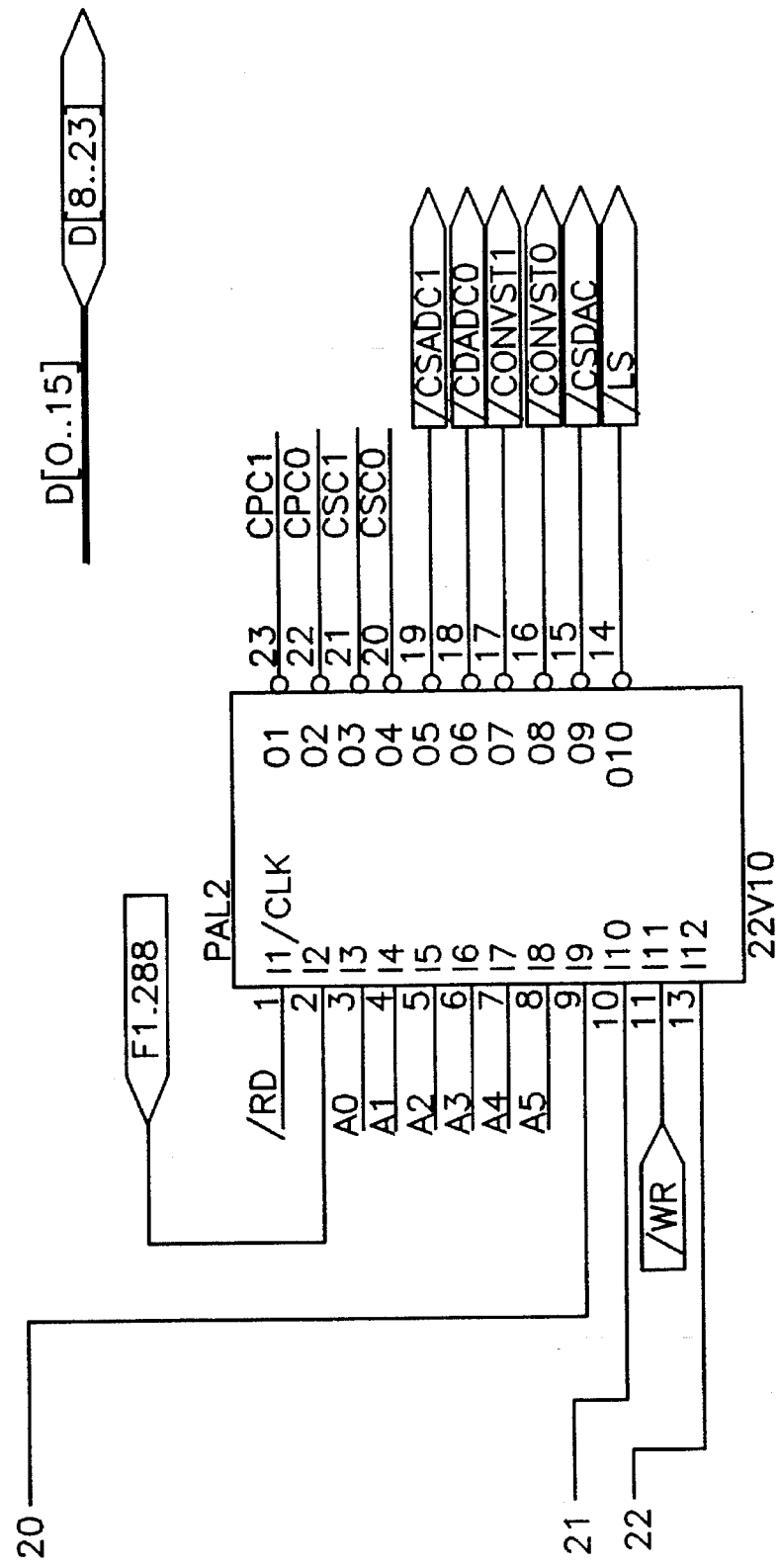
Figure 4A:
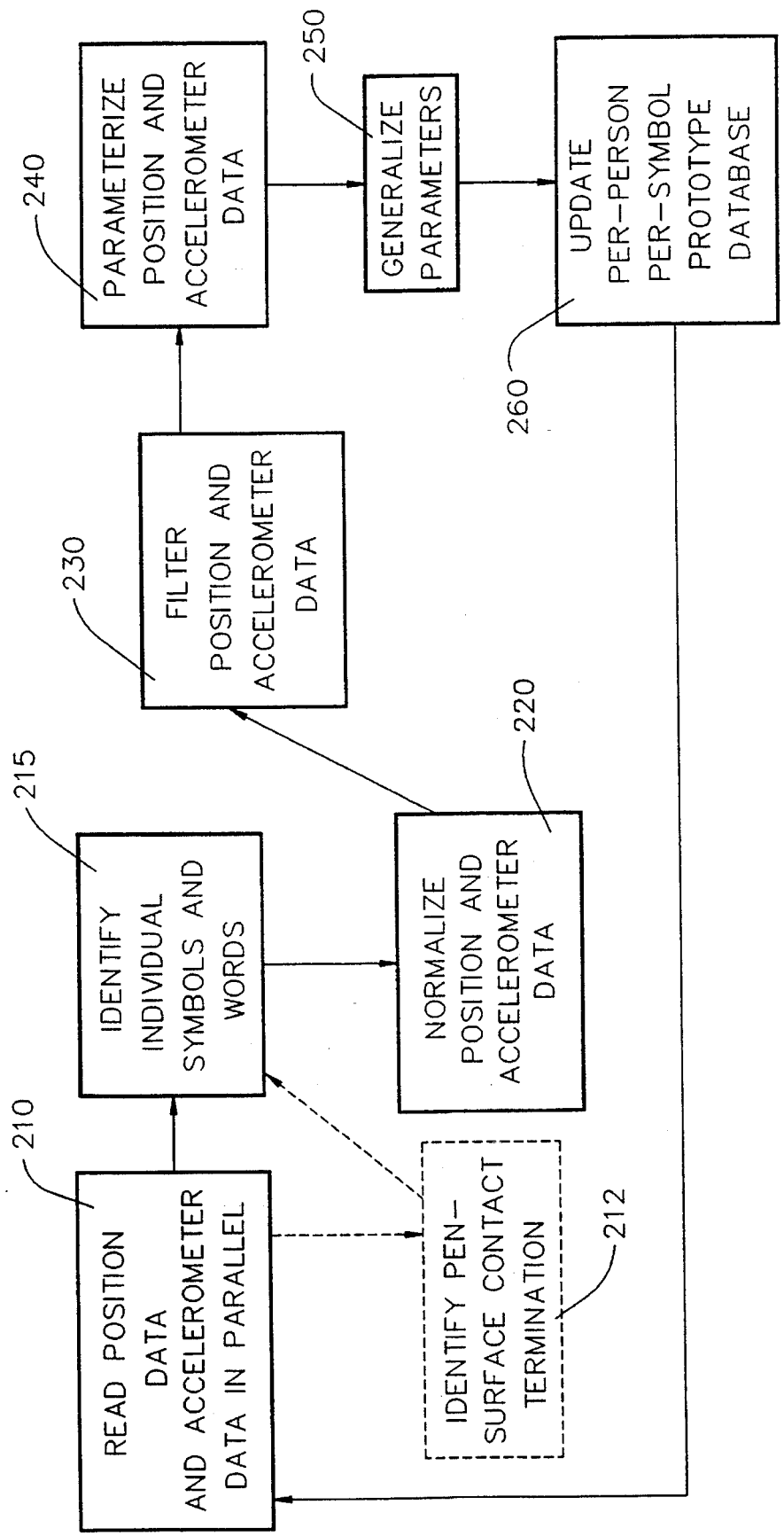
FIG. 4A is a simplified flow chart illustrating the teaching process performed by the handwriting recognition apparatus of FIGS. 1A and 1B.
Figure 4B:
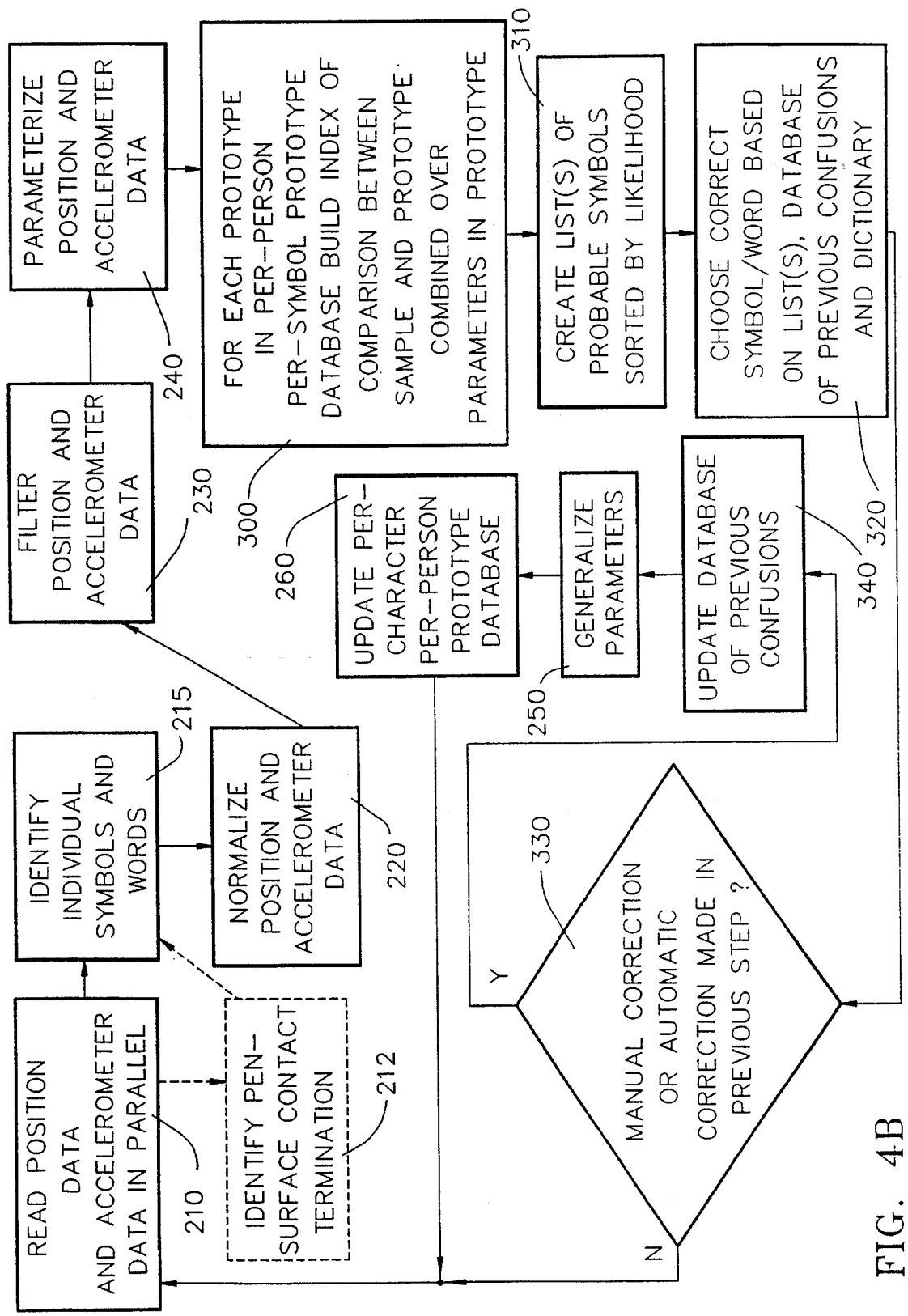
FIG. 4B is a simplified flow chart illustrating the recognition process performed by the handwriting recognition apparatus of FIGS. 1A and 1B.

Attached herewith are the following appendices which aid in the understanding and appreciation of one preferred embodiment of the invention shown and described herein:

Appendix A is a computer listing comprising a preferred implementation of portions of steps 220 and 300 of FIGS. 4A and 4B;

Appendix B is a computer listing comprising another preferred implementation of portions of steps 220, 300, 310, and of FIGS. 4A and 4B;

Appendix C is a computer listing comprising a preferred implementation of the apparatus of FIGS. 2D through 2R;

Appendix D is a computer listing comprising a preferred implementation of a portion of the apparatus of FIG. 1B; and Appendix E is a computer listing comprising a preferred implementation of a portion of the apparatus of FIG. 1B

DETAILED DESCRIPTION OF PREFERRED EMBODIMENTS

Reference is now made to FIG. 1A which is a simplified pictorial illustration of a preferred embodiment of handwriting recognition apparatus constructed and operated in accordance with the present invention. A digitizing pen/accelerometer 10 is employed to write on a graphic tablet 12.

Pen 10 also comprises a built-in accelerometer 25, such as model ICS 3031-2 commercially available from IC Sensors, 1701 McCarthy Blvd., Milpitas, Calif. 95035. Alternatively, pen 10 may comprise a plurality of accelerometers, which accelerometers may or may not be orthogonally disposed.

Pen 10 also comprises one or more amplifiers 30, associated with the one or more accelerometers 25. FIG. 2A is a schematic drawing of a preferred embodiment of amplifier 30 suitable for use in this application.

Alternatively, pen 10 may be fitted with retrofittable apparatus comprising one or more accelerometers 25 as described above, and also comprising associated amplifiers 30, as described above. The apparatus may have the form of a cap fitting the end of pen 10, a ring encircling the pen, or any other suitable form.

Graphic tablet 12 senses the position of the tip of pen 10 relative to tablet 12 and provides a digitized output of data describing the position. Graphic tablet 12 may be any suitable graphic tablet, such as a Wacom Tablet Processor model SD-510C available from WACOM Computer Systems GmbH, Hellersbergstrasse 4, W-4040 Neuss 1, Germany.

The data from the one or more accelerometers in pen 10 is termed herein "accelerometer data". Accelerometer data and location data from graphic tablet 12 are each sent through separate cables to a control circuit 40. Alternatively, the accelerometer data and location data may be sent through a single cable. According to a still further alternative, the accelerometer data and location data may be sent through any kind of wireless communication link, such as ultrasonic, infrared, or by any other suitable means.

Control circuit 40 amplifies the acceleration signals from pen 10 and converts them to digital form, preferably using an analog to digital converter. FIG. 2B is a schematic drawing of a preferred embodiment of an analog to digital converter suitable for use in this application.

Control circuit 40 then sends combined synchronized acceleration data and position data to an acceleration and position data processor 50. Data processor 50 may be any suitable computer, for example, an IBM PC compatible computer with an 80386 processor chip.

Associated with data processor 50 are a symbol display 60 and an input device 70. Recognition occurs within data processor 50 and the recognized symbols are displayed on symbol display 60. If necessary, the user may enter corrections of recognition errors using input device 70. Alternatively, the user may enter corrections using pen 10 and digitizing tablet 12 to choose among alternatives displayed on the symbol display, or using other suitable means.

The functionality of the apparatus of FIG. 1A will now be described. The user employs pen 10 to write symbols on graphic tablet 12. Pen 10 sends acceleration data describing the accelerations of pen 10 during writing to control circuit 40. Graphic tablet 12 sends pen point position data describing the position over time of the point of pen 10 to control circuit 40.

Control circuit 40 amplifies and digitizes the acceleration data. If the acceleration data and the position data are not synchronized in time, control circuit 40 synchronizes the acceleration and location data by matching pen status signals with acceleration data. The combined synchronized data is sent by control circuit 40 to data processor 50.

Alternatively, control circuit 40 may also comprise a processor and memory suitable for storing the combined synchronized data. In this case, pen 10, graphic tablet 12, and control circuit 40 may be used to produce and store the combined synchronized data. Then, at a later time, the data is sent by control circuit 40 to data processor 50 in order for handwriting recognition to occur.

Before handwriting recognition may occur, data processor 50 must create a database which comprises data about each symbol which may be recognized, specific to each person who uses the apparatus. The database is termed herein the per-person per-symbol database.

During teaching, data processor 50 controls the creation of the per-person per-symbol database of handwriting characteristics. The per-person per-symbol database comprises data for each person whose handwriting is known to the system, describing one or more prototypes for each symbol. Each prototype comprises parameters which describes the symbol as written by the person; the parameters are described in more detail below with reference to step 240.

During teaching the user writes symbols from a pre-arranged script known to data processor 50, and the associated symbols appear on symbol display 60 during the writing. Preferably, the pre-arranged script contains several repetitions of each symbol. Preferably, based on the experience of the inventor, the symbols should occur in different parts of the word, such as beginning, middle, and end, throughout the pre-arranged script. The functionality of data processor 50 during the teaching process is more fully described below with reference to FIG. 4A.

During recognition, data processor 50 controls the recognition process which comprises choosing the correct symbol code corresponding to the symbol that was written by the user; preferably, the recognition process also comprises choosing the correct word which was written by the user. The functionality of data processor 50 during the recognition process is more fully described below with reference to FIG. 4B.

Reference is now additionally made to FIG. 1B which is a simplified semi-pictorial semi-block diagram illustration of handwriting recognition apparatus constructed and operative in accordance with an alternative preferred embodiment of the present invention. The apparatus of FIG. 1B is substantially similar to the apparatus of FIG. 1A, except as described below.

In the apparatus of FIG. 1B, pen 10 writes on a writing surface 75, which may be a sheet of paper, a computer display screen, or any other suitable writing surface.

In the case where writing surface 75 comprises a computer display screen, pen 10 may optionally be employed to write without ink, so that pen 10 functions strictly as a data-input device for the associated computer. It is appreciated that pen 10 in this case is particularly suited to function generally as a data input and pointing device as well as functioning as described below for handwriting analysis.

Pen 10 of FIG. 1B is similar to pen 10 of FIG. 1A and additionally comprises an ultrasonic transmitter 80, such as model MA40S3S commercially available from Murata Electronics, GMBH, Halbeinstrabe 21-23, D-8500, Nurnberg, Germany. Ultrasonic transmitter 80 may be mounted on the pen in a suitable location, such as near the tip. Alternatively, ultrasonic transmitter 80 may be retrofittable to the pen. Further alternatively, ultrasonic transmitter 80 may comprise a plurality of transmitters.

A plurality of ultrasonic receivers 85, such as model MA40S3R commercially available from Murata Electronics, GMBH, Halbeinstrabe 21-23, D-8500, Nurnberg, Germany, are located at predetermined positions in proximity to writing surface 75. In the case where writing surface 75 comprises a typical sheet of paper or a typical computer display screen, two ultrasonic receivers 85 are typically sufficient to determine the position of pen 10. In the case where writing surface 75 is large compared to a typical sheet of paper or a typical computer display screen, more than two receivers are preferred.

In the case where two receivers 85 are employed, the line determined by the centers of the two receivers is preferably substantially parallel to the plane in which writing surface 75 largely lies. In the case where more than two receivers 85 are employed, the centers of the receivers are preferably substantially located in a single plane parallel to the plane in which writing surface 75 largely lies.

A control circuit 90 periodically triggers ultrasonic transmitter 80, accumulates data from ultrasonic receivers 85, and calculates position of pen 10 based on the accumulated data. Control circuit 90 comprises a digital signal processor, known herein as a "DSP", such as model ADSP 2101 commercially available from Analog Devices, One Technology Way, P.O.B. 9106, Norwood, Mass. 02062-9106, USA.

Control circuit 90 also comprises a plurality of digital counters operatively associated with the plurality of ultrasonic receivers 85. A suitable counter is model 74HCT4040 commercially available from RCA GMBH, Ridierstrasse 35A, 8000 Munchen 2, Germany. Control circuit 90 further comprises appropriate memory units for data storage and program storage.

Control circuit 90 also amplifies and digitizes the acceleration data. Control circuit 90 amplifies the acceleration signals from pen 10 and converts them to digital form, preferably using an analog to digital converter. FIG. 2B is a schematic drawing of a preferred embodiment of an analog to digital converter suitable for use in this application.

The functionality of the apparatus of FIG. 1B will now be described. The user employs pen 10 to write symbols on writing surface 75. Pen 10 sends acceleration data describing the accelerations of pen 10 during writing to control circuit 90. substantially parallel to the plane in which writing surface 75 largely lies. In the case where more than two receivers 85 are employed, the centers of the receivers are preferably substantially located in a single plane parallel to the plane in which writing surface 75 largely lies.

The receivers 85 are preferably located relative to the writing surface 75 in such a way as to maximize the accuracy of measurement. In the case of the MA40S3R receivers referred to above, the preferable minimum distance between the receivers 85 and the nearest portion of writing surface 75 is twenty centimeters, and the preferable maximum distance between the receivers 85 and the furthest portion of writing surface 75 is one meter.

The receivers 85 typically have a preferred direction of reception; receivers 85 should preferably be directed in the general direction of the area in which pen 10 will be employed. Also, transmitter 80 typically has a preferred direction of transmissions, pen 10 should preferably be employed so that the preferred direction of transmission of transmitter 80 will be toward receivers 85.

Control circuit 90 sends signals to pen 10, triggering ultrasonic transmitter 80 to emit a sequence of pulses. Typically, control circuit 90 sends a burst of pulses, each burst separated from the next burst by a specific time period. Preferably, four closely spaced pulses are sent in each burst, and the bursts are separated by 25 microseconds. Reference is now additionally made to FIG. 2C, which is a schematic drawing of a preferred structure of the portion of control circuit 90 which sends signals to pen 10.

Control circuit 90 restarts the counters included therein at the beginning of each burst. Each of the ultrasonic receivers 85 receives the ultrasonic sound waves emitted by ultrasonic transmitter 80 as part of the burst, and sends a signal to control circuit 90. Upon receipt of a signal from one of the ultrasonic receivers 85, control circuit 90 stops the associated counter. Reference is now additionally made to FIGS. 2D through 2R, which are schematic drawings of a preferred structure of the portion of control circuit 90 comprising the counters, DSP, and associated electronic circuits.

Appendix C is a computer listing comprising a listing in the PALASM computer language of a preferred implementation of the apparatus of FIGS. 2D through 2R.

Appendix D comprises a computer listing of a preferred implementation of the method of accumulating ultrasound data described above, in the language of the ADSP 2101 DSP mentioned above.

Control circuit 90, in parallel with the other operations carried out by control circuit 90, calculates the coordinates of the tip of pen 10 based on the values in the counters within the control circuit. Control circuit 90 filters the counter's signals by removing large jumps in the counter value between one burst and the next; typically, jumps exceeding 25 to 30 units on the counter are considered large.

When a large jump comprising a single data point is detected by control circuit 90, the value of the point is recomputed as the average of the previous and next values. When a large jump comprises two data points, control circuit 90 recomputes the values using linear interpolation. When a large jump comprises more than two data points, control circuit 90 recomputes the values of the points after the jump by subtracting the height of the jump, measured over the preceding data points.

Control circuit 90 removes quantization noise of the counters. When a jump of one unit on the counter comprising a single data point is detected, control circuit 90 recomputes the value of that data point using a zero order interpolation, giving the data point a value equal to that of the preceding and following data points.

Control circuit 90 then computes the position of the tip of pen 10 using triangulation as follows. The counter value represents the time between the transmission of a pulse by ultrasonic transmitter 80 and the receipt of the pulse by the one of ultrasonic receivers 85 associated with the counter. Because the speed of sound in air is taken to be isotropic, the counter value also represents the distance between ultrasonic transmitter 80 and the one of ultrasonic receivers 85 associated with the counter. The position of pen 10 is then computed by applying the Pythagorean theorem.

Control circuit 90 then filters the signals using a low-pass filter, described in Digital Filter Design by T. W. Parks and C. S. Burrus, published by John Wiley & Sons, 1987, chapter 7, section 7.3.3, using the fourth order with cut-off frequency of 0.03.

Appendix E is a computer listing written in the C programming language comprising a preferred implementation of the method for computing position from ultrasound data as described above.

The position data thus computed by control circuit 90 may comprise the position data used subsequently by the apparatus of FIG. 1B. Alternatively, as described below, position data may be computed from a combination of data received by ultrasonic receivers 85 and acceleration data.

Control circuit 90 amplifies and digitizes the acceleration data. If the acceleration data and the position data are not synchronized in time, control circuit 90 synchronizes the acceleration and position data by matching pen status signals with acceleration data. The combined synchronized data is sent by control circuit 90 to data processor 50.

Alternatively, control circuit 90 may also comprise a processor and memory suitable for storing the combined synchronized data. In this case, pen 10 and control circuit 90 may be used to produce and store the combined synchronized data. Then, at a later time, the data is sent by control circuit 90 to data processor 50 in order for handwriting recognition to occur.

In the case described above where data from ultrasonic receivers 85 is combined with acceleration data to obtain position data, the improved position data is computed by data processor 50. Alternatively, the new position data may be computed by the DSP described above with reference to control circuit 90.

Data processor 50 filters the position data from control circuit 90 to remove components other than noise. For example, the acceleration data is filtered by a Butterworth digital filter described in Digital Filter Design by T. W. Parks and C. S Burrus, published by John Wiley & Sons, 1987, chapter 7, section 7.3.3, using the 4th order lowpass digital filter with cut-off frequency of 0.7 to 0.9.

The noise component is generated when pen 10, being moved by the user, is moved over irregularities in writing surface 75, including microscopic irregularities. In the case of most writing surfaces 75, such as for example a sheet of paper, the microscopic surface irregularities occur at regular intervals over surface 75. The number of peaks in the noise component is taken to represent the number of surface irregularities traversed, and hence the distance traversed.

Data processor 50 identifies and counts peaks in the noise. The number of peaks per unit of distance may be determined in advance for the particular type of writing surface 75, may be determined by a learning process, or may be determined by other means.

The positions determined by control circuit 90 from ultrasound data are taken to specify the direction of movement, and the number of peaks in the noise component as described above are taken to specify the distance traversed. Data processor 50 computes, from the direction of movement and the distance traversed, updated and more accurate position data. Preferably, the sample rate of the acceleration data used to compute the noise is greater than the data transmission rate of ultrasound data from control circuit 90.

Before handwriting recognition may occur, data processor 50 must create a database which comprises data about each symbol which may be recognized, specific to each person who uses the apparatus. The database is termed herein the per-person per-symbol database.

During teaching, data processor 50 controls the creation of the per-person per-symbol database of handwriting characteristics. The per-person per-symbol database comprises data for each person whose handwriting is known to the system, describing one or more prototypes for each symbol. Each prototype comprises parameters which describes the symbol as written by the person; the parameters are described in more detail below with reference to step 240.

During teaching the user writes symbols from a prearranged script known to data processor 50, and the associated symbols appear on symbol display 60 during the writing. Preferably, the pre-arranged script contains several repetitions of each symbol. Preferably, based on the experience of the inventor, the symbols should occur in different parts of the word, such as beginning, middle, and end, throughout the pre-arranged script. The functionality of data processor 50 during the teaching process is more fully described below with reference to FIG. 4A.

During recognition, data processor 50 controls the recognition process which comprises choosing the correct symbol code corresponding to the symbol that was written by the user; preferably, the recognition process also comprises choosing the correct word which was written by the user. The functionality of data processor 50 during the recognition process is more fully described below with reference to FIG. 4B.

Figure 3:
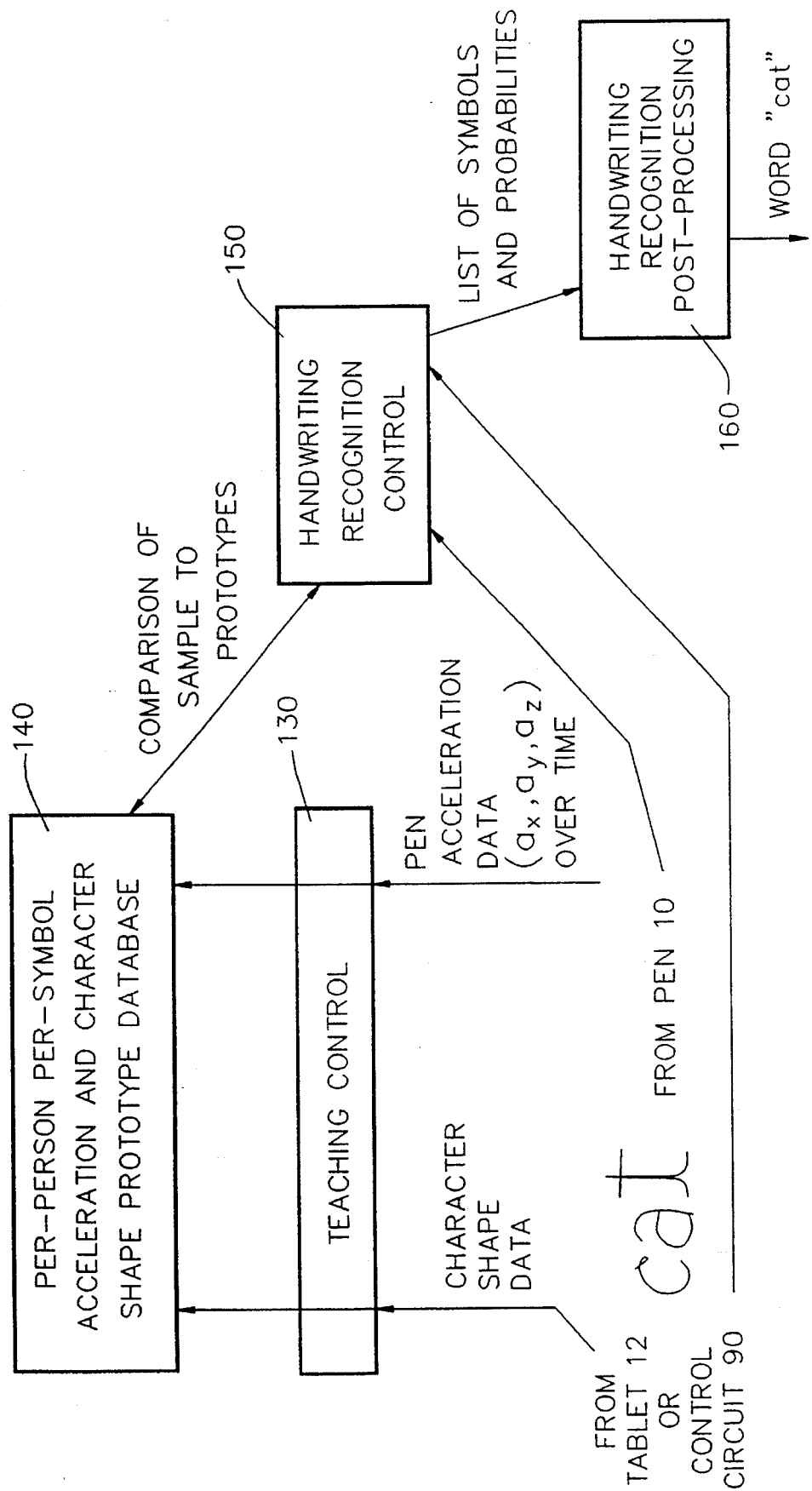
FIG. 3 is a simplified block diagram of the handwriting recognition apparatus of FIGS. 1A and 1B.

Reference is now additionally made to FIG. 3 which is a simplified block diagram of the handwriting recognition apparatus of FIGS. 1A and 1B. The handwriting recognition apparatus of FIG. 3 receives input from pen 10 and either graphic tablet 12 or control circuit 90. The data from either graphic tablet 12 or control circuit 90, representing positions of pen 10, is referred to herein as "position data".

Pen 10, when moved by the user of the handwriting recognition apparatus, transmits data describing the accelerations of pen 10 over time to teaching control 130 and/or handwriting recognition control 150. Pen 10 also provides, in conjunction with graphic tablet 12, data describing the positions traced out over time by the tip of pen 10 as pen 10 is moved by the user over the surface of graphic tablet 12. Alternatively, in the case of the apparatus of FIG. 1B, position data is provided by control circuit 90 as described above.

The data from pen 10 and the position data may be transmitted to a teaching control 130. Transmission to teaching control 130 occurs for each person who is to use the system for handwriting recognition before the person uses the system for handwriting recognition for the first time. Transmission to teaching control 130 also occurs when recognition errors are detected; use of teaching control 130 when recognition errors are detected is termed herein adaptive teaching.

Teaching control 130 operates on the data received, which data represents hand movements by the user when writing a symbol, together with manually-provided identification of the symbol codes that are associated with the data. Teaching control 130 then updates database 140, the per-person persymbol database. Database 140 comprises prototypes of accelerations and symbol shape for each symbol, comprising data specific to each person for each symbol.

Alternatively, the data from pen 10 and the position data may be transmitted to handwriting recognition control 150. Handwriting recognition control 150 operates on the data received from pen 10 and the position data to recognize the symbol represented by the movement of pen 10 on graphic tablet 12 or writing surface 75. The output of handwriting recognition control 150 comprises a list of symbol codes and their respective probabilities.

A handwriting recognition post-processing circuit 160, chooses the correct symbol code based on the list of symbol codes and probabilities, and on post-processing information which preferably comprises a database of previous confusions and a dictionary. The output of handwriting recognition post-processing circuit 160 is a symbol code or a word.

Reference is now additionally made to FIGS. 4A and 4B which are simplified flow charts illustrating operation of the handwriting recognition apparatus of FIGS. 1A and 1B in accordance with a preferred embodiment of the invention. FIG. 4A illustrates the teaching process and FIG. 4B illustrates the recognition process.

The preferred method of operation of the method of FIG. 4A includes the following steps:

STEP 210: Read position data and accelerometer data in parallel. Preferably, the accelerometer data is sampled more often than the position data; for example, eight data points may be collected from the accelerometer for each data point in the position data.

The combined data preferably comprises the X,Y coordinates of the position of the tip of the pen 10 in the grid of the tablet and the tablet contact status of pen 10, i.e. whether or not it is in contact with the tablet surface. The status may be operationally indicated as "pen up", "pen down", or "pen out of proximity with the tablet", in the case of the Wacom Tablet Processor specified above. The combined data also preferably comprises the average value of the accelerometer data points corresponding to a single graphic tablet data point. The status of pen 10 may be derived from signals transmitted by graphic tablet 12, by a switch operatively associated with the tip of pen 10, as described below with reference to step 212, or by other means.

STEP 212: Identify pen-surface contact termination. The data from step 210 may not include the surface contact status of pen 10. In this case, the surface contact status of pen 10 may be derived from the acceleration data. The acceleration data is filtered to remove components other than noise. For example, the acceleration data is filtered by a Butterworth digital filter described in Digital Filter Design by T. W. Parks and C. S Burrus, published by John Wiley & Sons, 1987, chapter 7, section 7.3.3, using the 4th order lowpass digital filter with cut-off frequency of 0.7 to 0.9.

The filtered acceleration data is then integrated over time. The slope of the integrated filtered acceleration data is then analyzed to determine the point at which the slope exceeds a threshold value. The point at which the slope exceeds the threshold value is taken to be the first point with status "pen down". The point at which the slope falls below a threshold value is taken to be the first point with status "pen up"; the threshold value may or may not be the same as the previously described threshold value. In the case of determining pen status based on accelerometer data there is no status "pen out of proximity".

The threshold values described above may be determined in advance for the particular type of pen and writing surface, may be determined by a learning process for the particular person, or may be determined by other means.

STEP 215: Identify individual symbols and words. The data from the previous step is divided into data representing individual symbols. The status which comprises the statuses of "pen up" or "pen out of proximity" is termed herein "pen not down". Preferably, the number of consecutive data points with status of "pen not down", which data points represent a particular duration of the status "pen not down" is taken to indicate the end of a symbol or of a word.

Typically, the duration of status "pen not down" within a range from 200 milliseconds to 400 milliseconds is taken to indicate the end of a symbol. Duration of the status "pen not down" in the range from 800 milliseconds to 1200 milliseconds is typically taken to indicate the end of a word.

Alternatively, the end of a symbol or of a word may be indicated by data points which represent pen movements that are not part of a symbol, or by other means. Output data from step 215 comprises symbol end and word end data.

STEP 220: Normalize combined data. The combined position data and the accelerometer data are normalized in time or by other means.

Appendix A is a computer listing in the C programming language comprising routines that are a preferred implementation of step 220. The routines comprise the following routines in section II, "pre-preprocessing": normal; together with various definitions used by routine normal.

STEP 230: Filter combined data. The normalized combined data received from the previous step is filtered in order to remove noise. The filtering may be accomplished by iterative smoothing of adjacent points until the total change in the signal due to a smoothing operation is less than the desired accuracy of the data, or by other suitable means.

STEP 240: Parameterize combined data. The data is parameterized according to criteria which are chosen to represent each symbol. Reference is now additionally made to FIGS. 5A through 5D which graphically illustrate some of the parameters.

Figure 5B:
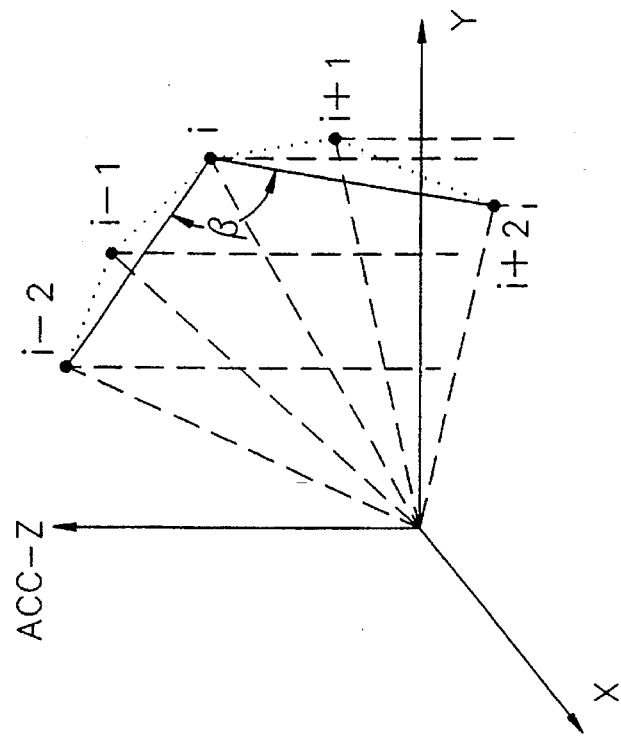
FIGS. 5A through 5D are graphical depictions of data illustrating a preferred method for a portion of the teaching and recognition processes performed by the handwriting recognition apparatus of FIGS. 1A and 1B.
Figure 5A:
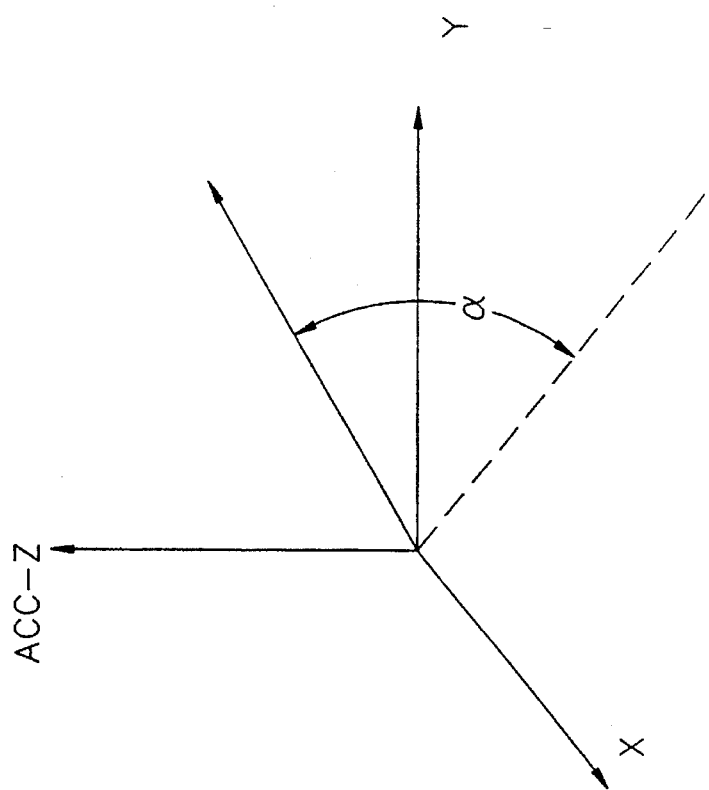

If the pen comprises a single accelerometer, the parameters preferably comprise the following:

number of points before normalization;

normalized signal of pen status;

normalized signal of accelerations;

sine of the angle α which angle is defined as the angle between the vector associated with the current data point $(X_i, Y_i, AccZ_i)$ and the XY plane as shown in FIG. 5A;

cosine of the angle α;

sine of the angle β which angle is defined as the angle between the vector that connects the point before the previous point $(X_{i-2}, Y_{i-2}, AccZ_{i-2})$ and the current point $(X_i, Y_i, AccZ_i)$, and the vector that connects the current point with the point after the subsequent point $(X_{i+2}, Y_{i+2}, AccZ_{i+2})$ in space (X,Y,AccZ) as shown in FIG. 5B;

and cosine of the angle α.

Alternatively, the pen may comprise, for example, three accelerometers, which are not necessarily mutually orthogonal. If the accelerometers are not mutually orthogonal, the acceleration data may be converted into equivalent data in a mutually orthogonal coordinate system as follows:

Let the non-orthogonal signals be denoted by the vector $u=(u_1,u_2,u_3)^T$ and the orthogonal signals be denoted by the vector $u=(u'_1,u'_2,u'_3)^T$. Then $u'=A_0A^{-1}u$ where A is a vector of static sensitivity vectors $A=(A_1,A_2,A_3)$ of the three accelerometers. The static sensitivity vector is computed from the outputs of the accelerometers during a defined orientation without movement. $A_0$ is a diagonalized matrix of sensitivity of the orthogonal coordinate system comprising the norms of $A_1$, $A_2$, and $A_3$.

Figure 5D:
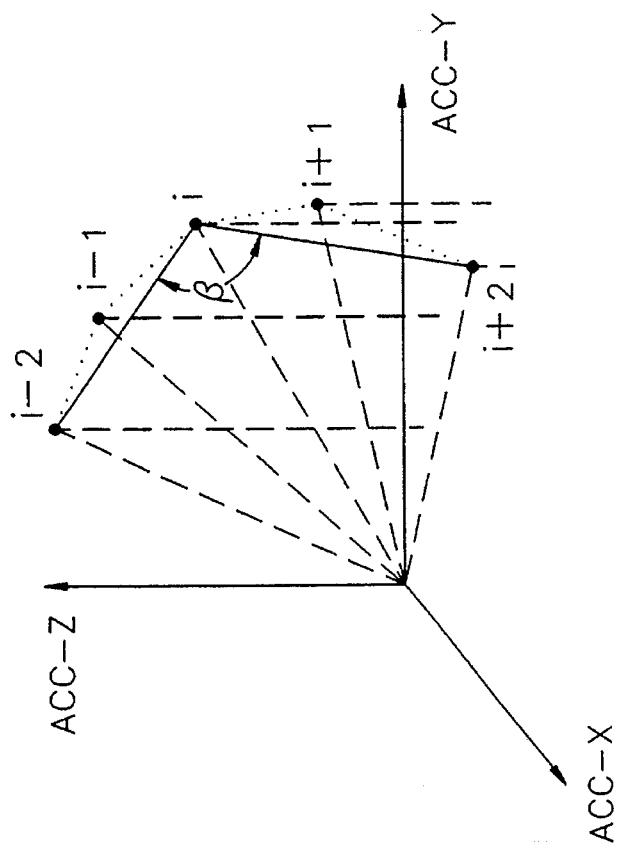
Figure 5C:
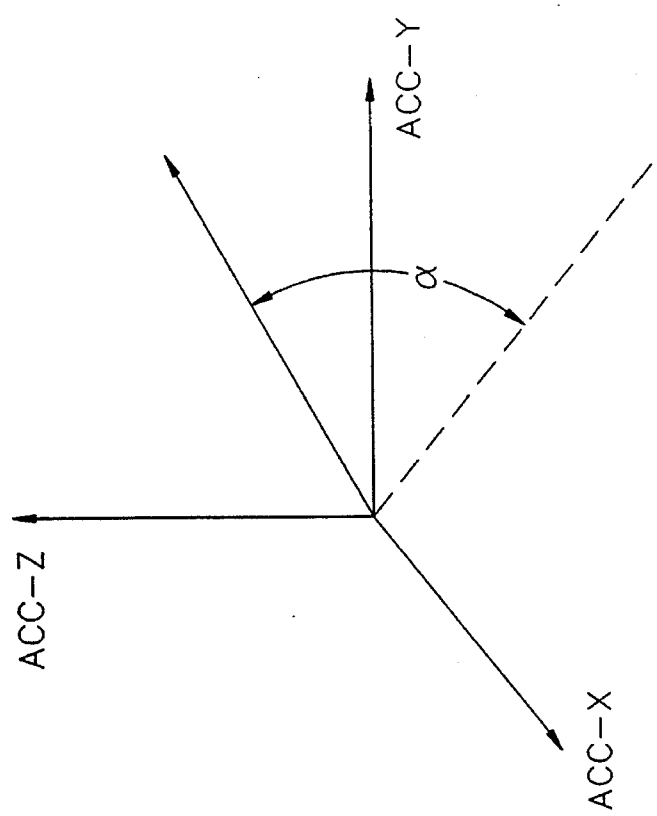

When the pen comprises, for example, three accelerometers, the parameters preferably comprise those mentioned above plus the following parameters:

sine of the angle α' which angle is defined as the angle between the vector associated with the current data point $(AccX_i, AccY_i, AccZ_i)$ and the AccXAccY plane as shown in FIG. 5C;

cosine of the angle α';

sine of the angle β' which angle is defined as the angle between the vector that connects the point before the previous data point $(AccX_{i-2}, AccY_{i-2}, AccZ_{i-2})$ and the current point $(AccX_i, AccY_i, AccZ_i)$, and the vector that connects the current point with the point after the subsequent point $(AccX_{i+2}, AccY_{i+2}, AccZ_{i+2})$ in space (AccX,AccY,AccZ) as shown in FIG. 5D;

and cosine of the angle β'.

STEP 250: Generalize parameters. The parameters of the symbol being learned represent a specific instance of the symbol. The symbol prototype stored by the system is to represent the general characteristics of the symbol as drawn by that person. Therefore, the parameters of the symbol being learned are generalized by some suitable means, such as by computation of the average of the value of each parameter from previous instances of the symbol along with the value of each parameter from the current instance of the symbol.

STEP 260: Update per-person per-symbol prototype database. The newly computed parameters from the previous step are stored in the per-person per-symbol prototype database.

The preferred method of FIG. 4B includes steps which have been described as part of the description of FIG. 4A. Description of those steps which are identical to steps in FIG. 4A have been omitted for the sake of brevity. The remainder of the steps in FIG. 4B include the following:

STEP 300: For each prototype in the per-person per-symbol prototype database, build an index of comparison between the sample and the prototype, combined over parameters in the prototype. In accordance with one preferred embodiment of the present invention, all parameters are combined together to produce the index of comparison. Appendix A is a computer listing in the C programing language comprising routines that are a preferred implementation of step 300. The routines comprise the following, which are found in section V, "symbols recognition": make__corr; correl__hem; obj__funct; together with various definitions used by the routines.

In accordance with another preferred embodiment of the present invention, parameters which come from graphic tablet data are combined and compared together, and parameters from accelerometer data are separately combined and compared, thus producing two measures of comparison between the sample and the prototype. Appendix B is a computer listing in the C programing language comprising routines that are a preferred implementation of step 300. The routines comprise the following, which are found in section IV, "recognition procedures": def__k__class; def__k__letter; def__k__word; def__k__row; mut__metric; metric__dir__y; metric__dir__x; together with various definitions used by the routines.

STEP 310: Create a list or lists of probable symbols sorted by likelihood. Based on the index or indices of comparison generated in step 300, a single list of probable symbols sorted by likelihood is generated according to one preferred embodiment of the present invention.

According to another preferred embodiment of the present invention, two separate lists of probable symbols sorted by likelihood are generated. When two separate lists are generated, one comprises likely symbols based on graphic tablet data and the other comprises likely symbols based on accelerometer data. Appendix B is a computer listing in the C programing language comprising routines that are a preferred implementation of step 310. The routines comprise the following, which are found in section IV, "recognition procedures": main of subsection "sort out"; sort__a; sort__b; sort__c; sort; check__map; read__map; r__matr; add__metric; sort__add; together with various definitions used by the routines.

STEP 320: Choose the correct symbols and the correct word based on the list or lists, the database of previous confusions and a dictionary. If one list was generated previously, the symbols with greatest likelihood are the candidates from which the correct symbol is chosen.

If more than one list was generated, the lists are combined and symbols with high likelihood on the combined list are the candidates from which the correct symbol is chosen.

Preferably, the lists may be combined by a voting procedure which first forms the intersection between the two lists. Appendix B is a computer listing in the C programming language comprising routines that are a preferred implementation of step 320. The routines comprise those routines found in the section entitled "combined results from graphic tablet and accelerations recognition", together with various definitions used by the routines.

If the intersection is empty, so that no symbol appears in both lists, the output is the list which was produced from the position data. If the intersection is not empty, so that at least one symbol appears in both lists, the output list comprises all symbols included in the intersection group of the two input lists, sorted according to the average of the probabilities contained in the two lists.

The database of previous confusions provides information that allows the correction of the choice of the correct symbol based on previous incorrect identifications. The database of previous confusions comprises, for each symbol, a list of other symbols which have been confused with the first symbol; for example, that the symbol "f" has often been confused with the symbol "b". When such an entry is found comprising previous confusions for a symbol in the list, the symbol or symbols that have previously been confused with the symbol in the list are added to the list. In accordance with the previous example, if the symbol "f" is found in the list, then the symbol "b" is added to the list.

An indication of the end of each word has been passed as output since step 215, described above. Based on the indication, the most likely word, comprising the most likely identifications for each symbol in the list, is identified.

The most likely word is checked against the dictionary. Preferably, the dictionary comprises both a general dictionary used for all users of the system and a personal dictionary for each user of the system. If an entry exists in the dictionary for the most likely word, the word is chosen as the correct identification.

If the most likely word is not found in the dictionary, all possible word combinations in the list are formed and each is checked against the dictionary. Among all such words which are found in the dictionary, the word with the highest likelihood is then chosen as the correct identification.

If none of the words is found in the dictionary, the most likely word is chosen as the correct identification.

STEP 330: Check to see if a correction has been entered. During the process of recognition, the user of the system is preferably provided with a visual indication of each symbol recognized.

After the end of a word is detected, the user of the system preferably is provided with a visual indication of the word recognized. The user may indicate manually that a given word was incorrectly recognized and may input a correction.

STEP 340: Update database of previous confusions. Based on a manual correction entered in step 330 or an automatic correction based on the dictionary, the database of previous confusions is updated. Based on a manual correction, the personal dictionary is also updated if the corrected word is not found in the dictionary.

Figure 6A:
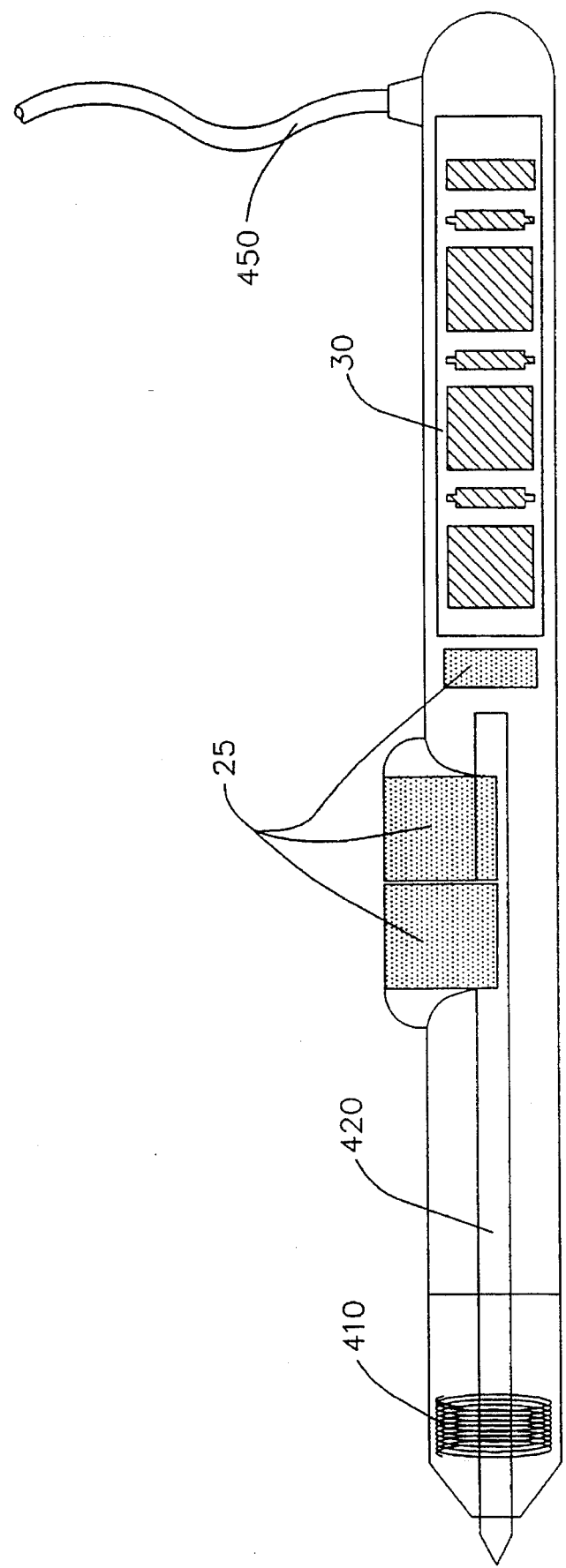
FIG. 6A is a simplified illustration of a preferred mechanical structure of the digitizing pen/accelerometer of FIG. 1A.

Reference is now additionally made to FIG. 6A which is a simplified illustration of a preferred mechanical structure of the digitizing pen/accelerometer 10 of FIG. 1A. Pen 10 may comprise an electromagnetic pen such as a WACOM SP-200 available from WACOM Computer Systems GmbH, Hellersbergstrasse 4, W-4040 Neuss 1, Germany, or any other suitable pen designed for use with a suitable model of graphic tablet. Pen 10 also comprises an electromagnet coil 410 which operates in conjunction with graphic tablet 12 to provide and indication of the location of the point of pen 10. Pen 10 further comprises an ink refill 420 which provides the ability to write on paper or on another surface.

Pen 10 also comprises three built-in mutually orthogonal accelerometers 25 such as ICS 3031-2 available from IC Sensors. Alternatively, there may be a plurality of accelerometers not necessarily orthogonally disposed. According to a still further alternative, there may be only one accelerometer.

Pen 10 also comprises associated amplifiers 30, described above with reference to FIG. 1A. Pen 10 further comprises communications cable 450 which is used to send data to control circuit 40. Alternatively, the data may be sent through any kind of wireless communication link, such as ultrasonic, infrared, or by any other suitable means.

Figure 6B:
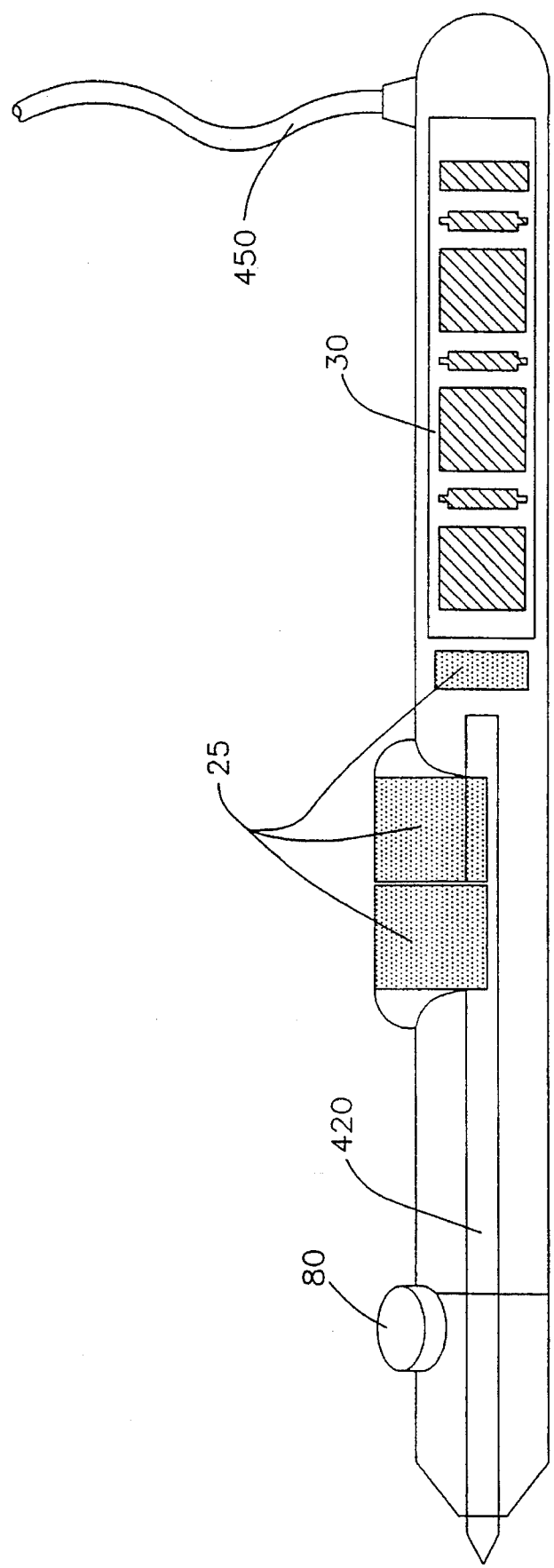
FIG. 6B is a simplified illustration of a preferred mechanical structure of the digitizing pen/accelerometer of FIG. 1B.

Reference is now additionally made to FIG. 6B which is a simplified illustration of a preferred mechanical structure of the digitizing pen/accelerometer 10 of FIG. 1B. Pen 10 may comprise a housing such as an ABS plastic housing or other suitable housing. Pen 10 further comprises an ink refill 420 and associated spring which provides the ability to write on paper or on another surface.

Pen 10 also comprises three built-in mutually orthogonal accelerometers 25 such as ICS 3031-2 available from IC Sensors. Alternatively, there may be a plurality of accelerometers not necessarily orthogonally disposed. According to a still further alternative, there may be only one accelerometer.

Pen 10 also comprises associated amplifiers 30, described above with reference to FIG. 1A.

Pen 10 also comprises ultrasonic transmitter 80 as specified above. Pen 10 further comprises communications cable 450 which is used to send data to control circuit 40. Alternatively, the data may be sent through any kind of wireless communication link, such as ultrasonic, infrared, or by any other suitable means.

Preferred methods and apparatus for handwriting recognition are described in the following applications, discussion of which is hereby incorporated by reference: PCT/US92/08703; Israel 104575; PCT application filed 31 Jan. 1994 in the U.S. Receiving Office by Ehud Baron and Edward A. Wolfe.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow.

APPENDIX A

Recognition according a combination of signals

Definitions and data structures

Board.H file

```
/* Function init_datatr ( portbase ) sets communication with data
   translation board via port portbase. It returns :
                0 - communication was established ;
                -1 - error on board (board is not exist). */
//int init_datatr ( int ) ;

int newcomp ( void ) ;

int read_ch ( int channel , int gain ) ;

//int read_point ( struct point * , int ) ;

/*int read_block ( struct point * , int max_numb_point ,
             int timeout_for_begin , int timeout_for_end ,
             int key_mouse_stop ) ; */

//int read_symbol ( struct point * , int , int ) ;

int mshit ( void ) ;

void close_datatr ( void ) ;

define PORT_BASE    0x210 define KEY_STOP       0x1
define MOUSE_STOP     0x2
define KEY_MOUSE_STOP 0x3 define PEN_WAIT       0x1
define PEN_NOWAIT     0x0
```

Data.H file
```
struct point_pen
{
  unsigned ax ;
  unsigned ay ;
  unsigned az ;
  unsigned pn ;
} ;
struct point_tablet
{
  int x ;
  int y ;
  int p ;
} ;
#define SYNCROBIT    0x80
```

```
Datar.H file
#define PORT_BASE     0x210
#define CSR           0x0
#define GAIN          0x1
#define DAC0_LOW      0x2
#define DAC0_HIGH     0x3
#define DAC1_LOW      0x4
define DAC1_HIGH     0x5 define CHANNEL_AX    0x4
define CHANNEL_AY    0x5
#define CHANNEL_AZ    0x6
#define CHANNEL_PN    0x7
#define STATUS        0xe
define CHANNEL_EMPTY 0x0 define IDREGISTER    0xf define GAIN_1        0x00
define GAIN_2        0x40
#define GAIN_4        0x80
define GAIN_8        0xc0 define IER           0x21
define IIR           0x20 define IRQ0          0x08
define IRQ1          0x09
#define IRQ2          0x0a
#define IRQ3          0x0b
#define IRQ4          0x0c
#define IRQ5          0x0d
#define IRQ6          0x0e
define IRQ7          0x0f /*struct point {
  unsigned ax ;
  unsigned ay ;
  unsigned az ;
  unsigned pn ;
} ;*/
#define MINUS_PEN     1700
/*#define PEN_UP       0x2
#define PEN_DOWN      0x4
#define PEN_THRSLD    200
define EMPTY         0    */ define BUFSIZE       0x80 define TIME_COUNT    3000
include <dos.h>
```

Ser.H file
```
/*---------------------------------------------------------------*
   FILENAME:            SERIAL.H Some definitions used by SER.C

*---------------------------------------------------------------*/ define COM1           1
define COM2           2
#define COM1BASE       0x3F8   /* Base port address for COM1 */
#define COM2BASE       0x2F8   /* Base port address for COM2 */

/*
   The 8250 UART has 10 registers accessible through 7 port addresses.
   Here are their addresses relative to COM1BASE and COM2BASE. Note
   that the baud rate registers. (DLL) and (DLH) are active only when
   the Divisor-Latch Access-Bit (DLAB) is on. The (DLAB) is bit 7 of
   the (LCR).

o TXR Output data to the serial port.
        o RXR Input data from the serial port.
        o LCR Initialize the serial port.
        o IER Controls interrupt generation.
        o IIR Identifies interrupts.
        o MCR Send contorl signals to the modem.
        o LSR Monitor the status of the serial port.
        o MSR Receive status of the modem.
        o DLL Low byte of baud rate divisor.
        o DHH High byte of baud rate divisor.
*/
#define TXR       0    /* Transmit register (WRITE) */
#define RXR       0    /* Receive register  (READ)  */
#define IER       1    /* Interrupt Enable          */
#define IIR       2    /* Interrupt ID              */
#define LCR       3    /* Line control              */
#define MCR       4    /* Modem control             */
#define LSR       5    /* Line Status               */
#define MSR       6    /* Modem Status              */
#define DLL       0    /* Divisor Latch Low         */
#define DLH       1    /* Divisor latch High        */

/*---------------------------------------------------------------*
   Bit values held in the Line Control Register (LCR).
        bit          meaning
        ---          -------
        0-1          00=5 bits, 01=6 bits, 10=7 bits, 11=8 bits.
        2            Stop bits.
        3            0=parity off, 1=parity on.
        4            0=parity odd, 1=parity even.
        5            Sticky parity.
        6            Set break.
        7            Toggle port addresses.
 *---------------------------------------------------------------*/ define NO_PARITY      0x00
define EVEN_PARITY    0x18
#define ODD_PARITY     0x08
```

```
/*-----------------------------------------------------*
Bit values held in the Line Status Register (LSR).
     bit        meaning
     ---        -------
     0          Data ready.
     1          Overrun error - Data register overwritten.
     2          Parity error - bad transmission.
     3          Framing error - No stop bit was found.
     4          Break detect - End to transmission requested.
     5          Transmitter holding register is empty.
     6          Transmitter shift register is empty.
     7          Time out - off line.
*-----------------------------------------------------*/
#define RCVRDY      0x01
#define OVRERR      0x02
#define PRTYERR     0x04
#define FRMERR      0x08
#define BRKERR      0x10
#define XMTRDY      0x20
#define XMTRSR      0x40
#define TIMEOUT         0x80

/*-----------------------------------------------------*
Bit values held in the Modem Output Control Register (MCR).
     bit        meaning
     ---        -------
     0          Data Terminal Ready. Computer ready to go.
     1          Request To Send. Computer wants to send data.
     2          auxillary output #1.
     3          auxillary output #2.(Note: This bit must be
                set to allow the communications card to send
                interrupts to the system)
     4          UART ouput looped back as input.
     5-7        not used.
*-----------------------------------------------------*/
#define DTR         0x01
#define RTS         0x02
#define MC_INT          0x08

/*-----------------------------------------------------*
Bit values held in the Modem Input Status Register (MSR).
     bit        meaning
     ---        -------
     0          delta Clear To Send.
     1          delta Data Set Ready.
     2          delta Ring Indicator.
     3          delta Data Carrier Detect.
     4          Clear To Send.
     5          Data Set Ready.
     6          Ring Indicator.
     7          Data Carrier Detect.
*-----------------------------------------------------*/
#define CTS         0x10
#define DSR         0x20
```

```
/*----------------------------------------------------------*
   Bit values held in the Interrupt Enable Register (IER).
        bit             meaning
        ---             -------
        0               Interrupt when data received.
        1               Interrupt when transmitter holding reg. empty.
        2               Interrupt when data reception error.
        3               Interrupt when change in modem status register.
        4-7             Not used.
*----------------------------------------------------------*/
#define RX_INT      0x01

/*----------------------------------------------------------*
   Bit values held in the Interrupt Identification Register (IIR).
        bit             meaning
        ---             -------
        0               Interrupt pending
        1-2             Interrupt ID code
                        00=Change in modem status register,
                        01=Transmitter holding register empty,
                        10=Data received,
                        11=reception error, or break encountered.
        3-7             Not used.
*----------------------------------------------------------*/
#define RX_ID       0x04
#define RX_MASK     0x07

/*
   These are the port addresses of the 8259 Programmable Interrupt
   Controller (PIC).
*/
#define IMR         0x21    /* Interrupt Mask Register port */
#define ICR         0x20    /* Interrupt Control Port       */

/*
   An end of interrupt needs to be sent to the Control Port of
   the 8259 when a hardware interrupt ends.
*/
#define EOI         0x20    /* End Of Interrupt */

/*
   The (IMR) tells the (PIC) to service an interrupt only if it
   is not masked (FALSE).
*/
#define IRQ3        0xF7    /* COM2 */
#define IRQ4        0xEF    /* COM1 */

/*
   The (IMR) tells the (PIC) to service an interrupt only if it
   is not masked (FALSE).
*/
#define IRQ3        0xF7    /* COM2 */
#define IRQ4        0xEF    /* COM1 */
```

```
int flag;
int SetSerial();
int SetOthers(int Parity, int Bits, int StopBit);
int SetSpeed(int Speed);
int SetPort(int Port);
void init_serial(void);
void comm_off(void);

void setallport(int Port, int Speed, int Parity, int Bits, int StopBit);
int  putchport (char);
void putstrport(char *);
int  getchport(void);
void offport();
```

Serconst.H file
```
/*-------------------------------------------------------------*
   FILENAME:            SERCONST.H Some definitions used by SER.C

*-------------------------------------------------------------*/

/*
    The 8250 UART has 10 registers accessible through 7 port addresses.
    Here are their addresses relative to COM1BASE and COM2BASE. Note
    that the baud rate registers, (DLL) and (DLH) are active only when
    the Divisor-Latch Access-Bit (DLAB) is on. The (DLAB) is bit 7 of
    the (LCR).

o TXR Output data to the serial port.
        o RXR Input data from the serial port.
        o LCR Initialize the serial port.
        o IER Controls interrupt generation.
        o IIR Identifies interrupts.
        o MCR Send contorl signals to the modem.
        o LSR Monitor the status of the serial port.
        o MSR Receive status of the modem.
        o DLL Low byte of baud rate divisor.
        o DHH High byte of baud rate divisor.
*/
#define TXR       0     /* Transmit register (WRITE) */
#define RXR       0     /* Receive register  (READ)  */
#define IER       1     /* Interrupt Enable          */
#define IIR       2     /* Interrupt ID              */
#define LCR       3     /* Line control              */
#define MCR       4     /* Modem control             */
#define LSR       5     /* Line Status               */
#define MSR       6     /* Modem Status              */
#define DLL       0     /* Divisor Latch Low         */
define DLH       1     /* Divisor latch High        */ define DLAB      0x80  /*   */
/*-------------------------------------------------------------*
    Bit values held in the Line Control Register (LCR).
        bit             meaning
        ---             -------
```

```
        0-1         00=5 bits. 01=6 bits, 10=7 bits, 11=8 bits.
        2           Stop bits.
        3           0=parity off, 1=parity on.
        4           0=parity odd, 1=parity even.
        5           Sticky parity.
        6           Set break.
        7           Toggle port addresses.
*----------------------------------------------------------------*/
#define NO_PARITY      0x00
define EVEN_PARITY    0x18
#define ODD_PARITY     0x08

/*----------------------------------------------------------------*
  Bit values held in the Line Status Register (LSR).
        bit         meaning
        ---         -------
        0           Data ready.
        1           Overrun error - Data register overwritten.
        2           Parity error - bad transmission.
        3           Framing error - No stop bit was found.
        4           Break detect - End to transmission requested.
        5           Transmitter holding register is empty.
        6           Transmitter shift register is empty.
        7           Time out - off line.
*----------------------------------------------------------------*/
#define RCVRDY         0x01
#define OVRERR         0x02
#define PRTYERR        0x04
#define FRMERR         0x08
#define BRKERR         0x10
#define XMTRDY         0x20
#define XMTRSR         0x40
#define TIMEOUT            0x80

/*----------------------------------------------------------------*
  Bit values held in the Modem Output Control Register (MCR).
        bit     meaning
        ---     -------
        0       Data Terminal Ready. Computer ready to go.
        1       Request To Send. Computer wants to send data.
        2       auxillary output #1.
        3       auxillary output #2.(Note: This bit must be
                set to allow the communications card to send
                interrupts to the system)
        4       UART ouput looped back as input.
        5-7     not used.
*----------------------------------------------------------------*/
#define DTR        0x01
#define RTS        0x02
#define MC_INT         0x08

/*----------------------------------------------------------------*
  Bit values held in the Modem Input Status Register (MSR).
        bit         meaning
        ---         -------
```

```
      0            delta Clear To Send.
      1            delta Data Set Ready.
      2            delta Ring Indicator.
      3            delta Data Carrier Detect.
      4            Clear To Send.
      5            Data Set Ready.
      6            Ring Indicator.
      7            Data Carrier Detect.
*---------------------------------------------------------------*/
#define CTS      0x10
#define DSR      0x20

/*---------------------------------------------------------------*
    Bit values held in the Interrupt Enable Register (IER).
        bit         meaning
        ---         -------
        0           Interrupt when data received.
        1           Interrupt when transmitter holding reg. empty.
        2           Interrupt when data reception error.
        3           Interrupt when change in modem status register.
        4-7         Not used.
*---------------------------------------------------------------*/
#define RX_INT   0x01

/*---------------------------------------------------------------*
    Bit values held in the Interrupt Identification Register (IIR).
        bit         meaning
        ---         -------
        0           Interrupt pending
        1-2         Interrupt ID code
                        00=Change in modem status register,
                        01=Transmitter holding register empty,
                        10=Data received,
                        11=reception error, or break encountered.
        3-7         Not used.
*---------------------------------------------------------------*/
#define RX_ID    0x04
#define RX_MASK  0x07

/*
    These are the port addresses of the 8259 Programmable Interrupt
    Controller (PIC).
*/
#define IMR      0x21   /* Interrupt Mask Register port */
#define ICR      0x20   /* Interrupt Control Port       */

/*
    An end of interrupt needs to be sent to the Control Port of
    the 8259 when a hardware interrupt ends.
*/
#define EOI      0x20   /* End Of Interrupt */

/*
```

```
The (IMR) tells the (PIC) to service an interrupt only if it
is not masked (FALSE).
*/
/*unsigned char IRQ[8] = { ~0x01 , ~0x02 , ~0x04 , ~0x80 ,
                           ~0x10 , ~0x */
#define IRQ3        0xF7   /* COM2 */
define IRQ4        0xEF   /* COM1 */ int SerSetPortBase ( int , unsigned * ) ;
int SerSetSpeed ( unsigned , long ) ;
int SerSetBitsParityStopBit ( unsigned , int , int , int ) ;
int SerPutChar ( unsigned , unsigned char ) ;
int SerPutString ( unsigned , unsigned char * ) ;
int SerInitBuffer ( unsigned ) ;
int SerGetChar ( unsigned ) ;
int SerTestDSR ( unsigned ) ;
int SerTestCTS ( unsigned ) ;

/*  int flag;
    int SetSerial();
    int SetOthers(int Parity, int Bits, int StopBit);
    int SetSpeed(int Speed);
    int SetPort(int Port);
    void init_serial(void);
    void comm_off(void);

void setallport(int Port, int Speed, int Parity, int Bits, int StopBit);
    int  putchport (char);
    void putstrport(char *);
    int  getchport(void);
    void offport();
*/

Tablet.H file
#define PEN_DOWN                    1
#define PEN_UP                              0
#define PEN_OUTPROX                        99
#define TBL_WACOM_II             3
#define TBL_DATA_ASCII           1
#define TBL_DATA_BINARY                     0
#define TBL_MODE_STREAM                     3
#define TBL_MODE_SWITCH_STREAM                  2
#define TBL_MODE_SUPRESSED                  0
#define TBL_MODE_POINT                      0
#define TBL_TYPE_ABSOLUTE        0
#define TBL_TYPE_RELATIVE                   1
#define TBL_MILLIMETERS          0
#define TBL_INCHES               1
#define TBL_ALWAYS_TRANSMIT_YES             1
#define TBL_ALWAYS_TRANSMIT_NO              0
#define TBL_BAUD_19200                      7
#define TBL_BAUD_9600                       6
#define TBL_BAUD_4800                       5
#define TBL_BAUD_2400                       4
#define TBL_BAUD_1200                       3
#define TBL_BAUD_600                        2
#define TBL_BAUD_300                        1
```

```
#define TBL_BAUD_150                    0
#define TBL_PARITY_NONE                 0
#define TBL_PARITY_ODD                  1
#define TBL_PARITY_EVEN                 2
#define TBL_STOPBITS_1                  0
#define TBL_STOPBITS_2                  1
#define TBL_DSR_MONITOR_OFF             0
#define TBL_DSR_MONITOR_ON              1
#define TBL_DATALENGTH_7        0
#define TBL_DATALENGTH_8        1
#define TBL_TRANSFER_RATE_MAX           7
#define TBL_TRANSFER_RATE_100           6
#define TBL_TRANSFER_RATE_67            5
#define TBL_TRANSFER_RATE_50            4
#define TBL_TRANSFER_RATE_20            3
#define TBL_TRANSFER_RATE_10            2
#define TBL_TRANSFER_RATE_5             1
#define TBL_TRANSFER_RATE_1             0
#define TBL_ORIGINLOG_UPPER_LEFT        1
#define TBL_ORIGINLOG_LOWER_LEFT        0
#define TBL_DATA_TERMINATOR_CR_LF       2
#define TBL_DATA_TERMINATOR_LF          1
define TBL_DATA_TERMINATOR_CR          0 int read_point_tablet_pen ( unsigned , int ,
                  struct point_tablet * , struct point_pen *[8] ) ;
int find_set_parameters_tablet ( int comport , unsigned *portbase ) ;
int init_tablet ( int port , unsigned *portbase , int command_set ,
            int data_format , int operation_mode , int origin_type ,
            int unit_mesure , int always_transmit , int speed ,
            int parity , int stopbit , int dsr_monitor ,
            int datalength , int transfer_rate , int orig_log ,
            int data_terminator , int max_x , int max_y ) ;
void close_tablet ( unsigned portbase ) ;
```

I. Reading from device

/*     This procedure reads synchronized data from the graphic tablet and accelerometers     /*

```
int read_point_tablet_pen ( unsigned portbase , int read_pen ,
                            struct point_tablet *tablet ,
                            struct point_pen pen[8] )
{
   int ind_package = 0 , reply , debug[10] , i ;
   unsigned char package[7] = { 0 , 0 , 0 , 0 , 0 , 0 , 0 } ;
   if ( read_pen )
      read_point_pen ( &pen[0] ) ;
   i= 0 ;

/* Waiting for synchro-bit */ do
   {
      if ( ( reply = SerGetChar ( portbase ) ) < 0 )
          return reply ;
      debug[i++] = reply ;
      if ( ( package[0] = (char) reply ) & SYNCROBIT )
          break ;
   } while ( ind_package++ < 10 ) ;

/* Error - No synchro-bit in 10 bytes */ if ( ind_package >= 10 )
      return SER_SYNCROBIT ;

/* Read the next 6 bytes from tablet and 6 points from accelerometer */ for ( ind_package = 1 ; ind_package < 7 ; ind_package++ )
   {
      if ( read_pen )
      {
          read_point_pen ( &pen[ind_package] ) ;
      }
      if ( ( reply = SerGetChar ( portbase ) ) < 0 )
          return reply ;
      package[ind_package] = (char) reply ;
   }

/* Read last point from accelerometer */ if ( read_pen )
      read_point_pen ( &pen[ind_package] ) ;

/* Calculates the values of the signals for tablet */ tablet->x = ( package[0] & 0x03 ) << 14 ;
   tablet->x += ( package[1] & 0x7f ) << 7 ;
   tablet->x += ( package[2] & 0x7f ) ;
   if ( package[0] & 0x04 )
      tablet->x = - tablet->x ;
   tablet->y = ( package[3] & 0x03 ) << 14 ;
   tablet->y += ( package[4] & 0x7f ) << 7 ;
   tablet->y += ( package[5] & 0x7f ) ;
```

```
  tablet->p = 0 ;
  if ( ! ( package[0] & 0x40 ) )
    tablet->p = 99 ;
  if ( package[3] & 0x04 )
    tablet->y = - tablet->y ;
  if ( package[6] & 0x20 )
    tablet->p = ( package[6] & 0x1f ) ;
  return 0 ;
}
```

II. Pre-processing

```
/*     Two procedures: Normalization in time and filtering the input signals by smoothing
                                         */ void normal ( int num_old , float arr_old[] , int num_new , float arr_new[] )
{
  double koeff ;
  int ind_old , ind_new ;
  koeff = (double) ( num_old - 1 ) / (float) ( num_new - 1 ) ;
  arr_new[0] = arr_old[0] ;
  for ( ind_new = 1 ; ind_new < num_new - 1 ; ind_new ++ ) {
    ind_old = (int) ( floor ( koeff * ind_new ) ) ;
    arr_new[ind_new] = ( ind_old + 1 - koeff * ind_new ) * arr_old[ind_old] +
                       ( koeff * ind_new - ind_old ) * arr_old[ind_old + 1] ;
    arr_new[ind_new] = arr_new[ind_new] ;
  }
  arr_new[ind_new] = arr_old[num_old-1] ;
} float smooth1 ( int num , float z[] )
{
  int ind ;
  float temp ;
  float norma ;
  for (ind = 1 , norma = 0 ; ind < num - 1  ; ind++ ) {
    temp = ( z[ind -1]+z[ind]+z[ind+1] ) /3. ;
    norma += abbs ( z[ind] - temp ) ;
    z[ind] = temp ;
  }
  return norma ;
}
```

III. Parameter's extraction

```
/*      Calculation of the parameters of a symbol from the input signals    */ int make_par ( char arg_ch )
{
  struct point {
    unsigned int x   : 12 ;
    unsigned int y   : 12 ;
    unsigned int z   : 12 ;
    unsigned int pen :  4 ;
  } point , points[500];
  int read_next_symbol ( FILE * , struct point[] ) ;
  char file_name[40] ;
  int len , number_points = 0 ;
  FILE *in_file , *out_file[10] , *out_letter , *out_bin ;
  float  param[6][NUMBER_POINT] , sum_par[6][NUMBER_POINT] ;
  int index = 0 , max_point ;
  int ind , start ;
  int cur_x , cur_y , cur_z , cur_p ;
  float arr_x[MAX_POINT] , arr_y[MAX_POINT] , arr_z[MAX_POINT] , arr_p[MAX_POINT] ;

/* Initialization of the results arrays to zero  */ for ( ind = 0 ; ind < 6 ; ind++ )
    for ( index = 0 ; index < NUMBER_POINT ; index++ ) {
      param[ind][index] = 0.0 ;
      sum_par[ind][index] = 0.0 ;
    }

/* Identification of the file of data   */ sprintf ( file_name , "%03d.smb" , (int) arg_ch ) ;
  if ( ( in_file = fopen ( file_name , "rb" ) ) == NULL )
  {
    strcpy (ext_err,file_name);
    return -4 ;
  }
  start = 0 ;

/* Reading data from file    */ while ( ( max_point = read_next_symbol ( in_file , points ) ) > 0 ) {
    for ( index = 0 ; index < max_point ; index++ ) {
      arr_x[index] = (float) points[index].x ;
      arr_y[index] = (float) points[index].y ;
      arr_z[index] = (float) points[index].z ;
      arr_p[index] = (float) points[index].pen ;
    }
    arr_p[0] = arr_p[max_point - 1] = 1 ;

start++ ;
    number_points += max_point ;

/* Calling the procedure make_par_let for calculating parameters 1-6  */ make_par_let ( arr_x , arr_y , arr_z , arr_p , param , max_point - 1 ) ;
```

```c
/* Calculating the average of each parameter */
    for ( ind = 0 ; ind < 6 ; ind++ )
      for ( index = 0 ; index < NUMBER_POINT ; index++ ) {
          sum_par[ind][index] += param[ind][index] ;
      }
  }
  for ( ind = 0 ; ind < 6 ; ind++ )
    for ( index = 0 ; index < NUMBER_POINT ; index++ )
      sum_par[ind][index] /= start ;

sum_par[0][0] = (float) number_points / start ;
  fclose ( in_file ) ;

/* write avg in Binary file */
  sprintf ( file_name , "%03d.par" , (int) arg_ch ) ;
  out_letter = fopen ( file_name , "wb+") ;
  for ( index = 0 ; index < 6 ; index++ )
    fwrite ( sum_par[index] , sizeof(float) , NUMBER_POINT , out_letter);

fclose ( out_letter ) ;

return start ;

} void make_par_let ( float arr_x[] , float arr_y[] , float arr_z[] ,
                    float arr_p[] , float param[6][NUMBER_POINT] , int max_point )
{
  float end_smooth;

float new_arr_x[500] , new_arr_y[500] , new_arr_z[500] , new_arr_p[500] ;
  int ind , index ;

/* Call for pre-processing   */ normal ( max_point , arr_x , NUMBER_POINT , new_arr_x ) ;
  normal ( max_point , arr_y , NUMBER_POINT , new_arr_y ) ;
  normal ( max_point , arr_z , NUMBER_POINT , new_arr_z ) ;
  normal ( max_point , arr_p , NUMBER_POINT , new_arr_p ) ;
  max_point = NUMBER_POINT ;
  for ( ind = 0 ; ind < max_point ; ind++ ) {
    arr_x[ind] = new_arr_x[ind] ;
    arr_y[ind] = new_arr_y[ind] ;
    arr_z[ind] = new_arr_z[ind] ;
    arr_p[ind] = new_arr_p[ind] ;
  }
  while ( ( end_smooth = smooth1 ( max_point , arr_x ) ) > NUMBER_POINT / 10 ) ;
  while ( ( end_smooth = smooth1 ( max_point , arr_y ) ) > NUMBER_POINT / 10 ) ;
  while ( ( end_smooth = smooth1 ( max_point , arr_z ) ) > NUMBER_POINT / 10 ) ;

/* Initialization of parameters */
  param[0][0] = (float) arr_p[0] ;
  param[1][0] = ( arr_z[0] - arr_z[0] ) ;
  param[2][0] = 0.0 ;
  param[3][0] = 0.0 ;
  param[4][0] = 0.0 ;
  param[5][0] = 0.0 ;
```

```
  param[0][1] = (float) arr_p[1] ;

/* Calculation of parameters */
  param[1][1] = ( arr_z[1] - arr_z[0] ) ;
  elev ( arr_x[2] - arr_x[0] , arr_y[2] - arr_y[0] , arr_z[2] - arr_z[0] ,
         ¶m[2][1] , ¶m[3][1] ) ;
  param[4][1] = 0.0 ;
  param[5][1] = 0.0 ;
  for ( index = 2 ; index < max_point - 2 ; index++ ) {
    param[0][index] = (float) arr_p[index] ;
    param[1][index] = ( arr_z[index] - arr_z[0] ) ;
    elev ( arr_x[index + 1] - arr_x[index - 1] , arr_y[index + 1] - arr_y[index - 1] , arr_z[index + 1] -
arr_z[index - 1] ,
           ¶m[2][index] , ¶m[3][index] ) ;
    angles ( arr_x[index + 2] - arr_x[index] ,
             arr_y[index + 2] - arr_y[index] ,
             arr_z[index + 2] - arr_z[index] ,
             arr_x[index] - arr_x[index - 2] ,
             arr_y[index] - arr_y[index - 2] ,
             arr_z[index] - arr_z[index - 2] ,
             ¶m[4][index] , ¶m[5][index] ) ;
    index = index ;
  }
  param[0][index] = (float) arr_p[index] ;
  param[1][index] = ( arr_z[index] - arr_z[0] ) ;
  elev ( arr_x[index + 1] - arr_x[index - 1] , arr_y[index + 1] - arr_y[index - 1] , arr_z[index + 1] -
arr_z[index - 1] ,
         ¶m[2][index] , ¶m[3][index] ) ;
  param[4][index] = 0.0 ;
  param[5][index] = 0.0 ;
  index++ ;

/* Calculation of parameters for last point */
  param[0][index] = (float) arr_p[index] ;
  param[1][index] = ( arr_z[index] - arr_z[0] ) ;
  param[2][index] = 0.0 ;
  param[3][index] = 0.0 ;
  param[4][index] = 0.0 ;
  param[5][index] = 0.0 ;
}

/* Procedure elev calculates the SIN and COS of the angle of elevation */ void elev ( float x , float y , float z , float *cos_ug , float *sin_ug )
{
  float norma ;
  norma = (float) sqrt ( x * x + y * y + z * z ) ;
  if ( norma < .00001 ) {
    *cos_ug = 0.0 ;
    *sin_ug = 0.0 ;
    return ;
  }
  *cos_ug = ( (float) sqrt ( x * x + y * y ) ) / norma ;
  *sin_ug = z / norma ;
  return ;
}
```

```c
/* Procedure angles calculates the SIN and COS of the angle β */ void angles ( float x1 , float y1 , float z1 , float x2 , float y2 , float z2 ,
              float *cos_ug , float *sin_ug )
{
  float norma1 , norma2 , x3 , y3 , z3 ;
  norma1 = ( float ) sqrt ( x1 * x1 + y1 * y1 + z1 * z1 ) ;
  norma2 = ( float ) sqrt ( x2 * x2 + y2 * y2 + z2 * z2 ) ;
  if ( norma1 < .0001 || norma2 < .0001 ) {
    *cos_ug = 0.0 ;
    *sin_ug = 0.0 ;
    return ;
  }
  *cos_ug = ( x1 * x2 + y1 * y2 + z1 * z2 ) / norma1 / norma2 ;
  x3 = ( y1 * z2 - z1 * y2 ) ;
  y3 = ( x2 * z1 - x1 * z2 ) ;
  z3 = ( x1 * y2 - x2 * y1 ) ;
  *sin_ug = ( (float) sqrt ( x3 * x3 + y3 * y3 + z3 * z3 ) ) / norma1 / norma2 ;
  return ;
}
```

IV. Training procedures

/* Procedure for preliminary teaching */

```c
int first_teach ( void )
{
  FILE *fp ;
  FILE *fpout;
  int i;
  char buf[4] , NdxStr[4] , symbols[256] ;
  int ndx = 0 , max_symb = 0 ;
  int num_sym;
  comment ("converting data files, please wait",0,1);

if ( ( fp=fopen ( "symbols.dat" , "r" ) ) == NULL )
  {
     strcpy (ext_err,"symbols.dat");
     hide_comment ("converting data files, please wait",0);
     return (-4);
  }
  while ( fscanf ( fp , "%s" , buf ) > 0 )
    symbols[max_symb++] = buf[0] ;
  fclose ( fp ) ;

fpout=fopen ("text.adp","w");

for ( ndx = 0 ; ndx < max_symb ; ndx++ ) {
    sprintf ( NdxStr , "%03d" , ndx ) ;
    if ( ( num_sym=make_par ( symbols[ndx] ) ) <= 0 )
    {
       hide_comment ("converting data files, please wait",0);
       return (num_sym);
    }
    else for (i=0;i<num_sym;i++)
                fprintf (fpout,"%c",symbols[ndx]);
  }
  fclose (fpout);
  hide_comment ("converting data files, please wait",0);
  return (0);
}

/* procedure for adaptation of prototypes */ float huge *all_par[100] ;
int first_adap ( void )
{
  float old_rec , new_rec ;
  int count=0 , temp ;
  char *text ;
  char str[80];
  if ( ( temp = read_text ("try.txt", &text ) ) < 0 )
    return ( temp ) ;
  read_param ( ) ;
  new_rec = recogn ( "try.prl" , text , 0 , 0 ) ;
  sprintf (str,"%3f-before adaptation",new_rec);
  comment (str,-1,1);
  do {
```

```c
    if (new_rec < 0 ) {
      hide_comment (str,-1);
      while ( all_par[temp] != NULL ) {
          farfree ( all_par[temp++] ) ;
      }
      return ((int) new_rec);
    }
    if ( new_rec > .995 )
      break ;
    old_rec = new_rec ;
    new_rec = recogn ( "try.prl", text , 1 , 0 ) ;
    if (new_rec <0 ) {
      hide_comment (str,-1);
      while ( all_par[temp] != NULL ) {
          farfree ( all_par[temp++] ) ;
      }
      return ((int) new_rec);
    }
    hide_comment (str,-1);
    sprintf (str,"%3f- in adaptation",new_rec);
    comment (str,-1,1);

new_rec = recogn ( "try.prl", text , 0 , 0 ) ;

hide_comment (str,-1);
    sprintf (str,"%3f-after adaption",new_rec);
    comment (str,-1,1);

if (new_rec < 0 ) {
        hide_comment (str,-1);
        while ( all_par[temp] != NULL ) {
          farfree ( all_par[temp++] ) ;
        }
        return ((int) new_rec);
    }

} while ( fabs ( old_rec - new_rec ) > .005 & count++ < 9 ) ;
hide_comment (str,-1);
farfree ( text ) ;
while ( all_par[temp] != NULL ) {
  farfree ( all_par[temp++] ) ;
}
return 0 ;
}
```

V. Symbol's recognition

```c
struct point {
  unsigned int x  : 12 ;
  unsigned int y  : 12 ;
  unsigned int z  : 12 ;
  unsigned int pen : 4 ;
} ;

struct reply
{
   int  ndx;
   float weight;
};

float recogn ( char *file_pen , char *text , int adapt , int words )
{
  float old_rec , new_rec , probs[10][20] ;
  int count=0 ;
  char symbols[256] , buf[4] ;
  unsigned long ttt ;
  int max_symb;
  FILE *in_file , *file_symb , *temp_word ;
  int symb;
  unsigned long start_word , end_word ;
  float  param[6][NUMBER_POINT] ;
  int index = 0 , max_point ;
  struct reply *repl ;
  int temp;
  int Ngood=0;
  int ind , NumSymbols ,ndx;
  struct point symb_pnts [MAX_POINT];
  float arr_x[MAX_POINT] , arr_y[MAX_POINT] , arr_z[MAX_POINT] , arr_p[MAX_POINT] ;
  int map[256];
  int order=0;
  char letters[10][20],dict_wrds[10][20];
  int end_of_word=0;
  int wrdlen;
  float sum[10],maxsum,ndx_maxsum;
  char org_wrd[20],f_word[20];
  int txt_width;
  int i;
  if ( ( file_symb = fopen ( "symbols.dat" , "r" ) ) == NULL ) {
    strcpy (ext_err,"symbols.dat");
    return (-4);
  } for (ind=0;ind<256;ind++) map[ind]=-1;
  max_symb = 0 ;
  while ( fscanf ( file_symb , "%s" , buf ) > 0 )
  {
    map [buf[0]]=max_symb;
    symbols[max_symb++] = buf[0] ;
  }
  fclose ( file_symb ) ;
  symbols[max_symb] = 0 ;

for ( ind = 0 ; ind < 6 ; ind++ )
```

```
    for ( index = 0 ; index < NUMBER_POINT ; index++ ) {
       param[ind][index] = 0.0 ;
    }
if ( ( in_file = fopen ( file_pen , "rb" ) ) == NULL )
{
   strcpy (ext_err,file_pen);
   return -4 ;
}
index = 0 ;
NumSymbols = 0 ;
symb=-1;
        if (adapt)
           repl = make_corr ( param , symbols , symb) ;
        else {
           repl = make_corr ( param , symbols , -1) ;
        }
        if (repl[0].ndx<0)
           return ( repl[0].weight);

if (repl[0].ndx==symb)
          Ngood++;
        else
          Ngood = Ngood ;
    }
  fclose ( in_file ) ;
  if (NumSymbols==0) return 0;
     else return (Ngood/(float)NumSymbols) ;
}

/* Calculation of the similarity of all the parameters of all the prototypes and the
   symbol to be recognized  */ extern float huge *all_par[100] ;

struct reply
{
   int   ndx;
   float weight;
};

static int comm_count = 0 , abs_count = 0 ;
int obj_funct ( float [100][7] , int , int , float [100] , float [7] , int [10] ) ;
float correl_hem ( float [NUMBER_POINT] , float [NUMBER_POINT] , float ) ;
float correl ( float [NUMBER_POINT] , float [NUMBER_POINT] ) ;
struct reply *make_corr ( float cur_par[6][NUMBER_POINT] , char *symbols ,int symb)
{
   FILE *cur_file ;
   int ind_repl , ind_corrct , ind , max_symb , ind_symb , index ;
   struct reply arr_repl[30];
   int arr_ind[10];
   float res[100] , nres[7] , old_max_pnt = cur_par[0][0] , com_wight ;
   float old_max_pnt2 , corr[100][7] , tmp_par[6][NUMBER_POINT] ;
   char buf[8] ;
   int iterat;
   struct reply rt;
   int i,j;
```

```
max_symb = strlen ( symbols ) ;
for ( ind_symb = 0 ; ind_symb < max_symb ; ind_symb++ ) {
  for ( i = 0 ; i < 6 ; i++ )
    for ( j = 0 ; j < NUMBER_POINT ; j++ )
      tmp_par[i][j] = all_par[ind_symb][i*100+j] ;
  if ( tmp_par[0][0] > 0 ) {
    cur_par[0][0] = old_max_pnt ;
    corr[ind_symb][N_PAR-1] = 1.0 * ( 1 -
            min ( fabs ( tmp_par[0][0] - cur_par[0][0] ) / cur_par[0][0] , 1 ) ) ;

old_max_pnt = cur_par[0][0] ;
    tmp_par[0][0] = 1. ;
    cur_par[0][0] = 1. ;
    corr[ind_symb][0] = correl_hem ( cur_par[0] , tmp_par[0] , .9 ) ;
    for ( ind = 1 ; ind < N_PAR - 1; ind++ ) {
        corr[ind_symb][ind] = correl ( cur_par[ind] , tmp_par[ind] ) ;
    }
  }
  else
    for ( ind = 1 ; ind < N_PAR - 1; ind++ ) {
        corr[ind_symb][ind] = 0.0 ;
    }
} if (symb<0)
{
  index = obj_funct ( corr , max_symb , N_PAR , res , nres , arr_ind ) ;
  iterat=20;
}
else
{
  sprintf ( buf , "%03d.par" , (int) symbols[symb] ) ;
  for ( i = 0 ; i < 6 ; i++ )
      for ( j = 0 ; j < NUMBER_POINT ; j++ )
      tmp_par[i][j] = all_par[symb][i*100+j] ;
  iterat=0;
  while ( (index=obj_funct (corr,max_symb,N_PAR,res,nres, arr_ind))>0
          && (arr_ind[0]!=symb))
  {
      if (iterat>19) break;
      for (ind=0, ind_corrct=0; ind<N_PAR-1 ; ind++)
        if (corr[symb][ind]<0.95 * nres[ind])
        {
           ind_corrct++;
           for (index=0; index < NUMBER_POINT ; index++)
              tmp_par[ind][index] = tmp_par [ind][index]*.9
                             +cur_par[ind][index]*.1;
        }
        if (corr[symb][ind]<0.95 * nres[ind])
        {
           ind_corrct++;
           tmp_par[0][0] = tmp_par[0][0] * .9 + old_max_pnt * .1 ;
        }
        if (!ind_corrct) {
          iterat = 20 ;
          break;
        }
```

```
            iterat++;
            cur_par[0][0]= old_max_pnt;
            corr[symb][N_PAR-1]=1-fabs(tmp_par[0][0]-cur_par[0][0])/ cur_par[0][0];
            old_max_pnt = cur_par[0][0];
            old_max_pnt2= tmp_par[0][0];
            tmp_par[0][0] = 1.;
            cur_par[0][0] = 1.;
            corr[symb][0] = correl_hem ( cur_par[0] , tmp_par[0] , .9 ) ;
            for ( ind = 1 ; ind < N_PAR - 1 ; ind++ ) {
               corr[symb][ind] = correl ( cur_par[ind] , tmp_par[ind] ) ;
            }
            cur_par[0][0] = old_max_pnt ;
            tmp_par[0][0] = old_max_pnt2 ;
      } /* while */
   } /* else */ if ((iterat<20) && (index>0) && (iterat>0))
   {
      cur_file = fopen ( buf , "w+b" ) ;
      for ( index = 0 ; index < N_PAR -1 ; index++ )
         fwrite ( tmp_par[index] , sizeof ( float ) , NUMBER_POINT , cur_file ) ;
      fclose ( cur_file ) ;
      for ( i = 0 ; i < 6 ; i++ )
          for ( j = 0 ; j < NUMBER_POINT ; j++ )
             all_par[symb][i*100+j] = tmp_par[i][j] ;
   }
   index = min ( index , 9 ) ;
   arr_ind[index]=-1;
   res[arr_ind[index]]=-1;
   for (i=0;i<=index;i++)
   {
      arr_repl[i].ndx=arr_ind[i];
      arr_repl[i].weight=-res[arr_ind[i]];
   }
   return arr_repl ;
}

/* Calculation of correlation between two vectors */ float correl ( float first[NUMBER_POINT] , float second[NUMBER_POINT] )
{
  float sumxy = 0.0 , sumx = 0.0 , sumy = 0.0 , sumx2 = 0.0 , sumy2 = 0.0 ;
  int i_d , i_s ;
  for ( i_s = 0 ; i_s < NUMBER_POINT ; i_s++ ) {
     sumxy += first[i_s] * second[i_s] ;
     sumx  += first[i_s] ;
     sumy  += second[i_s] ;
     sumx2 += first[i_s] * first[i_s] ;
     sumy2 += second[i_s] * second[i_s] ;
  }
  if ( ( sumx2 - sumx * sumx / NUMBER_POINT ) < 0 ||
       ( sumy2 - sumy * sumy / NUMBER_POINT ) < 0 )
     return 0 ;
  if ( ( sumxy = ( sumxy - sumx * sumy / NUMBER_POINT ) /
```

```
            sqrt ( sumx2 - sumx * sumx / NUMBER_POINT ) /
            sqrt ( sumy2 - sumy * sumy / NUMBER_POINT ) ) < .5 )
      return 0 ;
   return sumxy ;
}

/* Similarity function for the parameter of pen up/down */ float correl_hem ( float par1[NUMBER_POINT] , float par2[NUMBER_POINT] , float border )
{
  int index ;
  float result = 0.0 ;
  for ( index = 1 ; index < NUMBER_POINT ; index++ )
    result += fabs ( par1[index] - par2[index] ) ;
  result /= NUMBER_POINT ;
  result = 1 - result ;
  if ( result < border )
    return 0 ;
  return result ;
}

/* Selection of the list of symbols that are likely to be the symbol to be recognized */ int obj_funct ( float arr[100][7] , int n_symb , int n_par ,
                float res[100] , float nres[7] , int arrindex[30] )
{
  int ind_s , ind_p , ind_arr = 0 ;
  float max_res = 0.0 , cur_res , abs_res = 0.0 ;
  int result = -1 ;
  for ( ind_s = 0 ; ind_s < n_symb ; ind_s++ ) {
    for ( ind_p = 0 , cur_res = 0.0 ; ind_p < n_par ; ind_p++ )
      cur_res += arr[ind_s][ind_p] ;
    res[ind_s] = cur_res ;
    if ( cur_res > max_res ) {
      result = ind_s ;
      max_res = cur_res ;
    }
  }
  abs_res = max_res * .85 ;
  do {
    arrindex[ind_arr++] = result ;
    res[result] = - res[result] ;
    for ( ind_s = 0 , max_res = 0.0 ; ind_s < n_symb ; ind_s++ )
        if ( res[ind_s] > max_res ) {
          result = ind_s ;
          max_res = res[ind_s] ;
        }
  } while ( max_res > abs_res && ind_arr < 30 ) ;
  for ( ind_p = 0 ; ind_p < n_par ; ind_p++ )
    for ( ind_s = 0 , nres[ind_p] = -5 ; ind_s < n_symb ; ind_s++ )
      nres[ind_p] = max ( arr[ind_s][ind_p] , nres[ind_p] ) ;
  return ind_arr ;
}
```

U 9670-0

APPENDIX B
Recognition according second method

Graphic Tablet recognition

Initialization of work

```
void main(void)

void init_map(void);
int i,j;
 for (i=0;i<NUM_SYMBOLS;i++)
   for (j=0;j<2;j++)
       map_char[i][j]=0;
init_map();

extern int map_char[NUM_SYMBOLS][2];

void save_map(void)

FILE *fp;
int i;
fp=fopen("map_ch","wb");
for (i=0; i<NUM_SYMBOLS;i++)
  fprintf(fp,"%d %d\n",map_char[i][0],map_char[i][1]);
fclose(fp);

void init_map(void)
int i,j;
for (i=97,j=0;i<123;j++,i++)
  { map_char[j][0]=i;              //a-z
    map_char[j][1]=0;
  }
for (i=65,j=26;i<91;j++,i++)
  { map_char[j][0]=i;              //A-Z
    map_char[j][1]=0;
  }
  for (i=48,j=52;i<58;j++,i++)
  { map_char[j][0]=i;
    map_char[j][1]=0;              //0123456789
  }
for (i=43,j=62;i<47;j++,i++)
  { map_char[j][0]=i;
```

II. Training procedures

```c
/*        MAIN FOR TEACHING        */ struct TABLE_EXTREMOMS arr_extremoms[MAX_NUM_OF_EXTREMOMS];
    struct POINT arr_cor[MAX_NUM_OF_POINTS];
    struct LIN ARR_DIR[MAX_AMOUNT_DIREC];
    struct LIG ARR_LIGAT[MAX_AMOUNT_DIREC];
    struct LIG ARR_ORD_1_LIGAT[MAX_AMOUNT_DIREC];
    struct LIG ARR_LIG1[MAX_AMOUNT_DIREC];
    struct LIG ARR_ORD_1_LIG1[MAX_AMOUNT_DIREC];
    struct LIG ARR_LIG2[MAX_AMOUNT_DIREC];
    struct LIG ARR_ORD_1_LIG2[MAX_AMOUNT_DIREC];
    struct LIG ARR_LIG3[MAX_AMOUNT_DIREC];
    struct LIG ARR_ORD_1_LIG3[MAX_AMOUNT_DIREC];
    struct MASK penn[MAX_NUM_OF_EXTREMOMS];
    char our_sent[MAX_LENGTH_SENTENSE];
    struct X x[MAX_AMOUNT_DIREC];
    struct Y y[MAX_AMOUNT_DIREC];
    int map_char[NUM_SYMBOLS][2];
    int amp_y;
    int num_of_extrms;
    float y_vec_beg;
    float y_vec_end;
    float x_vec_beg;
    float x_vec_end;

void main(int arg,char *par[])
{
    FILE *fp;
    char infile[30];
    int num;
    struct ffblk ffblk;
    int done;

read_map();
    fp=fopen("fextr.out","wb");
    fclose(fp);
    fp=fopen("feat.out","wb");
    fclose(fp);
    fp=fopen("feat1.out","wb");
    fclose(fp);
    fp=fopen("fsent0.out","wb");
    fclose(fp);
    fp=fopen("fsent1.out","wb");
    fclose(fp);
    fp=fopen("fsent2.out","wb");
    fclose(fp);
    fp=fopen("fsent3.out","wb");
    fclose(fp);
    fp=fopen("fsent4.out","wb");
    fclose(fp);
    fp=fopen("fsent5.out","wb");
    fclose(fp);
    fp=fopen("fsent6.out","wb");
    fclose(fp);

done=findfirst("*.tab",&ffblk,0);
```

```c
    num=1;
    while (!done)
      {
        sprintf(infile,"%-12.12s",ffblk.ff_name);
        fp=fopen(infile,"r");
        if (!fp)
            { printf("Can't open input file --%s--\n",infile);
              return;
            } if (infile[0] !='B') letter=tolower(infile[0]);
        else
            { if (isdigit( (int) infile[1] ) !=0) letter=tolower(infile[0]);
              else letter=infile[1];
            }
        num=transform(fp,&letter);
        if ((num>=0)&&(num<7)) save_files(num,&letter);
        if (num==-3) num=1;
        fclose(fp);
        done=findnext(&ffblk);
      }
    save_map();
} int transform(FILE *fp,char *letter)
{
  extern struct POINT arr_cor[MAX_NUM_OF_POINTS]; /* array of coordinates */
  extern struct TABLE_EXTREMOMS arr_extremoms[MAX_NUM_OF_EXTREMOMS];
         /* array of special points (i.e. extremums , changing of pen
                                       position */
  extern struct TABLE_EXTREMOMS arr_exc_extrms[MAX_NUM_OF_EXTREMOMS];
         /* array of excluded extremums , it is excluded from the array
            of extremums by excluding close points */
  extern struct LIN ARR_DIR[MAX_AMOUNT_DIREC];
  extern struct LIN ARR_DIR[MAX_AMOUNT_DIREC];
  extern struct LIG ARR_LIGAT[MAX_AMOUNT_DIREC];
  extern struct LIG ARR_ORD_1_LIGAT[MAX_AMOUNT_DIREC];
  extern struct LIG ARR_LIG1[MAX_AMOUNT_DIREC];
  extern struct LIG ARR_ORD_1_LIG1[MAX_AMOUNT_DIREC];
  extern struct LIG ARR_LIG2[MAX_AMOUNT_DIREC];
  extern struct LIG ARR_ORD_1_LIG2[MAX_AMOUNT_DIREC];
  extern struct LIG ARR_LIG3[MAX_AMOUNT_DIREC];
  extern struct LIG ARR_ORD_1_LIG3[MAX_AMOUNT_DIREC];
  extern struct MASK penn[MAX_NUM_OF_EXTREMOMS];
  extern char our_sent[MAX_LENGTH_SENTENSE];
  extern struct X x[MAX_AMOUNT_DIREC];
  extern struct Y y[MAX_AMOUNT_DIREC];
  extern int amp_y;
  extern int num_of_extrms;

int count;
  int num;
  int num_direc;
  float length_of_letter;

int num_ligat_d_r_o;
  int num_ord_1_ligat;
  int num_ligat_u_r_i;
```

```
    int num_ord_1_lig1;
    int num_ligat_d_l_o;
    int num_ord_1_lig3;
    int num_ligat_u_l_i;
    int num_ord_1_lig2;
    int index_max_dir;
    int amp_x;

num=read_symb (fp,letter);
    if ((num==-2)||(num==1)) return(-1);
    if (num==0) return (-1);
    if (num==-3) return (-3);
    if (num > MAX_NUM_OF_POINTS-1)
       {  printf("Input file too huge\n");
          getch();
          return(-1);
       }
    num_of_extrms=calc_extremoms (num);
    if (num_of_extrms > MAX_NUM_OF_EXTREMOMS-1)
       {  printf("Array of extremums too huge\n");
          getch();
          return(-1);
       }
    length_of_letter=letter_length(num,arr_cor);
    filtr(num_of_extrms);
    amp_y=ampl_y(num,arr_cor);
    amp_x=ampl_x(num,arr_cor);
    start(num_of_extrms);

if ((num_direc=direct(num_of_extrms))==0)
           { printf("It's no directions\n");
             getch();
             return(0);
           }
    index_max_dir=length_angl(num_direc,ARR_DIR);

/*****************************
    filter for long down
*****************************/
    if (filtr_1(length_of_letter,num_direc,num_of_extrms)==1)
      { start(num_of_extrms);
         if ((num_direc=direct(num_of_extrms))==0)
           { printf("It's no directions after conversion and filtr_1\n");
             getch();
             return(0);
           }
         index_max_dir=length_angl(num_direc,ARR_DIR);
      }
    if (filtr_2(length_of_letter,num_direc)==1)
      { start(num_of_extrms);
         if ((num_direc=direct(num_of_extrms))==0)
           {printf("It's no directions after conversion filtr_1 and _2\n");
             getch();
             return(0);
           }
         index_max_dir=length_angl(num_direc,ARR_DIR);
      }
```

```
   if (filtr_3(length_of_letter,num_direc,num_of_extrms)==1)
     { start(num_of_extrms);
         if ((num_direc=direct(num_of_extrms))==0)
           {printf("It's no directions after conversion filtr_1,_2 and _3\n");
            getch();
            return(0);
           }
         index_max_dir=length_angl(num_direc,ARR_DIR);
     }
   num_ligat_d_r_o=ligat(num_of_extrms,num_direc);
   num_ligat_u_r_i=lig1(num_of_extrms,num_direc);
   num_ligat_u_l_i=lig2(num_of_extrms,num_direc);
   num_ligat_d_l_o=lig3(num_of_extrms,num_direc);
   num_ord_1_ligat=ord_1_ligat(num_of_extrms,num_ligat_d_r_o);
   num_ord_1_lig1=ord_1_lig1(num_of_extrms,num_ligat_u_r_i);
   num_ord_1_lig2=ord_1_lig2(num_of_extrms,num_ligat_u_l_i);
   num_ord_1_lig3=ord_1_lig3(num_of_extrms,num_ligat_d_l_o);
   curve(num_of_extrms);
   if (sentense(num_of_extrms)==0)
                printf("It's no sentense\n");
   conv_dir_train(num_direc,amp_y,ARR_DIR,x,y);

return (num_direc);
}

/* This module is for calculating and manipulating extremums , it includes
   three procedures :

(1) calc_extremums    : To find the extremums of the symbol , and the
                               "change in pen" points.
       (2) find_max_extrm    : To find the max/min X-coordinate and the
                               max/min Y-coordinate of the symbol.
       (3) analyse_extremums : A procedure to analyse the extremums found so
                               far , mainly this procedure marks close extre
                               -mums as suspecious extremums.
*/

/****************************************************************
   The input of this procedure is the array of coordinates which holds the
   coordinates of the symbol , and the number of these points , it fills
   the special of points (i.e. , extremums or change in pen) in the array
   arr_extremums , it returns the number of special points it found.
****************************************************************/
   struct TABLE_EXTREMOMS extrm[MAX_NUM_OF_EXTREMOMS];
   extern struct POINT arr_cor[MAX_NUM_OF_POINTS]; /* array of coordinates */
   extern struct TABLE_EXTREMOMS arr_extremoms[MAX_NUM_OF_EXTREMOMS];
           /* array of special points (i.e. extremums , changing of pen
                              position */
   extern struct TABLE_EXTREMOMS arr_exc_extrms[MAX_NUM_OF_EXTREMOMS];
           /* array of excluded extremums , it is excluded from the array
              of extremums by excluding close points */
   struct TABLE_EXTREMOMS arr_exc_extrm[MAX_NUM_OF_EXTREMOMS];

int calc_extremoms (int num_of_points)
{
   int def_quart (int x,int y);
```

```
unsigned int indE;
unsigned int ndx;
unsigned pen_was_up;
int crnt_quart,prev_quart;
int crnt_rot,prev_rot;
int Sx,Sy,PSx,PSy,a,b;
int first_point=1;
int Pndx=0;
unsigned int LastNdx;
int i;

indE=0;
ndx=0;
pen_was_up=1;
Sx=0;
Sy=0;
PSx=0;
PSy=0;
a=0;b=0;

while (ndx<num_of_points)
{
    while ((arr_cor[ndx].pen_status)==1)
    {
      if (pen_was_up==1)
      { /* beginning extremom */
          if (first_point==1)
          {
            int tSx,tSy;

Sx=(arr_cor[ndx+1].x_cor-arr_cor[ndx].x_cor);
            Sy=(arr_cor[ndx+1].y_cor-arr_cor[ndx].y_cor);
            tSx=(arr_cor[ndx+2].x_cor-arr_cor[ndx+1].x_cor);
            tSy=(arr_cor[ndx+2].y_cor-arr_cor[ndx+1].y_cor);
            a=Sx*tSy-Sy*tSx;
            b=Sx*tSx+Sy*tSy;

PSx=Sx;
            PSy=Sy;
          }
          else {
                  /* for the previous ENDING extremom */
                  Sx=(arr_cor[ndx].x_cor-arr_cor[Pndx].x_cor);
                  Sy=(arr_cor[ndx].y_cor-arr_cor[Pndx].y_cor);
                  PSx=(arr_cor[Pndx].x_cor-arr_cor[Pndx-1].x_cor);
                  PSy=(arr_cor[Pndx].y_cor-arr_cor[Pndx-1].y_cor);
                  a=PSx*Sy-PSy*Sx;
                  b=PSx*Sx+PSy*Sy;

arr_extremoms[indE].p_ndx=Pndx;
                  arr_extremoms[indE].x_cor=arr_cor[Pndx].x_cor;
                  arr_extremoms[indE].y_cor=arr_cor[Pndx].y_cor;
                  arr_extremoms[indE].pen_sts=0;
                  arr_extremoms[indE].dir=def_quart(PSx,PSy);
                  arr_extremoms[indE].out_rot=def_quart(b,a);
                  {
                    int PPSx,PPSy;
                    PPSx=(arr_cor[Pndx-1].x_cor-arr_cor[Pndx-2].x_cor);
```

```
                    PPSy=(arr_cor[Pndx-1].y_cor-arr_cor[Pndx-2].y_cor);
                    a=PPSx*PSy-PPSy*PSx;
                    b=PPSx*PSx+PPSy*PSy;
                    arr_extremoms[indE].in_rot=def_quart(b,a);
                } indE++;
                PSx=Sx;
                PSy=Sy;
                {
                    int tSx,tSy;

Sx=(arr_cor[ndx+1].x_cor-arr_cor[ndx].x_cor);
                    Sy=(arr_cor[ndx+1].y_cor-arr_cor[ndx].y_cor);
                    tSx=(arr_cor[ndx].x_cor-arr_cor[Pndx].x_cor);
                    tSy=(arr_cor[ndx].y_cor-arr_cor[Pndx].y_cor);
                    a=tSx*Sy-tSy*Sx;
                    b=tSx*Sx+tSy*Sy;
                }
            }
    crnt_quart=def_quart(Sx,Sy);
    crnt_rot=def_quart(b,a);

arr_extremoms[indE].p_ndx=ndx;
    arr_extremoms[indE].x_cor=arr_cor[ndx].x_cor;
    arr_extremoms[indE].y_cor=arr_cor[ndx].y_cor;
    arr_extremoms[indE].pen_sts=1;

if (first_point==1) {
                    arr_extremoms[indE].dir=15;
                    arr_extremoms[indE].in_rot=15;
                    arr_extremoms[indE].out_rot=15;
            ndx++;
                    first_point=0;
                }
                else {
                    arr_extremoms[indE].dir=def_quart(PSx,PSy);
                    arr_extremoms[indE].in_rot=0;
                    arr_extremoms[indE].out_rot=def_quart(b,a);
                }
    indE++;
    pen_was_up=0;
} else {
        crnt_quart=def_quart(Sx,Sy);
        crnt_rot=def_quart(b,a);
        if ((b<0) && ((a/b)<-10)) crnt_rot=2;
        if ((b<0) && ((a/b)>10)) crnt_rot=6;

if ((( (crnt_quart!=prev_quart) )) /*||
            ((crnt_rot>=4) && (prev_rot<4)) ||
            ((crnt_rot<4) && (prev_rot>=4))
            )
            && (prev_rot!=15)) */
        { /* regular extremom */
            if ((abs(Sx)>0) || (abs(Sy)>0) || (b<0))
            {
                if ((ndx-1-arr_extremoms[indE-1].p_ndx)>0)
                {
```

```
                            arr_extremoms[indE].p_ndx=ndx-1;
                            arr_extremoms[indE].x_cor=arr_cor[ndx-1].x_cor;
                            arr_extremoms[indE].y_cor=arr_cor[ndx-1].y_cor;
                            arr_extremoms[indE].pen_sts=1;
                            arr_extremoms[indE].dir=prev_quart;
                            arr_extremoms[indE].in_rot=prev_rot;
                            arr_extremoms[indE].out_rot=crnt_rot;
                            indE++;
                          }
                        }
                      }
                    }
            ndx++;

Sx=(arr_cor[ndx].x_cor-arr_cor[ndx-1].x_cor);
            Sy=(arr_cor[ndx].y_cor-arr_cor[ndx-1].y_cor);
            a=PSx*Sy-PSy*Sx;
            b=PSx*Sx+PSy*Sy;
            PSx=Sx;
            PSy=Sy;

prev_quart=crnt_quart;
            prev_rot=crnt_rot;
        } /* end of while (arr_cor[ndx].penstatus==1) */ if ((pen_was_up==0) && (arr_cor[ndx-1].pen_status==1))
          { /* ending extremom */
            Pndx=ndx-1;
            pen_was_up=1;
            LastNdx=ndx-1;
          }
     ndx++;
  } /* ndx<=NumOfPoints */

/* Add the last special point to the array */
  arr_extremoms[indE].p_ndx=LastNdx;
  arr_extremoms[indE].x_cor=arr_cor[LastNdx].x_cor;
  arr_extremoms[indE].y_cor=arr_cor[LastNdx].y_cor;
  arr_extremoms[indE].pen_sts=0;
  Sx=(arr_cor[LastNdx-1].x_cor-arr_cor[LastNdx-2].x_cor);
  Sy=(arr_cor[LastNdx-1].x_cor-arr_cor[LastNdx-2].x_cor);
  PSx=(arr_cor[LastNdx-2].x_cor-arr_cor[LastNdx-3].x_cor);
  PSy=(arr_cor[LastNdx-2].y_cor-arr_cor[LastNdx-3].y_cor);
  arr_extremoms[indE].dir=def_quart(Sx,Sy);
  a=PSx*Sy-PSy*Sx;
  b=PSx*Sx+PSy*Sy;
  arr_extremoms[indE].in_rot=def_quart(b,a);
  arr_extremoms[indE].out_rot=15;
  return (indE);
}
```

```
/****************************************************************
   This procedure is to find the max/min X-coordinate and the max/min
   Y-coordinate of the symbol.
****************************************************************/
void find_max_extrm (int num_of_extrms,
                     int *Xmin,int *Xmax,int *Ymin,int *Ymax)
{
 unsigned int i=0;
 *Xmin=1200;
 *Xmax=0;
 *Ymin=1200;
 *Ymax=0;

while (i<=num_of_extrms)
 {
   if (arr_extremoms[i].x_cor<*Xmin) *Xmin=arr_extremoms[i].x_cor;
   if (arr_extremoms[i].x_cor>*Xmax) *Xmax=arr_extremoms[i].x_cor;
   if (arr_extremoms[i].y_cor<*Ymin) *Ymin=arr_extremoms[i].y_cor;
   if (arr_extremoms[i].y_cor>*Ymax) *Ymax=arr_extremoms[i].y_cor;
   i++;
 }
}

/****************************************************************
    correct dir,in_rot,out_rot for suspicious points , called from
    analyse_extremums
****************************************************************/
void correct_extrm (int i,int Pi,int j)
{
  int def_quart (int x,int y);
  int Sx,Sy,PSx,PSy;
  int ndx1,ndx2;
  int a,b;

ndx1=extrm[Pi].p_ndx;
  ndx2=extrm[i].p_ndx;
  if (Pi>0)
  {
     if (extrm[Pi-1].pen_sts==0)
     {
         PSx=arr_cor[ndx1].x_cor-arr_cor[extrm[Pi-1].p_ndx].x_cor;
         PSy=arr_cor[ndx1].y_cor-arr_cor[extrm[Pi-1].p_ndx].y_cor;
     }
     else {
         PSx=arr_cor[ndx1].x_cor-arr_cor[ndx1-1].x_cor;
         PSy=arr_cor[ndx1].y_cor-arr_cor[ndx1-1].y_cor;
        }
  } else {PSx=0;PSy=0;}
  Sx=arr_cor[ndx2].x_cor-arr_cor[ndx1].x_cor;
  Sy=arr_cor[ndx2].y_cor-arr_cor[ndx1].y_cor;
  a=PSx*Sy-PSy*Sx;
  b=PSx*Sx+PSy*Sy;
  if (arr_exc_extrm[j-1].out_rot!=15)
     arr_exc_extrm[j-1].out_rot=def_quart(b,a);

PSx=Sx;
  PSy=Sy;
```

```c
    arr_exc_extrm[j].dir=def_quart(PSx,PSy);
    arr_exc_extrm[j].in_rot=0;
    if (arr_exc_extrm[j].out_rot!=15)
    {
       if (extrm[i].pen_sts==0)
          {
              Sx=arr_cor[extrm[i+1].p_ndx].x_cor-arr_cor[ndx2].x_cor;
              Sy=arr_cor[extrm[i+1].p_ndx].y_cor-arr_cor[ndx2].y_cor;
          }
          else
          {
              Sx=arr_cor[ndx2+1].x_cor-arr_cor[ndx2].x_cor;
              Sy=arr_cor[ndx2+1].y_cor-arr_cor[ndx2].y_cor;
          }
       a=PSx*Sy-PSy*Sx;
       b=PSx*Sx+PSy*Sy;
       arr_exc_extrm[j].out_rot=def_quart(b,a);
    }
}

/*************************************************************
  A procedure to analyse the extremums found so far , mainly this procedure
  marks close extremums as suspecious extremums.
**************************************************************/
int analyse_extremoms (int num_of_extrms)
{
   int i,j=0;
   int count=0;
   int Pi=0;
   boolean FirstP=TRUE;

for (i=1;i<num_of_extrms;i++)
   {
       if ((( (abs(extrm[i].x_cor-extrm[i+1].x_cor))<2 ||
              (abs(extrm[i].y_cor-extrm[i+1].y_cor))<2) &&
              (extrm[i].in_rot!=extrm[i+1].in_rot) &&
              (extrm[i].dir==extrm[i+1].dir) &&
              (extrm[i].pen_sts==1) &&
              (extrm[i-1].pen_sts!=0)) extrm[i].susp=1;
                            else {extrm[i].susp=0;count++;}
   }
   extrm[0].susp=0;
   extrm[i].susp=0;
   count++;

for (i=0;i<=num_of_extrms;i++)
   {
       if (extrm[i].susp==0) {
                       arr_exc_extrm[j].p_ndx=extrm[i].p_ndx;
                       arr_exc_extrm[j].x_cor=extrm[i].x_cor;
                       arr_exc_extrm[j].y_cor=extrm[i].y_cor;
                       arr_exc_extrm[j].pen_sts=extrm[i].pen_sts;

arr_exc_extrm[j].dir=extrm[i].dir;
                       arr_exc_extrm[j].in_rot =extrm[i].in_rot;
                       arr_exc_extrm[j].out_rot=extrm[i].out_rot;

if (FirstP==FALSE)
```

```
                        {
                            correct_extrm (i,Pi,j);
                            FirstP=TRUE;
                        } if (extrm[i].pen_sts==0) FirstP=TRUE;
                        j++;
                    }
        else {
                if (FirstP) Pi=i-1;
                FirstP=FALSE;
            }
    } for (i=1;i<=count;i++)
        if (extrm[i-1].p_ndx==(extrm[i].p_ndx-1)) arr_exc_extrm[i].in_rot=0;
    return (count);
}

/***************************************************************
function length_angl() calculates length for the each long down and
returns the number of the long down with the max lengt.
***************************************************************/
int length_angl(int num_lin,struct LIN Z[])
{ int count,dx,dy,max_dy,max_length,i_max_length,i_max_dy;
  float tng;
  max_dy=0;
  max_length=0;
  for (count=0;count<num_lin;count++)
    { dx=Z[count].x_end-Z[count].x_beg;
      dy=Z[count].y_end-Z[count].y_beg;
      Z[count].length = (unsigned)sqrt((float)dx*(float)dx+
                                       (float)dy*(float)dy);
      if (max_dy < abs(dy))
          { max_dy = abs(dy);
            i_max_dy = count;
          }
      if (max_length < Z[count].length)
          { max_length = Z[count].length;
            i_max_length = count;
          }
      if ((dx==0)&&(dy>0)) tng=M_PI/2;/* 90 */
      else
          if ((dx==0)&&(dy<0)) tng=-M_PI/2;/* -90 */
          else
              if ((dx==0)&&(dy==0)) tng=999999;
              else
                  tng=atan((float)dy/(float)dx);
      if (tng < 0) tng=tng+M_PI; /* angle + 180 */
      Z[count].angle = tng;
    } return(i_max_dy);
}
```

```c
/****************************************************************
function ampl_y() calculates maximum and minimum of y coordinate
and returns y - amplitude.
****************************************************************/
int ampl_y(int num_of_points,struct POINT arr_cor[])
{ int min,max,count,temp;
  min=arr_cor[0].y_cor;
  max=arr_cor[0].y_cor;
  for(count=1;count<=num_of_points;count++)
    { if (arr_cor[count].pen_status==0)  continue;
      if (max < arr_cor[count].y_cor)
                              max=arr_cor[count].y_cor;
      if (min > arr_cor[count].y_cor)
                              min=arr_cor[count].y_cor;

}
  if (max==min) max=max+1;
  y_vec_beg=(float)(arr_cor[0].y_cor-min)/(float)(max-min);
  y_vec_end=(float)(arr_cor[num_of_points-1].y_cor-min)/(float)(max-min);
  return(abs(max-min));
}
int ampl_x(int num_of_points,struct POINT arr_cor[])
{ int min,max,count,temp;
  min=arr_cor[0].x_cor;
  max=arr_cor[0].x_cor;
  for(count=1;count<=num_of_points;count++)
    { if (arr_cor[count].pen_status==0)  continue;
      if (max < arr_cor[count].x_cor)
                              max=arr_cor[count].x_cor;
      if (min > arr_cor[count].x_cor)
                              min=arr_cor[count].x_cor;

}
  if (max==min) max=max+1;
  x_vec_beg=(float)(arr_cor[0].x_cor-min)/(float)(max-min);
  x_vec_end=(float)(arr_cor[num_of_points-1].x_cor-min)/(float)(max-min);
  return(abs(max-min));
}
/****************************************************************
function conv_dir_train() calculates relative ordinates of letter
skeleton.
****************************************************************/
void conv_dir_train(int num_dir,int amp_y,struct LIN Z[],struct X x[],
                                                       struct Y y[])

{
  int count;
  int x_min=9999;
  int y_min=9999;
  int x_max=0;
  int y_max=0;

for (count=0; count<num_dir; count++)
    { if (Z[count].x_beg < x_min)  x_min=Z[count].x_beg;
      if (Z[count].x_beg > x_max)  x_max=Z[count].x_beg;
      if (Z[count].x_end < x_min)  x_min=Z[count].x_end;
      if (Z[count].x_end > x_max)  x_max=Z[count].x_end;
      if (Z[count].y_beg < y_min)  y_min=Z[count].y_beg;
      if (Z[count].y_beg > y_max)  y_max=Z[count].y_beg;
      if (Z[count].y_end < y_min)  y_min=Z[count].y_end;
      if (Z[count].y_end > y_max)  y_max=Z[count].y_end;
```

```c
    }
    for (count=0; count<num_dir; count++)
    { x[count].x_b=(float)(Z[count].x_beg-x_min)/(float)(y_max-y_min);
            y[count].y_b=(float)(Z[count].y_beg-y_min)/(float)amp_y;
            x[count].x_e=(float)(Z[count].x_end-x_min)/(float)(y_max-y_min);
            y[count].y_e=(float)(Z[count].y_end-y_min)/(float)amp_y;
    }
 return;
}
float letter_length(int num_of_points,struct POINT arr_cor[])
{ int i;
  double res=0.0;

for (i=0;i<num_of_points;i++)
    { if (arr_cor[i].pen_status!=0)
            res=res+hypot((double)((signed)arr_cor[i+1].x_cor-(signed)arr_cor[i].x_cor),
                (double)((signed)arr_cor[i+1].y_cor-(signed)arr_cor[i].y_cor));

}
    return((float)res);
}

/**
function filtr() calculates one's more stroke's directions and corrects it
in the array arr_extremoms.
**/ void filtr(int num_of_extrm)
{ int count,dir;
    int def_quart (int x,int y);
    for (count = 0; count <= num_of_extrm; count++)
    { dir=def_quart (arr_extremoms[count+1].x_cor-arr_extremoms[count].x_cor,
                arr_extremoms[count+1].y_cor-arr_extremoms[count].y_cor);
        if (dir!=arr_extremoms[count+1].dir)
                arr_extremoms[count+1].dir=dir;

}
}
/**
function filtr_1 returns 0,if there wasn't filtration.
corrects the array arr_extremoms[] and returns 1,if there was filtration.
filtr_1 takes away a long down,if she is first or last,if there are no
penstrokes before (for the first) or after ( for the last long down) and
if relative length of deleted long down is less 0.2.
**/
int filtr_1(float length_of_letter,int num_dir,int num_of_extrm)
/****************************
    return 0 there was't filtration
           1 was filtration
****************************/
{ int temp=0;
    int count;
    if (((float)ARR_DIR[0].length/length_of_letter < TRESH_F1)&&
                    (ARR_DIR[0].pns_beg==1))
        { for (count=0;count<=ARR_DIR[0].pns_end;count++)
                arr_extremoms[count].pen_sts=0;
            temp=1;
        }
```

```c
     if (((float)ARR_DIR[num_dir-1].length/length_of_letter < TRESH_F1)&&
                    (ARR_DIR[num_dir-1].pns_end==num_of_extrm))
       { for (count=ARR_DIR[num_dir-1].pns_beg-1;
                           count<=ARR_DIR[num_dir-1].pns_end;count++)
             arr_extremoms[count].pen_sts=0;
          temp=1;
       }
    return(temp);
}
/**
function filtr_2 returns 0 if there wasn't filtration.
corrects array arr_extremoms[], returns 1,if there was filtration.
filtr_2 takes away a one penstroke betweem two long down,if
distance x between long down <= 5 and distance y between long down <= 2.
**/
int filtr_2(float length_of_letter,int num_dir)
{ int temp=0,i;
  for (i=0;i<num_dir-2;i++)
    { if (ARR_DIR[i+1].pns_beg-ARR_DIR[i].pns_end > 2)  continue;
       if (abs(arr_extremoms[ARR_DIR[i+1].pns_beg].dir -
                  arr_extremoms[ARR_DIR[i].pns_end].dir) > 1) continue;
       if (hypot((double)((signed)arr_extremoms[ARR_DIR[i+1].pns_beg].x_cor -
                  (signed)arr_extremoms[ARR_DIR[i].pns_end].x_cor),
                  (double)((signed)arr_extremoms[ARR_DIR[i+1].pns_beg].y_cor -
                     (signed)arr_extremoms[ARR_DIR[i].pns_end].y_cor))
                             /(double)length_of_letter < (double)TRESH_F2)
         arr_extremoms[ARR_DIR[i].pns_end+1].dir=
                          arr_extremoms[ARR_DIR[i].pns_end].dir;

temp=1;
    }
   return(temp);
}
/**
function filtr_3 returns 0,if there wasn't filtration.
corrects array arr_extremoms[],returns , if there was filtration.
takes away long down before stroke with pen up==0, if long down's
length <= 0.2 from max length.
**/
int filtr_3(float length_of_letter,int num_dir,int num_of_extrm)
{ int temp=0,i,m,count;
  i=num_of_extrm;
  while (arr_extremoms[i].pen_sts==0)
    i--;
  while (arr_extremoms[i].pen_sts==1)
    i--;
  if (i<=0) return(temp);
  else
    { for (count=0;count<num_dir;count++)
        { if ((i>=ARR_DIR[count].pns_beg)&&(i<=ARR_DIR[count].pns_end)&&
              ((float)ARR_DIR[count].length/length_of_letter < TRESH_F3))
           { for (m=ARR_DIR[count].pns_beg-1;m<=ARR_DIR[count].pns_end;m++)
             { arr_extremoms[m].pen_sts=0;
               temp=1;
               return(temp);
             }
           }
        }
    }
```

```c
   return(temp);
} void start(int num_of_extrms)
{ int count;
  for (count = 0; count <MAX_AMOUNT_DIREC; count++)
     {    ARR_DIR[count].num = 0;
          ARR_DIR[count].pns_beg = 0;
          ARR_DIR[count].pns_end = 0;
          ARR_DIR[count].x_beg = 0;
          ARR_DIR[count].y_beg = 0;
          ARR_DIR[count].x_end = 0;
          ARR_DIR[count].y_end = 0;
          ARR_DIR[count].length = 0;
          ARR_DIR[count].angle = 0;
          ARR_LIGAT[count].num = 0;
          ARR_LIGAT[count].pns_beg = 0;
          ARR_LIGAT[count].pns_end = 0;
          ARR_LIGAT[count].x_beg = 0;
          ARR_LIGAT[count].y_beg = 0;
          ARR_LIGAT[count].x_end = 0;
          ARR_LIGAT[count].y_end = 0;
          ARR_LIGAT[count].length = 0;
          ARR_LIG1[count].num = 0;
          ARR_LIG1[count].pns_beg = 0;
          ARR_LIG1[count].pns_end = 0;
          ARR_LIG1[count].x_beg = 0;
          ARR_LIG1[count].y_beg = 0;
          ARR_LIG1[count].x_end = 0;
          ARR_LIG1[count].y_end = 0;
          ARR_LIG1[count].length = 0;
          ARR_LIG2[count].num = 0;
          ARR_LIG2[count].pns_beg = 0;
          ARR_LIG2[count].pns_end = 0;
          ARR_LIG2[count].x_beg = 0;
          ARR_LIG2[count].y_beg = 0;
          ARR_LIG2[count].x_end = 0;
          ARR_LIG2[count].y_end = 0;
          ARR_LIG2[count].length = 0;
          ARR_LIG3[count].num = 0;
          ARR_LIG3[count].pns_beg = 0;
          ARR_LIG3[count].pns_end = 0;
          ARR_LIG3[count].x_beg = 0;
          ARR_LIG3[count].y_beg = 0;
          ARR_LIG3[count].x_end = 0;
          ARR_LIG3[count].y_end = 0;
          ARR_LIG3[count].length = 0;
     }
  for (count = 0; count <=num_of_extrms; count++)
     {    penn[count].strk_num = count;
          penn[count].p_ndx = arr_extremoms[count].p_ndx;
          penn[count].form_code = 0;
          penn[count].pen_sts = arr_extremoms[count].pen_sts;
     }
}
```

```
/****************************************************************
function ligat() defines left up strokes from the end of long down
in the arr_extremoms[],records defined left up stroke's parameters to
ARR_LIGAT[] according to his number and labels MASK penn.
****************************************************************/
int ligat(int num_of_extrms,int num_dir)
{ int pr,num_lig,num_pns,count,num_str;

pr = 0;
  num_pns = 0;
  num_lig = 0;
  if (num_dir == 0)
        return(0);
  for (count = 0; count < num_dir; count++)
     {
        pr = 0;
        if (ARR_DIR[count].pns_end == (unsigned)0)  continue;
        if (penn[ARR_DIR[count].pns_end].form_code==(unsigned)0)  continue;
        if (arr_extremoms[ARR_DIR[count].pns_end+1].dir > 2)  continue;
        if (arr_extremoms[ARR_DIR[count].pns_end].pen_sts == (unsigned)0)
                                                              continue;

for (num_str = ARR_DIR[count].pns_end+1; num_str <= num_of_extrms;
                                                              num_str++)

{ if ((arr_extremoms[num_str].dir <= 2)
                    &&(penn[num_str].form_code == 0))

{ if (pr==0)
              { ARR_LIGAT[num_lig].num = num_lig;
                ARR_LIGAT[num_lig].pns_beg = num_str;
                ARR_LIGAT[num_lig].x_beg = arr_extremoms[num_str-1].x_cor;
                ARR_LIGAT[num_lig].y_beg = arr_extremoms[num_str-1].y_cor;
                ARR_LIGAT[num_lig].pns_end = num_str;
                ARR_LIGAT[num_lig].x_end = arr_extremoms[num_str].x_cor;
                ARR_LIGAT[num_lig].y_end = arr_extremoms[num_str].y_cor;
                pr = 1;
                num_pns++;
                penn[num_str].form_code = 3;
                if ((num_str==num_of_extrms)||
                     (arr_extremoms[num_str].pen_sts == (unsigned)0))
                   { num_lig++;
                     pr = 0;
                     break;
                   }
              }
            else
              { /*ARR_LIGAT[num_lig].dir =  ARR_LIGAT[count].dir +
                                            arr_extremoms[num_str].dir;*/
                num_pns++;
                penn[num_str].form_code = 3;
                if (( arr_extremoms[num_str].pen_sts == (unsigned)0)||
                        (num_str==num_of_extrms))
                   { /*ARR_LIGAT[num_lig].pen_sts = arr_extremoms[num_str].pen_sts;*/
                     ARR_LIGAT[num_lig].pns_end = num_str;
                     ARR_LIGAT[num_lig].x_end =  arr_extremoms[num_str].x_cor;
                     ARR_LIGAT[num_lig].y_end =  arr_extremoms[num_str].y_cor;
                     num_lig++;
                     pr = 0;
```

```
/****************************************************
function ligat() defines left up strokes from the end of long down
in the arr_extremoms[],records defined left up stroke's parameters to
ARR_LIGAT[] according to his number and labels MASK penn.
****************************************************/
int ligat(int num_of_extrms,int num_dir)
{ int pr,num_lig,num_pns,count,num_str;

pr = 0;
    num_pns = 0;
    num_lig = 0;
    if (num_dir == 0)
            return(0);
    for (count = 0; count < num_dir; count++)
        {
            pr = 0;
            if (ARR_DIR[count].pns_end == (unsigned)0) continue;
            if (penn[ARR_DIR[count].pns_end].form_code==(unsigned)0) continue;
            if (arr_extremoms[ARR_DIR[count].pns_end+1].dir > 2) continue;
            if (arr_extremoms[ARR_DIR[count].pns_end].pen_sts == (unsigned)0)
                                                            continue;

for (num_str = ARR_DIR[count].pns_end+1; num_str <= num_of_extrms;
                                                            num_str++)

{ if ((arr_extremoms[num_str].dir <= 2)
                        &&(penn[num_str].form_code == 0))

{ if (pr==0)
                    { ARR_LIGAT[num_lig].num = num_lig;
                      ARR_LIGAT[num_lig].pns_beg = num_str;
                      ARR_LIGAT[num_lig].x_beg = arr_extremoms[num_str-1].x_cor;
                      ARR_LIGAT[num_lig].y_beg = arr_extremoms[num_str-1].y_cor;
                      ARR_LIGAT[num_lig].pns_end = num_str;
                      ARR_LIGAT[num_lig].x_end = arr_extremoms[num_str].x_cor;
                      ARR_LIGAT[num_lig].y_end = arr_extremoms[num_str].y_cor;
                      pr = 1;
                      num_pns++;
                      penn[num_str].form_code = 3;
                      if ((num_str==num_of_extrms)||
                            (arr_extremoms[num_str].pen_sts == (unsigned)0))
                        { num_lig++;
                          pr = 0;
                          break;
                        }
                    }
                    else
                    { /*ARR_LIGAT[num_lig].dir = ARR_LIGAT[count].dir +
                                                arr_extremoms[num_str].dir;*/ num_pns++;
                        penn[num_str].form_code = 3;
                        if (( arr_extremoms[num_str].pen_sts == (unsigned)0)||
                                (num_str==num_of_extrms))
                        { /*ARR_LIGAT[num_lig].pen_sts = arr_extremoms[num_str].pen_sts;*/
                          ARR_LIGAT[num_lig].pns_end = num_str;
                          ARR_LIGAT[num_lig].x_end = arr_extremoms[num_str].x_cor;
                          ARR_LIGAT[num_lig].y_end = arr_extremoms[num_str].y_cor;
                          num_lig++;
                          pr = 0;
```

```
                    break;
                }
            }
        }
        else
        { if (pr==1)
            { ARR_LIGAT[num_lig].pns_end = num_str-1;
                ARR_LIGAT[num_lig].x_end = arr_extremoms[num_str-1].x_cor;
                ARR_LIGAT[num_lig].y_end = arr_extremoms[num_str-1].y_cor;
                num_lig++;
                pr = 0;
                break;
            }
        }
    }
}
return(num_lig);
}

/******************************************************************
function ord_1_ligat() defines one order left up strokes from the
end of left up strokes in the arr_extremoms[],records one order
left up stroke's parameters to ARR_ORD_1_LIGAT[] according to his
number and labels MASK penn.
******************************************************************/
int ord_1_ligat(int num_of_extrms,int num_ligat)
{ int pr,num_lig,num_pns,count,num_str;

pr = 0;
    num_pns = 0;
    num_lig = 0;
    if (num_ligat == 0)
            return(0);
    for (count = 0; count < num_ligat; count++)
        {
            pr = 0;
            if (ARR_LIGAT[count].pns_end == (unsigned)0)  continue;
            if (penn[ARR_LIGAT[count].pns_end].form_code==(unsigned)0)  continue;
            if ((arr_extremoms[ARR_LIGAT[count].pns_end+1].dir > 4)||
                    (arr_extremoms[ARR_LIGAT[count].pns_end+1].dir < 2))  continue;
            if (arr_extremoms[ARR_LIGAT[count].pns_end].pen_sts == (unsigned)0)
                                                                continue;

for (num_str = ARR_LIGAT[count].pns_end+1; num_str <= num_of_extrms;
                                                        num_str++)
            { if ((arr_extremoms[num_str].dir <= 4)
                        &&(arr_extremoms[num_str].dir >= 2)
                        &&(penn[num_str].form_code == 0))

{ if (pr==0)
                    { ARR_ORD_1_LIGAT[num_lig].num = num_lig;
                        ARR_ORD_1_LIGAT[num_lig].pns_beg = num_str;
                        ARR_ORD_1_LIGAT[num_lig].x_beg = arr_extremoms[num_str-1].x_cor;
                        ARR_ORD_1_LIGAT[num_lig].y_beg = arr_extremoms[num_str-1].y_cor;
                        ARR_ORD_1_LIGAT[num_lig].pns_end = num_str;
                        ARR_ORD_1_LIGAT[num_lig].x_end = arr_extremoms[num_str].x_cor;
                        ARR_ORD_1_LIGAT[num_lig].y_end = arr_extremoms[num_str].y_cor;
                        pr = 1;
```

```c
                num_pns++;
                penn[num_str].form_code = 11;
                if ((num_str==num_of_extrms)||
                        (arr_extremoms[num_str].pen_sts == (unsigned)0))
                    { num_lig++;
                        pr = 0;
                        break;
                    }
            }
            else
            { /*ARR_ORD_1_LIGAT[num_lig].dir = ARR_ORD_1_LIGAT[count].dir +
                                              arr_extremoms[num_str].dir;*/
                num_pns++;
                penn[num_str].form_code = 11;
                if (( arr_extremoms[num_str].pen_sts == (unsigned)0)||
                        (num_str==num_of_extrms))
                    {// ARR_ORD_1_LIGAT[num_lig].pen_sts = arr_extremoms[num_str].pen_sts;
                        ARR_ORD_1_LIGAT[num_lig].pns_end = num_str;
                        ARR_ORD_1_LIGAT[num_lig].x_end = arr_extremoms[num_str].x_cor;
                        ARR_ORD_1_LIGAT[num_lig].y_end = arr_extremoms[num_str].y_cor;
(unsigned)ARR_ORD_1_LIGAT[num_lig].dir/num_pns;
                        num_lig++;
                        pr = 0;
                        break;
                    }
                }
            }
            else
            { if (pr==1)
                { ARR_ORD_1_LIGAT[num_lig].pns_end = num_str-1;
                    ARR_ORD_1_LIGAT[num_lig].x_end = arr_extremoms[num_str-1].x_cor;
                    ARR_ORD_1_LIGAT[num_lig].y_end = arr_extremoms[num_str-1].y_cor;
                    num_lig++;
                    pr = 0;
                    break;
                }
            }
        }
    }
    return(num_lig);
}

/*****************************************************************
function lig1() defines right up strokes from the begining of long
down in the arr_extremoms[],records defined right up stroke's
parameters to ARR_LIG1[] according to his number and labels MASK
penn.
*****************************************************************/
int lig1(int num_of_extrms,int num_dir)
{ int pr,num_lig,num_pns,count,num_str;
    unsigned temp;

pr = 0;
    num_pns = 0;
    num_lig = 0;
    if (num_dir == 0)
            return(0);
```

```
for (count = 0; count < num_dir; count++)
{
    pr = 0;
    if (ARR_DIR[count].pns_beg < (unsigned)2)  continue;
    if (penn[ARR_DIR[count].pns_beg].form_code==0) continue;
    if ((arr_extremoms[ARR_DIR[count].pns_beg-1].dir > 4 )
            ||(arr_extremoms[ARR_DIR[count].pns_beg-1].dir < 2 ))
                                                    continue;
    if (penn[ARR_DIR[count].pns_beg-1].form_code!=0)  continue;
    if (arr_extremoms[ARR_DIR[count].pns_beg-1].pen_sts == (unsigned)0)
                                                    continue;

for (num_str = ARR_DIR[count].pns_beg-1; num_str >= 1;
                                                num_str--)
      { if ((arr_extremoms[num_str].dir <= 4 )
                &&(arr_extremoms[num_str].dir >= 2 )
                &&(penn[num_str].form_code==0))
         { if (pr==0)
            { ARR_LIG1[num_lig].num = num_lig;
              ARR_LIG1[num_lig].pns_beg = num_str;
              ARR_LIG1[num_lig].x_beg = arr_extremoms[num_str+1].x_cor;
              ARR_LIG1[num_lig].y_beg = arr_extremoms[num_str+1].y_cor;
              ARR_LIG1[num_lig].pns_end = num_str;
              ARR_LIG1[num_lig].x_end = arr_extremoms[num_str].x_cor;
              ARR_LIG1[num_lig].y_end = arr_extremoms[num_str].y_cor;
              pr = 1;
              num_pns++;
              penn[num_str].form_code = 5;
              if ((num_str==1)
                  ||(arr_extremoms[num_str-1].pen_sts == (unsigned)0))
                  { num_lig++;
                    pr = 0;
                    break;
                  }
            }
            else
            { /*ARR_LIG1[num_lig].dir =  ARR_LIG1[count].dir +
                                        arr_extremoms[num_str].dir;*/ num_pns++;
              penn[num_str].form_code = 5;
              if (( arr_extremoms[num_str-1].pen_sts == (unsigned)0)||
                  (num_str==1))
                { //ARR_LIG1[num_lig].pen_sts = arr_extremoms[num_str].pen_sts;
                  ARR_LIG1[num_lig].pns_end = num_str;
                  ARR_LIG1[num_lig].x_end = arr_extremoms[num_str].x_cor;
                  ARR_LIG1[num_lig].y_end = arr_extremoms[num_str].y_cor;
                  num_lig++;
                  pr = 0;
                  break;
                }
            }
         }
         else
         { if (pr==1)
           { ARR_LIG1[num_lig].pns_end = num_str+1;
             ARR_LIG1[num_lig].x_end = arr_extremoms[num_str+1].x_cor;
             ARR_LIG1[num_lig].y_end = arr_extremoms[num_str+1].y_cor;
             num_lig++;
```

```
                    pr = 0;
                    break;
                }
            }
        }
    }
    for (count=0; count<num_lig; count++)
      { temp = ARR_LIG1[count].x_end;
          ARR_LIG1[count].x_end = ARR_LIG1[count].x_beg;
          ARR_LIG1[count].x_beg = temp;

temp = ARR_LIG1[count].y_end;
          ARR_LIG1[count].y_end = ARR_LIG1[count].y_beg;
          ARR_LIG1[count].y_beg = temp;

temp = ARR_LIG1[count].pns_end;
          ARR_LIG1[count].pns_end = ARR_LIG1[count].pns_beg;
          ARR_LIG1[count].pns_beg = temp;
      }
    return(num_lig);
}

/*****************************************************************
function ord_1_lig1() defines one order right up strokes from the
begining of right up strokes in the arr_extremoms[],records one
order right up stroke's parameters to ARR_ORD_1_LIG1[] according
to his number and labels MASK penn.
*****************************************************************/
int ord_1_lig1(int num_of_extrms,int num_lig1)
{ int pr,num_lig,num_pns,count,num_str;
  unsigned temp;

pr = 0;
  num_pns = 0;
  num_lig = 0;
  if (num_lig1 == 0)
       return(0);
  for (count = 0; count < num_lig1; count++)
     {
       pr = 0;
       if (ARR_LIG1[count].pns_beg < (unsigned)2) continue;
       if (penn[ARR_LIG1[count].pns_beg].form_code==0) continue;
       if (arr_extremoms[ARR_LIG1[count].pns_beg-1].dir > 2 ) continue;
       if (penn[ARR_LIG1[count].pns_beg-1].form_code!=0) continue;
       if (arr_extremoms[ARR_LIG1[count].pns_beg-1].pen_sts == (unsigned)0)
                                                          continue;

for (num_str = ARR_LIG1[count].pns_beg-1; num_str >= 1;
                                                    num_str--)
         { if ((arr_extremoms[num_str].dir <= 2 )
                  &&(arr_extremoms[num_str].dir >= 0 )
                  &&(penn[num_str].form_code==0))
            { if (pr==0)
                { ARR_ORD_1_LIG1[num_lig].num = num_lig;
                  ARR_ORD_1_LIG1[num_lig].pns_beg = num_str;
                  ARR_ORD_1_LIG1[num_lig].x_beg = arr_extremoms[num_str+1].x_cor;
                  ARR_ORD_1_LIG1[num_lig].y_beg = arr_extremoms[num_str+1].y_cor;
                  ARR_ORD_1_LIG1[num_lig].pns_end = num_str;
```

```
                    ARR_ORD_1_LIG1[num_lig].x_end = arr_extremoms[num_str].x_cor;
                    ARR_ORD_1_LIG1[num_lig].y_end = arr_extremoms[num_str].y_cor;
                    pr = 1;
                    num_pns++;
                    penn[num_str].form_code = 12;
                    if ((num_str==1)
                        ||(arr_extremoms[num_str-1].pen_sts == (unsigned)0))
                       { num_lig++;
                           pr = 0;
                           break;
                       }
                   }
                   else
                   { /*ARR_ORD_1_LIG1[num_lig].dir =  ARR_ORD_1_LIG1[count].dir +
                                          arr_extremoms[num_str].dir;*/
                      num_pns++;
                      penn[num_str].form_code = 12;
                      if (( arr_extremoms[num_str-1].pen_sts == (unsigned)0)||
                          (num_str==1))
                       { //ARR_ORD_1_LIG1[num_lig].pen_sts = arr_extremoms[num_str].pen_sts;
                         ARR_ORD_1_LIG1[num_lig].pns_end = num_str;
                         ARR_ORD_1_LIG1[num_lig].x_end =  arr_extremoms[num_str].x_cor;
                         ARR_ORD_1_LIG1[num_lig].y_end =  arr_extremoms[num_str].y_cor;
                         num_lig++;
                         pr = 0;
                         break;
                       }
                   }
              }
              else
              { if (pr==1)
                { ARR_ORD_1_LIG1[num_lig].pns_end = num_str+1;
                    ARR_ORD_1_LIG1[num_lig].x_end =  arr_extremoms[num_str+1].x_cor;
                    ARR_ORD_1_LIG1[num_lig].y_end =  arr_extremoms[num_str+1].y_cor;
                    num_lig++;
                    pr = 0;
                    break;
                }
              }
            }
        }
    for (count=0; count<num_lig; count++)
      { temp = ARR_ORD_1_LIG1[count].x_end;
          ARR_ORD_1_LIG1[count].x_end = ARR_ORD_1_LIG1[count].x_beg;
          ARR_ORD_1_LIG1[count].x_beg = temp;

temp = ARR_ORD_1_LIG1[count].y_end;
          ARR_ORD_1_LIG1[count].y_end = ARR_ORD_1_LIG1[count].y_beg;
          ARR_ORD_1_LIG1[count].y_beg = temp;

temp = ARR_ORD_1_LIG1[count].pns_end;
          ARR_ORD_1_LIG1[count].pns_end = ARR_ORD_1_LIG1[count].pns_beg;
          ARR_ORD_1_LIG1[count].pns_beg = temp;
      }
    return(num_lig);
}
```

```c
/****************************************************
function lig2() defines left up strokes from the begining of
long down in the arr_extremoms[],records defined left up stroke's
parameters to ARR_LIG2[] according to his number and labels
MASK penn.
****************************************************/
int lig2(int num_of_extrms,int num_dir)
{  int pr,num_lig,num_pns,count,num_str;
   unsigned temp;

pr = 0;
   num_pns = 0;
   num_lig = 0;
   if (num_dir == 0)
         return(0);
   for (count = 0; count < num_dir; count++)
      {
         pr = 0;
         if (ARR_DIR[count].pns_beg < (unsigned)2) continue;
         if (penn[ARR_DIR[count].pns_beg].form_code==0) continue;
         if (arr_extremoms[ARR_DIR[count].pns_beg-1].dir > (unsigned)2 )
                                                 continue;
         if (penn[ARR_DIR[count].pns_beg-1].form_code!=0) continue;
         if (arr_extremoms[ARR_DIR[count].pns_beg-1].pen_sts == (unsigned)0)
                                                 continue;
         for (num_str = ARR_DIR[count].pns_beg-1; num_str >= 1;
                                                  num_str--)
            { if ((arr_extremoms[num_str].dir <= (unsigned)2 )
                       &&(penn[num_str].form_code==0))
               { if (pr==0)
                  { ARR_LIG2[num_lig].num = num_lig;
                    ARR_LIG2[num_lig].pns_beg = num_str;
                    ARR_LIG2[num_lig].x_beg = arr_extremoms[num_str+1].x_cor;
                    ARR_LIG2[num_lig].y_beg = arr_extremoms[num_str+1].y_cor;
                    ARR_LIG2[num_lig].pns_end = num_str;
                    ARR_LIG2[num_lig].x_end = arr_extremoms[num_str].x_cor;
                    ARR_LIG2[num_lig].y_end = arr_extremoms[num_str].y_cor;
                    pr = 1;
                    num_pns++;
                    penn[num_str].form_code = 7;
                    if ((num_str==1)
                        ||(arr_extremoms[num_str-1].pen_sts == (unsigned)0))
                       { num_lig++;
                         pr = 0;
                         break;
                       }
                  }
                  else
                  {/* ARR_LIG2[num_lig].dir = ARR_LIG2[count].dir +
                                              arr_extremoms[num_str].dir;*/
                     num_pns++;
                     penn[num_str].form_code = 7;
                     if (( arr_extremoms[num_str-1].pen_sts == (unsigned)0)||
                        (num_str==0))
                       {// ARR_LIG2[num_lig].pen_sts = arr_extremoms[num_str].pen_sts;
                          ARR_LIG2[num_lig].pns_end = num_str;
                          ARR_LIG2[num_lig].x_end = arr_extremoms[num_str].x_cor;
                          ARR_LIG2[num_lig].y_end = arr_extremoms[num_str].y_cor;
```

```
                    num_lig++;
                    pr = 0;
                    break;
                }
              }
            }
            else
            { if (pr==1)
              { ARR_LIG2[num_lig].pns_end = num_str+1;
                ARR_LIG2[num_lig].x_end = arr_extremoms[num_str+1].x_cor;
                ARR_LIG2[num_lig].y_end = arr_extremoms[num_str+1].y_cor;
                num_lig++;
                pr = 0;
                break;
              }
            }
          }
      }
  for (count=0;count<num_lig;count++)
    { temp = ARR_LIG2[count].x_end;
      ARR_LIG2[count].x_end = ARR_LIG2[count].x_beg;
      ARR_LIG2[count].x_beg = temp;

temp = ARR_LIG2[count].y_end;
      ARR_LIG2[count].y_end = ARR_LIG2[count].y_beg;
      ARR_LIG2[count].y_beg = temp;

temp = ARR_LIG2[count].pns_end;
      ARR_LIG2[count].pns_end = ARR_LIG2[count].pns_beg;
      ARR_LIG2[count].pns_beg = temp;
    }
  return(num_lig);
}

/*****************************************************
function ord_1_lig2() defines one order left up strokes from the
begining of left up strokes in the arr_extremoms[],records one
order left up stroke's parameters to ARR_ORD_2_LIG1[] according
to his number and labels MASK penn.
*****************************************************/
int ord_1_lig2(int num_of_extrms,int num_lig2)
{ int pr,num_lig,num_pns,count,num_str;
  unsigned temp;

pr = 0;
  num_pns = 0;
  num_lig = 0;
  if (num_lig2 == 0)
        return(0);
  for (count = 0; count < num_lig2; count++)
     {
        pr = 0;
        if (ARR_LIG2[count].pns_beg < (unsigned)2) continue;
        if (penn[ARR_LIG2[count].pns_beg].form_code==0) continue;
        if ((arr_extremoms[ARR_LIG2[count].pns_beg-1].dir < (unsigned)2 )
          ||(arr_extremoms[ARR_LIG2[count].pns_beg-1].dir > (unsigned)4 ))
                                                       continue;
        if (penn[ARR_LIG2[count].pns_beg-1].form_code!=0) continue;
```

```
            if (arr_extremoms[ARR_LIG2[count].pns_beg-1].pen_sts == (unsigned)0)
                                    continue;

for (num_str = ARR_LIG2[count].pns_beg-1; num_str >= 1;
                                    num_str--)
        { if ((arr_extremoms[num_str].dir <= (unsigned)4 )
                    &&(arr_extremoms[num_str].dir >= (unsigned)2 )
                    &&(penn[num_str].form_code==0))
            { if (pr==0)
                { ARR_ORD_1_LIG2[num_lig].num = num_lig;
                  ARR_ORD_1_LIG2[num_lig].pns_beg = num_str;
                  ARR_ORD_1_LIG2[num_lig].x_beg = arr_extremoms[num_str+1].x_cor;
                  ARR_ORD_1_LIG2[num_lig].y_beg = arr_extremoms[num_str+1].y_cor;
                  ARR_ORD_1_LIG2[num_lig].pns_end = num_str;
                  ARR_ORD_1_LIG2[num_lig].x_end = arr_extremoms[num_str].x_cor;
                  ARR_ORD_1_LIG2[num_lig].y_end = arr_extremoms[num_str].y_cor;
                  pr = 1;
                  num_pns++;
                  penn[num_str].form_code = 13;
                  if ((num_str==1)
                        ||(arr_extremoms[num_str-1].pen_sts == (unsigned)0))
                    { num_lig++;
                        pr = 0;
                        break;
                    }
                }
                else
                {/* ARR_ORD_1_LIG2[num_lig].dir = ARR_ORD_1_LIG2[count].dir +
                                            arr_extremoms[num_str].dir;*/
                    num_pns++;
                    penn[num_str].form_code = 13;
                    if (( arr_extremoms[num_str-1].pen_sts == (unsigned)0)||
                        (num_str==0))
                    { //ARR_ORD_1_LIG2[num_lig].pen_sts = arr_extremoms[num_str].pen_sts;
                        ARR_ORD_1_LIG2[num_lig].pns_end = num_str;
                        ARR_ORD_1_LIG2[num_lig].x_end = arr_extremoms[num_str].x_cor;
                        ARR_ORD_1_LIG2[num_lig].y_end = arr_extremoms[num_str].y_cor;
(unsigned)ARR_ORD_1_LIG2[num_lig].dir/num_pns;
                        num_lig++;
                        pr = 0;
                        break;
                    }
                }
            }
            else
            { if (pr==1)
                { ARR_ORD_1_LIG2[num_lig].pns_end = num_str+1;
                    ARR_ORD_1_LIG2[num_lig].x_end = arr_extremoms[num_str+1].x_cor;
                    ARR_ORD_1_LIG2[num_lig].y_end = arr_extremoms[num_str+1].y_cor;
                    num_lig++;
                    pr = 0;
                    break;
                }
            }
        }
    }
    for (count=0;count<num_lig;count++)
    { temp = ARR_ORD_1_LIG2[count].x_end;
```

```c
        ARR_ORD_1_LIG2[count].x_end = ARR_ORD_1_LIG2[count].x_beg;
        ARR_ORD_1_LIG2[count].x_beg = temp;

temp = ARR_ORD_1_LIG2[count].y_end;
        ARR_ORD_1_LIG2[count].y_end = ARR_ORD_1_LIG2[count].y_beg;
        ARR_ORD_1_LIG2[count].y_beg = temp;

temp = ARR_ORD_1_LIG2[count].pns_end;
        ARR_ORD_1_LIG2[count].pns_end = ARR_ORD_1_LIG2[count].pns_beg;
        ARR_ORD_1_LIG2[count].pns_beg = temp;
    }
    return(num_lig);
}

/******************************************************************
function lig3() defines right up strokes from the end of long
down in the arr_extremoms[],records defined left up stroke's
parameters to ARR_LIG3[] according to his number and labels
MASK penn.
******************************************************************/
int lig3(int num_of_extrms,int num_dir)
{ int pr,num_lig,num_pns,count,num_str;

pr = 0;
  num_pns = 0;
  num_lig = 0;
  if (num_dir == 0)
        return(0);
  for (count = 0; count < num_dir; count++)
    {
        pr = 0;
        if (ARR_DIR[count].pns_end == (unsigned)0) continue;
        if (penn[ARR_DIR[count].pns_end].form_code==(unsigned)0) continue;
        if ((arr_extremoms[ARR_DIR[count].pns_end+1].dir > 4)
                    ||(arr_extremoms[ARR_DIR[count].pns_end+1].dir < 2))
                                continue;
        if (penn[ARR_DIR[count].pns_end+1].form_code!=0) continue;
        if (arr_extremoms[ARR_DIR[count].pns_end].pen_sts == (unsigned)0)
                                continue;
        for (num_str = ARR_DIR[count].pns_end+1; num_str <= num_of_extrms;
                                                    num_str++)
          { if ((arr_extremoms[num_str].dir <= 4)
                    &&(arr_extremoms[num_str].dir >= 2)
                    &&(penn[num_str].form_code == 0))

{ if (pr==0)
                { ARR_LIG3[num_lig].num = num_lig;
                  ARR_LIG3[num_lig].pns_beg = num_str;
                  ARR_LIG3[num_lig].x_beg = arr_extremoms[num_str-1].x_cor;
                  ARR_LIG3[num_lig].y_beg = arr_extremoms[num_str-1].y_cor;
                  ARR_LIG3[num_lig].pns_end = num_str;
                  ARR_LIG3[num_lig].x_end = arr_extremoms[num_str].x_cor;
                  ARR_LIG3[num_lig].y_end = arr_extremoms[num_str].y_cor;
                  pr = 1;
                  num_pns++;
                  penn[num_str].form_code = 9;
                  if ((num_str==num_of_extrms)||
                        (arr_extremoms[num_str].pen_sts == (unsigned)0))
```

```
                        { num_lig++;
                            pr = 0;
                            break;
                        }
                    }
                    else
                    { /*ARR_LIG3[num_lig].dir = ARR_LIG3[count].dir +
                                                    arr_extremoms[num_str].dir;*/
                        num_pns++;
                        penn[num_str].form_code = 9;
                        if (( arr_extremoms[num_str].pen_sts == (unsigned)0)||
                                    (num_str==num_of_extrms))
                          { //ARR_LIG3[num_lig].pen_sts = arr_extremoms[num_str].pen_sts;
                            ARR_LIG3[num_lig].pns_end = num_str;
                            ARR_LIG3[num_lig].x_end = arr_extremoms[num_str].x_cor;
                            ARR_LIG3[num_lig].y_end = arr_extremoms[num_str].y_cor;
                            num_lig++;
                            pr = 0;
                            break;
                          }
                    }
                }
                else
                { if (pr==1)
                   { ARR_LIG3[num_lig].pns_end = num_str-1;
                        ARR_LIG3[num_lig].x_end = arr_extremoms[num_str-1].x_cor;
                        ARR_LIG3[num_lig].y_end = arr_extremoms[num_str-1].y_cor;
                        num_lig++;
                        pr = 0;
                        break;
                   }
                }
            }
        }
    return(num_lig);
}
/*****************************************************************
function ord_1_lig3() defines one order right up strokes from
the end of right up strokes in the arr_extremoms[],records one
order left up stroke's parameters to ARR_ORD_2_LIG1[] according
to his number and labels MASK penn.
*****************************************************************/
int ord_1_lig3(int num_of_extrms,int num_lig3)
{ int pr,num_lig,num_pns,count,num_str;

pr = 0;
    num_pns = 0;
    num_lig = 0;
    if (num_lig3 == 0)
            return(0);
    for (count = 0; count < num_lig3; count++)
        {
            pr = 0;
            if (ARR_LIG3[count].pns_end == (unsigned)0) continue;
            if (penn[ARR_LIG3[count].pns_end].form_code==(unsigned)0) continue;
            if (arr_extremoms[ARR_LIG3[count].pns_end+1].dir > 2) continue;
            if (penn[ARR_LIG3[count].pns_end+1].form_code!=0) continue;
```

```
        if (arr_extremoms[ARR_LIG3[count].pns_end].pen_sts == (unsigned)0)
                                                    continue;

for (num_str = ARR_LIG3[count].pns_end+1; num_str <= num_of_extrms;
                                                    num_str++)
         { if ((arr_extremoms[num_str].dir <= 2)
                    &&(arr_extremoms[num_str].dir >= 0)
                    &&(penn[num_str].form_code == 0))

{ if (pr==0)
              { ARR_ORD_1_LIG3[num_lig].num = num_lig;
                ARR_ORD_1_LIG3[num_lig].pns_beg = num_str;
                ARR_ORD_1_LIG3[num_lig].x_beg = arr_extremoms[num_str-1].x_cor;
                ARR_ORD_1_LIG3[num_lig].y_beg = arr_extremoms[num_str-1].y_cor;
                ARR_ORD_1_LIG3[num_lig].pns_end = num_str;
                ARR_ORD_1_LIG3[num_lig].x_end = arr_extremoms[num_str].x_cor;
                ARR_ORD_1_LIG3[num_lig].y_end = arr_extremoms[num_str].y_cor;
                pr = 1;
                num_pns++;
                penn[num_str].form_code = 14;
                if ((num_str==num_of_extrms)||
                        (arr_extremoms[num_str].pen_sts == (unsigned)0))
                    { num_lig++;
                        pr = 0;
                        break;
                    }
              }
              else
              { /*ARR_ORD_1_LIG3[num_lig].dir = ARR_ORD_1_LIG3[count].dir +
                                                arr_extremoms[num_str].dir;*/
                num_pns++;
                penn[num_str].form_code = 14;
                if (( arr_extremoms[num_str].pen_sts == (unsigned)0)||
                        (num_str==num_of_extrms))
                 { //ARR_ORD_1_LIG3[num_lig].pen_sts = arr_extremoms[num_str].pen_sts;
                    ARR_ORD_1_LIG3[num_lig].pns_end = num_str;
                    ARR_ORD_1_LIG3[num_lig].x_end = arr_extremoms[num_str].x_cor;
                    ARR_ORD_1_LIG3[num_lig].y_end = arr_extremoms[num_str].y_cor;
                    num_lig++;
                    pr = 0;
                    break;
                 }
              }
          }
          else
          { if (pr==1)
            { ARR_ORD_1_LIG3[num_lig].pns_end = num_str-1;
                ARR_ORD_1_LIG3[num_lig].x_end = arr_extremoms[num_str-1].x_cor;
                ARR_ORD_1_LIG3[num_lig].y_end = arr_extremoms[num_str-1].y_cor;
                num_lig++;
                pr = 0;
                break;
            }
          }
         }
    }
    return(num_lig);
}
```

```c
/* function curve() records to MASK penn[] form code to each of penstrokes
(except long down) according to its curvature.   */
void curve(int num_of_extrms)
{ extern struct TABLE_EXTREMOMS arr_extremoms[MAX_NUM_OF_EXTREMOMS];
  int count;
  for (count = 0; count <= num_of_extrms; count++)
   switch (penn[count].form_code)
    { case (unsigned)3:
          { if (arr_extremoms[count].in_rot==7)
                                   penn[count].form_code = 4;
             else
             { if ((arr_extremoms[count].in_rot==1)
                             ||(arr_extremoms[count].in_rot==0))
                    penn[count].form_code = 3;
                else
                    penn[count].form_code = 15;
             }
             continue;
          }
      case (unsigned)5:
          { if (arr_extremoms[count].in_rot==1)
                                   penn[count].form_code = 6;
             else
             { if ((arr_extremoms[count].in_rot==7)
                             ||(arr_extremoms[count].in_rot==0))
                    penn[count].torm_code = 5;
                else
                    penn[count].form_code = 16;
             }
             continue;
          }
      case (unsigned)7:
          { if (arr_extremoms[count].in_rot==7)
                                   penn[count].form_code = 7;
             else
             { if ((arr_extremoms[count].in_rot==1)
                             ||(arr_extremoms[count].in_rot==0))
                         penn[count].form_code = 8;
                else
                    penn[count].form_code = 17;
             }
             continue;
          }
      case (unsigned)9:
          { if (arr_extremoms[count].in_rot==1)
                                   penn[count].form_code = 9;
             else
             { if ((arr_extremoms[count].in_rot==7)
                             ||(arr_extremoms[count].in_rot==0))
                         penn[count].form_code = 10;
                 else
                    penn[count].form_code = 18;
             }
          }
      default: continue;
    }
  return;
}
```

```c
/******************************************************************
--initial MASK penn have to be build from penstrokes table form_code have
to be done =0
record to MASK penn is used in functions : direct,ligat,lig1,lig2,lig3,
ord_1_ligat,ord_1_lig1,ord_1_lig2,ord_1_lig3. From these programs
information for every find form have to be written to MASK for
these letter.
output1 - letter representation in the "LETTER SYMBOLIC REPRESENTATION".
output2 - letter representation in the "LETTER SYMBOLIC REPRESENTATION
IN GENERALIZED FORM".
******************************************************************/
int sentense(int num_of_extrms)

{  extern struct MASK penn[MAX_NUM_OF_EXTREMOMS];
   extern char our_sent[MAX_LENGTH_SENTENSE];

char temp[10];
   int count;
   strcpy(our_sent,"*");
   strcpy(temp,"_");
   for (count=1; count <= num_of_extrms;count++)
     {
           if((penn[count].form_code==(unsigned)1)&&((strcmp(temp,"A")!=0)))
             { strcpy(temp,"A");
               strcat(our_sent,"A");
               goto A;
             }
           if((penn[count].form_code==(unsigned)11)&&((strcmp(temp,"i")!=0)))
             { strcpy(temp,"i");
               strcat(our_sent,"i");
               goto A;
             }
           if((penn[count].form_code==(unsigned)12)&&((strcmp(temp,"g")!=0)))
             { strcpy(temp,"g");
               strcat(our_sent,"g");
               goto A;
             }
           if((penn[count].form_code==(unsigned)13)&&((strcmp(temp,"f")!=0)))
             { strcpy(temp,"f");
               strcat(our_sent,"f");
               goto A;
             }
           if((penn[count].form_code==(unsigned)14)&&((strcmp(temp,"d")!=0)))
             { strcpy(temp,"d");
               strcat(our_sent,"d");
               goto A;
             }
           if((penn[count].form_code==(unsigned)15)&&((strcmp(temp,"Q")!=0)))
             { strcpy(temp,"Q");
               strcat(our_sent,"Q");
               goto A;
             }
           if((penn[count].form_code==(unsigned)16)&&((strcmp(temp,"X")!=0)))
             { strcpy(temp,"X");
               strcat(our_sent,"X");
               goto A;
             }
```

```
       if((penn[count].form_code==(unsigned)17)&&((strcmp(temp,"Y")!=0)))
         { strcpy(temp,"Y");
           strcat(our_sent,"Y");
           goto A;
         }
       if((penn[count].form_code==(unsigned)18)&&((strcmp(temp,"Z")!=0)))
         { strcpy(temp,"Z");
           strcat(our_sent,"Z");
           goto A;
         }
       if((penn[count].form_code==3)&&((strcmp(temp,"C")!=0)))
         { strcpy(temp,"C");
           strcat(our_sent,"C");
           goto A;
         }
       if((penn[count].form_code==4)&&((strcmp(temp,"D")!=0)))
         { strcpy(temp,"D");
           strcat(our_sent,"D");
           goto A;
         }
        if((penn[count].form_code==5)&&((strcmp(temp,"E")!=0)))
         { strcpy(temp,"E");
           strcat(our_sent,"E");
           goto A;
         }
        if((penn[count].form_code==6)&&((strcmp(temp,"F")!=0)))
         { strcpy(temp,"F");
           strcat(our_sent,"F");
           goto A;
         }
       if((penn[count].form_code==7)&&((strcmp(temp,"G")!=0)))
         { strcpy(temp,"G");
           strcat(our_sent,"G");
           goto A;
         }
        if((penn[count].form_code==8)&&((strcmp(temp,"H")!=0)))
         { strcpy(temp,"H");
           strcat(our_sent,"H");
           goto A;
         }
        if((penn[count].form_code==9)&&((strcmp(temp,"I")!=0)))
         { strcpy(temp,"I");
           strcat(our_sent,"I");
           goto A;
         }
          if((penn[count].form_code==10)&&((strcmp(temp,"J")!=0)))
         { strcpy(temp,"J");
           strcat(our_sent,"J");
           goto A;
         }
A:     if ((penn[count].pen_sts==0)&&(strcmp(temp,"_")!=0))
         { strcat(our_sent,"_");
           strcpy(temp,"_");
           continue;
         }
       if((penn[count].form_code==0)&&(penn[count].pen_sts==1)
                           &&((strcmp(temp,"B")!=0)))
         { strcpy(temp,"B");
```

```c
            strcat(our_sent,"B");
            continue;
         }
      }
   return(1);
}

/*********************************************************************
   a funtion that recieves two numbers , and returns the quarter of these
   two numbers in the range of 0..7.
*********************************************************************/
int def_quart (int x,int y)
{
   if ((x>0 ) && (y==0)) return (0);
   if ((x>0 ) && (y>0) ) return (1);
   if ((x==0) && (y>0) ) return (2);
   if ((x<0 ) && (y>0) ) return (3);
   if ((x<0 ) && (y==0)) return (4);
   if ((x<0 ) && (y<0) ) return (5);
   if ((x==0) && (y<0) ) return (6);
   if ((x>0 ) && (y<0) ) return (7);
   return (15);
}

/*********************************************************************
   a function to returns the round number of the division of two integer
   numbers.
*********************************************************************/
int div_round (int a, int b)
{
  int i=0;
  int temp1,temp2;

temp1=a;
  temp2=b;
  a=abs(a);
  if (b==0) return (MAXINT);
  while(a>b)
   {
     if (b>0) a-=b;
        else a+=b;
     i++;
   }
   if ((a+a)>b) i++;
   if (((temp1>0) && (temp2>0)) || ((temp1<0) && (temp2<0))) return(i);
                                           else return (-i);
} void save_files(int num_direc,char *letter)
{ FILE *fp;
  int i;
  int letter_num;
  char filename[20];
  int get_num (char *letter);

if ((letter_num=get_num (letter))<0)
   { printf("Error in the number of the letter %c\n","letter);
     getch();
```

```c
     }
/*******/
  fp=fopen("fextr.out","ab+");
  fprintf(fp,"%d %c %d %d",
              map_char[letter_num][1],(*letter),num_direc,num_of_extrms);
  for (i=0;i<=num_of_extrms;i++)
     fwrite(&arr_extremoms[i],sizeof(struct TABLE_EXTREMOMS),1,fp);
  fprintf(fp,"\n");
  fclose (fp);
/********/
  fp=fopen("feat.out","ab+");
  fprintf(fp,"%c %d %.4f %.4f %.4f %.4f\n",
              (*letter),map_char[letter_num][1],y_vec_beg,y_vec_end,
                                              x_vec_beg,x_vec_end);
  fclose (fp);
/*********/
  fp=fopen("feat1.out","ab+");
  fprintf(fp,"%c %d %d\n",
              (*letter),map_char[letter_num][1],amp_y);
  fclose (fp);
/**********/
  if (num_direc==0)
       fp=fopen("fsent0.out","ab+");
  If (num_direc==1)
       fp=fopen("fsent1.out","ab+");
  if (num_direc==2)
       fp=fopen("fsent2.out","ab+");
  if (num_direc==3)
       fp=fopen("fsent3.out","ab+");
  if (num_direc==4)
       fp=fopen("fsent4.out","ab+");
  if (num_direc==5)
       fp=fopen("fsent5.out","ab+");
  if (num_direc==6)
       fp=fopen("fsent6.out","ab+");
  fprintf(fp,"%d %c ",map_char[letter_num][1],(*letter));
  if (num_direc!=0)
   { fprintf(fp,"%s ",our_sent);
     for (i=0;i<num_direc;i++)
       fprintf(fp,"%.4f %.4f ",x[i].x_b,x[i].x_e);
     for (i=0;i<num_direc;i++)
       fprintf(fp,"%.4f %.4f ",y[i].y_b,y[i].y_e);
     fprintf(fp,"%d",amp_y);
   }
  fprintf(fp,"\n");
  fclose (fp);
}
int add_map (char *letter)
{
 int i;
 for (i=0;i<NUM_SYMBOLS;i++)
  if (*letter==(char)map_char[i][0])
   { map_char[i][1]++;
     return(i);
   }
  if (i==NUM_SYMBOLS)
   { printf("There is no such character in the map %c\n",*letter);
     return(-1);
```

```
    }
   return(-1);
}
void read_map(void)
{
  FILE *fp;
  int i;
  fp=fopen("map_ch","rb");
  for (i=0; i<NUM_SYMBOLS;i++)
    fscanf(fp,"%d %d\n",&map_char[i][0],&map_char[i][1]);
  fclose(fp);
}
void save_map(void)
{
  FILE *fp;
  int i;
  fp=fopen("map_ch","wb");
  for (i=0; i<NUM_SYMBOLS;i++)
    fprintf(fp,"%d %d\n",map_char[i][0],map_char[i][1]);
  fclose(fp);
}
int get_num (char *letter)
{
  int i;
  for (i=0;i<NUM_SYMBOLS;i++)
   if (*letter==(char)map_char[i][0]) return(i);
  return(-1);
}
```

III. Generalization

```c
void main(void)
{
   FILE *fp,*fp1;
   int i;
   char filename[30],filename1[30];

read_map();

for (i=1;i<=MAX_AMOUNT_DIREC;i++)
    { if (i==1)
         { strcpy(filename,"fsent1.out");
           strcpy(filename1,"fgen1.out");
printf("----%d----\n",i);
           goto A;
         }
      if (i==2)
         { strcpy(filename,"fsent2.out");
           strcpy(filename1,"fgen2.out");
printf("----%d----\n",i);
           goto A;
         }
      if (i==3)
         { strcpy(filename,"fsent3.out");
           strcpy(filename1,"fgen3.out");
printf("----%d----\n",i);
           goto A;
         }
      if (i==4)
         { strcpy(filename,"fsent4.out");
           strcpy(filename1,"fgen4.out");
printf("----%d----\n",i);
           goto A;
         }
      if (i==5)
         { strcpy(filename,"fsent5.out");
           strcpy(filename1,"fgen5.out");
printf("----%d----\n",i);
           goto A;
         }
      if (i==6)
         { strcpy(filename,"fsent6.out");
           strcpy(filename1,"fgen6.out");
printf("----%d----\n",i);
           goto A;
         }
A:    fp1=fopen(filename1,"wb");
      fclose(fp1);
      gener(i,filename,filename1);
    }
   fp1=fopen("genfeat.out","wb");
   fclose(fp1);
   gener_feat();
   fp1=fopen("genfet1.out","wb");
   fclose(fp1);
   gener_feat1();
}
```

```
void read_map(void)
{
  FILE *fp;
  int i;
  fp=fopen("map_ch","rb");
  for (i=0; i<NUM_SYMBOLS;i++)
    fscanf(fp,"%d %d\n",&map_char[i][0],&map_char[i][1]);
  fclose(fp);
}
void gener(int i,char filename[],char filename1[])
{
  void gether(char letter,int num_dir,char filename[],char filename1[]);
  int j;

for (j=0;j<100;j++)
   { if (map_char[j][1]>0)
       gether(map_char[j][0],i,filename,filename1);
   }
}
void gener_feat(void)
{
  void gether_feat(char letter);
  int j;
  for (j=0;j<100;j++)
   { if (map_char[j][1]>0)
       gether_feat(map_char[j][0]);
   }
}
void gener_feat1(void)
{
  void gether_feat1(char letter);
  int j;
  for (j=0;j<100;j++)
   { if (map_char[j][1]>0)
       gether_feat1(map_char[j][0]);
   }
}
void gether(char letter,int num_dir,char filename[],char filename1[])
{ char ch;
  int letter_num;
  int i,amount;
  int amp_y;
  FILE *fp;
  int conv(void);
  void conv_dir_defin(int amount,int num_dir);
  void write_to_gen(int amount,int num_dir,char letter);
  void save_gen(int num_dir,char letter,char filename1[]);
  void save_xy(int num_dir,char filename1[]);

amount=0;
  gen.repr.num=0;
  for (i=0;i<=MAX_AMOUNT_DIREC;i++)
    gen.repr.tabl[i].number=0;
  fp=fopen(filename,"rb");
  while (fscanf(fp,"%d",&letter_num)!=EOF)
   { fscanf(fp," %c ",&ch);
     fscanf(fp,"%s ",our_sent);
     for (i=0;i<num_dir;i++)
```

```c
        fscanf(fp,"%f %f ",&bx[amount][i].x_b,&bx[amount][i].x_e);
      for (i=0;i<num_dir;i++)
        fscanf(fp,"%f %f ",&by[amount][i].y_b,&by[amount][i].y_e);
      fscanf(fp,"%d\n",&_y);

if (ch==letter)
        { conv();
          write_to_gen(amount,num_dir-1,letter);
          amount++;
          if (amount==MAX_REPRESNT)
          { fclose(fp);
            break;
          }
        }
    }
  fclose(fp);
  if (amount>0)
   { conv_dir_defin(amount,num_dir);
     save_gen(num_dir,letter,filename1);
     save_xy(num_dir,filename1);
   }
}
void save_gen(int num_dir,char letter,char filename1[])
{
  FILE *fp1;
  int i,j;

fp1=fopen(filename1,"ab+");
  fprintf(fp1,"%c ",letter);
  fprintf(fp1,"%d %c %d ",gen.amount,gen.repr.letter,gen.repr.num);
  for (i=0;i<=num_dir;i++)
   { fprintf(fp1,"%d ",gen.repr.tabl[i].number);
     if (gen.repr.tabl[i].number>0)
      { for (j=0;j<gen.repr.tabl[i].number;j++)
           fprintf(fp1,"%s ",gen.repr.tabl[i].row[j].str);
        fprintf(fp1,"\n");
      }
   }
  fclose(fp1);
} void save_xy(int num_dir,char filename1[])
{ FILE *fp1;
  int i;
  fp1=fopen(filename1,"ab+");
  for (i=0;i<num_dir;i++)
    fprintf(fp1,"%.4f %.4f ",x_midll[i].x_b,x_midll[i].x_e);
  for (i=0;i<num_dir;i++)
    fprintf(fp1,"%.4f %.4f ",x_dev[i].x_b,x_dev[i].x_e);
  for (i=0;i<num_dir;i++)
    fprintf(fp1,"%.4f %.4f ",y_midll[i].y_b,y_midll[i].y_e);
  for (i=0;i<num_dir;i++)
    fprintf(fp1,"%.4f %.4f \n",y_dev[i].y_b,y_dev[i].y_e);
  fclose(fp1);
}
```

```c
void save_feat1(char letter)
{ FILE *fp1;
  int i;
  fp1=fopen("genfeat.out","ab+");
  fprintf(fp1,"%c ",letter);
  fprintf(fp1,"%.4f %.4f %.4f %.4f\n",x_midll[0].x_b,x_midll[0].x_e,
                                      y_midll[0].y_b,y_midll[0].y_e);
  for (i=0;i<3;i++)
   { fprintf(fp1,"%.4f %.4f %.4f %.4f\n",x_dev[i].x_b,x_dev[i].x_e,
                                         y_dev[i].y_b,y_dev[i].y_e);
   }
   fclose(fp1);
}
void save_feat2(char letter)
{ FILE *fp1;
  int i;
  fp1=fopen("genfet1.out","ab+");
  fprintf(fp1,"%c ",letter);
  fprintf(fp1,"%.4f %d %d\n",y_midll[0].y_b,amp_y[0],amp_y[1]);
  for (i=0;i<3;i++)
    fprintf(fp1,"%.4f ",y_dev[i].y_b);
  fprintf(fp1,"\n");
  fclose(fp1);
} void gether_feat(char letter)
{
  void calc_vec(int amount);
  FILE *fp,fp1;
  int amount,letter_num;
  char ch;

amount=0;
  fp=fopen("feat.out","rb");
  while (fscanf(fp,"%c",&ch)!=EOF)
  { fscanf(fp," %d %f %f %f %f\n",&letter_num,
                                  &by[amount][0].y_b,&by[amount][0].y_e,
                                  &bx[amount][0].x_b,&bx[amount][0].x_e);
    if (ch==letter)
      { amount++;
          if (amount==MAX_REPRESNT) break;
      }
  }
  fclose(fp);
  if (amount>0)
   { calc_vec(amount);
     save_feat1(letter);
   }
} void gether_feat1(char letter)
{
  void calc_amp(int amount);
  FILE *fp;
  int amount,letter_num;
  char ch;

amount=0;
```

```
  fp=fopen("feat1.out","rb");
  while (fscanf(fp,"%c",&ch)!=EOF)
   { fscanf(fp," %d %d\n",&letter_num,&_y[amount]);
     if (ch==letter)
       { amount++;
          if (amount==MAX_REPRESNT) break;
       }
   }
  fclose(fp);
  if (amount>0)
   { calc_amp(amount);
     save_feat2(letter);
   }
}

/******************************************************************
function conv_dir_defin() calculates dispersions of x and y relative
coordinates in letter skeleton.
******************************************************************/ void conv_dir_defin(int amount,int num_dir)
{ int count,i;
    float summ_1=0.0;
    float summ_2=0.0;
    float summ_3=0.0;
    float summ_4=0.0;
    float temp;
      if (amount>=0)
          { for (count=0;count<num_dir;count++)
             { summ_1=0.0;
               summ_2=0.0;
               summ_3=0.0;
               summ_4=0.0;
               for (i=0; i<amount; i++)
                { summ_1=summ_1+bx[i][count].x_b;
                   summ_2=summ_2+by[i][count].y_b;
                   summ_3=summ_3+bx[i][count].x_e;
                   summ_4=summ_4+by[i][count].y_e;
                }
               x_midll[count].x_b=summ_1/(float)amount;
               y_midll[count].y_b=summ_2/(float)amount;
               x_midll[count].x_e=summ_3/(float)amount;
               y_midll[count].y_e=summ_4/(float)amount;
               summ_1=0.0;
               summ_2=summ_1;
               summ_3=summ_2;
               summ_4=summ_3;
               for (i=0; i<amount; i++)
                { temp=x_midll[count].x_b-
                                 bx[i][count].x_b;
                   summ_1=summ_1+temp*temp;
                   temp=y_midll[count].y_b-
                                 by[i][count].y_b;
                   summ_2=summ_2+temp*temp;
                   temp=x_midll[count].x_e-
                                 bx[i][count].x_e;
                   summ_3=summ_3+temp*temp;
                   temp=y_midll[count].y_e-
```

```
                              by[i][count].y_e;
             summ_4=summ_4+temp*temp;
           }
         x_dev[count].x_b=sqrt(summ_1/(float)amount);
         y_dev[count].y_b=sqrt(summ_2/(float)amount);
         x_dev[count].x_e=sqrt(summ_3/(float)amount);
         y_dev[count].y_e=sqrt(summ_4/(float)amount);
         }
       }
    return;
} void calc_vec(int amount)
{ int count,i;
   float summ_1=0.0;
   float summ_2=0.0;
   float summ_3=0.0;
   float summ_4=0.0;
   float summ_1m=0.0;
   float summ_2m=0.0;
   float summ_3m=0.0;
   float summ_4m=0.0;
   float temp;
   int am1,am2,am3,am4,am5,am6,am7,am8;

if (amount>0)
     for (i=0; i<amount; i++)
      { summ_1=summ_1+bx[i][0].x_b;
         summ_2=summ_2+by[i][0].y_b;
         summ_3=summ_3+bx[i][0].x_e;
         summ_4=summ_4+by[i][0].y_e;
      }
   x_midll[0].x_b=summ_1/(float)amount;
   y_midll[0].y_b=summ_2/(float)amount;
   x_midll[0].x_e=summ_3/(float)amount;
   y_midll[0].y_e=summ_4/(float)amount;

summ_1=0.0;
   summ_2=0.0;
   summ_3=0.0;
   summ_4=0.0;
   summ_1m=0.0;
   summ_2m=0.0;
   summ_3m=0.0;
   summ_4m=0.0;
   am1=0;
   am2=0;
   am3=0;
   am4=0;
   am5=0;
   am6=0;
   am7=0;
   am8=0;
   for (i=0; i<amount; i++)
    { temp=x_midll[0].x_b-bx[i][0].x_b;
      if (temp>0.0)
        { summ_1=summ_1+temp*temp;
           am1++;
```

```
      }
      else
       { summ_1m=summ_1m+temp*temp;
            am2++;
       }
      temp=y_midll[0].y_b-by[i][0].y_b;
      if (temp>0.0)
       { summ_2=summ_2+temp*temp;
            am3++;
       }
      else
       { summ_2m=summm_2m+temp*temp;
            am4++;
       }
      temp=x_midll[0].x_e-bx[i][0].x_e;
      if (temp>0.0)
       { summ_3=summ_3+temp*temp;
            am5++;
       }
      else
       { summ_3m=summ_3m+temp*temp;
            am6++;
       }
      temp=y_midll[0].y_e-by[i][0].y_e;
      if (temp>0.0)
       { summ_4=summ_4+temp*temp;
            am7++;
       }
      else
       { summ_4m=summ_4m+temp*temp;
            am8++;
       }
   }
   if (am1==0) x_dev[0].x_b=0.0;                              //dev-
   else x_dev[0].x_b=sqrt(summ_1/(float)am1);
   if (am2==0) x_dev[1].x_b=0.0;                              //dev+
   else x_dev[1].x_b=sqrt(summ_1m/(float)am2);
   if ((am1+am2)==0) x_dev[2].x_b=0.0;                        //dev
   else x_dev[2].x_b=sqrt((summ_1+summ_1m)/(float)(am1+am2));
   if (am3==0) y_dev[0].y_b=0.0;                              //dev-
   else y_dev[0].y_b=sqrt(summ_2/(float)am3);
   if (am4==0) y_dev[1].y_b=0.0;                              //dev+
   else y_dev[1].y_b=sqrt(summ_2m/(float)am4);
   if ((am3+am4)==0) y_dev[2].y_b=0.0;                        //dev
   else y_dev[2].y_b=sqrt((summ_2+summ_2m)/(float)(am3+am4));
   if (am5==0) x_dev[0].x_e=0.0;                              //dev-
   else x_dev[0].x_e=sqrt(summ_3/(float)am5);
   if (am6==0) x_dev[1].x_e=0.0;                              //dev+
   else x_dev[1].x_e=sqrt(summ_3m/(float)am6);
   if ((am5+am6)==0) x_dev[2].x_e=0.0;                        //dev
   else x_dev[2].x_e=sqrt((summ_3+summ_3m)/(float)(am5+am6));
   if (am7==0) y_dev[0].y_e=0.0;                              //dev-
   else y_dev[0].y_e=sqrt(summ_4/(float)am7);
   if (am8==0) y_dev[1].y_e=0.0;                              //dev+
   else y_dev[1].y_e=sqrt(summ_4m/(float)am8);
   if ((am7+am8)==0) y_dev[2].y_e=0.0;                        //dev
   else y_dev[2].y_e=sqrt((summ_4+summ_4m)/(float)(am7+am8));

}
```

```
void calc_amp(int amount)
{
  int i;
  float summ_1=0.0;
  float summ_1m=0.0;
  float amp_midll,temp;
  int am1,am2;
  int max,min;
  max=amp_y[0];
  min=amp_y[0];
  if (amount>0)
    for (i=0; i<amount; i++)
      { summ_1=summ_1+amp_y[i];
          if (amp_y[i]>max) max=amp_y[i];
          if (amp_y[i]<min) min=amp_y[i];
      }
    amp_midll=summ_1/(float)amount;
  am1=0;
  am2=0;
  summ_1=0.0;
  summ_1m=0.0;
  for (i=0; i<amount; i++)
   { temp=amp_midll-amp_y[i];
     if (temp>0.0)
      { summ_1=summ_1+temp*temp;
          am1++;
      }
      else
      { summ_1m=summ_1m+temp*temp;
          am2++;
      }
   }
   if (am1==0) y_dev[0].y_b=0.0;                //dev-
   else y_dev[0].y_b=sqrt(summ_1/(float)am1);

if (am2==0) y_dev[1].y_b=0.0;                //dev+
   else y_dev[1].y_b=sqrt(summ_1m/(float)am2);

if ((am1+am2)==0) y_dev[2].y_b=0.0;          //dev
   else y_dev[2].y_b=sqrt((summ_1+summ_1m)/(float)(am1+am2));

y_midll[0].y_b=amp_midll;
   amp_y[0]=max;
   amp_y[1]=min;
} int conv(void)
{ char *p;
  int count;
  count=0;
  p=strtok(our_sent,"A");
  if (p)
   { while(p)
       { strcpy(buf[count],p);
           if (strlen(buf[count])>9) return(0);
           count++;
           p=strtok(NULL,"A");
```

```
        }
    }
    else
    { printf("There is no directions in sentence");
      getch();
      return(0);
    }
return(1);
}

//*********************************************************
//          words' generalization
//*********************************************************
int cmpr(char a,char b,const char c,const char d,const char q)
{ if ((a==c)&&(b==d)||(a==d)&&(b==c)||(a==c)&&(b==q)||(a==q)&&(b==c)||
                    (a==d)&&(b==q)||(a==q)&&(b==d))

{
      return(1);
    }
  else
      return(0);
}
int comp1(char a[],char b[],int i)

/*********************************************
    comparesion two letters with the same number in the words a and b
    count - number of letters in words
**********************************************/
{   if (a[i]==b[i])
      { strncat(lgt,&b[i],1);
        return(1);
      }
    if (cmpr(a[i],b[i],'C','D','Q')==1)
        { strcat(lgt,"Q");
          return(1);
        }
    if (cmpr(a[i],b[i],'E','F','X')==1)
        { strcat(lgt,"X");
          return(1);
        }
    if (cmpr(a[i],b[i],'G','H','Y')==1)
        { strcat(lgt,"Y");
          return(1);
        }
    if (cmpr(a[i],b[i],'I','J','Z')==1)
        { strcat(lgt,"Z");
          return(1);
        }
    return(0);
}
```

```
int compar(int num_dir,int count)

/***********************************************
    comparison the word with word's row
    k - amount of letters in the words
    j - amount of words in the row
    return:
    777 - word isn't in the row
    0-10 - number of words if there is comparison of the word's part
    222 - word already is in the row
***********************************************/
{ int k,j,n,m,l,temp;
  strcpy(lgt,"");
  for (j=0; j<gen.repr.tabl[count].number; j++)
    if (strcmp(buf[count],gen.repr.tabl[count].row[j].str)==0)
              return (222);
  n=strlen(buf[count]);
  for (j=0; j<gen.repr.tabl[count].number; j++)
  { strcpy(lgt,"");
    m=strlen(gen.repr.tabl[count].row[j].str);
    if (n==m)
      { for (k=0; k<=n; k++)
          { temp=comp1(buf[count],gen.repr.tabl[count].row[j].str,k);

if (temp==0)
               break;
            else
             if ((temp==1)&&(k==n))
             { for (l=0; l<gen.repr.tabl[count].number; l++)
                   if (strcmp(lgt,gen.repr.tabl[count].row[l].str)==0)
                         return (222);
                 return(j);
              }
          }
      }
    else
    { if (j==gen.repr.tabl[count].number-1)
          return(777);
    }
  }
  return(777);
}

/***********************************************
  i-number of row   ( 0-infront of first direction
                     1-after first dir
                     2-after second dir ...)
***********************************************/
void write_to_gen(int amount,int num_dir,char letter)
{ int i,count,j,temp;
  int m,n;

gen.repr.letter=letter;
  gen.repr.num++;
  for (count=0;count<num_dir+2;count++)
    { if (gen.repr.tabl[count].number==0)
        { if (buf[count]!=NULL)
            { strcpy(gen.repr.tabl[count].row[0].str,buf[count]);
```

```
                    gen.repr.tabl[count].number++;
                }
            }
            else
            { temp=compar(num_dir,count);
                if (temp==777)
                { j=gen.repr.tabl[count].number;
                    strcpy(gen.repr.tabl[count].row[j].str,buf[count]);
                    gen.repr.tabl[count].number++;
                }
                else
                { if (temp!=222)
                    {   // j=gen[num_dir].repr[i].tabl[count].number;
                        strcpy(gen.repr.tabl[count].row[temp].str,lgt);
                        // gen[num_dir].repr[i].tabl[count].number++;
                    }
                }
            }
        }
return;
} void main(void)
{
    int length(int num_dir);
    void cutting(int i,int k,FILE *fpx);
    void add_1(int num_dir);
    char filename1[30];
    char temp[10];
    int i,k;
    int num_cut_long;

fp=fopen("g_cut1.out","wb");
    fclose(fp);
    fp=fopen("g_cut2.out","wb");
    fclose(fp);
    fp=fopen("g_cut3.out","wb");
    fclose(fp);
    fp=fopen("g_cut4.out","wb");
    fclose(fp);
    fp=fopen("g_cut5.out","wb");
    fclose(fp);
    fp=fopen("g_cut6.out","wb");
    fclose(fp);

for (i=1;i<=6;i++)
    { strcpy(filename1,"fgen");
        sprintf(temp,"%d",i);
        strncat(filename1,temp,1);
        strcat(filename1,".out");
        if ((fp=fopen(filename1,"r+b"))==NULL) continue;

strcpy(filename1,"g_cut");
        strncat(filename1,temp,1);
        strcat(filename1,".out");
        if ((fp1=fopen(filename1,"a+b"))==NULL) continue;
```

```
    add_1(i);
    fclose(fp);
    fclose(fp1);
  }
 for(i=2;i<=6;i++)
  { strcpy(filename1,"fgen");
    sprintf(temp,"%d",i);
    strncat(filename1,temp,1);
    strcat(filename1,".out");

if ((fp=fopen(filename1,"r+b"))==NULL) continue;
    while ((num_cut_long=length(i))>0)
     { for(k=i-1;k>=1;k--)
         {
           switch (k)
             { case 1:   fp1=fopen("g_cut1.out","a+b");
                         cutting(i,k,fp1);
                         fclose(fp1);
                         break;
               case 2:   fp2=fopen("g_cut2.out","a+b");
                         cutting(i,k,fp2);
                         fclose (fp2);
                         break;
               case 3:   fp3=fopen("g_cut3.out","a+b");
                         cutting(i,k,fp3);
                         fclose(fp3);
                         break;
               case 4:   fp4=fopen("g_cut4.out","a+b");
                         cutting(i,k,fp4);
                         fclose(fp4);
                         break;
               case 5:   fp5=fopen("g_cut5.out","a+b");
                         cutting(i,k,fp5);
                         fclose(fp5);
                         break;
               case 6:   fp6=fopen("g_cut6.out","a+b");
                         cutting(i,k,fp6);
                         fclose(fp6);
                         break;
               default: printf("Error in cutting\n"); getch();
             }
         }
     }
    fclose(fp);
  }
}
void cutting(int i,int k,FILE *fpx)
{ void cut_sent(int num_dir);
  void cut_skel(int num_dir,int k);
  void sav_new(int num_dir,int k,FILE *fp1);

cut_skel(i,k);
  cut_sent(i);
  sav_new(i,k,fpx);
}
int length(int num_dir)
{
  int i,j;
```

```c
float arr_hip[6];
char letter;
int pr;
float temp_fl,w;
int temp;

while (fscanf(fp,"%c",&letter)!=EOF)  /*letter from gen set*/
{
  fscanf(fp," %d %c %d ",&gen.amount,&gen.repr.letter,&gen.repr.num);
  for (i=0;i<=num_dir;i++)
  { fscanf(fp,"%d ",&gen.repr.tabl[i].number);
      for (j=0;j<gen.repr.tabl[i].number;j++)
        fscanf(fp,"%s ",gen.repr.tabl[i].row[j].str);
      fscanf(fp,"\n");
  } for (i=0;i<num_dir;i++)
    fscanf(fp,"%f %f ",&x_midll[i].x_b,&x_midll[i].x_e);
  for (i=0;i<num_dir;i++)
    fscanf(fp,"%f %f ",&x_dev[i].x_b,&x_dev[i].x_e);
  for (i=0;i<num_dir;i++)
    fscanf(fp,"%f %f ",&y_midll[i].y_b,&y_midll[i].y_e);
  for (i=0;i<num_dir;i++)
    fscanf(fp,"%f %f \n",&y_dev[i].y_b,&y_dev[i].y_e);

for (i=0;i<num_dir;i++)
    arr_hip[i]=fabs(y_midll[i].y_e-y_midll[i].y_b);
  for (i=0;i<num_dir;i++)
    arr_num_long[i]=i;

pr=1;
  while (pr==1)
  { pr=0;
      for (i=num_dir-1;i>=1;i--)
        { if (arr_hip[i] < arr_hip[i-1])
          { temp_fl=arr_hip[i-1];
            arr_hip[i-1]=arr_hip[i];
            arr_hip[i] = temp_fl;
            temp=arr_num_long[i-1];
            arr_num_long[i-1]=arr_num_long[i];
            arr_num_long[i]=temp;
            pr=1;
          }
        }
  }
  w=1.0;
  for (i=0;i<num_dir;i++)
  { coef[i]=w*(1.0-arr_hip[i]);
      w=coef[i];
  }
  return(1);
}
return(-1);
}
```

```
void paste(int k,int out_number,struct STRING out[10],int in_number,
                             struct STRING in[10])
{ int i,j,m,len_out;
  char a[20];
  m=0;
  gen_cut.repr.tabl[k].number=out_number*in_number;
  if (gen_cut.repr.tabl[k].number>=100) gen_cut.repr.tabl[k].number=99;
  for (i=0;i<out_number;i++)
   for (j=0;j<in_number;j++)
    { strcpy(a,"");
      len_out=strlen(out[i].str);
      if (out[i].str[len_out-1]==in[j].str[0])
       { if (len_out>1)
           { strncpy(a,out[i].str,len_out-1);
             a[len_out-1]='\0';
           }
          else
            strcpy(a,"");
       }
      else
         strcpy(a,out[i].str);
      strcat(a,in[j].str);

if (strlen(a) < 10)
       { strcpy(gen_cut.repr.tabl[k].row[m].str,a);
           m++;
          if (m>=100) break;
       }
      else
      { printf("ERR.paste,length of pasted word > 10");
          getch();
      }
    }
}

/****************************************************
num_dir - anishial amount of long.
k - amount of long, which have to be stay.
(num_dir-k) - number of loop.
****************************************************/
void cut_sent(int num_dir)
{
void cut_word_in(char gen_cut[15],char a[15]);
void cut_word_out(char gen_cut[15],char a[15]);
int j,k,i;
char a[15];
int out_number,in_number,len,pr,pr1;
struct STRING out[10];
struct STRING in[10];

gen_cut.amount=gen.amount;
gen_cut.repr.letter= gen.repr.letter;
gen_cut.repr.num= gen.repr.num;

j=0;
k=0;
pr=0;
pr1=0;
```

```
while (j<num_dir)
{ if (mark_long[j]!=0)
   { j++;
      pr1=1;
      continue;
   }
   else break;
}
if (pr1==1)
{ in_number=gen.repr.tabl[j].number;
   for (i=0;i<in_number;i++)
    { strcpy(a,gen.repr.tabl[j].row[i].str);
        cut_word_in(gen.repr.tabl[j].row[i].str,a);
        strcpy(in[i].str,a);
    }
   gen_cut.repr.tabl[k].number=in_number;
   for (i=0;i<in_number;i++)
      strcpy(gen_cut.repr.tabl[k].row[i].str,in[i].str);
   pr1=0;
}
else
{ gen_cut.repr.tabl[k].number=gen.repr.tabl[j].number;
   for (i=0;i<gen_cut.repr.tabl[k].number;i++)
      strcpy(gen_cut.repr.tabl[k].row[i].str,gen.repr.tabl[j].row[i].str);
} for (i=0; i<gen_cut.repr.tabl[0].number;i++)
{ if (gen_cut.repr.tabl[0].row[i].str[0]=='_')
     gen_cut.repr.tabl[0].row[i].str[0]='*';
   else
    { if (gen_cut.repr.tabl[0].row[i].str[0]=='*')
        ;
      else
      { strcpy(a,"*");
         strcat(a,gen_cut.repr.tabl[0].row[i].str);
         strcpy(gen_cut.repr.tabl[0].row[i].str,a);
      }
    }
}
j++;
k++;
while(j<num_dir)
    { while ((mark_long[j]==0)&&(j<num_dir))
        { gen_cut.repr.tabl[k].number=gen.repr.tabl[j].number;
          for (i=0;i<gen_cut.repr.tabl[k].number;i++)
            strcpy(gen_cut.repr.tabl[k].row[i].str,gen.repr.tabl[j].row[i].str);
          j++;
          k++;
        }
        pr=1;
        out_number=gen.repr.tabl[j].number;
        for (i=0;i<out_number;i++)
         { strcpy(a,gen.repr.tabl[j].row[i].str);
           cut_word_out(gen.repr.tabl[j].row[i].str,a);
           strcpy(out[i].str,a);
         }
        while ((mark_long[j]==1)&&(j<num_dir)) j++;
        if (j==num_dir) break;
```

```
            pr=0;
            in_number=gen.repr.tabl[j].number;
            for (i=0;i<in_number;i++)
             { strcpy(a,gen.repr.tabl[j].row[i].str);
               cut_word_in(gen.repr.tabl[j].row[i].str,a);
               strcpy(in[i].str,a);
             }
            paste(k,out_number,out,in_number,in);
            j++;
            k++;
     }
   if (pr==1)
    { gen_cut.repr.tabl[k].number=out_number;
      for (i=0;i<out_number;i++)
        strcpy(gen_cut.repr.tabl[k].row[i].str,out[i].str);
    }
   else
    { gen_cut.repr.tabl[k].number=gen.repr.tabl[j].number;
      for (i=0;i<gen_cut.repr.tabl[k].number;i++)
        strcpy(gen_cut.repr.tabl[k].row[i].str,gen.repr.tabl[j].row[i].str);
    }
   k++;

for (i=0; i<gen_cut.repr.tabl[k-1].number;i++)
    { len=strlen(gen_cut.repr.tabl[k-1].row[i].str);
      if (gen_cut.repr.tabl[k-1].row[i].str[len-1]=='_')
        ;
      else
       { strcpy(a,gen_cut.repr.tabl[k-1].row[i].str);
         strcat(a,"_");
         strcpy(gen_cut.repr.tabl[k-1].row[i].str,a);
         strcpy(a,gen_cut.repr.tabl[k-1].row[i].str);
       }
    }
 }
}
void cut_skel(int num_dir,int k)
{
 int j;
 int l;
 float min_x,min_y;

for (j=0;j<6;j++)
   mark_long[j]=0;

for (j=0;j<num_dir-k;j++)
   mark_long[arr_num_long[j]]=1;

l=0;
 for (j=0;j<num_dir;j++)
  { if (mark_long[j]==0)
     { cut_x_midll[l].x_b=x_midll[j].x_b;
       cut_x_midll[l].x_e=x_midll[j].x_e;
       cut_y_midll[l].y_b=y_midll[j].y_b;
       cut_y_midll[l].y_e=y_midll[j].y_e;
       cut_x_dev[l].x_b=x_dev[j].x_b;
       cut_x_dev[l].x_e=x_dev[j].x_e;
       cut_y_dev[l].y_b=y_dev[j].y_b;
       cut_y_dev[l].y_e=y_dev[j].y_e;
```

```
        i++;
      }
    }
    min_x=9999.0;
    min_y=9999.0;
    for (j=0;j<=l;j++)
     { if (min_x > cut_x_midll[j].x_b)
                                    min_x=cut_x_midll[j].x_b;
       if (min_x > cut_x_midll[j].x_e)
                                    min_x=cut_x_midll[j].x_e;
       if (min_y > cut_y_midll[j].y_b)
                                    min_y=cut_y_midll[j].y_b;
       if (min_y > cut_y_midll[j].y_e)
                                    min_y=cut_y_midll[j].y_e;
     }
     for (j=0;j<l;j++)
      { cut_x_midll[j].x_b=cut_x_midll[j].x_b-min_x;
        cut_x_midll[j].x_e=cut_x_midll[j].x_e-min_x;
        cut_y_midll[j].y_b=cut_y_midll[j].y_b-min_y;
        cut_y_midll[j].y_e=cut_y_midll[j].y_e-min_y;
      }
}
void sav_new(int num_dir,int k,FILE *fp1)
{
   int i,j;

fprintf(fp1,"%c ",gen_cut.repr.letter);
   fprintf(fp1,"%f ",coef[num_dir-k-1]);

fprintf(fp1,"%d %c %d ",gen_cut.amount,gen_cut.repr.letter,gen_cut.repr.num);
   for (i=0;i<=k;i++)
    { fprintf(fp1,"%d ",gen_cut.repr.tabl[i].number);
      if (gen_cut.repr.tabl[i].number>0)
       { for (j=0;j<gen_cut.repr.tabl[i].number;j++)
            fprintf(fp1,"%s ",gen_cut.repr.tabl[i].row[j].str);
         fprintf(fp1,"\n");
       }
    }
   for (i=0;i<k;i++)
      fprintf(fp1,"%.4f %.4f ",cut_x_midll[i].x_b,x_midll[i].x_e);
   for (i=0;i<k;i++)
      fprintf(fp1,"%.4f %.4f ",cut_x_dev[i].x_b,x_dev[i].x_e);
   for (i=0;i<k;i++)
      fprintf(fp1,"%.4f %.4f ",cut_y_midll[i].y_b,y_midll[i].y_e);
   for (i=0;i<k;i++)
      fprintf(fp1,"%.4f %.4f \n",cut_y_dev[i].y_b,y_dev[i].y_e);

}
int cmpr_out(char c)
{ if ((c=='E')||(c=='F')||(c=='X')||(c=='g')||(c=='G')||(c=='H')||(c=='f')||
                                                                       (c=='Y'))
    return(1);
  else return(0);
}
int cmpr_in(char c)
{ if ((c=='C')||(c=='D')||(c=='Q')||(c=='i')||(c=='J')||(c=='I')||(c=='d')||
                                                                       (c=='Z'))
```

```c
    return(1);
  else return(0);
}
void cut_word_out(char gen_cut[15],char a[15])
{
  int i;
  int len;
  len=strlen(gen_cut);
  i=len-1;
  while (cmpr_out(gen_cut[i])==1)
   { i--;
     if (i<0) break;
   }
   if (i<0) strcpy(a,"_");
   else
   { strncpy(a,gen_cut,i+1);
     a[i+1]='\0';
   }
} void cut_word_in(char gen_cut[15],char a[15])
{
  int i;
  int len;
  len=strlen(gen_cut);
  i=0;
  while (cmpr_in(gen_cut[i])==1)
   { i++;
     if (i>len-1) break;
   }
   if (i>len-1) strcpy(a,"_");
   else
    { strcpy(a,"");
      strncpy(a,gen_cut+i,len-i);
      a[len-i]='\0';
    }
}
void add_1(int num_dir)
{ char letter;
  int i,j;

while (fscanf(fp,"%c",&letter)!=EOF)  /*letter from gen set*/
   {
     fprintf(fp1,"%c ",letter);
     fprintf(fp1,"%f ",1.0);

fscanf(fp," %d %c %d ",&gen.amount,&gen.repr.letter,&gen.repr.num);
     fprintf(fp1," %d %c %d ",gen.amount,gen.repr.letter,gen.repr.num);
     for (i=0;i<=num_dir;i++)
     { fscanf(fp,"%d ",&gen.repr.tabl[i].number);
         fprintf(fp1,"%d ",gen.repr.tabl[i].number);

for (j=0;j<gen.repr.tabl[i].number;j++)
           { fscanf(fp,"%s ",gen.repr.tabl[i].row[j].str);
             fprintf(fp1,"%s ",gen.repr.tabl[i].row[j].str);
           }
         fscanf(fp,"\n");
         fprintf(fp1,"\n");
```

```
        }
    for (i=0;i<num_dir;i++)
     { fscanf(fp,"%f %f ",&x_midll[i].x_b,&x_midll[i].x_e);
         fprintf(fp1,"%f %f ",x_midll[i].x_b,x_midll[i].x_e);
     }
    for (i=0;i<num_dir;i++)
     { fscanf(fp,"%f %f ",&x_dev[i].x_b,&x_dev[i].x_e);
         fprintf(fp1,"%f %f ",x_dev[i].x_b,x_dev[i].x_e);
     }
    for (i=0;i<num_dir;i++)
         { fscanf(fp,"%f %f ",&y_midll[i].y_b,&y_midll[i].y_e);
             fprintf(fp1,"%f %f ",y_midll[i].y_b,y_midll[i].y_e);
         }
    for (i=0;i<num_dir;i++)
         { fscanf(fp,"%f %f \n",&y_dev[i].y_b,&y_dev[i].y_e);
             fprintf(fp1,"%f %f \n",y_dev[i].y_b,y_dev[i].y_e);
         }
    }
}
```

IV. Recognition procedures

```c
int main(void)
{
  FILE *fp;
  char infile[30];
  int num;

struct ffblk ffblk;
  int done;
  int SeqNo;
  read_map();
  fp=fopen("fextr.out","wb");
  fclose(fp);
  fp=fopen("feat.out","wb");
  fclose(fp);
  fp=fopen("feat1.out","wb");
  fclose(fp);
  fp=fopen("rsent.out","wb");
  fclose(fp);
  done=findfirst("*.tab",&ffblk,0);
  num=1;
  while (!done)
    {
      sprintf(infile,"%-12.12s",ffblk.ff_name);
      fp=fopen(infile,"rb");
      if (!fp)
          { printf("Can't open input file --%s--\n",infile);
            return;
          }
      if (infile[0] !='B')
       { letter=tolower(infile[0]);
           SeqNo=(int)(infile[2]-48);
       }
      else
         { if (isdigit( (int) infile[1] ) !=0)
             { letter=tolower(infile[0]);
               SeqNo=(int)(infile[2]-48);
             }
            else
             { letter=infile[1];
               SeqNo=(int)(infile[3]-48);
             }
         }
      num=transform(fp,&letter);
      if ((num>=0)&&(num<7)) save_files(SeqNo,num,&letter);
      if (num==-3) num=1;
      fclose(fp);
      done=findnext(&ffblk);
    }
    return 0;
}
```

```c
/*         MAIN FOR RECOGNITION         */ void recogn(FILE *fp,FILE *fp2);

int main(void)
{
  FILE *fp,*fp2;
  int i;
  char filename[30],filename1[30];
  map_char[i][1]=0;
  map_char[i][0]='a';
  fp2=fopen("sort.out","wb");
  fp=fopen("rsent.out","rb");
  recogn(fp,fp2);
  fclose(fp);
  fclose(fp2);
  return 0;
}

/*****************************************************************
structures initialization (initial set of the symbols to be recognized)
*****************************************************************/
void read_map(void)
{
  FILE *fp;
  int i;
  fp=fopen("map_ch","rb");
  for (i=0; i<NUM_SYMBOLS;i++)
   fscanf(fp,"%d %d\n",&map_char[i][0],&map_char[i][1]);
  fclose(fp);
}
/*****************************************************************
function defines if the char letter was in mapping card in training set
*****************************************************************/
int check_map (char letter)
{
  int i;
  for (i=0;i<NUM_SYMBOLS;i++)
   if ((letter==(char)map_char[i][0])&&(map_char[i][1]>0)) return(i);
   if (i==NUM_SYMBOLS)
    { printf("There is no such character in the map\n");
      return(-1);
    }
   return(-1);
}
/*****************************************************************
function reads FILE *fp (symbols to be recognized ) and using generalized
information after the training (FILE *fp1) defines similarity functions
for every symbol to be recognized from the different points of view and
writes this information to FILE *fp2
*****************************************************************/
int conv(void);
float def_k_sent(int num_dir);
float metric_dir_y(int num_dir,int amp_y,struct X x[],struct Y y[]);
float metric_dir_x(int num_dir,int amp_y,struct X x[],struct Y y[]);
void length(int num_dir);
float cut_skel(int num_dir,int k);
void cut_sent(int num_dir);
```

```c
int calc_pen_up(char a[MAX_LENGTH_SENTENSE]);
void recogn(FILE *fp,FILE *fp2)
{ FILE *fp1;
  char filename1[30];
  float w_sent,w_y,w_x;
  int amp_y,w_pen_up;
  char ch,letter;
  int letter_num;
  int i,j,k;
  int num_dir;
  char num_long[10];
  float gen_coef,rsent_coef;
  int gen_max_pen_up,gen_min_pen_up;
  int rsent_pen_up;
  char our_sent1[MAX_LENGTH_SENTENSE];

while (fscanf(fp,"%d",&letter_num)!=EOF)
  {
    fscanf(fp," %c ",&ch);
    fscanf(fp,"%d ",&num_dir);
    if (num_dir==0) continue;
    fscanf(fp,"%s ",our_sent);       /*letter from recognition set*/
    for (i=0;i<num_dir;i++)
    fscanf(fp,"%f %f ",&x[i].x_b,&x[i].x_e);
    for (i=0;i<num_dir;i++)
    fscanf(fp,"%f %f ",&y[i].y_b,&y[i].y_e);
    fscanf(fp,"%d\n",&_y);
    for (i=0;i<num_dir;i++)
    xz[i]=x[i];
    for (i=0;i<num_dir;i++)
    yz[i]=y[i];
    strcpy(our_sent1,our_sent);
    if (conv()==0)
      { printf("This ligature is too long\n");
        continue;
      }
    for (i=0;i<=num_dir; i++)
      strcpy(bufz[i],buf[i]);
    rsent_pen_up=calc_pen_up(our_sent1);

{
    k=num_dir;
    rsent_coef=1.0;
    length(num_dir);
    for (num_dir=k; num_dir>=1; num_dir--)
       {strcpy(filename1,"g_cut");
        sprintf(num_long,"%d",num_dir);
        strncat(filename1,num_long,1);
        strcat(filename1,".out");
        fp1=fopen(filename1,"rb");
        while (fscanf(fp1,"%c",&letter)!=EOF)  /*letter from gen set*/
        {
          fscanf(fp1,"%f ",&gen_coef);
          fscanf(fp1," %d %c %d ",&gen.amount,&gen.repr.letter,&gen.repr.num);
          for (i=0;i<=num_dir;i++)
          { fscanf(fp1,"%d ",&gen.repr.tabl[i].number);
               for (j=0;j<gen.repr.tabl[i].number;j++)
                 fscanf(fp1,"%s ",gen.repr.tabl[i].row[j].str);
             fscanf(fp1,"\n");
```

```c
      }
      fscanf(fp1,"%d %d\n",&gen_max_pen_up,&gen_min_pen_up);

for (i=0;i<num_dir;i++)
        fscanf(fp1,"%f %f ",&x_midll[i].x_b,&x_midll[i].x_e);
      for (i=0;i<num_dir;i++)
        fscanf(fp1,"%f %f ",&x_dev[i].x_b,&x_dev[i].x_e);
      for (i=0;i<num_dir;i++)
        fscanf(fp1,"%f %f ",&y_midll[i].y_b,&y_midll[i].y_e);
      for (i=0;i<num_dir;i++)
        fscanf(fp1,"%f %f \n",&y_dev[i].y_b,&y_dev[i].y_e);
      w_sent=gen_coef*rsent_coef*def_k_sent(num_dir-1);
      w_y=gen_coef*rsent_coef*metric_dir_y(num_dir,amp_y,x,y);
      w_x=gen_coef*rsent_coef*metric_dir_x(num_dir,amp_y,x,y);
      if ((rsent_pen_up >= gen_min_pen_up)&&
                  (rsent_pen_up <= gen_max_pen_up)) w_pen_up=1;
      else w_pen_up=0;
      if (rsent_coef>TRESH_CUT)
        fprintf(fp2,"%c%d %d %c %f %f %f %d\n",
            ch,letter_num,num_dir,letter,w_sent,w_y,w_x,w_pen_up);
      }
      fclose(fp1);
      if (num_dir==1);
      else
      { rsent_coef=cut_skel(k,num_dir-1);
        cut_sent(k);
      }
    }
      fprintf(fp2,"*");
    }
  }
}
void length(int num_dir)
{
  int i,j;
  float arr_hip[6];
  char letter;
  int pr;
  float temp_fl;
  int temp;
      for (i=0;i<num_dir;i++)
        arr_hip[i]=fabs(y[i].y_e-y[i].y_b);
      for (i=0;i<num_dir;i++)
        arr_num_long[i]=i;
    pr=1;
    while (pr==1)
    { pr=0;
        for (i=num_dir-1;i>=1;i--)
        { if (arr_hip[i] < arr_hip[i-1])
          { temp_fl=arr_hip[i-1];
            arr_hip[i-1]=arr_hip[i];
            arr_hip[i] = temp_fl;
            temp=arr_num_long[i-1];
            arr_num_long[i-1]=arr_num_long[i];
            arr_num_long[i]=temp;
            pr=1;
          }
```

```c
      }
    }
  coef[0]=1.0;
  for (i=1;i<=num_dir;i++)
    coef[i]=coef[i-1]*(1.0-arr_hip[i-1]);
}
void paste(int k,char out[10],char in[10])
{ int i,j,m,len_out;
  char a[20];
  strcpy(a,"");
  len_out=strlen(out);
  if (out[len_out-1]==in[0])
   { if (len_out>1)
      { strncpy(a,out,len_out-1);
         a[len_out-1]='\0';
      }
     else
         strcpy(a,"");
   }
  else
    strcpy(a,out);
  strcat(a,in);
  if (strlen(a) < 10)
    strcpy(buf[k],a);
  else
   { printf("RSENT.OUT - ERR.paste,length of pasted word > 10");
     getch();
   }
} void cut_sent(int num_dir)
{
  void cut_word_in(char gen_cut[15],char a[15]);
  void cut_word_out(char gen_cut[15],char a[15]);
  int j,k,i;
  char a[15];
  int out_number,in_number,len,pr,pr1;
  char out[10];
  char in[10];

for (i=0;i<=num_dir; i++)
    strcpy(buf[i],"");
  j=0;
  k=0;
  pr=0;
  pr1=0;
  while (j<num_dir)
   { if (mark_long[j]!=0)
      { j++;
        pr1=1;
        continue;
      }
     else break;
   }
  if (pr1==1)
   { strcpy(a,bufz[j]);
     cut_word_in(bufz[j],a);
     strcpy(buf[k],a);
```

```
       pr1=0;
   }
  else
    strcpy(buf[k],bufz[j]);

if (buf[0][0]=='_')
          buf[0][0]='*';
  else
   { if (buf[0][0]=='*')
          ;
      else
       { strcpy(a,"*");
           strcat(a,buf[0]);
       }
   }
  j++;
  k++;
  while(j<num_dir)
     { while ((mark_long[j]==0)&&(j<num_dir))
          { strcpy(buf[k],bufz[j]);
              j++;
              k++;
          }
          pr=1;
          strcpy(a,bufz[j]);
          cut_word_out(bufz[j],a);
          strcpy(out,a);

while ((mark_long[j]==1)&&(j<num_dir)) j++;
          if (j==num_dir) break;
          pr=0;
          strcpy(a,bufz[j]);
          cut_word_in(bufz[j],a);
          strcpy(in,a);
          paste(k,out,in);
          j++;
          k++;
      }
  if (pr==1)
      strcpy(buf[k],out);
  else
      strcpy(buf[k],bufz[j]);
  k++;
  len=strlen(buf[k-1]);
  if (buf[k-1][len-1]=='_');
  else
   { strcpy(a,buf[k-1]);
     strcat(a,"_");
     strcpy(buf[k-1],a);
     strcpy(a,buf[k-1]);
   }
} float cut_skel(int num_dir,int k)
{
  int j;
  int l;
  float min_x,min_y;
```

```
    for (j=0;j<6;j++)
     mark_long[j]=0;

for (j=0;j<num_dir-k;j++)
     mark_long[arr_num_long[j]]=1;

l=0;
    for (j=0;j<k;j++)
     { if (mark_long[j]==0)
       { x[l].x_b=xz[j].x_b;
          x[l].x_e=xz[j].x_e;
          y[l].y_b=yz[j].y_b;
          y[l].y_e=yz[j].y_e;
          l++;
       }
     }
    min_x=9999.0;
    min_y=9999.0;
    for (j=0;j<=l;j++)
     { if (min_x > x[j].x_b)
                                 min_x=x[j].x_b;
       if (min_x > x[j].x_e)
                                 min_x=x[j].x_e;
       if (min_y > y[j].y_b)
                                 min_y=y[j].y_b;
       if (min_y > y[j].y_e)
                                 min_y=y[j].y_e;
     }
    for (j=0;j<l;j++)
     { x[j].x_b=x[j].x_b-min_x;
       x[j].x_e=x[j].x_e-min_x;
       y[j].y_b=y[j].y_b-min_y;
       y[j].y_e=y[j].y_e-min_y;
     }
    return(coef[num_dir-k]);
}
int cmp_out(char c)
{ if ((c=='E')||(c=='F')||(c=='X')||(c=='g')||(c=='G')||(c=='H')||(c=='f')||
                                                                    (c=='Y'))
    return(1);
   else return(0);
}
int cmp_in(char c)
{ if ((c=='C')||(c=='D')||(c=='Q')||(c=='i')||(c=='J')||(c=='I')||(c=='d')||
                                                                    (c=='Z'))
    return(1);
   else return(0);
}
void cut_word_out(char gen_cut[15],char a[15])
{
  int i;
  int len;
  len=strlen(gen_cut);
  i=len-1;
  while (cmp_out(gen_cut[i])==1)
   { i--;
     if (i<0) break;
   }
```

```c
    if (i<0) strcpy(a,"_");
    else
    { strncpy(a,gen_cut,i+1);
        a[i+1]='\0';
    }
} void cut_word_in(char gen_cut[15],char a[15])
{
  int i;
  int len;
  len=strlen(gen_cut);
  i=0;
  while (cmp_in(gen_cut[i])==1)
  { i++;
    if (i>len-1) break;
  }
  if (i>len-1) strcpy(a,"_");
  else
    { strcpy(a,"");
      strncpy(a,gen_cut+i,len-i);
      a[len-i]='\0';
    }
}
int calc_pen_up(char a[MAX_LENGTH_SENTENSE])
{ int count;
  char *p;
  count=0;
  if ((strlen(a)==1)&&(a[0]=='_'))
        return(0);
  p=strchr(a,'_');
  if (p==NULL) return(0);
  while(p!=NULL)
  { p=strchr(p+1,'_');
    count++;
  }
  count--;
  return(count);
}

/**
function conv() makes sentence separation into words using symbol "A"
as delimiter and writes the results to buf[].
**/
int conv(void)
{ char *p;
  int count;
  count=0;
  p=strtok(our_sent,"A");
  if (p)
    { while(p)
        { strcpy(buf[count],p);
          if (strlen(buf[count])>9) return(0);
          count++;
          p=strtok(NULL,"A");
        }
    }
    else
```

```
          { printf("There is no long in the sentence\n");
             getch();
             return(0);
          }
    return(1);
}
float def_k_class(char a,char b,const char c,const char d,const char q,
                                              const char d_small)
/*******************************
    a - letter from the generalized sentence
    b - letter from the symbols' sentence to be recognized
    c,d,q,d_small - symbols' from the same class segments' vocabulary
    function defines if the letters a and the b belongs to one class
    in the segments' vocabulary or not and defines def_k[i][j] for them
    in the weight table def_k[5][5]

*******************************/
{ float
  def_k[5][5]={1.00, 0.50, 1.00, 0.25, 0.00,
               0.50, 1.00, 1.00, 0.25, 0.00,
               1.00, 1.00, 1.00, 0.25, 0.00,
               0.25, 0.25, 0.25, 1.00, 0.00,
               0.00, 0.00, 0.00, 0.00, 0.00}; //posibility to modify the similarity !!!!
  char alfabet[4];
  int i,j;
   alfabet[0]=c;
   alfabet[1]=d;
   alfabet[2]=q;
   alfabet[3]=d_small;

i=0;
   while (a!=alfabet[i])
    { i++;
      if (i==4)
         break;
    }
   j=0;
   while (b!=alfabet[j])
    { j++;
      if (j==4)
         break;
    }
     return(def_k[i][j]);
}

/**
function def_k_letter() calculates similirity between letters in the
words according to weights table.
**/
float def_k_letter(char a[],char b[],int i,int j)
/*********************
    a - word from the generalized sentence
    b - word from symbols sentence to be recognized
    i - number of letter in the word a
    j - number of letter in the word b
*********************/
```

```
{ float temp;
  if (a[i]==b[j])
                    return(1.00);
  if ((temp=def_k_class(a[i],b[j],'C','D','Q','d'))!=0)
                                                        return(temp);
  if ((temp=def_k_class(a[i],b[j],'E','F','X','f'))!=0)
                                                        return(temp);
  if ((temp=def_k_class(a[i],b[j],'G','H','Y','g'))!=0)
                                                        return(temp);
  if ((temp=def_k_class(a[i],b[j],'I','J','Z','i'))!=0)
                                                        return(temp);
  if ((a[i]==b[j])&&(a[i]=='B'))
                                                        return(1.00);
  return(0.0);
}
int cmpr_in(char c)
{ if ((c=='E')||(c=='F')||(c=='X')||(c=='g')||(c=='G')||(c=='H')||(c=='f')||
                                                                              (c=='Y'))
    return(1);
  else return(0);
}
int cmpr_out(char c)
{ if ((c=='C')||(c=='D')||(c=='Q')||(c=='i')||(c=='J')||(c=='I')||(c=='d')||
                                                                              (c=='Z'))
    return(1);
  else return(0);
}
/**
function def_k_word() calculates and returns symilirity function (SF) for the
every word in the row . SF is defined from 0 to 1. If word in the recognized
symbol is equal to the word in the row then SF is equal to 1;
if words are not equal,then parts of words are compared.There are three parts
in the words.Part1 - down input segments,part2 - down output segments, part3
segments between part1 and part2 .
**/
float def_k_word(char a[],char b[],int row)
/***********************************
words' similarity comparison function
a - word from the generalized sentence
b - word from the symbols sentence to be recognized
***********************************/
{ float w=0.0;
  int i,j,n,m,temp,i_end_1,i_end_2,j_end_1,j_end_2;
  int pr_a_1=0,pr_a_2=0,pr_b_1=0,pr_b_2=0;
  float w1=0.0,w2=0.0,w3=0.0,w4=0.0;
  if (strcmp(a,b)==0)
      return(1.0);
  n=strlen(a);
  m=strlen(b);

if ((n==0)&&(m!=0)) return(0.0);
  if ((n!=0)&&(m==0)) return(0.0);
  if ((n==0)&&(m==0)) return(1.0);

if (n>=m) temp=n;
  else temp=m;
  if (row==0)
```

```
{ for (i=n-1,j=m-1;(i>0)||(j>0);i--,j--)
      w=w+def_k_letter(a,b,i,j);
  if (temp>1) w=w/(float)(temp-1);
  else w=1.0;
  return(w);
}
else
{ if (row==2)
  { for (i=0; (i<n-1)||(i<m-1); i++)
        w=w+def_k_letter(a,b,i,i);
    if (temp>1) w=w/(float)(temp-1);
    else w=1.0;
    return(w);
  }
  else
  { i=0;
    while (cmpr_out(a[i])==1)
      { i++;
        pr_a_1=1;
        if (i>n) break;
      }
    i_end_1=i-1;
    i=n-1;
    while (cmpr_in(a[i])==1)
      { i--;
        pr_a_2=1;
        if (i<0) break;
      }
    i_end_2=i+1;
    i=0;
    while (cmpr_out(b[i])==1)
      { i++;
        pr_b_1=1;
        if (i>m) break;
      }
    j_end_1=i-1;
    i=m-1;
    while (cmpr_in(b[i])==1)
      { i--;
        pr_b_2=1;
        if (i<0) break;
      }
    j_end_2=i+1;
    if ((i_end_1>=i_end_2)||(j_end_1>=j_end_2))
              { puts("it's not right dividing inside the words\n");
printf("a[]=%s  b[]=%s\n",a,b);
printf("i_end_1=%d i_end_2=%d j_end_1=%d  j_end_2=%d\n",
                i_end_1,i_end_2,j_end_1,j_end_2);
printf("pr_a_1=%d pr_a_2=%d pr_b_1=%d  pr_b_2=%d\n",
             pr_a_1,pr_a_2,pr_b_1,pr_b_2);
getch();
                       getch();
              }
    if ((pr_a_1==1)&&(pr_b_1==1))
      for (i=0,j=0;(i<=i_end_1)||(j<=j_end_1);i++,j++)
          w1=w1+def_k_letter(a,b,i,j);
    if ((pr_a_2==1)&&(pr_b_2==1))
      for (i=n-1,j=m-1;(i>=i_end_2)||(j>=j_end_2);i--,j--)
```

```c
                    w2=w2+def_k_letter(a,b,i,j);
                if ((i_end_2!=i_end_1+1)&&(j_end_2!=j_end_1+1))
                  { for (i=i_end_1+1,j=j_end_1+1;(i<i_end_2)||(j<j_end_2);i++,j++)
                      w3=w3+def_k_letter(a,b,i,j);
                    for (i=i_end_2-1,j=j_end_2-1;(i>i_end_1)||(j>j_end_1);i--,j--)
                      w4=w4+def_k_letter(a,b,i,j);
                    if (w3<w4) w3=w4;
                  }
                if (temp>0) w=(w1+w2+w3)/(float)(temp);
                else
                  { printf("*def_k_word* -amount of letters in the row equal 0\n");
                    getch();
                  }
             }
          }
      return(w);
}
/**
function def_k_row() calculates and returns symilirity function for every
row in symbols generalized representation as maximum value in row.
SF is defined from 0 to 1.
**/
float def_k_row(int num_dir,int count,int row)
{ float temp;
  float w=0.0;
  int j;
  if (gen.repr.tabl[count].number<1)
     if (buf[count]==NULL) return(1.0);
     else return(0.0);
  for (j=0; j<gen.repr.tabl[count].number; j++)
     if ((temp=def_k_word(gen.repr.tabl[count].row[j].str,
                                        buf[count],row)) > 0.9999999)
        { w=temp;
            break;
        }
     else
        if (temp>w)
             w=temp;
  return(w);
}
float def_k_sent(int num_dir)
{ float w=0.0;
  int count;
  w=w+def_k_row(num_dir,0,0);
  if (num_dir>0)
  { for (count=1; count<num_dir+1; count++)
     { w=w+def_k_row(num_dir,count,1);
     }
  }
  w=w+def_k_row(num_dir,num_dir+1,2);
  return(w/(float)(num_dir+2));
}
```

```c
/****************************************************************
similarity function defining similarity between defined param and
sample of parameters with known medial,left and right deviation,
and range of definition (const_l,const_r)
****************************************************************/
float mut_metric(float param,float medial,float const_l,float const_r,
                                           float dev_l,float dev_r)

{ float left,right,m,div;
  left=medial-dev_l;
  if (left<const_l) left=const_l;
  right=medial+dev_r;
  if (right>const_r) right=const_r;
  if ((param >= left)&&(param <=right))
                                           return(1.0);

else
   { div=const_r-const_l-right+left+0.0001;
     if (div==0.0)
      { if (medial==0)
               { printf("ERROR in mut_metric\n");
                  getch();
               }
           div=medial;
      }
     if (param < left)
                 m=1.0 - (left-param)/div;
     if (param > right)
                 m=1.0 -(param-right)/div;

}
  if (m<0.0) m=0.0;
  return(m);

}
/****************************************************************
functions metric_dir_y() and metric_dir_x() calculate similarity
metrics on the base of distance between recognized letter skeleton
and symbol's generalized skeleton calculated during a teaching.
****************************************************************/
float metric_dir_y(int num_dir,int amp_y,struct X x[],struct Y y[])
{ int count;
  float m_1,m_2,metric;

metric=1.0;

for (count=0;count<num_dir;count++)
   { m_1=mut_metric(y[count].y_b,y_midll[count].y_b,0.0,1.0,
                                           y_dev[count].y_b,y_dev[count].y_b);

m_2= mut_metric(y[count].y_e,y_midll[count].y_e,0.0,1.0,
                                           y_dev[count].y_e,y_dev[count].y_e);

metric=metric*m_1*m_2;
   }
  return(metric);

}
float metric_dir_x(int num_dir,int amp_y,struct X x[],struct Y y[])
{ int count;
  float m_1,m_2,metric;

metric=1.0;
```

```c
   for (count=0;count<num_dir;count++)
   { m_1=mut_metric(x[count].x_b,x_midll[count].x_b,0.0,1.0,
                                   x_dev[count].x_b,x_dev[count].x_b);

m_2=mut_metric(x[count].x_e,x_midll[count].x_e,0.0,1.0,
                                   x_dev[count].x_e,x_dev[count].x_e);

metric=metric*m_1*m_2;
   }
   return(metric);
}

/*****************************************************************
The file sort.out is sorting step by step using appropriate similarity
functions (defined with parameters a,b,c and tresholds w_level,y_level,
x_level) and their order,the result is written the file err.
*****************************************************************/
int main(void)
{
   char sort(int j,char a,char b,char c,float w_level,float y_level,
                                   float x_level,char ch,int num_dir);
   int check_map (char letter);
   void read_map(void);
   void r_matr(void);

int i,j;
   float w_level,y_level,x_level;
   char a,b,c;
   char ch,temp_ch,letter;
   int letter_num,num_dir;
   float ttt;
   int tt;
   a='w';
   b='y';
   c=' ';
   w_level=0.6;
   y_level=0.6;
   x_level=0.6;
   fout5 = fopen ("err","w+");
   fprintf(fout5,"%c%c%c  Mw=%.4f  My=%.4f  Mx=%.4f\n",a,b,c,w_level,
                                   y_level,x_level);

fp=fopen("sort.out","rb");
   while (fscanf(fp,"%c",&ch)!=EOF)
   { i=0;
     fscanf(fp,"%d %d",&letter_num,&num_dir);
     fprintf(fout5,"%d %c num_long=%d",letter_num,ch,num_dir);
     fscanf(fp," %c ",&arr_srt[i].letter);
     fscanf(fp,"%f ",&ttt);
     arr_srt[i].w=ttt;
     fscanf(fp,"%f ",&ttt);
     arr_srt[i].y=ttt;
     fscanf(fp,"%f ",&ttt);
     arr_srt[i].x=ttt;
     fscanf(fp,"%d\n",&tt);
     arr_srt[i].pen_up=tt;
     temp_ch=ch;
```

```c
      fscanf(fp,"%c",&ch);
      while (ch!='"')
       { i++;
          fscanf(fp,"%d %d",&letter_num,&num_dir);
          fscanf(fp," %c %f %f %f %d\n",&arr_srt[i].letter,&arr_srt[i].w,
                &arr_srt[i].y,&arr_srt[i].x,&arr_srt[i].pen_up);
          fscanf(fp,"%c",&ch);
       }
       letter=sort(i,a,b,c,w_level,y_level,x_level,temp_ch,num_dir);
    }
    fclose(fp);
    fclose(fout5);
    return 0;
}
int sort_a(int j,char a,float w_level,float y_level,float x_level)
{
  int sort_w(int j,float level);
  int sort_y(int j,float level);
  int sort_x(int j,float level);
  if (a=='w') return(sort_w(j,w_level));
  if (a=='y') return(sort_y(j,y_level));
  if (a=='x') return(sort_x(j,x_level));
  return(j);
}
int sort_b(int j,char b,float w_level,float y_level,float x_level)
{
  int sort_w(int j,float level);
  int sort_y(int j,float level);
  int sort_x(int j,float level);
  if (b=='w') return(sort_w(j,w_level));
  if (b=='y') return(sort_y(j,y_level));
  if (b=='x') return(sort_x(j,x_level));
  return(j);
}
int sort_c(int j,char c,float w_level,float y_level,float x_level)
{
  int sort_w(int j,float level);
  int sort_y(int j,float level);
  int sort_x(int j,float level);
  if (c=='w') return(sort_w(j,w_level));
  if (c=='y') return(sort_y(j,y_level));
  if (c=='x') return(sort_x(j,x_level));
  return(j);
}
char sort(int j,char a,char b,char c,float w_level,float y_level,
                                     float x_level,char ch,int num_dir)
{
  int i,k,l;
  i=sort_a(j,a,w_level,y_level,x_level);
  if (i==0)
   { //if (ch!=arr_srt[0].letter)
     fprintf(fout5," %d\n%c  Mw=%.4f  My=%.4f  Mx=%.4f  Mup=%d\n",
                        1,
                        arr_srt[0].letter,
                        arr_srt[0].w,
                        arr_srt[0].y,
                        arr_srt[0].x,
                        arr_srt[0].pen_up);
```

```
    return (arr_srt[0].letter);
  }
  k=sort_b(i,b,w_level,y_level,x_level);
  if (k==0)
   { //if (ch!=arr_srt[0].letter)
     fprintf(fout5," %d\n%c   Mw=%.4f  My=%.4f  Mx=%.4f  Mup=%d\n",
                       1,
                       arr_srt[0].letter,
                       arr_srt[0].w,
                       arr_srt[0].y,
                       arr_srt[0].x,
                       arr_srt[0].pen_up);
     return (arr_srt[0].letter);
   }
  l=sort_c(k,c,w_level,y_level,x_level);
  if (l<0)
   { printf("l<0\n");
     getch();
   }
  if (l==0)
   { //if (ch!=arr_srt[0].letter)
     fprintf(fout5," %d\n%c   Mw=%.4f  My=%.4f  Mx=%.4f  Mup=%d\n",
                       1,
                       arr_srt[0].letter,
                       arr_srt[0].w,
                       arr_srt[0].y,
                       arr_srt[0].x,
                       arr_srt[0].pen_up);

return (arr_srt[0].letter);
   }
   else
   { //fprintf(fout4,"%d long %c {",num_dir,ch);
     fprintf(fout5," %d\n",l+1);
     for (i=0;i<=l;i++)
      { //fprintf(fout4,"%c",arr_srt[i].letter);

fprintf(fout5,"%c   Mw=%.4f  My=%.4f  Mx=%.4f  Mup=%d\n",
                       arr_srt[i].letter,
                       arr_srt[i].w,
                       arr_srt[i].y,
                       arr_srt[i].x,
                       arr_srt[i].pen_up);
      }

}
   return (arr_srt[0].letter);
}
int sort_w(int j,float level)
{ int i;
  char ch;
  float temp_1,temp_2,temp_w,temp_y,temp_x,temp_pen_up;
  int pr=1;

if (j==0) return(0);

while (pr==1)
```

```
{ pr=0;
  for (i=j;i>0;i--)
    { temp_1=arr_srt[i].w;
      temp_2=arr_srt[i-1].w;
      if (temp_1 > temp_2)
        { ch=arr_srt[i-1].letter;
          temp_w=arr_srt[i-1].w;
          temp_y=arr_srt[i-1].y;
          temp_x=arr_srt[i-1].x;
          temp_pen_up=arr_srt[i-1].pen_up;
          arr_srt[i-1].letter=arr_srt[i].letter;
          arr_srt[i-1].w=arr_srt[i].w;
          arr_srt[i-1].y=arr_srt[i].y;
          arr_srt[i-1].x=arr_srt[i].x;
          arr_srt[i-1].pen_up=arr_srt[i].pen_up;
          arr_srt[i-1].m=temp_1;
          arr_srt[i].letter=ch;
          arr_srt[i].w=temp_w;
          arr_srt[i].y=temp_y;
          arr_srt[i].x=temp_x;
          arr_srt[i].pen_up=temp_pen_up;
          arr_srt[i].m=temp_2;
          pr=1;
        }
      else
        { arr_srt[i-1].m=temp_2;
          arr_srt[i].m=temp_1;
        }
    }
}
level=arr_srt[0].w-level;
if (level<=0.0) level=0.0;
i=0;
while ((i<=j)&&(arr_srt[i].w >= level))
  i++;
if (i==0) return (0);
else return(i-1);
}
int sort_y(int j,float level)
{ int i;
  char ch;
  float temp_1,temp_2,temp_w,temp_y,temp_x,temp_pen_up;
  int pr=1;

if (j==0) return(0);

while (pr==1)
    { pr=0;
      for (i=j;i>0;i--)
        { temp_1=arr_srt[i].y;
          temp_2=arr_srt[i-1].y;
          if (temp_1 > temp_2)
            { ch=arr_srt[i-1].letter;
              temp_w=arr_srt[i-1].w;
              temp_y=arr_srt[i-1].y;
              temp_x=arr_srt[i-1].x;
              temp_pen_up=arr_srt[i-1].pen_up;
```

```
                        arr_srt[i-1].letter=arr_srt[i].letter;
                        arr_srt[i-1].w=arr_srt[i].w;
                        arr_srt[i-1].y=arr_srt[i].y;
                        arr_srt[i-1].x=arr_srt[i].x;
                        arr_srt[i-1].pen_up=arr_srt[i].pen_up;
                        arr_srt[i-1].m=temp_1;
                        arr_srt[i].letter=ch;
                        arr_srt[i].w=temp_w;
                        arr_srt[i].y=temp_y;
                        arr_srt[i].x=temp_x;
                        arr_srt[i].pen_up=temp_pen_up;
                        arr_srt[i].m=temp_2;
                        pr=1;
                    }
                    else
                    { arr_srt[i-1].m=temp_2;
                      arr_srt[i].m=temp_1;
                    }
            }
    }
    level=arr_srt[0].y-level;
    if (level<=0.0) level=0.0;
    i=0;
    while ((i<=j)&&(arr_srt[i].y >= level))
        i++;
    if (i==0) return (0);
    else return(i-1);
}
int sort_x(int j,float level)
{ int i;
  char ch;
  float temp_1,temp_2,temp_w,temp_y,temp_x,temp_pen_up;
  int pr=1;
  if (j==0) return(0);
  while (pr==1)
   { pr=0;
     for (i=j;i>0;i--)
        { temp_1=arr_srt[i].x;
          temp_2=arr_srt[i-1].x;
          if (temp_1 > temp_2)
            { ch=arr_srt[i-1].letter;
              temp_w=arr_srt[i-1].w;
              temp_y=arr_srt[i-1].y;
              temp_x=arr_srt[i-1].x;
              temp_pen_up=arr_srt[i-1].pen_up;
              arr_srt[i-1].letter=arr_srt[i].letter;
              arr_srt[i-1].w=arr_srt[i].w;
              arr_srt[i-1].y=arr_srt[i].y;
              arr_srt[i-1].x=arr_srt[i].x;
              arr_srt[i-1].pen_up=arr_srt[i].pen_up;
              arr_srt[i-1].m=temp_1;
              arr_srt[i].letter=ch;
              arr_srt[i].w=temp_w;
              arr_srt[i].y=temp_y;
              arr_srt[i].x=temp_x;
              arr_srt[i].pen_up=temp_pen_up;
              arr_srt[i].m=temp_2;
              pr=1;
```

```
            }
      else
        { arr_srt[i-1].m=temp_2;
          arr_srt[i].m=temp_1;
        }
    }
  }
  level=arr_srt[0].x-level;
  if (level<=0.0) level=0.0;
  i=0;
  while ((i<=j)&&(arr_srt[i].x >= level))
    i++;
  if (i==0) return (0);
  else return(i-1);
}
int check_map (char letter)
{
  int i;
  for (i=0;i<NUM_SYMBOLS;i++)
   if (letter==(char)map_char[i][0]) return(i);
   if (i==NUM_SYMBOLS)
     { printf("There is no such character in the map %c\n",letter);
       return(-1);
     }
   return(-1);
}
void read_map(void)
{
  FILE *fp;
  int i;
  fp=fopen("map_ch","rb");
  for (i=0; i<NUM_SYMBOLS;i++)
    fscanf(fp,"%d %d\n",&map_char[i][0],&map_char[i][1]);
  fclose(fp);
}
void r_matr(void)
{ FILE *fout1;
  int i,j;
  fout1 = fopen ("matrix.out","w");
  for (i=0;i<69;i++)
     fprintf (fout1," %c",map_char[i][0]);
  fprintf (fout1,"\n");
  for (i=0;i<69;i++)
   { for (j=0;j<69;j++)
       fprintf (fout1," %2d",matr[i][j]);
       fprintf (fout1,"\n");
   }
   fclose(fout1);
}
```

```c
/*******************************************************************
The file "err" is sorting using appropriate similarity
function defined with treshold level and it's order.
*******************************************************************/
int main(void)
{
  int check_map (char letter);
  void read_map(void);
  void add_metric(char ch,int letter_num,int loop);
  int sort_add(int j,float level);
  void read_map(void);
  void r_matr(void);
  char mtr_cl(int i,char ch);
  int spell_ch ( char [10][20] , char [100][20] ) ;
  int letter_num,num_dir,loop;
  char ch;
  int i,k,j,num_inside,pr;
  float level;
  char reply[100][20] ;
  int repl;
  read_map();
  max_min();
  level=0.4;
  fp=fopen("err","r");
  fp1=fopen("add_err","w+");
  num_inside=0;
  pr=0;
  fseek(fp,37,0);
  while (fscanf(fp,"%d",&letter_num)!=EOF)
   { fscanf(fp," %c",&ch);
     fseek(fp,10,1);
     fscanf(fp,"%d %d\n",&num_dir,&loop);
     for (i=0;i<loop;i++)
      { fscanf(fp,"%c",&arr_srt[i].letter);
        fseek(fp,6,1);
        fscanf(fp,"%f",&arr_srt[i].w);
        fseek(fp,6,1);
        fscanf(fp,"%f",&arr_srt[i].y);
        fseek(fp,6,1);
        fscanf(fp,"%f",&arr_srt[i].x);
        fseek(fp,6,1);
        fscanf(fp,"%d\n",&arr_srt[i].pen_up);
        pr=1;
      }
     add_metric(ch,letter_num,loop);
     k=sort_add(loop,level);
     if (k>=10) k=8;
     fprintf(fp1,"%c %d long=%d %d\n",ch,letter_num,num_dir,/*loop*/k+1);
     if (k==0)
      { //if (ch!=arr_srt[0].letter)
         fprintf(fp1,"%c w=%.4f y=%.4f x=%.4f x_vec=%.4f y_vec=%.4f amp=%.4f up=%d m=%.4f\n",
                 arr_srt[0].letter,arr_srt[0].w,arr_srt[0].y,arr_srt[0].x,
           arr_srt[0].x_vec,arr_srt[0].y_vec,arr_srt[0].amp,
           arr_srt[0].pen_up,arr_srt[0].m);
      }
     else
      {// fprintf(fout4,"%d long %c {",num_dir,ch);
        for (i=0;i<=k;i++)
```

```c
            {// fprintf(fout4,"%c",arr_srt[i].letter);
              fprintf(fp1,"%c w=%.4f y=%.4f x=%.4f x_vec=%.4f y_vec=%.4f amp=%.4f up=%d m=%.4f\n",
                 arr_srt[i].letter,arr_srt[i].w,arr_srt[i].y,arr_srt[i].x,
                 arr_srt[i].x_vec,arr_srt[i].y_vec,arr_srt[i].amp,
                 arr_srt[i].pen_up,arr_srt[i].m);
            }
        }
        if ((i=check_map(ch))<0)
          { printf("ERROR1");
              continue;
          }
            if ((j=check_map(arr_srt[0].letter))<0)
          { printf("ERROR2");
              continue;
          }
          matr[i][j]++;
          num_inside++;
      }
    fclose(fp);
    if (pr==0)
      { fsh=fopen ("sh_sp.out","w");
          fprintf(fsh,"— 0");
          fclose(fsh);
          return 0;
      }
    fclose(fp1);
    r_matr();
      return 0;
}
int check_map (char letter)
{
  int i;
  for (i=0;i<NUM_SYMBOLS;i++)
   if (letter==(char)map_char[i][0]) return(i);
   if (i==NUM_SYMBOLS)
      { printf("There is no such character in the map %c\n",letter);
          return(-1);
      }
    return(-1);
}
void read_map(void)
{
  FILE *fp;
  int i;
  fp=fopen("map_ch","rb");
  for (i=0; i<NUM_SYMBOLS;i++)
   fscanf(fp,"%d %d\n",&map_char[i][0],&map_char[i][1]);
  fclose(fp);
}
void r_matr(void)
{ FILE *fout1;
  int i,j;
  fout1 = fopen ("matrix.out","w");
  for (i=0;i<69;i++)
      fprintf (fout1," %c",map_char[i][0]);
  fprintf (fout1,"\n");
  for (i=0;i<69;i++)
    { for (j=0;j<69;j++)
```

```
        fprintf (fout1," %2d",matr[i][j]);
        fprintf (fout1,"\n");
     }
   fclose(fout1);
}

/*****************************************************************
function add_metric() for the every letter (according to it's number
and name) searches it's parameters in the files feat.out and feat1.out
and calculates corresponding metrics.
*****************************************************************/
void add_metric(char ch,int letter_num,int loop)
{
  void add_metr_feat(int loop);
  void add_metr_feat1(int loop);
  FILE *fp;
  char temp_letter;
  int temp_letter_num;
  fp=fopen("feat.out","rb");
  while (fscanf(fp,"%c",&temp_letter)!=EOF)
    { fscanf(fp," %d %f %f %f %f\n",&temp_letter_num,&y_vec_beg,&y_vec_end,
                                    &x_vec_beg,&x_vec_end);
      if ((temp_letter==ch)&&(temp_letter_num==letter_num))
       { fclose(fp);
           add_metr_feat(loop);
           break;
       }
    }
  fp=fopen("feat1.out","rb");
  while (fscanf(fp,"%c",&temp_letter)!=EOF)
    { fscanf(fp," %d %d\n",&temp_letter_num,&_y);
      if ((temp_letter==ch)&&(temp_letter_num==letter_num))
       { fclose(fp);
           add_metr_feat1(loop);
           break;
       }
    }
}
/*****************************************************************
functions add_metr_feat() calculates similarity function on the base of
distance between recognized symbol's vector (connecting start point with
the end point of the symbol) and generalized symbol's vector defined
during the teaching.
*****************************************************************/
void add_metr_feat(int loop)
{
  int i,j;
  FILE *fp;
  float m_1,m_2,m_3,m_4;
  char temp_letter;
  for (i=0;i<loop;i++)
    { fp=fopen("genfeat.out","rb");
      while(fscanf(fp,"%c",&temp_letter)!=EOF)
        { fscanf(fp," %f %f %f %f\n",&x_midll.x_b,&x_midll.x_e,
                                     &y_midll.y_b,&y_midll.y_e);
          for (j=0; j<3; j++)
            { fscanf(fp,"%f %f %f %f\n",&x_dev[j].x_b,&x_dev[j].x_e,
```

```
                                    &y_dev[j].y_b,&y_dev[j].y_e);
            }
         if (arr_srt[i].letter==temp_letter)
         { fclose(fp);
            m_1=mut_metric(x_vec_beg,x_midll.x_b,0.0,1.0,
                                    x_dev[2].x_b,x_dev[2].x_b);
            m_2=mut_metric(x_vec_end,x_midll.x_e,0.0,1.0,
                                    x_dev[2].x_e,x_dev[2].x_e);
            arr_srt[i].x_vec=m_1*m_2;

m_3=mut_metric(y_vec_beg,y_midll.y_b,0.0,1.0,
                                    y_dev[2].y_b,y_dev[2].y_b);
            m_4=mut_metric(y_vec_end,y_midll.y_e,0.0,1.0,
                                    y_dev[2].y_e,y_dev[2].y_e);
            arr_srt[i].y_vec=m_3*m_4;
            break;
         }
      }
   }
}
/*****************************************************************
functions add_metr_feat1() calculates similarity function on the base of
distance between recognized symbol's amplitude and symbol's generalized
amplitude calculated during the teaching.
*****************************************************************/
void add_metr_feat1(int loop)
{
  int i,j;
  FILE *fp;
  float m_1;
  char temp_letter;
  int y_max,y_min;

for (i=0;i<loop;i++)
   { fp=fopen("genfet1.out","rb");
      while(fscanf(fp,"%c",&temp_letter)!=EOF)
      { fscanf(fp," %f %d %d\n",&y_midll.y_b,&y_max,&y_min);
         for (j=0; j<3; j++)
            fscanf(fp,"%f ",&y_dev[j].y_b);
         fscanf(fp,"\n");
         if (arr_srt[i].letter==temp_letter)
         { fclose(fp);
            //y_min=2*y_min;//It's better to find min and max for all the symbols
            //y_max=2*y_max;
            m_1=mut_metric((float)amp_y,y_midll.y_b,(float)mut_min,(float)mut_max,
                                    y_dev[2].y_b,y_dev[2].y_b);
            arr_srt[i].amp=m_1;
            break;
         }
      }
   }
}
void max_min(void)
{ FILE *fp;
  char temp_letter;
  int y_max;
  int y_min;
  int j;
```

```c
    mut_max=0;
    mut_min=9999;
    fp=fopen("genfet1.out","rb");
    while(fscanf(fp,"%c",&temp_letter)!=EOF)
        { fscanf(fp," %f %d %d\n",&y_midll.y_b,&y_max,&y_min);
            for (j=0; j<3; j++)
               fscanf(fp,"%f ",&y_dev[j].y_b);
            fscanf(fp,"\n");
            if (mut_max < y_max) mut_max=y_max;
            if (mut_min > y_min) mut_min=y_min;
       }
  fclose(fp);
}

/*******************************************************************
similarity function defines similarity between parameter and sample of
parameters with known medial ,left and right deviation , and range of definition
(const_l,const_r)
*******************************************************************/
float mut_metric(float param,float medial,float const_l,float const_r,
                                                float dev_l,float dev_r)
{ float left,right,m,div;
  left=medial-dev_l;
  if (left<const_l) left=const_l;
  right=medial+dev_r;
  if (right>const_r) right=const_r;
  if ((param >= left)&&(param <=right))
                                        return(1.0);
  else
   { div=const_r-const_l-right+left+0.0001;
     if (div==0.0) div=medial;
     if (param < left)
                m=1.0 - (left-param)/div;
     if (param > right)
                m=1.0 -(param-right)/div;
   }
  if (m<0.0) m=0.0;
  return(m);
}

/*******************************************************************
average similarity function definition,final sorting using treshold
*******************************************************************/
extern struct SRT1 arr_srt[600];
int sort_add(int j,float level)
{ int i;
  char ch;
  float temp_1,temp_2,temp_w,temp_y,temp_x,temp_x_vec,temp_y_vec,temp_amp;
  int temp_up;
  int pr=1;

for (i=0;i<j;i++)
   arr_srt[i].m=(arr_srt[i].w+arr_srt[i].y+arr_srt[i].x_vec+
                arr_srt[i].y_vec+arr_srt[i].amp+(float)arr_srt[i].pen_up)/6.0;
    if (j-1==0) return(0);
    while (pr==1)
    { pr=0;
```

```
    for (i=j-1;i>0;i--)
     { temp_1=arr_srt[i].m;
         temp_2=arr_srt[i-1].m;
         if (temp_1 > temp_2)
          { ch=arr_srt[i-1].letter;
            temp_w=arr_srt[i-1].w;
            temp_y=arr_srt[i-1].y;
            temp_x=arr_srt[i-1].x;
            temp_up=arr_srt[i-1].pen_up;
            temp_x_vec=arr_srt[i-1].x_vec;
            temp_y_vec=arr_srt[i-1].y_vec;
            temp_amp=arr_srt[i-1].amp;
            arr_srt[i-1].letter=arr_srt[i].letter;
            arr_srt[i-1].w=arr_srt[i].w;
            arr_srt[i-1].y=arr_srt[i].y;
            arr_srt[i-1].x=arr_srt[i].x;
            arr_srt[i-1].pen_up=arr_srt[i].pen_up;
            arr_srt[i-1].x_vec=arr_srt[i].x_vec;
            arr_srt[i-1].y_vec=arr_srt[i].y_vec;
            arr_srt[i-1].amp=arr_srt[i].amp;
            arr_srt[i-1].m=temp_1;
            arr_srt[i].letter=ch;
            arr_srt[i].w=temp_w;
            arr_srt[i].y=temp_y;
            arr_srt[i].x=temp_x;
            arr_srt[i].pen_up=temp_up;
            arr_srt[i].x_vec=temp_x_vec;
            arr_srt[i].y_vec=temp_y_vec;
            arr_srt[i].amp=temp_amp;
            arr_srt[i].m=temp_2;
            pr=1;
          }
          else
          { arr_srt[i-1].m=temp_2;
            arr_srt[i].m=temp_1;
          }
     }
  }
  level=arr_srt[0].m-level;
  if (level<=0.0) level=0.0;
  i=0;
  while ((i<j)&&(arr_srt[i].m >= level))
    i++;
  if (i==0) return (0);
  else return(i-1);
}
char mtr_cl(int i,char ch)
{ int j;
  for (j=0;j<=i;j++)
   if (ch==arr_srt[j].letter) return(arr_srt[j].letter);
  return(arr_srt[0].letter);
}
```

Acceleration Recognition

I. Training procedures

```
/**************************************
    To define the works condition.
**************************************/
void main(void)
{
  FILE *fp;
  char filename[30];
  int index;
  char num[4];
  char ch;
  int k;
  printf (" Do you want to do PRESS (y/n) :   ");
  ch=getche();
  fp=fopen("fpr","w");
  if (toupper((int)ch)=='Y') fprintf(fp,"%d",1);
  else fprintf(fp,"%d",0);
  fclose(fp);
  printf ("\n Do you want to do SMOOTH (y/n) :   ");
  ch=getche();
  fp=fopen("fsm","w");
  if (toupper((int)ch)=='Y') fprintf(fp,"%d",1);
  else fprintf(fp,"%d",0);
  fclose(fp);
  printf ("\n Enter amout of level :   ");
  scanf ("%d",&k);
  fp=fopen("flv","w");
  fprintf(fp,"%d",k);
  fclose(fp);
}

/*       MAIN  FOR  TEACHING        */ void main(void)
{
  FILE *fp;
  FILE *fp1;
  char infile[30];
  char filename1[30];
  int number;
  int index;
  int num;
  int num_mut;
  char num_ch[4];
  int sp_amount;
  int zon_x[10];
  int zon_y[10];

float arr_x[NUMBER_OF_STROKES];
  float arr_y[NUMBER_OF_STROKES];
  float arr_z[NUMBER_OF_STROKES];
  float arr_p[NUMBER_OF_STROKES];
  int x,y,z,p,pen_old,i;
```

```c
int arr_beg_end[2];
fp1=fopen ("abc","r");
while ( fscanf(fp1,"%d",&number)!=EOF)
 {
   fscanf (fp1,"%s\n",infile);
   if ((fp=fopen(infile,"r"))==NULL)  continue;
   printf("—%s—\n",infile);
   sp_amount=0;
   num=0;
   num_mut=0;
   pen_old=1;
   while (fscanf(fp,"%d",&x)!=EOF)
   { fscanf(fp," %d %d %d\n",&y,&z,&p);
     if (pen_old==p)
        {
          arr_x[num]=(float)x;
          arr_y[num]=(float)y;
          arr_z[num]=(float)z;
          num++;     //amount in the space
          if (num > NUMBER_OF_STROKES)
            { printf("Amount of penstrokes in the space is bigger then %d\n",NUMBER_OF_STROKES);
              getch();
              exit(0);
            }
          num_mut++; //amount in the file
        }
     else
        { prep(num,num_mut,sp_amount,arr_x,arr_y,arr_z);
          sp_amount++; //amount of space
          pen_old=p;
          arr_x[0]=(float)x;
          arr_y[0]=(float)y;
          arr_z[0]=(float)z;
          num=1;
          num_mut++;
        }
     fscanf(fp," %d %d %d %d",&x,&y,&z,&p);
     fscanf(fp," %d %d %d %d",&x,&y,&z,&p);
     fscanf(fp," %d %d %d %d",&x,&y,&z,&p);
   }
   fclose(fp);
   prep(num,num_mut,sp_amount,arr_x,arr_y,arr_z);
   strcpy(filename1,"t");
   sprintf(num_ch,"%d",sp_amount);
   strcat(filename1,num_ch);
   strcat(filename1,".out");
   fp=fopen(filename1,"a+");
   fprintf(fp,"%d %d %d\n",number,sp_amount,num_mut);
   for (i=0;i<=sp_amount;i++)
    { nul_zone(i,arr_beg_end);
      save(i,num_mut,arr_beg_end,fp);
    }
   fclose(fp);
  }
 fclose(fp1);
}
```

```c
/***********************************************
   Get work's conditions.
***********************************************/
void prep(int num,int num_mut,int sp_amount,float arr_x[],
                                     float arr_y[],float arr_z[])
{
  FILE *fp;
  int pr,sm,amount_lev;
  if ((fp=fopen("fpr","r"))==NULL)
   { printf("Impossible to open the file 'fpr'\n");
      getch();
      exit(0);
   }
  fscanf(fp,"%d",&pr);
  fclose(fp);
  if (pr)
   { press(num,arr_x);
      press(num,arr_y);
      press(num,arr_z);
      num=PRESS_NUMBER_POINT;
   }
  if ((fp=fopen("fsm","r"))==NULL)
   { printf("Impossible to open the file 'fsm'\n");
      getch();
      exit(0);
   }
  fscanf(fp,"%d",&sm);
  fclose(fp);
  if(sm)
   { smooth(num,arr_x);
      smooth(num,arr_y);
      smooth(num,arr_z);
   } level(num,num_mut,sp_amount,arr_x,arr_y,arr_z);
}
/***********************************************
   Save one space information to output file.
***********************************************/
void save(int space,int num_mut,int arr_beg_end[],FILE *fp)
{ int i,j;

fprintf(fp,"%d\n",space);

fprintf(fp,"%d %f %f\n",g[space].num,g[space].beg/(float)num_mut,
                                     g[space].end/(float)num_mut);
  for (j=0;j < g[space].num; j++)
    fprintf(fp,"%d %d %d\n",g[space].f[j].x,g[space].f[j].y,g[space].f[j].z);

fprintf(fp,"%f %f\n",(float)arr_beg_end[0]/(float)g[space].num,
                 (float)arr_beg_end[1]/(float)g[space].num);
}
```

```c
/*******************************************************
  Calculate coordinates accordingly to amount of levels.
*******************************************************/
void level(int num,int num_mut,int space,float arr_x[],
                                  float arr_y[],float arr_z[])

{ int i,j;
  FILE *fp;
  float min_x=9999.0;
  float max_x=0.0;
  float min_y=9999.0;
  float max_y=0.0;
  float min_z=9999.0;
  float max_z=0.0;
  int sum;
  int pr;
  int temp;
  float kx,ky,kz;
  int lev;
/****************************************
  k-amount of level
****************************************/
  if ((fp=fopen("flv","r"))==NULL)
    { printf("Impossible to open the file 'flv'\n");
      getch();
      exit(0);
    }
  fscanf(fp,"%d",&lev);
  fclose(fp);
  for (i=0;i<num;i++)
    { if (arr_x[i] < min_x) min_x = arr_x[i];
      if (arr_x[i] > max_x) max_x = arr_x[i];
      if (arr_y[i] < min_y) min_y = arr_y[i];
      if (arr_y[i] > max_y) max_y = arr_y[i];
      if (arr_z[i] < min_z) min_z = arr_z[i];
      if (arr_z[i] > max_z) max_z = arr_z[i];
    }
  kx=(max_x-min_x)/(float)lev;
  ky=(max_y-min_y)/(float)lev;
  kz=(max_z-min_z)/(float)lev;
  if ( (kx <= 1.00) || (ky <= 1.00) || (kz <= 1.00) )
    { printf("--Decrease the number of levels !!!--\n");
      getch();
    }
  for (i=0;i<num;i++)
    { g[space].f[i].x=(int)(((float)(arr_x[i]-min_x)-0.001)/kx);
      g[space].f[i].y=(int)(((float)(arr_y[i]-min_y)-0.001)/ky);
      g[space].f[i].z=(int)(((float)(arr_z[i]-min_z)-0.001)/kz);
    }
  g[space].num=num;
  g[space].beg=(float)(num_mut-num+1);
  g[space].end=(float)(num_mut);
}
/******************************************
  Calculate the coordinates of null zone.
******************************************/
void nul_zone(int space,int arr_beg_end[])
{ int beg,end,dif;
  int beg_max,end_max;
```

```
     int pr=0;
     int j;
     dif=0;
     beg=0;
     end=0;
     for (j=0;j<g[space].num;j++)
      { if (g[space].f[j].z==0)
         { if(pr==0)
             { beg=j;
               end=j;
               pr=1;
               if (j==(g[space].num-1))
                 { if ( dif < 1 )
                     { beg_max=beg;
                       end_max=end;
                     }
                 }
             }
           else
             { if (j==(g[space].num-1))
                 { end=j;
                   if ( dif < (end-beg+1) )
                     { beg_max=beg;
                       end_max=end;
                     }
                 }
             }
         }
       else
         { if (pr==1)
             { end=j;
               pr=0;
               if ( dif < (end-beg) )
                 { dif=end-beg;
                   beg_max=beg;
                   end_max=end-1;
                 }
             }
         }
      }
     arr_beg_end[0]=beg_max+1;
     arr_beg_end[1]=end_max+1;
}
/*********************************************
  Do smoothing.
**********************************************/
float smooth1 ( int num , float z[] )
{
  int ind ;
  float temp ;
  float norma ;
  for (ind = 1 , norma = 0 ; ind < num - 1 ; ind++ ) {
    temp = ( z[ind -1]+z[ind]+z[ind+1] ) /3. ;
    norma += abbs ( z[ind] - temp ) ;
    z[ind] = temp ;
  }
  return norma ;
}
```

```c
void smooth(int max_point,float arr[])
{ float end_smooth;
  while ( ( end_smooth = smooth1 ( max_point,arr ) ) > PRESS_NUMBER_POINT / 10 ) ;
}

/*****************************************************
   Change file coordinates accordingly new length.
*****************************************************/
void normal ( int num_old , float arr_old[] , int num_new , float arr_new[] )
{
  double koeff ;
  int ind_old , ind_new ;
  koeff = (double) ( num_old - 1 ) / (float) ( num_new - 1 ) ;
  arr_new[0] = arr_old[0] ;
  for ( ind_new = 1 ; ind_new < num_new - 1 ; ind_new ++ ) {
    ind_old = (int) ( floor ( koeff * ind_new ) ) ;
    arr_new[ind_new] = ( ind_old + 1 - koeff * ind_new ) * arr_old[ind_old] +
                       ( koeff * ind_new - ind_old ) * arr_old[ind_old + 1] ;
  }
  arr_new[ind_new] = arr_old[num_old-1] ;
}
void press(int num,float arr[])
{ float new_arr[100];
  int i;
  normal ( num , arr , PRESS_NUMBER_POINT , new_arr) ;
  for ( i = 0 ; i < PRESS_NUMBER_POINT; i++ )
    arr[i] = new_arr[i] ;
}
```

II. Generalization procedures

```c
/*         MAIN  FOR  GENERALIZATING            */
void main(void)
{
  void gener(int i,char filename[],char filename1[]);

FILE *fp,*fp1;
  int i;
  char num[4];
  char filename[30],filename1[30];
  for (i=0;i<NUMBER_SPACE;i++)
  { strcpy(filename,"t");
    sprintf(num,"%d",i);
    strcat(filename,num);
    strcat(filename,".out");
    if ((fp=fopen(filename,"r"))==NULL) continue;
    fclose (fp);
    strcpy(filename1,"g");
    strcat(filename1,num);
    strcat(filename1,".out");
    fp1=fopen(filename1,"w");
    fclose(fp1);
    gener(i,filename,filename1);
  }
}
```

```c
void def_par(float arr[MAX_REPRESNT+1][NUMBER_SPACE+1],int amount,
                                   int space,char filename1[]);
void open_file(char filename1[],int amount,int letter)
{ FILE *fp;
  fp=fopen(filename1,"a+");
  fprintf(fp,"%d %d\n",letter,amount);
  fclose(fp);
}
/*******************************************
   Generalize information for all the letter.
********************************************/
void gener(int i,char filename[],char filename1[])
{
  int gether(int letter,int num_space,char filename[],char filename1[]);
  int j;
  int amount;

for (j=0;j<SYMBOLS_NUMBER;j++)
    { amount=gether(j,i,filename,filename1);
    }
}
/*******************************************
   Generalize information for one letter.
********************************************/
int gether(int letter,int num_space,char filename[],char filename1[])
{ int amount;
  FILE *fp;
  FILE *fp1;
  int in,space,num_mut,sp_num,x,y,z,i,j,length,l;
  float space_length[MAX_REPRESNT+1][NUMBER_SPACE+1];
  float beg[MAX_REPRESNT+1][NUMBER_SPACE+1];
  float end[MAX_REPRESNT+1][NUMBER_SPACE+1];
  float nul_beg[MAX_REPRESNT+1][NUMBER_SPACE+1];
  float nul_end[MAX_REPRESNT+1][NUMBER_SPACE+1];
  int temp;
  float mut_len[MAX_REPRESNT+1][NUMBER_SPACE+1];
  amount=0;
  fp=fopen(filename,"r");
  fp1=fopen("temp","w");
  fclose(fp1);
  fp1=fopen("temp","a+");
  while (fscanf(fp,"%d",&in)!=EOF)
   { fscanf(fp," %d %d\n",&space,&num_mut);
     mut_len[amount][0]=(float)num_mut;
     for (i=0;i<=space;i++)
     { fscanf(fp,"%d",&sp_num);
        fscanf(fp,"%d %f %f\n",&temp,&beg[amount][i],&end[amount][i]);
        space_length[amount][i]=(float)temp;
        if (letter==in)
        {// fp1=fopen("temp","a+");
           fprintf(fp1,"%d\n",temp);
           if (amount==MAX_REPRESNT)
            { fclose(fp);
              fclose(fp1);
              printf("Representation is too huge\n");
              getch();
              return(777);
            }
```

```
            for (j=0;j<temp;j++)
              { fscanf(fp,"%d %d %d\n",&x,&y,&z);
                fprintf(fp1,"%d %d %d\n",x,y,z);
              }
          }
          else
           { for (j=0;j<temp;j++)
               fscanf(fp,"%d %d %d\n",&x,&y,&z);
           }
          fscanf(fp,"%f %f\n",&nul_beg[amount][i],&nul_end[amount][i]);
       }
     if (letter==in) amount++;
   }
  fclose(fp);
  fclose(fp1);
  if (amount>0)
   { open_file(filename1,amount,letter);
     def_par(mut_len,amount,0,filename1);
     def_par(space_length,amount,space,filename1);
     def_par(beg,amount,space,filename1);
     def_par(end,amount,space,filename1);
     def_par(nul_beg,amount,space,filename1);
     def_par(nul_end,amount,space,filename1);
     fp=fopen("temp","r");
     fp1=fopen(filename1,"a+");
     for (i=0;i<=space;i++)
      { for (j=0;j<amount;j++)
          { fscanf(fp,"%d\n",&length);
            fprintf(fp1,"%d\n",length);
            for (l=0;l<length;l++)
             { fscanf(fp,"%d %d %d\n",&x,&y,&z);
               fprintf(fp1,"%d %d %d\n",x,y,z);
             }
          }
      }
     fclose(fp);
     fclose(fp1);
   }
  return(amount);
}

/*************************************************************
  Calculates medial x and y coordinates and their dispersions.
*************************************************************/
void def_par(float arr[MAX_REPRESNT+1][NUMBER_SPACE+1],int amount,
                                  int space,char filename1[])
{ int count,i;
  float dev[NUMBER_SPACE+1];
  float midll[NUMBER_SPACE+1];
  float summ;
  float temp;
  float max[NUMBER_SPACE+1];
  float min[NUMBER_SPACE+1];
  FILE *fp;
  for (i=0;i<=space;i++)
   { max[i]=0.0;
     min[i]=9999.9;
```

```
       }
    if (amount>0)
       { for (count=0;count<=space;count++)
         { summ=0.0;
           for (i=0; i<amount; i++)
            { summ=summ+arr[i][count];
                if (max[count] < arr[i][count]) max[count] = arr[i][count];
                if (min[count] > arr[i][count]) min[count] = arr[i][count];
            }
           midll[count]=summ/(float)amount;
           summ=0.0;
           for (i=0; i<amount; i++)
            { temp=midll[count] - arr[i][count];
                summ=summ + temp*temp;
            }
           dev[count]=sqrt(summ/(float)amount);
         }
       }
  fp=fopen(filename1,"a+");
  for (count=0; count<=space; count++)
   fprintf(fp,"%f %f %f %f\n",midll[count],dev[count],max[count],min[count]);
  fprintf(fp,"\n");
  fclose(fp);
  return;
}
/*****************************************************************
function calc_vec calculates medial x and y coordinates and their dispersions
of the vector joining the first point of the symbols' trajectory and the last
*****************************************************************/
void calc_vec(int amount)
{ int count,i;
  float summ_1=0.0;
  float summ_2=0.0;
  float summ_3=0.0;
  float summ_4=0.0;
  float summ_1m=0.0;
  float summ_2m=0.0;
  float summ_3m=0.0;
  float summ_4m=0.0;
  float temp;
  int am1,am2,am3,am4,am5,am6,am7,am8;
  if (amount>0)
    for (i=0; i<amount; i++)
     { summ_1=summ_1+bx[i][0].x_b;
         summ_2=summ_2+by[i][0].y_b;
         summ_3=summ_3+bx[i][0].x_e;
         summ_4=summ_4+by[i][0].y_e;
     }
  x_midll[0].x_b=summ_1/(float)amount;
  y_midll[0].y_b=summ_2/(float)amount;
  x_midll[0].x_e=summ_3/(float)amount;
  y_midll[0].y_e=summ_4/(float)amount;
  summ_1=0.0;
  summ_2=0.0;
  summ_3=0.0;
  summ_4=0.0;
  summ_1m=0.0;
  summ_2m=0.0;
```

```
summ_3m=0.0;
summ_4m=0.0;
am1=0;
am2=0;
am3=0;
am4=0;
am5=0;
am6=0;
am7=0;
am8=0;
for (i=0; i<amount; i++)
 { temp=x_midll[0].x_b-bx[i][0].x_b;
   if (temp>0.0)
    { summ_1=summ_1+temp*temp;
       am1++;
    }
   else
    { summ_1m=summ_1m+temp*temp;
       am2++;
    }
   temp=y_midll[0].y_b-by[i][0].y_b;
   if (temp>0.0)
    { summ_2=summ_2+temp*temp;
       am3++;
    }
   else
    { summ_2m=summ_2m+temp*temp;
       am4++;
    }
   temp=x_midll[0].x_e-bx[i][0].x_e;
   if (temp>0.0)
    { summ_3=summ_3+temp*temp;
       am5++;
    }
   else
    { summ_3m=summ_3m+temp*temp;
       am6++;
    }
   temp=y_midll[0].y_e-by[i][0].y_e;
   if (temp>0.0)
    { summ_4=summ_4+temp*temp;
       am7++;
    }
   else
    { summ_4m=summ_4m+temp*temp;
       am8++;
    }
 }
if (am1==0) x_dev[0].x_b=0.0;                //dev-
 else x_dev[0].x_b=sqrt(summ_1/(float)am1);
if (am2==0) x_dev[1].x_b=0.0;                //dev+
 else x_dev[1].x_b=sqrt(summ_1m/(float)am2);
if ((am1+am2)==0) x_dev[2].x_b=0.0;          //dev
 else x_dev[2].x_b=sqrt((summ_1+summ_1m)/(float)(am1+am2));
if (am3==0) y_dev[0].y_b=0.0;                //dev-
 else y_dev[0].y_b=sqrt(summ_2/(float)am3);
if (am4==0) y_dev[1].y_b=0.0;                //dev+
 else y_dev[1].y_b=sqrt(summ_2m/(float)am4);
```

```
    if ((am3+am4)==0) y_dev[2].y_b=0.0;                    //dev
    else y_dev[2].y_b=sqrt((summ_2+summ_2m)/(float)(am3+am4));
    if (am5==0) x_dev[0].x_e=0.0;                          //dev-
    else x_dev[0].x_e=sqrt(summ_3/(float)am5);
    if (am6==0) x_dev[1].x_e=0.0;                          //dev+
    else x_dev[1].x_e=sqrt(summ_3m/(float)am6);
    if ((am5+am6)==0) x_dev[2].x_e=0.0;                    //dev
    else x_dev[2].x_e=sqrt((summ_3+summ_3m)/(float)(am5+am6));
    if (am7==0) y_dev[0].y_e=0.0;                          //dev-
    else y_dev[0].y_e=sqrt(summ_4/(float)am7);
    if (am8==0) y_dev[1].y_e=0.0;                          //dev+
    else y_dev[1].y_e=sqrt(summ_4m/(float)am8);
    if ((am7+am8)==0) y_dev[2].y_e=0.0;                    //dev
    else y_dev[2].y_e=sqrt((summ_4+summ_4m)/(float)(am7+am8));
}
```

III. Recognition procedures

```
/*         MAIN FOR RECOGNITION         */
    struct G g[NUMBER_SPACE];
    float beg_end[NUMBER_SPACE][2];
void main(void)
{
    FILE *fp;
    FILE *fp1;
    char infile[30];
    char filename1[30];
    int number;
    int index;
    int num;
    int num_mut;
    char num_ch[4];
    int sp_amount;
    int zon_x[10];
    int zon_y[10];
    int letter;

float arr_x[NUMBER_OF_STROKES];
    float arr_y[NUMBER_OF_STROKES];
    float arr_z[NUMBER_OF_STROKES];
    float arr_p[NUMBER_OF_STROKES];
    int x,y,z,p,pen_old,i;
    int arr_beg_end[2];
    fp1=fopen("cba","r");
    while (fscanf(fp1,"%d ",&letter)!=EOF)
    { fscanf(fp1,"%s\n",infile);
        if ((fp=fopen(infile,"r"))==NULL) continue;
        printf("---%s---\n",infile);
        sp_amount=0;
        num=0;
        num_mut=0;
        pen_old=1;
        while (fscanf(fp,"%d",&x)!=EOF)
        { fscanf(fp," %d %d %d\n",&y,&z,&p);
            if (pen_old==p)
                {
```

```c
              arr_x[num]=(float)x;
              arr_y[num]=(float)y;
              arr_z[num]=(float)z;
              num++;    //amount in the space
              if (num > NUMBER_OF_STROKES)
                { printf("Amount of penstrokes in the space is bigger then %d\n",NUMBER_OF_STROKES);
                  getch();
                  exit (0);
                }
              num_mut++;  //amount in the file
            }
            else
            { prep(num,num_mut,sp_amount,arr_x,arr_y,arr_z);
              sp_amount++; //amount of space
              prep(num,num_mut,sp_amount,arr_x,arr_y,arr_z);
              pen_old=p;
              arr_x[0]=(float)x;
              arr_y[0]=(float)y;
              arr_z[0]=(float)z;
              num=1;
              num_mut++;
            }
            fscanf(fp," %d %d %d %d",&x,&y,&z,&p);
            fscanf(fp," %d %d %d %d",&x,&y,&z,&p);
            fscanf(fp," %d %d %d %d",&x,&y,&z,&p);
         }
         fclose(fp);
         prep(num,num_mut,sp_amount,arr_x,arr_y,arr_z);
         strcpy(filename1,"rec");
         strcat(filename1,".out");
         fp=fopen(filename1,"a+");
         fprintf(fp,"%d\n",letter);
         fprintf(fp,"%s\n",infile);
         fprintf(fp,"%d %d\n",sp_amount,num_mut);
         for (i=0;i<=sp_amount;i++)
           { nul_zone(i,arr_beg_end);
             save(i,num_mut,arr_beg_end,fp);
           }
         fclose(fp);
       }
     fclose(fp1);
} int main(void)
{
  FILE *fp,*fp2;
  int i,lev,j;
  char filename[30],filename1[30];
  float lev_sort;
  int lev_rb,lev_re;
  fp=fopen("flv","r");
  fscanf(fp,"%d",&lev);
  fclose(fp);
  printf (" Enter level for sorting :  ");
  scanf ("%f",&lev_sort);
  printf (" Enter level for begin null zone:  ");
  scanf ("%d",&lev_rb);
  printf (" Enter level for end null zone :  ");
```

```
    scanf ("%d",&lev_re);
/*****************************************************/
//  for confusion table
    for (i=0;i<SYMBOLS_NUMBER;i++)
     for (j=0;j<SYMBOLS_NUMBER;j++)
       conf[i][j]=0;
/*****************************************************/
    fp2=fopen("sort.out","a+");
    fp=fopen("rec.out","r");
    recogn(fp,fp2,lev,lev_sort,lev_rb,lev_re);
    fclose(fp);
    fclose(fp2);
/*****************************************************/
//  for confusion table
    fp=fopen("matr","w");
    for (i=0;i<26;i++)
     fprintf(fp,"%c ",(char)(i+97));
    for (i=0;i<26;i++)
     fprintf(fp,"%c ",(char)(i+65));
    for (i=0;i<10;i++)
     fprintf(fp,"%c ",(char)(i+48));
    fprintf(fp,"\n");
    for (i=0;i<62;i++)
     { for (j=0;j<62;j++)
        fprintf(fp,"%d ",conf[i][j]);
       fprintf(fp,"\n");
     }
    fclose(fp);
/*****************************************************/
    return 0;
}

/***************************************************
    Create sorting array according to sorting level.
****************************************************/
int cutt_sort(int num,float lev_sort,struct S sort[])
{ int i,j;
  float lev;
  float max=0.0;

for (i=0;i<num;i++)
   if (sort[i].w > max) max=sort[i].w;
  lev=max-lev_sort;
  if (lev <= 0.0) lev=0.0;
  j=0;
  for (i=0;i<num;i++)
   if (sort[i].w >= lev)
    { if (j!=i) sort[j]=sort[i];
      j++;
    }
  return(j);
}
int sort_funct( const void *a,const void *b)
{ if (((struct S *)a)->m > ((struct S *)b)->m) return(-1);
  if (((struct S *)a)->m < ((struct S *)b)->m) return(1);
  return(0);
}
```

```c
/******************************************
 Create file sign recognition.
******************************************/
void recogn(FILE *fp,FILE *fp2,int lev,float lev_sort,int lev_rb,int lev_re)
{
  struct S sort[SYMBOLS_NUMBER];

FILE *fp1;
  char filename1[30];
  float beg[NUMBER_SPACE];
  float end[NUMBER_SPACE];
  int space,num_mut,space_cur;
  double koef;
  int number,i,j,letter,amount,length,l;
  char num[5];
  float midll,dev.metr;
  float x[NUMBER_OF_STROKES];
  float y[NUMBER_OF_STROKES];
  float z[NUMBER_OF_STROKES];
  float x_rec[NUMBER_OF_STROKES];
  float y_rec[NUMBER_OF_STROKES];
  float z_rec[NUMBER_OF_STROKES];
  float new_arr[NUMBER_OF_STROKES];
  int temp1,temp2,temp3;
  float max,min;
  float summ;
  float summl;
  float m[MAX_REPRESNT][NUMBER_SPACE];
  float ml[MAX_REPRESNT][NUMBER_SPACE];
  float b_0[NUMBER_SPACE];
  float e_0[NUMBER_SPACE];
  float mult;
  int symb_num;
  char name_file[20];
  float lev_sort1;
  int num_for_sort;

char letter_print;
  int SeqNo;

while (fscanf(fp,"%d\n",&number)!=EOF)
  { fscanf(fp,"%s\n",name_file);
    printf("%s\n",name_file);
    fscanf(fp,"%d %d\n",&space,&num_mut);   /*letter from recognition set*/
    for (i=0;i<=space;i++)
    { fscanf(fp,"%d\n",&space_cur);
        fscanf(fp,"%d %f %f\n",&g[space_cur].num,&g[space_cur].beg,
                                          &g[space_cur].end);
        for (j=0;j < g[space_cur].num; j++)
          fscanf(fp,"%d %d %d\n",&g[space_cur].f[j].x,
                              &g[space_cur].f[j].y,&g[space_cur].f[j].z);
        fscanf(fp,"%f %f\n",&beg[space_cur],&end[space_cur]);
    } strcpy(filename1,"g");
    sprintf(num,"%d",space);
    strcat(filename1,num);
    strcat(filename1,".out");
```

```
fp1=fopen(filename1,"r");
symb_num=0;
while (fscanf(fp1,"%d",&sort[symb_num].letter)!=EOF)   /*letter from gen set*/
{
    fscanf(fp1,"%d",&amount);
    fscanf(fp1,"%f %f %f %f\n",&midll,&dev,&max,&min);
    sort[symb_num].mut_len=
                    mut_metric((float)num_mut,midll,0.0,1500.0,dev,dev);
    fscanf(fp1,"\n");

for (i=0;i<=space;i++)
    { fscanf(fp1,"%f %f %f %f\n",&midll,&dev,&max,&min);
    }
    mult=1.0;
    fscanf(fp1,"\n");
    for (i=0;i<=space;i++)
    { fscanf(fp1,"%f %f %f %f\n",&midll,&dev,&max,&min);
      if (i%2==0)
            mult*=mut_metric(g[i].beg,midll,0.0,1.0,dev,dev);
    }
    fscanf(fp1,"\n");
    for (i=0;i<=space;i++)
    { fscanf(fp1,"%f %f %f %f\n",&midll,&dev,&max,&min);
      if (i%2==0)
            mult*=mut_metric(g[i].end,midll,0.0,1.0,dev,dev);
    }
    sort[symb_num].beg_end=mult;
    fscanf(fp1,"\n");
    for (i=0;i<=space;i++)
    { fscanf(fp1,"%f %f %f %f\n",&midll,&dev,&max,&min);
    }
    fscanf(fp1,"\n");
    for (i=0;i<=space;i++)
    { fscanf(fp1,"%f %f %f %f\n",&midll,&dev,&max,&min);
    }
    fscanf(fp1,"\n");
    for (i=0;i<amount;i++)
    { for (j=0;j<=space;j++)
      { fscanf(fp1,"%d\n",&length);
        for (l=0;l<length;l++)
        { fscanf(fp1,"%d %d %d\n",&temp1,&temp2,&temp3);
            x[l]=temp1;
            y[l]=temp2;
            z[l]=temp3;
        }
        for (l=0;l<g[j].num;l++)
        { x_rec[l]=g[j].f[l].x;
            y_rec[l]=g[j].f[l].y;
            z_rec[l]=g[j].f[l].z;
        }
        if (length < g[j].num)
        {
            normal ( length , x , g[j].num , new_arr) ;
            summ=metric(x_rec,new_arr,g[j].num,lev);
            summl=metricl(x_rec,new_arr,g[j].num,lev,lev_rb,lev_re);
            normal ( length , y , g[j].num , new_arr) ;
            summ+=metric(y_rec,new_arr,g[j].num,lev);
            summl+=metricl(y_rec,new_arr,g[j].num,lev,lev_rb,lev_re);
```

```
                    normal ( length , z , g[j].num , new_arr) ;
                    summ+=metric(z_rec,new_arr,g[j].num,lev);
                    summl+=metricl(z_rec,new_arr,g[j].num,lev,lev_rb,lev_re);
                    m[i][j]=1-summ/3;
                    ml[i][j]=1-summl/3;
                }
              else
              {
                    normal ( g[j].num , x_rec , length , new_arr) ;
                    summ=metric(x , new_arr , length,lev);
                    summl=metricl(x,new_arr,length,lev,lev_rb,lev_re);

normal ( g[j].num , y_rec , length , new_arr) ;
                    summ+=metric(y , new_arr , length,lev);
                    summl+=metricl(y,new_arr,length,lev,lev_rb,lev_re);

normal ( g[j].num , z_rec , length , new_arr) ;
                    summ+=metric(z , new_arr , length,lev);
                    summl+=metricl(z,new_arr,length,lev,lev_rb,lev_re);
                    m[i][j]=1-summ/3;
                    ml[i][j]=1-summl/3;
              }
            }
        }
       metr=0.0;
       for (i=0;i<=space;i++)
       { max=0.0;
         for (j=0;j<amount;j++)
         if (max < m[j][i]) max=m[j][i];
         metr+=max;
       }
       sort[symb_num].w=metr/(space+1);
       metr=0.0;
       for (i=0;i<=space;i++)
       { max=0.0;
         for (j=0;j<amount;j++)
         if (max < ml[j][i]) max=ml[j][i];
         metr+=max;
       }
       sort[symb_num].m_0=metr/(space+1);
       sort[symb_num].m=(sort[symb_num].w+sort[symb_num].mut_len+
                        sort[symb_num].beg_end)/3.0;
       symb_num++;
    }
fclose(fp1);
num_for_sort=cutt_sort(symb_num,lev_sort,sort);
if (num_for_sort>1)
     qsort(sort,num_for_sort,sizeof(struct S),sort_funct);
i=0;
if (name_file[0] !='b')
  { letter_print=name_file[0];
     SeqNo=(int)(name_file[2]-48);
  }
else
    { if (isdigit( (int) name_file[1] ) !=0)
       { letter_print=name_file[0];
         SeqNo=(int)(name_file[2]-48);
       }
```

```
        else
        { letter_print=toupper ( name_file[1] );
          SeqNo=(int)(name_file[3]-48);
        }
      }
    fprintf(fp2,"---%c0%d--- Level=%f %d\n",letter_print,SeqNo,lev_sort,num_for_sort);
/****************************************************/
// for confusion table
    conf[number-1][sort[0].letter-1]++;
/****************************************************/
    while (i<num_for_sort)
     { fprintf(fp2,"%3d ",sort[i].letter);
       fprintf(fp2,"W=%.5f mut_len=%.5f beg_end=%.5f m_0=%.5f midll=%.5f\n",
          sort[i].w,sort[i].mut_len,sort[i].beg_end,sort[i].m_0,sort[i].m);
       i++;
     }
   }
  }
 }

/*****************************************************************
similarity function defines similarity between parameter and sample of
parameters with known medial ,left and right deviation , and range of definition
(const_l,const_r)
*****************************************************************/
float mut_metric(float param,float medial,float const_l,float const_r,
                                                float dev_l,float dev_r)
{ float left,right,m,div;
  left=medial-dev_l;
  if (left<const_l) left=const_l;
  right=medial+dev_r;
  if (right>const_r) right=const_r;
  if ((param >= left)&&(param <=right))
                                    return(1.0);
  else
   { div=const_r-const_l-right+left+0.0001;
     if (div==0.0) div=medial;
     if (param < left)
              m=1.0 - (left-param)/div;
     if (param > right)
              m=1.0 -(param-right)/div;
   }
  if (m<0.0) m=0.0;
  return(m);
}
/***************************************************
 Calculate file coordinates accordingly new length.
***************************************************/
void normal ( int num_old , float arr_old[] , int num_new , float arr_new[] )
{
 double koeff ;
 int ind_old , ind_new ;
 koeff = (double) ( num_old - 1 ) / (float) ( num_new - 1 ) ;
 arr_new[0] = arr_old[0] ;
 for ( ind_new = 1 ; ind_new < num_new - 1 ; ind_new ++ ) {
   ind_old = (int) ( floor ( koeff * ind_new ) ) ;
   arr_new[ind_new] = ( ind_old + 1 - koeff * ind_new ) * arr_old[ind_old] +
                    ( koeff * ind_new - ind_old ) * arr_old[ind_old + 1] ;
 }
```

```c
    arr_new[ind_new] = arr_old[num_old-1] ;
}
/*****************************************
    Calculate level's metric.
*****************************************/
float metric(float z1[] , float z2[] ,int length,int lev)
{ int i;
  float summ=0;
  for (i=0;i<length;i++)
   summ=summ+fabs(z1[i]-z2[i]);
   return(summ/(float)(length*(lev-1)));
}
/*****************************************
    Calculate zone metric.
*****************************************/
float metricl(float a[],float b[],int length,int lev,int beg,int end)
{
   int calc=0;
   int i;
   float s=0.0;calc=0;
   for (i=0; i < length ; i++)
   {
      if (((a[i] <= (float)end)&&(a[i] >= (float)beg))||(( b[i]<= (float)end)&&( b[i] >= (float)beg)))
      {
        s+=fabs(a[i]-b[i]);
        calc++;
      }
   }
     if(calc==0) s=1;
     s=1.0-s/(float)(calc*(lev-1));
     return(s);
}
```

Combined results from Graphic tablet's and acceleration's recognition

```
struct TAB_ACS
      { char name;
        float tab_w;
        float acs_w;
        float y;
        float x;
        float x_vec;
        float y_vec;
        float amp;
        int up;
        float m_tab;
        float mut_len;
        float beg_end;
        float m_acs;
        float midll;
      };

int matr[100][100];

void write_matr(void)
{ FILE *fout1;
  int i,j;
  fout1 = fopen ("matrix.t_a","w");
  for (i=0;i<26;i++)
     fprintf (fout1,"%c ",97+i);
  for (i=0;i<26;i++)
     fprintf (fout1,"%c ",65+i);
  fprintf (fout1,"\n");
  for (i=0;i<52;i++)
   { for (j=0;j<52;j++)
       fprintf (fout1,"%d ",matr[i][j]);
     fprintf (fout1,"\n");
   }
  fclose(fout1);
} char conv_char(int in_name)
{ if (in_name < 27) return ( (char) (in_name + 96) ); // a-z   1-26
  if (in_name < 53) return ( (char) (in_name + 38) ); // A-Z   27-52
  if (in_name < 63) return ( (char) (in_name - 5) );  // 0-9   53-62
  return(0);
} int conv_int( char a)
{ if ( a < 58 ) return ( (int)a + 4 );
  if ( a < 91 ) return ( (int)a - 39 );
  if ( a < 123) return ( (int)a - 97 );
  return(0);
} void matr_add( char a , char b )
{ matr[conv_int(a)][conv_int(b)]++;
} int sort_funct( const void *a,const void *b)
```

```c
{ if (((struct TAB_ACS *)a)->midll > ((struct TAB_ACS *)b)->midll) return(-1);
  if (((struct TAB_ACS *)a)->midll < ((struct TAB_ACS *)b)->midll) return(1);
  return(0);
} void main(void)
{ struct ACS
        { char name;
          float w;
          float mut_len;
          float beg_end;
          float m_0;
          float midll;
        };
  struct TAB
        { char name;
          float w;
          float y;
          float x;
          float x_vec;
          float y_vec;
          float amp;
          int up;
          float m;
        };
  struct TAB tab[100];
  struct ACS acs[100];
  struct TAB_ACS tab_acs[100];
  FILE *fp,*fp1,*fout;
  int i,j,k,l;
  char name_file_tab;
  char name_file_acs;
  int num_file_tab,num_file_acs;
  int num_tab,num_acs;
  int in_name;
  float temp;
  char tempc;
  int pr;
  int find_file;
  fp=fopen("add_err","r");
  fp1=fopen("sort.out","r");
  fout=fopen("combine","w");

while ( fscanf(fp,"%c %d",&name_file_tab,&num_file_tab)!=EOF)     //add_err
   {
      find_file=0;
printf("---%c0%d---\n",name_file_tab,num_file_tab);
      fseek(fp,8,1);
      fscanf(fp,"%d\n",&num_tab);
      for (i=0;i<num_tab;i++)
        { fscanf(fp,"%c ",&tab[i].name);
          fscanf(fp,"w=%6f ",&temp);
          tab[i].w=temp;
          fscanf(fp,"y=%6f ",&temp);
          tab[i].y=temp;
          fscanf(fp,"x=%6f ",&temp);
          tab[i].x=temp;
          fscanf(fp,"x_vec=%6f ",&temp);
```

```
            tab[i].x_vec=temp;
            fscanf(fp,"y_vec=%6f ",&temp);
            tab[i].y_vec=temp;
            fscanf(fp,"amp=%6f ",&temp);
            tab[i].amp=temp;
            fscanf(fp,"up=%6f ",&temp);
            tab[i].up=temp;
            fscanf(fp,"m=%6f ",&temp);
            tab[i].m=temp;
    }
    while (fscanf(fp1,"—%c",&name_file_acs)!=EOF) //sort_out
    {
        fscanf(fp1,"0%d",&num_file_acs);
        fseek(fp1,21,1);
        fscanf(fp1,"%d\n",&num_acs);
        for (i=0;i<num_acs;i++)
         { fscanf(fp1,"%d",&in_name);
           acs[i].name=conv_char(in_name);
           fscanf(fp1," W=%7f",&temp);
           acs[i].w=temp;
           fscanf(fp1," mut_len=%7f",&temp);
           acs[i].mut_len=temp;
           fscanf(fp1," beg_end=%7f",&temp);
           acs[i].beg_end=temp;
           fscanf(fp1," m_0=%7f",&temp);
           acs[i].m_0=temp;
           fscanf(fp1," midll=%7f\n",&temp);
           acs[i].midll=temp;
         }
        if ((name_file_acs==name_file_tab)&&(num_file_acs==num_file_tab))
         { find_file=1;
           break;
         }
    }
    if ( find_file == 0 )
     { matr_add( name_file_tab , tab[0].name);
       fseek(fp1, 0L, SEEK_SET);
       continue;
     }
    if ( acs[0].name == tab[0].name )
     { matr_add( name_file_tab , tab[0].name);
       fseek(fp1, 0L, SEEK_SET);
       continue;
     }
    else
    { k=0;
        for (i=0;i<num_tab;i++)
         { //tab_acs[k].name=tab[i].name;
           for (j=0;j<num_acs;j++)
             { if ( tab[i].name == acs[j].name )
                { tab_acs[k].name=tab[i].name;
                    tab_acs[k].tab_w = tab[i].w;
                    tab_acs[k].acs_w = acs[j].w;
                    tab_acs[k].y = tab[i].y;
                    tab_acs[k].x = tab[i].x;
                    tab_acs[k].x_vec = tab[i].x_vec;
                    tab_acs[k].y_vec = tab[i].y_vec;
                    tab_acs[k].amp = tab[i].amp;
```

```
                    tab_acs[k].up = tab[i].up;
                    tab_acs[k].m_tab = ( acs[j].w + tab[i].y + tab[i].x_vec + tab[i].amp)/4.0;
                    tab_acs[k].mut_len = acs[j].mut_len;
                    tab_acs[k].beg_end = acs[j].beg_end;
                    tab_acs[k].m_acs = acs[j].midll;
                    tab_acs[k].midll = ( tab_acs[k].m_tab + tab_acs[k].acs_w)/2.0;
                    k++;
                    break;
                }
            }
        }
        fseek(fp1, 0L, SEEK_SET);
    } fprintf(fout,"---%c0%d---%d\n",name_file_tab,num_file_tab,k);
    if ( k==0 ) matr_add(name_file_tab,tab[0].name);
    else
    { qsort(tab_acs, k , sizeof(struct TAB_ACS), sort_funct);
        matr_add(name_file_tab,tab_acs[0].name);
        for (l=0;l<k;l++)
            fprintf(fout," %c---tab_m=%.4f  acs_midll=%.4f  tab_acs=%.4f\n",
                tab_acs[l].name , tab_acs[l].m_tab ,
                tab_acs[l].acs_w , tab_acs[l].midll);
    }
}
fclose(fp1);
fclose(fp);
fclose(fout);
write_matr();
return;
}
```

U 9670-0

APPENDIX C

;PALASM Design Description

;------------------------------ Declaration Segment -----------
TITLE   PALASM DESIGN DESCRIPTION
PATTERN
REVISION 1.0
AUTHOR   HANNA &VECTOR
COMPANY  BAR_ON
DATE    02/27/94

CHIP  _PAL  PAL22V10

;------------------------------ PIN Declarations --------------
```
PIN  1     CLK       COMBINATORIAL   ; CLOCK=12.88MHZ
PIN  2     /RD       COMBINATORIAL   ;INPUT
PIN  3     A0        COMBINATORIAL   ;INPUT
PIN  4     A1        COMBINATORIAL   ;INPUT
PIN  5     A2        COMBINATORIAL   ;INPUT
PIN  6     A3        COMBINATORIAL   ;INPUT
PIN  7     A4        COMBINATORIAL   ;INPUT
PIN  8     A5        COMBINATORIAL   ;INPUT
PIN  9     /RS       COMBINATORIAL   ;INPUT
PIN 10     /REC0     COMBINATORIAL    ;INPUT
PIN 11     /REC1     COMBINATORIAL    ;INPUT
PIN 12     GND
PIN 13     IOCS      COMBINATORIAL    ;INPUT
           ; OUTPUT
PIN 14     /CSC0     COMBINATORIAL    ;INPUT
PIN 15     /CSC1     COMBINATORIAL    ;INPUT
pin 16     /R2       REGISTERED
PIN 17     /R1       REGISTERED
PIN 18     /R0       REGISTERED
PIN 19     MR1       COMBINATORIAL    ;OUTPUT
PIN 20     MR0       COMBINATORIAL    ;OUTPUT
PIN 21     OUTR1     COMBINATORIAL    ;OUTPUT
PIN 22     OUTR0     COMBINATORIAL    ;OUTPUT
PIN 23     /GD       COMBINATORIAL   ;OUTPUT
PIN 24     VCC
```
;------------------------------------------------------------
STRING ADD1  'IOCS*RD*/A5*/A4*/A3*A2*A1*A0'
STRING ADD2  'IOCS*RD*/A5*/A4*A3*/A2*/A1*/A0'
;------------------------------------------------------------
STATE
MOORE_MACHINE
START_UP := POWER_UP -> idle

IDLE :=   RS1    -> CON1
        +RS2     -> CON2
           +-> IDLE

```
CON1 :=  /RD     -> CON3
         +RD     -> CON1

CON2 :=  /RD     -> CON4
         +RD     -> CON2

CON3 :=  VCC     -> IDLE
CON4 :=  VCC     -> IDLE

;-----------------------------------------
IDLE= /R0 * /R1 */R2
CON1= R0 * /R1 * /R2
CON2 = /R0 * R1 * /R2
CON3 = R0 * R1 * /R2
CON4 = /R0 * /R1 * R2

;-----------------------------------------
IDLE.OUTF=/MR0*/MR1
CON1.OUTF=/MR0*/MR1
CON2.OUTF=/MR0*/MR1
CON3.OUTF=MR0
CON4.OUTF=MR1

;-----------------------------------------
CONDITIONS
RS1=ADD1
RS2=ADD2

;-----------------------------------------
EQUATIONS
OUTR0 = RS*REC0
OUTR1 = RS*REC1
GD = IOCS*RD*((/A5*/A4*/A3*A2*(A0 :+: A1))+CSC0+CSC1)

;-----------------------------------------
simulation
TRACE_ON CLK RD MR0 MR1 IOCS A0 A1 A2 A3 A4 A5
PRELOAD IDLE
SETF RD IOCS /A0 /A1 /A2 /A3 /A4 /A5
CLOCKF CLK
CLOCKF CLK
CLOCKF CLK
SETF A3
CLOCKF CLK
CLOCKF CLK
CLOCKF CLK
SETF /RD
CLOCKF CLK
CLOCKF CLK
SETF /IOCS RD /A3 A2 A1 /A0 /CSC0 /CSC1
SETF IOCS
SETF A0 /A1
```

```
SETF /A0
SETF CSC0
SETF CSC1 /CSC0
TRACE_OFF
```

;PALASM Design Description

;------------------------------ Declaration Segment ------------
TITLE    PALASM DESIGN DESCRIPTION
PATTERN
REVISION 1.0
AUTHOR   HANNA &VECTOR
COMPANY  BAR_ON
DATE     02/27/94

CHIP _PAL2 PAL22V10

;------------------------------ PIN Declarations --------------
PIN  1      /RD
PIN  2      FRES
PIN  3      A0
PIN  4      A1
PIN  5      A2
PIN  6      A3
PIN  7      A4
PIN  8      A5
PIN  9      Q0                          ; INPUT
PIN  10     Q1                          ; INPUT
PIN  11     /WR                         ; INPUT
            ; OUTPUT
PIN  13     IOCS
PIN  14     /LS
PIN  15     /CSDAC
PIN  16     /CONVST0
PIN  17     /CONVST1
PIN  18     /CSADC0
PIN  19     /CSADC1
PIN  20     /CSCOUNT0
PIN  21     /CSCOUNT1
PIN  22     CPCOUNT0
PIN  23     CPCOUNT1

;------------------------------ Boolean Equation Segment ------
EQUATIONS
LS=IOCS*/A5*/A4*/A3*/A2
CSDAC=IOCS*WR*/A5*/A4*/A3*(/A2+A2*/A1*/A0)
CONVST0=IOCS*WR*/A5*/A4*/A3*A2*/A1*A0
CONVST1=IOCS*WR*/A5*/A4*/A3*A2*A1*/A0
CSADC0=IOCS*/A5*/A4*/A3*A2*/A1*A0
CSADC1=IOCS*/A5*/A4*/A3*A2*A1*/A0
CSCOUNT0=IOCS*RD*/A5*/A4*/A3*A2*A1*A0
CSCOUNT1=IOCS*RD*/A5*/A4*A3*/A2*/A1*/A0
/CPCOUNT0=FRES*Q0
/CPCOUNT1=FRES*Q1

```
;--------------------------------------------------
SIMULATION
TRACE_ON /RD FRES A0 A1 A2 A3 A4 A5 Q0 Q1 /WR IOCS
SETF IOCS RD WR A0 A1 A2 A3 A4 A5 Q0 Q1 FRES
SETF /WR /A5 /A4 /A3 /A2
SETF /IOCS
SETF IOCS
SETF /RD WR
SETF A2 /A1 /A0
SETF A0
SETF A1 /A0
SETF RD /WR A0
SETF A3 /A0 /A1 /A2
SETF FRES Q0
SETF /FRES /Q0
```

;PALASM Design Description

;-------------------------------- Declaration Segment -----------
TITLE   PALASM DESIGN DESCRIPTION
PATTERN
REVISION 1.0
AUTHOR   HANNA &VECTOR
COMPANY
DATE    02/27/94

CHIP  _cs  PAL22V10

;-------------------------------- PIN Declarations --------------
PIN  1      A6                          ; INPUT
PIN  2      A7
PIN  3      A8
PIN  4      A9
PIN  5      A10
PIN  6      A11
PIN  7      A12
PIN  8      A13
PIN  9      /DMS                        ; INPUT
PIN  10     /PMS                        ; INPUT
PIN  11     /RD                         ; INPUT
PIN  14     /DMS0                       ; OUTPUT
PIN  15     /DMS1                       ; OUTPUT
PIN  16     /PMS0                       ; OUTPUT
PIN  17     /PMS1                       ; OUTPUT
PIN  18     /DMRD                       ; OUTPUT
PIN  19     /IOCS2
PIN  20     IOCS1
;-------------------------------- Boolean Equation Segment ------
STRING IO 'A13*A12*/A11*A10*A9*A8*A7*A6'

EQUATIONS

IOCS1 = IO*DMS
IOCS2 = IO*DMS
DMS0 = /A13*DMS
DMS1 = A13*DMS
PMS0 = /A13 *PMS
PMS1 = A13 * PMS
DMRD = (/A13+/A12+A11+/A10+/A9+/A8+/A7+/A6)*DMS*RD

;-------------------------------- Simulation Segment -----------
SIMULATION
trace_on IOCS1 IOCS2 DMS0 DMS1 PMS0 PMS1 DMRD
SETF A13 A12 A11 A10 A9 A8 A7 A6 DMS /RD /PMS
SETF A13 A12 A11 A10 A9 A8 A7 A6 /DMS /RD PMS

```
SETF A13 A12 /A11 A10 A9 A8 A7 /A6 DMS RD
SETF A13 A12 /A11 A10 A9 A8 A7 A6 DMS RD
SETF /A13 /DMS PMS
SETF /A13 DMS /PMS
SETF A13
SETF /DMS PMS
;-----------------------------------------------------------
```

APPENDIX D

```
.MODULE/SEG=prog_mem    ibmstr02;
.ENTRY                  StartUp;
.INCLUDE                <d:\adi_dsp\include\def2101.h>;
.CONST                  TSCALE=0;
.CONST                  TCOUNT=0x8fff;
.CONST                  TPERIOD=0x8fff;
.VAR/CIRC/DM/RAM/SEG=data_mem   Package[4];
.VAR/CIRC/DM/RAM/SEG=data_mem   Shifter_Const[8];
.VAR/CIRC/DM/RAM/SEG=data_mem   Masks[8];
.GLOBAL Package;
.GLOBAL Shifter_Const;
.GLOBAL Masks;

.INIT                   Shifter_Const : <sh_const.dat>;
.INIT                   Masks : <masks.dat>;
StartUp:
{       Set System Control Register : SPORT0-enable, SPORT1-enable    }

AX0=0x1c1f;
        DM(Sys_Ctrl_reg)=AX0;
{-----------------------------------------------------------------------}
{       Load Tperiod Register for 10 milliseconds                      }

AX0=TPERIOD;
        DM(Tperiod_Reg)=AX0;
{-----------------------------------------------------------------------}
{       Load Tcount Register   for 10 milliseconds                     }

AX0=TCOUNT;
        DM(Tcount_Reg)=AX0;
{-----------------------------------------------------------------------}
{       Load Tscale Register                                           }

AX0=TSCALE;
        DM(Tscale_Reg)=AX0;
{-----------------------------------------------------------------------}
{       Set SPORT0 Control Register : ISCLCK - enable, SLEN =(1+8+1)-1 }

AX0=B#0100101000001001;
        DM(Sport0_Ctrl_Reg)=AX0;
{-----------------------------------------------------------------------}
{       Set SPORT0 Clock Divider to 19200 baud                         }

AX0=0x13f;
        DM(Sport0_Sclkdiv)=AX0;
{-----------------------------------------------------------------------}
{       Set SPORT1 Control Register : ISCLCK - enable, SLEN=(8-1)      }

AX0=0x4a07;
        DM(Sport1_Ctrl_Reg)=AX0;
{-----------------------------------------------------------------------}
{       Set SPORT1 Clock Divider to 80000 cycles                       }

AX0=0x004c;
        DM(Sport1_Sclkdiv)=AX0;
```

```
{----------------------------------------------------------------------}
{       Set Parameters of Circ Buffer Package                          }

I0=^Package;
        M0=1;
        L0=%Package;
        I1=I0;
{----------------------------------------------------------------------}
{       Set Interrupt Control Reg, Set IMASK Reg, Set MSTAT Reg        }

ICNTL=0x17;
        IMASK=0x39;
        MSTAT=0x30;
{----------------------------------------------------------------------}
{       Set Parameters of Circ Buffer Shifter_const                    }

I2=^Shifter_Const;
        I3=^Masks;
        M2=1;
        M3=1;
        L2=%Shifter_Const;
        L3=%Masks;
{----------------------------------------------------------------------}

RTS;

.ENDMOD;
```

```
.MODULE/SEG=prog_mem        ibmwac01;
.INCLUDE                    <d:\adi_dsp\include\def2101.h>;
.CONST MASK_RS232=B#0000000001;
.CONST DATA_BITS_1=B#11111110;
.CONST DATA_BITS_2=B#00000000111111100;
.CONST MASK_SYNCHROBIT=B#100000000;
.CONST EXCITATION_WORD=0x0055;
.EXTERNAL                   StartUp;
.EXTERNAL                   Revers;
.PORT                       x_counter_port;
.PORT                       y_counter_port;
.EXTERNAL                   Package;

JUMP StartMouse; NOP; NOP; NOP;         {Interupt vector table}
        RTI; NOP; NOP; NOP;                     {No interrupts used}
        JUMP Transmit_Next; NOP; NOP; NOP;
        RTI; NOP; NOP; NOP;
        RTI; NOP; NOP; NOP;
        RTI; NOP; NOP; NOP;
        JUMP Sampling; NOP; NOP; NOP;

StartMouse: {Setting all Control Registers and other parameters}

{       Set system parameters : Timer, SPORT's                          }

CALL    StartUp;
{---------------------------------------------------------------}

{       Set Parameters of Circ Buffer

I0=^Package;
        M0=1;
        L0=%Package;
        I1=I0;
{---------------------------------------------------------------}

{       Set Interrupt Control Reg, Set IMASK Reg, Set MSTAT Reg

ICNTL=0x17;
        IMASK=0x39;
        MSTAT=0x30;
{---------------------------------------------------------------}

{       Send first signal to UST                                        }

TX1=EXCITATION_WORD;
{---------------------------------------------------------------}

MLoop:  {Main loop of program}
        IDLE;                                   {Wait for Timer Interrupt}
        JUMP MLoop;

Sampling: {Timer Interrupt Service routine (every 3ms)}

MR0=DM(x_counter_port);                 {Read X counter}
        MR1=DM(y_counter_port);                 {Read Y counter}
        TX1=EXCITATION_WORD;                    {Transmit signal to UST}

{
ëëëëëëëëùëëëëëëëëëùëëëëëëëëëëùëëëëëëîëëëëëîëëëëëîëëëëëîëëëëëîëëëëëîëëëëëùëëëëëë£
¤ Pack. ¤    9    ¤    8    ¤    7   °   6   °   5   °   4   °   3   °   2   °   1   ¤   0   ¤
```

```
▫ for    ▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫
▫ PC     ▫Start Bit▫Sync. Bit▫            Data Bits             ▫Stop ▫
▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫
▫Byte 1 ▫    0    ▫    1    ▫ PEN ° F11 ° F10 ° F09 ° F08 ° F07 ° F06 ▫  1  ▫
▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫
▫Byte 2 ▫    0    ▫    0    ▫  0  ° F05 ° F04 ° F03 ° F02 ° F01 ° F00 ▫  1  ▫
▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫
▫Byte 3 ▫    0    ▫    0    ▫  0  ° S11 ° S10 ° S09 ° S08 ° S07 ° S06 ▫  1  ▫
▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫
▫Byte 4 ▫    0    ▫    0    ▫  0  ° S05 ° S04 ° S03 ° S02 ° S01 ° S00 ▫  1  ▫
▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫▫
}

{       Buiding the First byte of Package for PC                    }

AR=MASK_RS232;
        AY0=MASK_SYNCHROBIT;
        AF=AR OR AY0;
        SR=LSHIFT MR0 BY 11 (LO) ;
        AY1=DATA_BITS_1;
        AR=SR1 AND AY1;
        CALL Revers;
        SR=LSHIFT AR BY 1 (LO) ;
        AR=SR0 OR AF;
        DM(I0,M0)=AR;

{-----------------------------------------------------------------}

{       Buiding the Second byte of Package for PC                   }

AR=MASK_RS232;
        AY0=0;
        AF=AR OR AY0;
        SR=LSHIFT MR0 BY 18 (LO) ;
        AY1=DATA_BITS_2;
        AR=SR1 AND AY1;
        CALL Revers;
        SR=LSHIFT AR BY 1 (LO) ;
        AR=SR0 OR AF;
        DM(I0,M0)=AR;
{-----------------------------------------------------------------}

{       Buiding the Third byte of Package for PC                    }

SR=LSHIFT MR1 BY 12 (LO) ;
        AY1=DATA_BITS_1;
        AR=SR1 AND AY1;
        CALL Revers;
        SR=LSHIFT AR BY 1 (LO) ;
        AR=SR0 OR AF;
        DM(I0,M0)=AR;
{-----------------------------------------------------------------}

{       Buiding the Fourth byte of Package for PC                   }

SR=LSHIFT MR1 BY 18 (LO) ;
        AY1=DATA_BITS_1;
        AR=SR1 AND AY1;
        CALL Revers;
        SR=LSHIFT AR BY 1 (LO) ;
        AR=SR0 OR AF;
        DM(I0,M0)=AR;
{-----------------------------------------------------------------}
```

```
{       Send First Byte to PC                                          }

AX0=DM(I0,M0);
        TX0=AX0;
{------------------------------------------------------------------}

RTI;

Transmit_Next:

AX1=I0;
        AY1=I1;
        AR=AX1-AY1;
        IF EQ JUMP Out_Interrupt;

Send_Next:
        AX0=DM(I0,M0);
        TX0=AX0;

Out_Interrupt:

RTI;
.ENDMOD;
```

```
.SYSTEM                         ibmwacom01 ;
.ADSP2101;
.MMAP0;
.SEG/ROM/BOOT=0/CODE            boot_pm[2048];
.SEG/PM/RAM/ABS=0/CODE          prog_mem[2048];
.SEG/DM/RAM/ABS=0x3800/DATA     data_mem[1024];
.PORT/DM/ABS=0x3400             x_counter_port;
.PORT/DM/ABS=0x3401             y_counter_port;
.ENDSYS;
```

U 9670-0
APPENDIX E

```c
extern int COUNTS1[15000];
extern int COUNTS2[15000];
extern char pen_up[15000];

define BUFFER_SIZE 60000 define MIN_COUNT 850
define MAX_COUNT 1800 define MINX -120
define MINY 700
#define MAXX 800
define MAXY 1600 include <stdio.h>
include "extern.h"
int Initialize (void)
{
   FILE *fp;
   int ndx=0,tmp;

if ((fp=fopen ("temp.tst","r+t"))==NULL)
      return -1;

while (fscanf (fp,"%d %d  %d",&COUNTS1[ndx],&COUNTS2[ndx],&tmp)>0  &&
ndx<15000)
      {
        pen_up[ndx++]=(char)tmp;
      }
   fclose (fp);
   if (ndx==15000)
      printf ("array exceeds 15000!!! , not all fioleis read\n");
   return ndx;
}
```

```c
#include "const.h"
#include <graphics.h>
#include <conio.h>
#include <stdio.h>
#include <math.h>
include <Stdlib.h> int Initialize (void);
void butter_filt0(float in[],float out[]);

define GR_ON int COUNTS1[15000],COUNTS2[15000];
char far pen_up[15000];
pragma argsused int main ( )
{
   int repl ;
   int i,ndx ;
   unsigned char c1,c2,flx=0,fly=0;
   unsigned int count1,count2;
   int gdriver = DETECT, gmode, errorcode;
   int ScrMaxX,ScrMaxY;
   int CountRange,XRange,YRange;
   float x_cor,y_cor;
   float NewCountAX[3] , NewCountAY [3];
   float CountAX[5] , CountAY[5];
   float ax=0.,ay=0.;
   float InFilt[2] , OutFilt[2];
   int NumPoints,CountNdx=0;
   float temp;

#ifdef GR_ON
   initgraph(&gdriver, &gmode, "C:\\BORLANDC\\BGI");
   errorcode = graphresult();
   if (errorcode != grOk)
   {
      printf("Graphics error: %s\n", grapherrormsg(errorcode));
      printf("Press any key to halt:");
      getch();
      return -2;
   }
endif ScrMaxX= getmaxx();
   ScrMaxY= getmaxy();
   CountRange = MAX_COUNT - MIN_COUNT;
```

```
XRange = MAXX - MINX;
YRange = MAXY - MINY;

if ((NumPoints=Initialize ())<0)
{
   printf ("unable to initalize\n");
   return -1;
} count1=COUNTS1[CountNdx];
count2=COUNTS2[CountNdx++];

NewCountAX[0]=NewCountAX[1]=NewCountAX[2] =count1;
NewCountAY[0]=NewCountAY[1]=NewCountAY[2] =count2;
CountAX[0]=CountAX[1]=CountAX[2]=count1;
CountAY[0]=CountAY[1]=CountAY[2]=count2;
InFilt[0]=NewCountAX[1];   InFilt[1]=NewCountAY[1];

InFilt[0]=375. -
        ((float)NewCountAX[1]*NewCountAX[1]-
        (float)NewCountAY[1]*NewCountAY[1])/1500.;
temp=(float)NewCountAY[1]*NewCountAY[1]-InFilt[0]*InFilt[0];
if (temp>0)
   InFilt[1]=(float)sqrt(temp);

x_cor = (((InFilt[0] - MINX) / (float)XRange ) * ScrMaxX);
y_cor = (((InFilt[1] - MINY) / (float)YRange ) * ScrMaxY);
#ifdef GR_ON
   moveto (x_cor,y_cor);
endif ndx=0;
NewCountAX[0]=NewCountAX[1]=NewCountAX[2]=COUNTS1[CountNdx];
NewCountAY[0]= NewCountAY[1]=NewCountAY[2]=COUNTS2[CountNdx];

CountAX[0]=CountAX[1]=CountAX[2]=CountAX[3]=CountAX[4]=COUNTS1[CountNdx];

CountAY[0]=CountAY[1]=CountAY[2]=CountAY[3]=CountAY[4]=COUNTS2[CountN
dx++];
   while (CountNdx<NumPoints)
   {
         count1=COUNTS1[CountNdx];
         count2=COUNTS2[CountNdx++];

NewCountAX[0]=NewCountAX[1];  NewCountAY[0]=NewCountAY[1];
         NewCountAX[1]=NewCountAX[2];  NewCountAY[1]=NewCountAY[2];
/*       NewCountAX[2]=count1;  NewCountAY[2]=count2;
*/       CountAX[0]=CountAX[1];  CountAY[0]=CountAY[1];
         CountAX[1]=CountAX[2];  CountAY[1]=CountAY[2];
```

```
CountAX[2]=CountAX[3];   CountAY[2]=CountAY[3];
CountAX[3]=CountAX[4];   CountAY[3]=CountAY[4];
CountAX[4]=count1;   CountAY[4]=count2;
if ( flx )
  {
    NewCountAX[2]=(CountAX[3]-CountAX[0])*2./3.+ NewCountAX[0];
    flx = 0;
  }
  else
if (abs(CountAX[2]-NewCountAX[1]-ax)<10)
   NewCountAX[2]=CountAX[2]-ax;
else if ( abs(CountAX[1]-CountAX[3]) < 12)
   NewCountAX[2]=(CountAX[1]+CountAX[3])/2.- ax;
else if ( abs(CountAX[1]-CountAX[4]) < 12)
    {
     NewCountAX[2]=(CountAX[4]-CountAX[1])/3.+ CountAX[1]-ax;
     flx = 1;
    }
    else
    {float tmp;
       tmp = (NewCountAX[1]-NewCountAX[0]+CountAX[3]-CountAX[2])/2;
       ax=(CountAX[2]-NewCountAX[1]-tmp);
       NewCountAX[2]=CountAX[2]-ax;
    } if ( fly )
  {
    NewCountAY[2]=(CountAY[3]-CountAY[0])*2./3.+ NewCountAY[0];
    fly = 0;
  }
  else
if (abs(CountAY[2]-NewCountAY[1]-ay)<10)
   NewCountAY[2]=CountAY[2]-ay;
else if ( abs(CountAY[1]-CountAY[3]) < 12)
   NewCountAY[2]=(CountAY[1]+CountAY[3])/2.- ay;
else if ( abs(CountAY[1]-CountAY[4]) < 12)
    {
     NewCountAY[2]=(CountAY[4]-CountAY[1])/3.+ CountAY[1]-ay;
     fly = 1;
    }
    else
    {float tmp;
       tmp = (NewCountAY[1]-NewCountAY[0]+CountAY[3]-CountAY[2])/2;
       ay=(CountAY[2]-NewCountAY[1]-tmp);
       NewCountAY[2]=CountAY[2]-ay;
    }
/*
if (abs(CountAY[1]-NewCountAY[0]-ay)<10)
   {NewCountAY[1]=CountAY[1]-ay; apy=ay;}
```

```
            else if ( abs(CountAY[0]-CountAY[2]) < 12)
              {NewCountAY[1]=(int)(CountAY[0]+CountAY[2])/2.- ay; apy=ay;}
            else if (ay==apy)
            {
              apy=ay;
              ay=(int)(CountAY[1]-NewCountAY[0]);
              NewCountAY[1]=CountAY[1]-ay;
            }
*/
            InFilt[0]=375. -
                    ((float)NewCountAX[2]*NewCountAX[2]-
                    (float)NewCountAY[2]*NewCountAY[2])/1500.;
            temp=(float)NewCountAY[2]*NewCountAY[2]-InFilt[0]*InFilt[0];
            if (temp>0)
               InFilt[1]=(float)sqrt(temp);

butter_filt0(InFilt,OutFilt);

#ifdef GR_ON
         x_cor = (((OutFilt[0] - MINX) / (float)XRange ) * ScrMaxX)*(480./640.);
         y_cor = (((OutFilt[1] - MINY) / (float)YRange ) * ScrMaxY);
         if ( CountNdx>21)
            {
             if ( pen_up[CountNdx-20] && !pen_up[CountNdx-21] )
                 moveto ((x_cor-200)*2,(y_cor-100)*2);
               else
                if ( pen_up[CountNdx-20] )
                  lineto ((x_cor-200)*2,(y_cor-100)*2);
            }
endif ifndef GR_ON
           printf ( " % 0 4 d % 0 4 d % 0 4 d
%04d\n",NewCountAX[1],NewCountAY[1],(int)OutFilt[0],(int)OutFilt[1]);
         /*printf ("%u %u\n",BuffIn,BuffOut);*/
         ndx++;
#endif
         if (kbhit())
         {
           if (getch()==0)
              getch();
           break;
         }
         /*if (OverFlowFlag)
         {
            printf ("Buffer OverFlow\n");
            continue;
         } */
      }
```

```c
/*CloseInterrComm ( portbase ) ;*/
#ifdef GR_ON
   while (!kbhit()) /* do nothing */ ;
   getch();
/*   closegraph();*/
#endif
   return 0 ;
}

/***********************************************************************
*Reconstruction and drawing of pen's movement and Symbols
***********************************************************************/
#include <conio.h>
#include <stdio.h>
#include <math.h>
#include <stdlib.h>

/*
   Filtration by low PASS filter Butterworth 4 order. and
   cutoff freq. .04 from half sampling rate
   Input : aray in.
   Output : array out.
*/
void butter_filt0(float in[],float out[])
{
    static float a[5]=  {1., -3.6717291, 5.0679984, -3.1159669, .71991033};
    static float b[5]={1.3293729e-05,5.3174916e-05,7.9762373e-05,5.3174916e-05,1.3293729e-05};

static float y[2][5],x[2][5];
    int i,j;
    float sum=0.;
    static int fl=0;

for(j=0;j<2;j++)
     {
      if ( !fl )
        for(i=0;i<5;i++)
         {
            y[j][i] = in[j];
            x[j][i] = in[j];
         }
      for(i=4;i>0;i--)
         x[j][i] = x[j][i-1];
      x[j][0] = in[j];
```

```
        if ( fl )
          {
            sum = 0;
            for(i=4;i>0;i--)
               y[j][i] = y[j][i-1];
            for(i=0;i<5;i++)
               sum += b[i]*x[j][i];
            for(i=1;i<5;i++)
               sum -= a[i]*y[j][i];
            y[j][0] = sum;
            out[j]= sum;;
          }
          else
            out[j] = in[j];
      }
      if ( !fl ) fl=1;
   }
```

We claim:

1. Handwriting recognition apparatus comprising:

handwriting input apparatus employing at least two different sensing techniques to sense handwriting and including at least one accelerometer located in a hand held writing implement other than at a tip thereof; and symbol identification apparatus receiving an output of the handwriting input apparatus for providing an output indication of symbols represented by the handwriting, and wherein said symbol identification apparatus includes a first identification channel for employing an input from said handwriting input apparatus to provide a first output representing identification of symbols, a second identification channel for employing an input from said at least one accelerometer to provide a second output representing identification of symbols, and symbol selection apparatus for selecting between the first and the second outputs based on predetermined criteria.

2. Handwriting recognition apparatus according to claim 1 and wherein said handwriting input apparatus comprises a position digitizer.

3. Handwriting recognition apparatus according to claim 2 and wherein said at least one accelerometer comprises a plurality of mutually orthogonally disposed accelerometers.

4. Handwriting recognition apparatus according claim 2 and wherein said symbol identification apparatus includes combined position and acceleration processing apparatus which combines the inputs from said digitizer and said at least one accelerometer in identifying symbols.

5. Handwriting recognition apparatus according to claim 1 and wherein said handwriting input apparatus comprises ultrasonic position determination apparatus operative in air.

6. Handwriting recognition apparatus according to claim 5 and wherein said handwriting input apparatus is operative to write on a computer screen.

7. Apparatus for detecting pen-surface contact comprising:

at least one accelerometer located in a pen other than at a tip thereof measuring at least one component of acceleration of a user's hand manipulating the pen; and a pen-surface contact detector receiving an input from the accelerometer which is filtered to remove components other than noise.

8. Apparatus for detecting pen-surface contact according to claim 7 and wherein said detector comprises an acceleration noise analyzer operative to extract noise out of the acceleration data and employs the noise for detecting pen-surface contact.

9. Apparatus for detecting pen-surface contact according to claim 7 wherein said at least one accelerometer is retrofittable onto the pen.

10. A handwriting recognition method comprising:

receiving information regarding the acceleration of a writing implement from three mutually orthogonal accelerometers mounted on the writing implement other than at a tip thereof; and identifying symbols written by the writing implement at least partly on the basis of a comparison between the acceleration of the writing implement and stored acceleration sequences characterizing each of a plurality of symbols, and wherein said step of identifying symbols employs input from a digitizer to provide a first output representing identification of symbols along a first identification channel and employs input from said accelerometers to provide a second output representing identification of symbols along a second identification channel and selects between the first and the second outputs based on predetermined criteria.

11. Handwriting recognition apparatus comprising:

a characteristic acceleration sequence memory operative to store acceleration sequences characterizing each of a plurality of symbols;

a writing implement monitor operative to receive information regarding acceleration of a writing implement from three mutually orthogonal accelerometers mounted on said writing implement other than at a tip thereof; and a symbol identifier operative to provide an output indication of symbols written by the writing implement at least partly on the basis of a comparison between the acceleration of the writing implement and the stored acceleration sequences, wherein said symbol identifier includes a first identification channel for employing input from a digitizer to provide a first output representing identification of symbols, a second identification channel for employing input from said accelerometers to provide a second output representing identification of symbols, and symbol selection apparatus for selecting between the first and the second outputs based on predetermined criteria.

12. Handwriting recognition apparatus according to claim 11 wherein said writing implement monitor is also operative to receive information regarding the position of said writing implement.

13. Handwriting recognition method comprising:

employing at least one accelerometer located in a hand held writing implement other than at a tip thereof and at least one additional different sensing technique to sense handwriting; and receiving an output indication of the handwriting and providing an output indication of symbols represented by the handwriting, and wherein said step of providing an output indication of symbols employs input from a digitizer to provide a first output representing identification of symbols along a first identification channel and employs input from said at least one accelerometer to provide a second output representing identification of symbols along a second identification channel and selects between the first and the second outputs based on predetermined criteria.

14. A handwriting recognition method according to claim 13 and wherein said at least one additional sensing technique comprises:

position digitizing.

15. A handwriting recognition method according to claim 14 and also comprising identifying symbols by combining digitized position inputs and sensed acceleration information.

16. A handwriting recognition method according to claim 13 and wherein said receiving includes:

employing digitized position inputs to provide a first output representing identification of symbols;

employing acceleration information to provide a second output representing identification of symbols; and selecting between the first and second outputs.

17. A method for detecting pen-surface contact comprising:

employing at least one accelerometer located in a pen other than at a tip thereof for measuring at least one component of acceleration of a user's hand manipulating a pen; and receiving an input from the accelerometer which is filtered to remove components other than noise.

18. Handwriting recognition apparatus comprising:

handwriting input apparatus including:
- at least first and second different handwriting sensors producing first and second handwriting outputs, at least one of said first and second different handwriting sensors comprising at least one accelerometer located in a hand held writing implement other than at a tip thereof; and
- an associator for combining the first and second handwriting outputs to provide an enhanced performance handwriting output; and symbol identification apparatus receiving said enhanced performance handwriting output for providing an output indication of symbols represented by the handwriting, and wherein said symbol identification apparatus includes a first identification channel employing said first handwriting output to provide a first identification output, a second identification channel employing said second handwriting output to provide a second symbol identification output, and symbol selection apparatus for selecting between the first and the second symbol identification outputs based on predetermined criteria.

19. Handwriting recognition apparatus according to claim 18 and wherein said second handwriting sensor comprises a pad.

20. Handwriting recognition apparatus according to claim 18 and wherein said second handwriting sensor comprises ultrasonic position determination apparatus operative in air.

21. Handwriting recognition apparatus according to claim 20 and wherein said second handwriting sensor is operative to sense handwriting on a computer screen.

22. Handwriting recognition apparatus according to claim 18 and wherein at least one of said first and second handwriting sensors comprises apparatus operative to sense the location of the writing implement.

23. Handwriting recognition apparatus according to claim 18 and wherein said associator is operative to correlate first and second handwriting outputs in a two dimensional domain.

24. Handwriting recognition apparatus according to claim 18 and wherein said associator is operative to correlate first and second handwriting outputs in a time domain.

25. A handwriting recognition method comprising:
- employing at least one accelerometer located in a hand held writing implement other than at a tip thereof and at least one additional different sensor to produce first and second handwriting outputs;
- combining the first and second handwriting outputs to provide an enhanced performance handwriting output; and
- employing said enhanced performance handwriting output for providing an output indication of symbols represented by the handwriting,
- and wherein said steps of combining and employing employ said first handwriting output to provide a first output representing identification of symbols along a first identification channel and employ said second handwriting output to provide a second output representing identification of symbols along a second identification channel and select between the first and the second outputs based on predetermined criteria.

26. A method according to claim 25 and wherein said at least one additional different sensor is operative to sense the location of a writing implement.

27. A method according to claims 25 and wherein the step of combining includes correlating said first and second handwriting outputs in a two dimensional domain.

28. A method according to claim 25 and wherein the step of combining includes correlating said first and second handwriting outputs in a time domain.

29. Hand imaging recognition apparatus comprising:

hand imaging input apparatus employing at least two different sensing techniques to sense hand imaging and including at least one accelerometer located in a hand held writing implement other than at a tip thereof; and shape identification apparatus receiving an output of the hand imaging input apparatus for providing an output indication of shapes represented by the hand imaging, wherein said shape identification apparatus includes a first identification channel for employing an input produced using a first one of said at least two different sensing techniques to provide a first output representing identification of shapes, a second identification channel for employing an input produced using a second one of said at least two different sensing techniques to provide a second output representing identification of shapes, and shape selection apparatus for selecting between the first and the second outputs based on predetermined criteria.

30. Hand imaging recognition apparatus according to claim 29 and wherein said hand imaging input apparatus comprises a position digitizer.

31. Hand imaging recognition apparatus according to claim 29 and wherein said hand imaging includes at least one of drawing and handwriting.

32. Hand imaging recognition apparatus according to claim 29 and wherein said input apparatus comprises ultrasonic position determination apparatus operative in air.

33. Hand imaging recognition apparatus according to claim 29 and wherein said shape identification apparatus includes combined position and acceleration processing apparatus which combines the inputs from said digitizer and said at least one accelerometer in identifying shapes.

34. Hand imaging recognition apparatus according to claim 29 and wherein said at least one accelerometer is retrofittable onto the writing implement.

35. A hand imaging recognition method comprising:
- receiving information regarding the acceleration of a writing implement from three mutually orthogonal accelerometers mounted on said writing implement other than at a tip thereof; and
- identifying shapes written by the writing implement at least partly on the basis of a comparison between the acceleration of the writing implement and stored acceleration sequences characterizing each of a plurality of shapes,
- and wherein said step of identifying shapes employs input from a digitizer to provide a first output representing identification of shapes along a first identification channel and employs input from said accelerometers to provide a second output representing identification of shapes along a second identification channel and selects between the first and the second outputs based on predetermined criteria.

36. A hand imaging recognition method according to claim 35 and also comprising receiving information regarding the position of a writing implement.

37. A hand imaging recognition method according to claim 35 and also comprising storing acceleration sequences characterizing each of a first plurality of shapes as generated by each of a second plurality of users.

38. Hand imaging recognition apparatus comprising:
a characteristic acceleration sequence memory operative to store acceleration sequences characterizing each of a plurality of shapes;
a writing implement monitor operative to receive information regarding acceleration of a writing implement from three mutually orthogonal accelerometers mounted on said writing implement other than at a tip thereof; and
a shape identifier operative to provide an output indication of shapes written by the writing implement at least partly on the basis of a comparison between the acceleration of the writing implement and the stored acceleration sequences,
wherein said shape identifier includes a first identification channel for employing an input produced using a first sensing technique to provide a first output representing identification of shapes, a second identification channel for employing an input produced using a second sensing technique to provide a second output representing identification of shapes, and shape selection apparatus for selecting between the first and the second outputs based on predetermined criteria.

39. Hand imaging recognition apparatus according to claim 38 wherein said writing implement monitor is also operative to receive information regarding the position of said writing implement.

40. A hand imaging recognition method comprising:
employing at least one accelerometer located in a hand held writing implement other than at a tip thereof and at least one additional different sensing technique to sense hand imaging; and
receiving an output of the hand imaging and providing an output indication of shapes represented by the hand imaging,
and wherein said step of providing an output indication of shapes employs input from a digitizer to provide a first output representing identification of shapes along a first identification channel and employs input from said at least one accelerometer to provide a second output representing identification of shapes along a second identification channel and selects between the first and the second outputs based on predetermined criteria.

41. A hand imaging recognition method according to claim 40 and wherein said at last one additional sensing technique comprises:
position digitizing.

42. A hand imaging recognition method according to claim 40 and also comprising identifying shapes by combining digitized position inputs and sensed acceleration information.

43. A hand imaging recognition method according to claim 40 and wherein said receiving step includes:
employing digitized position inputs to provide a first output representing identification of shapes;
employing acceleration information to provide a second output representing identification of shapes; and
selecting between the first and second outputs.

44. A hand imaging recognition method comprising:
employing at least one accelerometer located in a hand held writing implement other than at a tip thereof and at least one additional different sensing technique to sense hand imaging; and
receiving an output of the hand imaging and providing an output indication of shapes represented by the hand imaging and wherein said receiving and providing comprises extracting noise out of the acceleration data and employing the noise for detecting pen-surface contact.

45. Hand imaging recognition apparatus comprising:
hand imaging input apparatus including:
at least first and second different hand imaging sensors producing first and second hand imaging outputs, at least one of said first and second different hand imaging sensors comprising at least one accelerometer located in a hand held writing implement other than at a tip thereof; and
an associator for combining the first and second hand imaging outputs to provide an enhanced performance hand imaging output; and
shape identification apparatus receiving said enhanced performance hand imaging output for providing an output indication of shapes represented by the hand imaging,
wherein said shade identification apparatus includes a first identification channel employing said first hand imaging output to provide a first shape identification output, a second identification channel employing said second hand imaging output to provide a second shape identification output, and shape selection apparatus for selecting between the first and the second shape identification outputs based on predetermined criteria.

46. Hand imaging recognition apparatus according to claim 45 and wherein said second hand imaging sensor comprises a pad.

47. Handwriting recognition apparatus according to claim 45 and wherein said second handwriting sensor comprises an ultrasonic position determination apparatus operative in air.

48. Hand imaging recognition apparatus according to claim 45 and wherein at least one of said first and second handwriting sensors comprises apparatus operative to sense the location of the writing implement.

49. Hand imaging recognition apparatus according to claim 45 and wherein said associator is operative to correlate first and second hand imaging outputs in a two dimensional domain.

50. Hand imaging recognition apparatus according to claim 45 and wherein said associator is operative to correlate first and second hand imaging outputs in a time domain.

51. A hand imaging recognition method comprising:
employing at least one accelerometer located in a hand held imaging implement other than at a tip thereof and at least one additional different sensor to produce first and second hand imaging outputs;
combining the first and second hand imaging outputs to provide an enhanced performance hand imaging output; and
employing said enhanced performance hand imaging output and providing an output indication of shapes represented by the hand imaging,
and wherein said steps of combining and employing employ said first hand imaging output to provide a first output representing identification of shades along a first identification channel and employ said second hand imaging output to provide a second output representing identification of shapes along a second identification channel and select between the first and the second outputs based on predetermined criteria.

52. A method according to claim 51 and wherein at least one of said first and second handwriting sensors is operative to sense the location of a writing implement.

53. A method according to claim 51 and wherein the combining includes correlating said first and second hand imaging outputs in a two dimensional domain.

54. A method according to claim 51 and wherein the combining includes correlating said first and second hand imaging outputs in a time domain.

* * * * *